US010085038B2

(12) United States Patent
Sato et al.

(10) Patent No.: US 10,085,038 B2
(45) Date of Patent: Sep. 25, 2018

(54) ENCODING DEVICE, ENCODING METHOD, DECODING DEVICE, AND DECODING METHOD

(71) Applicant: SONY CORPORATION, Tokyo (JP)

(72) Inventors: Kazushi Sato, Kanagawa (JP); Shuo Lu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 523 days.

(21) Appl. No.: 14/427,844

(22) PCT Filed: Sep. 20, 2013

(86) PCT No.: PCT/JP2013/075518
§ 371 (c)(1),
(2) Date: Mar. 12, 2015

(87) PCT Pub. No.: WO2014/050748
PCT Pub. Date: Apr. 3, 2014

(65) Prior Publication Data
US 2015/0222921 A1 Aug. 6, 2015

(30) Foreign Application Priority Data

Sep. 28, 2012 (JP) .................................. 2012-218303
Apr. 3, 2013 (JP) .................................. 2013-077661

(51) Int. Cl.
H04N 19/53 (2014.01)
H04N 19/597 (2014.01)
(Continued)

(52) U.S. Cl.
CPC ............. *H04N 19/53* (2014.11); *H04N 19/30* (2014.11); *H04N 19/44* (2014.11);
(Continued)

(58) Field of Classification Search
CPC combination set(s) only.
See application file for complete search history.

(56) References Cited

U.S. PATENT DOCUMENTS

2009/0003445 A1   1/2009  Ying et al.
2009/0080535 A1*  3/2009  Yin .................. H04N 19/63
                                                375/240.26
(Continued)

FOREIGN PATENT DOCUMENTS

CN       101288311 A    10/2008
CN       101606391 A    12/2009
(Continued)

OTHER PUBLICATIONS

International Search Report dated Dec. 24, 2013 in PCT/JP2013/075518.
(Continued)

*Primary Examiner* — Janese Duley
(74) *Attorney, Agent, or Firm* — Oblon, McClelland, Maier & Neustadt, L.L.P.

(57) ABSTRACT

The present technology relates to an encoding device, an encoding method, a decoding device, and a decoding method, which are capable of sharing or predicting information related to a reference image of an image having a hierarchical structure. An enhancement encoding unit sets reference image specifying generation information used for generation of reference image specifying information of an enhancement image using reference image specifying information serving as information related to a reference image used when the enhancement image is encoded and reference image specifying information serving as information related to a reference image of a base image. The enhancement encoding unit encodes the enhancement image using the reference image, and generates encoded data. A transmission unit transmits the encoded data and the reference image (Continued)

specifying generation information. For example, the present technology can be applied to the encoding device.

3 Claims, 112 Drawing Sheets

(51) Int. Cl.
    *H04N 19/503*     (2014.01)
    *H04N 19/70*     (2014.01)
    *H04N 19/30*     (2014.01)
    *H04N 19/44*     (2014.01)
    *H04N 19/593*     (2014.01)
    *H04N 19/91*     (2014.01)
    *H04N 19/96*     (2014.01)

(52) U.S. Cl.
    CPC ......... *H04N 19/503* (2014.11); *H04N 19/593* (2014.11); *H04N 19/597* (2014.11); *H04N 19/70* (2014.11); *H04N 19/91* (2014.11); *H04N 19/96* (2014.11)

(56) References Cited

U.S. PATENT DOCUMENTS

| | | |
|---|---|---|
| 2009/0285299 A1 | 11/2009 | Chen et al. |
| 2010/0020867 A1 | 1/2010 | Wiegand et al. |
| 2010/0158110 A1* | 6/2010 | Pandit ............... H04N 19/105 375/240.12 |
| 2010/0215095 A1* | 8/2010 | Hayase ............... H04N 19/105 375/240.02 |
| 2013/0208792 A1* | 8/2013 | He ............... H04N 19/00569 375/240.12 |
| 2013/0251030 A1* | 9/2013 | Wang ............... H04N 19/105 375/240.03 |
| 2015/0103898 A1* | 4/2015 | Ye ..................... H04N 19/70 375/240.12 |

FOREIGN PATENT DOCUMENTS

| | | |
|---|---|---|
| EP | 1 806 930 A1 | 7/2007 |
| JP | 2008-535424 A | 8/2008 |
| JP | 2009-512347 A | 3/2009 |
| JP | 2009-100473 A | 5/2009 |
| JP | 2009-522888 A | 6/2009 |
| JP | 2010-517343 A | 5/2010 |

OTHER PUBLICATIONS

Benjamin Bross, et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d7, 9$^{th}$ Meeting, (Apr. 27-May 7, 2012), 277 pages.

Benjamin Bross, et al., "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003_d7, 10$^{th}$ Meeting, (Jul. 11-20, 2012), 261 pages.

Extended European Search Report dated May 10, 2016 in Patent Application No. 13841545.0.

Do-Kyoung Kwon, et al., "Inter-layer slice header syntax element prediction in SHVC", Joint Collaborative Team on Video Coding (JCT-VC) of ITU-T SG 16 WP 3 and ISO/IEC JTC 1/SC 29/WG 11, JCTVC-L0231, XP030056135, 2013, 4 Pages.

Shuo Lu, et al., "AHG9: Inter-layer RPS Prediction", Joint Collaborative Team on Video Coding (JCT-VC) of ITU-T SG 16 WP 3 and ISO/IEC JTC 1/SC 29/WG 11, JCTVC-M0140rl, XP030057122, 2013, pp. 1-9.

Danny Hong, et al., "Scalability Support in HEVC", Joint Collaborative Team on Video Coding (JCT-VC) of ITU-T SG16 WP3 and ISO/IEC JTC1/SC29/WG11, JCTVC-F290, XP030009313, 2011, pp. 1-12.

Japanese Office Action dated Sep. 26, 2017 in Patent Application No. 2014-538469.

Combined Chinese Office Action and Search Report dated Aug. 18, 2017 in Patent Application No. 201380061119.3 (with English Translation).

Japanese Office Action dated Jun. 27, 2017 in Patent Appication No. 2014/538469 (without English Translation).

Danny Hong et al., "Scalability Support in HEVC", Joint Collaborative Team on Video Coding (JCT-VC) of ITU-T SG16 WP3 and ISO/IEC JTC1/SC29/WG11, JCTVC-F290, 2011, pp. 1-15 and cover page.

Hyomin Choi et al., "Scalable Structures and Inter-layer Predictions for HEVC Scalable Extension", Joint Collaborative Team on Video Coding (JCT-VC) of ITU-T SG16 WP3 and ISO/IEC JTC1/SC29/WG11, JCTVC-F096, 2011, pp. 1-15 and cover page.

* cited by examiner

FIG. 1
RELATED ART

| 1 | video_parameter_set_rbsp( ) { | Descriptor |
|---|---|---|
| 2 | video_parameter_set_id | u(4) |
| 3 | vps_temporal_id_nesting_flag | u(1) |
| 4 | vps_reserved_zero_2bits | u(2) |
| 5 | vps_reserved_zero_6bits | u(6) |
| 6 | vps_max_sub_layers_minus1 | u(3) |
| 7 | profile_and_level( 1, vps_max_sub_layers_minus1 ) | |
| 8 | vps_reserved_zero_12bits | u(12) |
| 9 | for( i = 0; i <= vps_max_sub_layers_minus1; i++ ) { | |
| 10 | vps_max_dec_pic_buffering[ i ] | ue(v) |
| 11 | vps_max_num_reorder_pics[ i ] | ue(v) |
| 12 | vps_max_latency_increase[ i ] | ue(v) |
| 13 | } | |
| 14 | vps_num_hrd_parameters | ue(v) |
| 15 | for( i = 0; i < vps_num_hrd_parameters; i++ ) { | |
| 16 | if( i > 0 ) | |
| 17 | op_point( i ) | |
| 18 | hrd_parameters( i = = 0, vps_max_sub_layers_minus1 ) | |
| 19 | } | |
| 20 | vps_extension_flag | u(1) |
| 21 | if( vps_extension_flag ) | |
| 22 | while( more_rbsp_data( ) ) | |
| 23 | vps_extension_data_flag | u(1) |
| 24 | } | |
| 25 | rbsp_trailing_bits( ) | |
| 26 | } | |

FIG. 7

| | | Descriptor |
|---|---|---|
| 1 | seq_parameter_set_rbsp( ) { | |
| 2 |    video_parameter_set_id | u(4) |
| 3 |    sps_max_sub_layers_minus1 | u(3) |
| 4 |    sps_reserved_zero_bit | u(1) |
| 5 |    profile_and_level( 1, sps_max_sub_layers_minus1 ) | |
| 6 |    seq_parameter_set_id | ue(v) |
| 7 |    chroma_format_idc | ue(v) |
| 8 |    if( chroma_format_idc  = =  3 ) | |
| 9 |       separate_colour_plane_flag | u(1) |
| 10 |    pic_width_in_luma_samples | ue(v) |
| 11 |    pic_height_in_luma_samples | ue(v) |
| 12 |    pic_cropping_flag | u(1) |
| 13 |    if( pic_cropping_flag ) { | |
| 14 |       pic_crop_left_offset | ue(v) |
| 15 |       pic_crop_right_offset | ue(v) |
| 16 |       pic_crop_top_offset | ue(v) |
| 17 |       pic_crop_bottom_offset | ue(v) |
| 18 |    } | |
| 19 |    bit_depth_luma_minus8 | ue(v) |
| 20 |    bit_depth_chroma_minus8 | ue(v) |
| 21 |    pcm_enabled_flag | u(1) |
| 22 |    if( pcm_enabled_flag ) { | |
| 23 |       pcm_sample_bit_depth_luma_minus1 | u(4) |
| 24 |       pcm_sample_bit_depth_chroma_minus1 | u(4) |
| 25 |    } | |
| 26 |    log2_max_pic_order_cnt_lsb_minus4 | ue(v) |
| 27 |    for( i = 0; i <= sps_max_sub_layers_minus1; i++ ) { | |
| 28 |       sps_max_dec_pic_buffering[ i ] | ue(v) |
| 29 |       sps_max_num_reorder_pics[ i ] | ue(v) |
| 30 |       sps_max_latency_increase[ i ] | ue(v) |
| 31 |    } | |
| 32 |    restricted_ref_pic_lists_flag | u(1) |
| 33 |    if( restricted_ref_pic_lists_flag ) | |
| 34 |       lists_modification_present_flag | u(1) |
| 35 |    log2_min_coding_block_size_minus3 | ue(v) |
| 36 |    log2_diff_max_min_coding_block_size | ue(v) |
| 37 |    log2_min_transform_block_size_minus2 | ue(v) |
| 38 |    log2_diff_max_min_transform_block_size | ue(v) |
| 39 |    if( pcm_enabled_flag ) { | |
| 40 |       log2_min_pcm_coding_block_size_minus3 | ue(v) |
| 41 |       log2_diff_max_min_pcm_coding_block_size | ue(v) |
| 42 |    } | |
| 43 |    max_transform_hierarchy_depth_inter | ue(v) |
| 44 |    max_transform_hierarchy_depth_intra | ue(v) |
| 45 |    scaling_list_enable_flag | u(1) |
| 46 |    if( scaling_list_enable_flag ) { | |
| 47 |       sps_scaling_list_data_present_flag | u(1) |

FIG. 8

| 1 | if( sps_scaling_list_data_present_flag ) | |
|---|---|---|
| 2 | scaling_list_data( ) | |
| 3 | } | |
| 4 | amp_enabled_flag | u(1) |
| 5 | sample_adaptive_offset_enabled_flag | u(1) |
| 6 | if( pcm_enabled_flag ) | |
| 7 | pcm_loop_filter_disable_flag | u(1) |
| 8 | sps_temporal_id_nesting_flag | u(1) |
| 9 | num_short_term_ref_pic_sets | ue(v) |
| 10 | for( i = 0; i < num_short_term_ref_pic_sets; i++) | |
| 11 | short_term_ref_pic_set( i ) | |
| 12 | long_term_ref_pics_present_flag | u(1) |
| 13 | if( long_term_ref_pics_present_flag ) { | |
| 14 | num_long_term_ref_pics_sps | ue(v) |
| 15 | for( i = 0; i < num_long_term_ref_pics_sps; i++ ) { | |
| 16 | lt_ref_pic_poc_lsb_sps[ i ] | u(v) |
| 17 | used_by_curr_pic_lt_sps_flag[ i ] | u(1) |
| 18 | } | |
| 19 | } | |
| 20 | sps_temporal_mvp_enable_flag | u(1) |
| 21 | vui_parameters_present_flag | u(1) |
| 22 | if( vui_parameters_present_flag ) | |
| 23 | vui_parameters( ) | |
| 24 | sps_extension_flag | u(1) |
| 25 | if( sps_extension_flag ) | |
| 26 | while( more_rbsp_data( ) ) | |
| 27 | sps_extension_data_flag | u(1) |
| 28 | rbsp_trailing_bits( ) | |
| 29 | } | |

FIG. 9

| | | Descriptor |
|---|---|---|
| 1 | slice_header( ) { | |
| 2 |   first_slice_in_pic_flag | u(1) |
| 3 |   if( RapPicFlag ) | |
| 4 |     no_output_of_prior_pics_flag | u(1) |
| 5 |   pic_parameter_set_id | ue(v) |
| 6 |   if( !first_slice_in_pic_flag ) | |
| 7 |     slice_address | u(v) |
| 8 |   if( dependent_slice_enabled_flag && !first_slice_in_pic_flag ) | |
| 9 |     dependent_slice_flag | u(1) |
| 10 |   if( !dependent_slice_flag ) { | |
| 11 |     slice_type | ue(v) |
| 12 |     if( output_flag_present_flag ) | |
| 13 |       pic_output_flag | u(1) |
| 14 |     if( separate_colour_plane_flag == 1 ) | |
| 15 |       colour_plane_id | u(2) |
| 16 |     if( !IdrPicFlag ) { | |
| 17 |       pic_order_cnt_lsb | u(v) |
| 18 |       short_term_ref_pic_set_sps_flag | u(1) |
| 19 |       if( !short_term_ref_pic_set_sps_flag ) | |
| 20 |         short_term_ref_pic_set( num_short_term_ref_pic_sets ) | |
| 21 |       else | |
| 22 |         short_term_ref_pic_set_idx | u(v) |
| 23 |       if( long_term_ref_pics_present_flag ) { | |
| 24 |         if( num_long_term_ref_pics_sps > 0 ) | |
| 25 |           num_long_term_sps | ue(v) |
| 26 |           num_long_term_pics | ue(v) |
| 27 |         for( i = 0; i < num_long_term_sps + num_long_term_pics; i++ ) { | |
| 28 |           if( i < num_long_term_sps ) | |
| 29 |             lt_idx_sps[ i ] | u(v) |
| 30 |           else { | |
| 31 |             poc_lsb_lt[ i ] | u(v) |
| 32 |             used_by_curr_pic_lt_flag[ i ] | u(1) |
| 33 |           } | |
| 34 |           delta_poc_msb_present_flag[ i ] | u(1) |
| 35 |           if( delta_poc_msb_present_flag[ i ] ) | |
| 36 |             delta_poc_msb_cycle_lt[ i ] | ue(v) |
| 37 |         } | |
| 38 |       } | |
| 39 |     } | |
| 40 |     if( sample_adaptive_offset_enabled_flag ) { | |
| 41 |       slice_sao_luma_flag | u(1) |
| 42 |       slice_sao_chroma_flag | u(1) |
| 43 |     } | |
| 44 |     if( slice_type == P || slice_type == B ) { | |
| 45 |       if( sps_temporal_mvp_enable_flag ) | |
| 46 |         slice_temporal_mvp_enable_flag | u(1) |
| 47 |       num_ref_idx_active_override_flag | u(1) |

FIG. 10

| 1 | if( num_ref_idx_active_override_flag ) { | |
|---|---|---|
| 2 | num_ref_idx_l0_active_minus1 | ue(v) |
| 3 | if( slice_type = = B ) | |
| 4 | num_ref_idx_l1_active_minus1 | ue(v) |
| 5 | } | |
| 6 | if( lists_modification_present_flag ) | |
| 7 | ref_pic_list_modification( ) | |
| 8 | if( slice_type = = B ) | |
| 9 | mvd_l1_zero_flag | u(1) |
| 10 | if( cabac_init_present_flag ) | |
| 11 | cabac_init_flag | u(1) |
| 12 | if( slice_temporal_mvp_enable_flag ) { | |
| 13 | if( slice_type = = B ) | |
| 14 | collocated_from_l0_flag | u(1) |
| 15 | if(( collocated_from_l0_flag && num_ref_idx_l0_active_minus1 > 0 )<br>\|\| ( !collocated_from_l0_flag &&<br>num_ref_idx_l1_active_minus1 > 0 )) | |
| 16 | collocated_ref_idx | ue(v) |
| 17 | } | |
| 18 | if(( weighted_pred_flag && slice_type = = P) \|\|<br>( weighted_bipred_flag && slice_type = = B )) | |
| 19 | pred_weight_table( ) | |
| 20 | five_minus_max_num_merge_cand | ue(v) |
| 21 | } | |
| 22 | slice_qp_delta | se(v) |
| 23 | if( pic_slice_level_chroma_qp_offsets_present_flag ) { | |
| 24 | slice_cb_qp_offset | se(v) |
| 25 | slice_cr_qp_offset | se(v) |
| 26 | } | |
| 27 | if( deblocking_filter_control_present_flag ) { | |
| 28 | if( deblocking_filter_override_enabled_flag ) | |
| 29 | deblocking_filter_override_flag | u(1) |
| 30 | if( deblocking_filter_override_flag ) { | |
| 31 | slice_header_disable_deblocking_filter_flag | u(1) |
| 32 | if( !slice_header_disable_deblocking_filter_flag ) { | |
| 33 | beta_offset_div2 | se(v) |
| 34 | tc_offset_div2 | se(v) |
| 35 | } | |
| 36 | } | |
| 37 | } | |
| 38 | if( loop_filter_across_slices_enabled_flag &&<br>( slice_sao_luma_flag \|\| slice_sao_chroma_flag \|\|<br>!disable_deblocking_filter_flag )) | |
| 39 | slice_loop_filter_across_slices_enabled_flag | u(1) |
| 40 | } | |
| 41 | if( tiles_enabled_flag \|\| entropy_coding_sync_enabled_flag ) { | |
| 42 | num_entry_point_offsets | ue(v) |
| 43 | if( num_entry_point_offsets > 0 ) { | |
| 44 | offset_len_minus1 | ue(v) |

FIG. 11

| | | |
|---|---|---|
| 1 | for( i = 0; i < num_entry_point_offsets; i++ ) | |
| 2 |     entry_point_offset[ i ] | u(v) |
| 3 | } | |
| 4 | } | |
| 5 | if( slice_header_extension_present_flag ) { | |
| 6 |   slice_header_extension_length | ue(v) |
| 7 |   for( i = 0; i < slice_header_extension_length; i++) | |
| 8 |     slice_header_extension_data_byte[ i ] | u(8) |
| 9 | } | |
| 10 | byte_alignment( ) | |
| 11 | } | |

FIG. 12

| | | |
|---|---|---|
| 1 | short_term_ref_pic_set( idx ) { | Descriptor |
| 2 |   inter_ref_pic_set_prediction_flag | u(1) |
| 3 |   if( inter_ref_pic_set_prediction_flag ) { | |
| 4 |     if( idx = = num_short_term_ref_pic_sets ) | |
| 5 |       delta_idx_minus1 | ue(v) |
| 6 |     delta_rps_sign | u(1) |
| 7 |     abs_delta_rps_minus1 | ue(v) |
| 8 |     for( j = 0; j <= NumDeltaPocs[ RIdx ]; j++ ) { | |
| 9 |       used_by_curr_pic_flag[ j ] | u(1) |
| 10 |       if( !used_by_curr_pic_flag[ j ] ) | |
| 11 |         use_delta_flag[ j ] | u(1) |
| 12 |     } | |
| 13 |   } | |
| 14 |   else { | |
| 15 |     num_negative_pics | ue(v) |
| 16 |     num_positive_pics | ue(v) |
| 17 |     for( i = 0; i < num_negative_pics; i++ ) { | |
| 18 |       delta_poc_s0_minus1[ i ] | ue(v) |
| 19 |       used_by_curr_pic_s0_flag[ i ] | u(1) |
| 20 |     } | |
| 21 |     for( i = 0; i < num_positive_pics; i++ ) { | |
| 22 |       delta_poc_s1_minus1[ i ] | ue(v) |
| 23 |       used_by_curr_pic_s1_flag[ i ] | u(1) |
| 24 |     } | |
| 25 |   } | |
| 26 | } | |

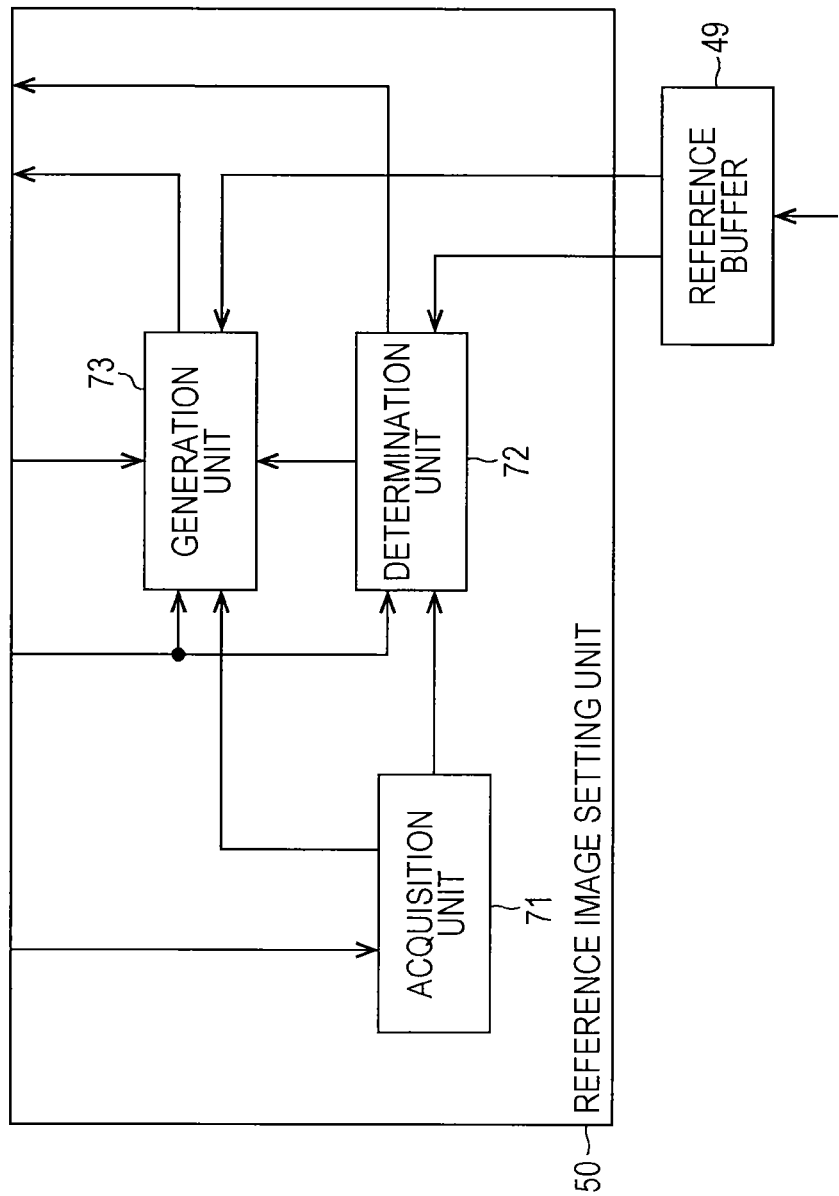

FIG. 17

| | | Descriptor |
|---|---|---|
| 1 | seq_parameter_set_rbsp( ) { | |
| 2 |   video_parameter_set_id | u(4) |
| 3 |   sps_max_sub_layers_minus1 | u(3) |
| 4 |   sps_reserved_zero_bit | u(1) |
| 5 |   profile_and_level( 1, sps_max_sub_layers_minus1 ) | |
| 6 |   seq_parameter_set_id | ue(v) |
| 7 |   chroma_format_idc | ue(v) |
| 8 |   if( chroma_format_idc == 3 ) | |
| 9 |     separate_colour_plane_flag | u(1) |
| 10 |   pic_width_in_luma_samples | ue(v) |
| 11 |   pic_height_in_luma_samples | ue(v) |
| 12 |   pic_cropping_flag | u(1) |
| 13 |   if( pic_cropping_flag ) { | |
| 14 |     pic_crop_left_offset | ue(v) |
| 15 |     pic_crop_right_offset | ue(v) |
| 16 |     pic_crop_top_offset | ue(v) |
| 17 |     pic_crop_bottom_offset | ue(v) |
| 18 |   } | |
| 19 |   bit_depth_luma_minus8 | ue(v) |
| 20 |   bit_depth_chroma_minus8 | ue(v) |
| 21 |   pcm_enabled_flag | u(1) |
| 22 |   if( pcm_enabled_flag ) { | |
| 23 |     pcm_sample_bit_depth_luma_minus1 | u(4) |
| 24 |     pcm_sample_bit_depth_chroma_minus1 | u(4) |
| 25 |   } | |
| 26 |   log2_max_pic_order_cnt_lsb_minus4 | ue(v) |
| 27 |   for( i = 0; i <= sps_max_sub_layers_minus1; i++ ) { | |
| 28 |     sps_max_dec_pic_buffering[ i ] | ue(v) |
| 29 |     sps_max_num_reorder_pics[ i ] | ue(v) |
| 30 |     sps_max_latency_increase[ i ] | ue(v) |
| 31 |   } | |
| 32 |   restricted_ref_pic_lists_flag | u(1) |
| 33 |   if( restricted_ref_pic_lists_flag ) | |
| 34 |     lists_modification_present_flag | u(1) |
| 35 |   log2_min_coding_block_size_minus3 | ue(v) |
| 36 |   log2_diff_max_min_coding_block_size | ue(v) |
| 37 |   log2_min_transform_block_size_minus2 | ue(v) |
| 38 |   log2_diff_max_min_transform_block_size | ue(v) |
| 39 |   if( pcm_enabled_flag ) { | |
| 40 |     log2_min_pcm_coding_block_size_minus3 | ue(v) |
| 41 |     log2_diff_max_min_pcm_coding_block_size | ue(v) |
| 42 |   } | |
| 43 |   max_transform_hierarchy_depth_inter | ue(v) |
| 44 |   max_transform_hierarchy_depth_intra | ue(v) |
| 45 |   scaling_list_enable_flag | u(1) |
| 46 |   if( scaling_list_enable_flag ) { | |
| 47 |     sps_scaling_list_data_present_flag | u(1) |

FIG. 18

| 1 | if( sps_scaling_list_data_present_flag ) | |
| --- | --- | --- |
| 2 |    scaling_list_data( ) | |
| 3 | } | |
| 4 | amp_enabled_flag | u(1) |
| 5 | sample_adaptive_offset_enabled_flag | u(1) |
| 6 | if( pcm_enabled_flag ) | |
| 7 |    pcm_loop_filter_disable_flag | u(1) |
| 8 | sps_temporal_id_nesting_flag | u(1) |
| 9 | short_term_ref_pic_pred_mode | u(2) |
| 10 | if( short_term_ref_pic_pred_mode !=0 ) { | |
| 11 |    num_short_term_ref_pic_sets | ue(v) |
| 12 |    for( i = 0; i < num_short_term_ref_pic_sets; i++) | |
| 13 |      short_term_ref_pic_set( i , short_term_ref_pic_pred_mode ) | |
| 14 | } | |
| 15 | long_term_ref_pics_present_flag | u(1) |
| 16 | if( long_term_ref_pics_present_flag ) { | |
| 17 |    long_term_ref_pics_pred_mode | u(2) |
| 18 |    if( long_term_ref_pic_pred_mode == 2 ) { | |
| 19 |      num_long_term_ref_pics_sps | ue(v) |
| 20 |      for( i = 0; i < num_long_term_ref_pics_sps; i++ ) { | |
| 21 |         lt_ref_pic_poc_lsb_sps[ i ] | u(v) |
| 22 |         used_by_curr_pic_lt_sps_flag[ i ] | u(1) |
| 23 |    } | |
| 24 |    }else if( long_term_ref_pic_pred_mode == 1 ) { | |
| 25 |      diff_num_long_term_ref_pics_sps | se(v) |
| 26 |      for( i = 0; i < num_long_term_ref_pics_sps; i++ ) { | |
| 27 |         diff_lt_ref_pic_poc_lsb_sps[ i ] | s(v) |
| 28 |    } | |
| 29 |    } | |
| 30 | } | |
| 31 | sps_temporal_mvp_enable_flag | u(1) |
| 32 | vui_parameters_present_flag | u(1) |
| 33 | if( vui_parameters_present_flag ) | |
| 34 |    vui_parameters( ) | |
| 35 | sps_extension_flag | u(1) |
| 36 | if( sps_extension_flag ) | |
| 37 |    while( more_rbsp_data( )) | |
| 38 |      sps_extension_data_flag | u(1) |
| 39 | rbsp_trailing_bits( ) | |
| 40 | } | |

FIG. 19

| | | Descriptor |
|---|---|---|
| 1 | slice_header( ) { | |
| 2 |   first_slice_in_pic_flag | u(1) |
| 3 |   if( RapPicFlag ) | |
| 4 |     no_output_of_prior_pics_flag | u(1) |
| 5 |   pic_parameter_set_id | ue(v) |
| 6 |   if( !first_slice_in_pic_flag ) | |
| 7 |     slice_address | u(v) |
| 8 |   if( dependent_slice_enabled_flag && !first_slice_in_pic_flag ) | |
| 9 |     dependent_slice_flag | u(1) |
| 10 |   if( !dependent_slice_flag ) { | |
| 11 |     slice_type | ue(v) |
| 12 |     if( output_flag_present_flag ) | |
| 13 |       pic_output_flag | u(1) |
| 14 |     if( separate_colour_plane_flag == 1 ) | |
| 15 |       colour_plane_id | u(2) |
| 16 |     if( !IdrPicFlag ) { | |
| 17 |       pic_order_cnt_lsb | u(v) |
| 18 |       short_term_ref_pic_set_sps_flag | u(1) |
| 19 |       if( !short_term_ref_pic_set_sps_flag ) { | |
| 20 |         short_term_ref_pic_pred_mode | u(2) |
| 21 |         if( short_term_ref_pic_pred_mode !=0 ) | |
| 22 |         short_term_ref_pic_set( num_short_term_ref_pic_sets , short_term_ref_pic_pred_mode ) | |
| 23 |       } else | |
| 24 |         short_term_ref_pic_set_idx | u(v) |
| 25 |       if( long_term_ref_pics_present_flag ) { | |
| 26 |         long_term_ref_pics_pred_mode | |
| 27 |         if( long_term_ref_pics_pred_mode == 2 ) { | |
| 28 |           if( num_long_term_ref_pics_sps > 0 ) | |
| 29 |             num_long_term_sps | ue(v) |
| 30 |           num_long_term_pics | ue(v) |
| 31 |           for( i = 0; i < num_long_term_sps + num_long_term_pics; i++ ) { | |
| 32 |             if( i < num_long_term_sps ) | |
| 33 |               lt_idx_sps[ i ] | u(v) |
| 34 |             else { | |
| 35 |               poc_lsb_lt[ i ] | u(v) |
| 36 |               used_by_curr_pic_lt_flag[ i ] | u(1) |
| 37 |             } | |
| 38 |             delta_poc_msb_present_flag[ i ] | u(1) |
| 39 |             if( delta_poc_msb_present_flag[ i ] ) | |
| 40 |               delta_poc_msb_cycle_lt[ i ] | ue(v) |
| 41 |           } | |
| 42 |         }else if(long_term_ref_pics_pred_mode == 1 ) { | |
| 43 |           if( num_long_term_ref_pics_sps > 0 ) | |
| 44 |             diff_num_long_term_sps | se(v) |
| 45 |           diff_num_long_term_pics | se(v) |
| 46 |           for( i = 0; i < num_long_term_sps + num_long_term_pics; i++ ) { | |

FIG. 20

| | | |
|---|---|---|
| 1 | if( i < num_long_term_sps ) | |
| 2 | lt_idx_sps[ i ] | s(v) |
| 3 | else { | |
| 4 | diff_poc_lsb_lt[ i ] | s(v) |
| 5 | } | |
| 6 | if( delta_poc_msb_present_flag[ i ] ) | |
| 7 | diff_delta_poc_msb_cycle_lt[ i ] | se(v) |
| 8 | } | |
| 9 | } | |
| 10 | } | |
| 11 | ; | |
| 12 | if( sample_adaptive_offset_enabled_flag ) { | |
| 13 | slice_sao_luma_flag | u(1) |
| 14 | slice_sao_chroma_flag | u(1) |
| 15 | } | |
| 16 | if( slice_type = = P \|\| slice_type = = B ) { | |
| 17 | if( sps_temporal_mvp_enable_flag ) | |
| 18 | slice_temporal_mvp_enable_flag | u(1) |
| 19 | num_ref_idx_active_override_flag | u(1) |
| 20 | if( num_ref_idx_active_override_flag ) { | |
| 21 | num_ref_idx_l0_active_minus1 | ue(v) |
| 22 | if( slice_type = = B ) | |
| 23 | num_ref_idx_l1_active_minus1 | ue(v) |
| 24 | } | |
| 25 | if( lists_modification_present_flag ) | |
| 26 | ref_pic_list_modification( ) | |
| 27 | if( slice_type = = B ) | |
| 28 | mvd_l1_zero_flag | u(1) |
| 29 | if( cabac_init_present_flag ) | |
| 30 | cabac_init_flag | u(1) |
| 31 | if( slice_temporal_mvp_enable_flag ) { | |
| 32 | if( slice_type = = B ) | |
| 33 | collocated_from_l0_flag | u(1) |
| 34 | if(( collocated_from_l0_flag && num_ref_idx_l0_active_minus1 > 0 ) \|\| ( !collocated_from_l0_flag && num_ref_idx_l1_active_minus1 > 0 )) | |
| 35 | collocated_ref_idx | ue(v) |
| 36 | } | |
| 37 | if(( weighted_pred_flag && slice_type = = P) \|\| ( weighted_bipred_flag && slice_type = = B )) | |
| 38 | pred_weight_table( ) | |
| 39 | five_minus_max_num_merge_cand | ue(v) |
| 40 | : | |
| 41 | slice_qp_delta | se(v) |
| 42 | if( pic_slice_level_chroma_qp_offsets_present_flag ) { | |
| 43 | slice_cb_qp_offset | se(v) |

FIG. 21

| 1 | slice_cr_qp_offset | se(v) |
|---|---|---|
| 2 | } | |
| 3 | if( deblocking_filter_control_present_flag ) { | |
| 4 |   if( deblocking_filter_override_enabled_flag ) | |
| 5 |     deblocking_filter_override_flag | u(1) |
| 6 |   if( deblocking_filter_override_flag ) { | |
| 7 |     slice_header_disable_deblocking_filter_flag | u(1) |
| 8 |     if( !slice_header_disable_deblocking_filter_flag ) { | |
| 9 |       beta_offset_div2 | se(v) |
| 10 |       tc_offset_div2 | se(v) |
| 11 |     } | |
| 12 |   } | |
| 13 | } | |
| 14 | if( loop_filter_across_slices_enabled_flag &&<br>  ( slice_sao_luma_flag \|\| slice_sao_chroma_flag \|\|<br>  !disable_deblocking_filter_flag )) | |
| 15 |   slice_loop_filter_across_slices_enabled_flag | u(1) |
| 16 | } | |
| 17 | if( tiles_enabled_flag \|\| entropy_coding_sync_enabled_flag ) { | |
| 18 |   num_entry_point_offsets | ue(v) |
| 19 |   if( num_entry_point_offsets > 0 ) { | |
| 20 |     offset_len_minus1 | ue(v) |
| 21 |     for( i = 0; i < num_entry_point_offsets; i++ ) | |
| 22 |       entry_point_offset[ i ] | u(v) |
| 23 |   } | |
| 24 | } | |
| 25 | if( slice_header_extension_present_flag ) { | |
| 26 |   slice_header_extension_length | ue(v) |
| 27 |   for( i = 0; i < slice_header_extension_length; i++) | |
| 28 |     slice_header_extension_data_byte[ i ] | u(8) |
| 29 | } | |
| 30 | byte_alignment( ) | |
| 31 | } | |

FIG. 22

| 1 | short_term_ref_pic_set( idx , short_term_ref_pics_pred_mode ) { | Descriptor |
|---|---|---|
| 2 |   inter_ref_pic_set_prediction_flag | u(1) |
| 3 |   if( inter_ref_pic_set_prediction_flag ) { | |
| 4 |     if( short_term_ref_pics_pred_mode == 2) { | |
| 5 |       if( idx == num_short_term_ref_pic_sets ) | |
| 6 |         delta_idx_minus1 | ue(v) |
| 7 |       delta_rps_sign | u(1) |
| 8 |       abs_delta_rps_minus1 | ue(v) |
| 9 |       for( j = 0; j <= NumDeltaPocs[ RIdx ]; j++ ) { | |
| 10 |         used_by_curr_pic_flag[ j ] | u(1) |
| 11 |         if( !used_by_curr_pic_flag[ j ] ) | |
| 12 |           use_delta_flag[ j ] | u(1) |
| 13 |       } | |
| 14 |     }else if( short_term_ref_pics_pred_mode == 1) { | |
| 15 |       if( idx == num_short_term_ref_pic_sets ) | |
| 16 |         diff_delta_idx_minus1 | se(v) |
| 17 |       diff_abs_delta_rps_minus1 | se(v) |
| 18 |     } | |
| 19 |   } | |
| 20 |   } | |
| 21 |   else { | |
| 22 |     if( short_term_ref_pics_pred_mode == 2) { | |
| 23 |       num_negative_pics | ue(v) |
| 24 |       num_positive_pics | ue(v) |
| 25 |       for( i = 0; i < num_negative_pics; i++ ) { | |
| 26 |         delta_poc_s0_minus1[ i ] | ue(v) |
| 27 |         used_by_curr_pic_s0_flag[ i ] | u(1) |
| 28 |       } | |
| 29 |       for( i = 0; i < num_positive_pics; i++ ) { | |
| 30 |         delta_poc_s1_minus1[ i ] | ue(v) |
| 31 |         used_by_curr_pic_s1_flag[ i ] | u(1) |
| 32 |       } | |
| 33 |     }else if( short_term_ref_pics_pred_mode == 1) { | |
| 34 |       diff_num_negative_pics | se(v) |
| 35 |       diff_num_positive_pics | se(v) |
| 36 |       for( i = 0; i < num_negative_pics; i++ ) { | |
| 37 |         diff_delta_poc_s0_minus1[ i ] | se(v) |
| 38 |       } | |
| 39 |       for( i = 0; i < num_positive_pics; i++ ) { | |
| 40 |         diff_delta_poc_s1_minus1[ i ] | se(v) |
| 41 |       } | |
| 42 |     } | |
| 43 |   } | |
| 44 | } | |

FIG. 23

| 1 | video_parameter_set_rbsp( ) { | Descriptor |
|---|---|---|
| 2 |   video_parameter_set_id | u(4) |
| 3 |   vps_temporal_id_nesting_flag | u(1) |
| 4 |   vps_reserved_zero_2bits | u(2) |
| 5 |   vps_reserved_zero_6bits | u(6) |
| 6 |   vps_max_layers_minus1 | u(3) |
| 7 |   vps_max_sub_layers_minus1 | u(3) |
| 8 |   profile_and_level( 1, vps_max_sub_layers_minus1 ) | |
| 9 |   vps_reserved_zero_12bits | u(12) |
| 10 |   for( i = 0; i <= vps_max_sub_layers_minus1; i++ ) { | |
| 11 |     vps_max_dec_pic_buffering[ i ] | ue(v) |
| 12 |     vps_max_num_reorder_pics[ i ] | ue(v) |
| 13 |     vps_max_latency_increase[ i ] | ue(v) |
| 14 |   } | |
| 15 |   diff_ref_layer[0] = 0 | |
| 16 |   for( i = 1; i <= vps_max_layers_minus1; i++ ) | |
| 17 |     diff_ref_layer[i] | ue(v) |
| 18 |   vps_num_hrd_parameters | ue(v) |
| 19 |   for( i = 0; i < vps_num_hrd_parameters; i++ ) { | |
| 20 |     if( i > 0 ) | |
| 21 |       op_point( i ) | |
| 22 |     hrd_parameters( i == 0, vps_max_sub_layers_minus1 ) | |
| 23 |   } | |
| 24 |   vps_extension_flag | u(1) |
| 25 |   if( vps_extension_flag ) | |
| 26 |     while( more_rbsp_data( )) | |
| 27 |       vps_extension_data_flag | u(1) |
| 28 |   } | |
| 29 |   rbsp_trailing_bits( ) | |
| 30 | } | |

FIG. 40

| | | C | Descriptor |
|---|---|---|---|
| 1 | pic_parameter_set_rbsp( ) { | | |
| 2 |   pic_parameter_set_id | 1 | ue(v) |
| 3 |   seq_parameter_set_id | 1 | ue(v) |
| 4 |   entropy_coding_mode_flag | 1 | u(1) |
| 5 |   bottom_field_pic_order_in_frame_present_flag | 1 | u(1) |
| 6 |   num_slice_groups_minus1 | 1 | ue(v) |
| 7 |   if( num_slice_groups_minus1 > 0 ) { | | |
| 8 |     slice_group_map_type | 1 | ue(v) |
| 9 |     if( slice_group_map_type == 0 ) | | |
| 10 |       for( iGroup = 0; iGroup <= num_slice_groups_minus1; iGroup++ ) | | |
| 11 |         run_length_minus1[ iGroup ] | 1 | ue(v) |
| 12 |     else if( slice_group_map_type == 2 ) | | |
| 13 |       for( iGroup = 0; iGroup < num_slice_groups_minus1; iGroup++ ) { | | |
| 14 |         top_left[ iGroup ] | 1 | ue(v) |
| 15 |         bottom_right[ iGroup ] | 1 | ue(v) |
| 16 |       } | | |
| 17 |     else if( slice_group_map_type == 3 \|\|<br>        slice_group_map_type == 4 \|\|<br>        slice_group_map_type == 5 ) { | | |
| 18 |       slice_group_change_direction_flag | 1 | u(1) |
| 19 |       slice_group_change_rate_minus1 | 1 | ue(v) |
| 20 |     } else if( slice_group_map_type == 6 ) { | | |
| 21 |       pic_size_in_map_units_minus1 | 1 | ue(v) |
| 22 |       for( i = 0; i <= pic_size_in_map_units_minus1; i++ ) | | |
| 23 |         slice_group_id[ i ] | 1 | u(v) |
| 24 |     } | | |
| 25 |   } | | |
| 26 |   num_ref_idx_l0_default_active_minus1 | 1 | ue(v) |
| 27 |   num_ref_idx_l1_default_active_minus1 | 1 | ue(v) |
| 28 |   weighted_pred_flag | 1 | u(1) |
| 29 |   weighted_bipred_idc | 1 | u(2) |
| 30 |   pic_init_qp_minus26  /* relative to 26 */ | 1 | se(v) |
| 31 |   pic_init_qs_minus26  /* relative to 26 */ | 1 | se(v) |
| 32 |   chroma_qp_index_offset | 1 | se(v) |
| 33 |   deblocking_filter_control_present_flag | 1 | u(1) |
| 34 |   constrained_intra_pred_flag | 1 | u(1) |
| 35 |   redundant_pic_cnt_present_flag | 1 | u(1) |
| 36 |   if( more_rbsp_data( )) { | | |
| 37 |     transform_8x8_mode_flag | 1 | u(1) |
| 38 |     pic_scaling_matrix_present_flag | 1 | u(1) |
| 39 |     if( pic_scaling_matrix_present_flag ) | | |
| 40 |       for( i = 0; i < 6 +<br>        ((chroma_format_idc != 3 ) ? 2 : 6 ) * transform_8x8_mode_flag;<br>        i++ ) { | | |
| 41 |         pic_scaling_list_present_flag[ i ] | 1 | u(1) |
| 42 |         if( pic_scaling_list_present_flag[ i ] ) | | |
| 43 |           if( i < 6 ) | | |

FIG. 41

| 1 | scaling_list( ScalingList4x4[ i ], 16, | 1 | |
| --- | --- | --- | --- |
| 2 | UseDefaultScalingMatrix4x4Flag[ i ] ) | | |
| 3 | else | | |
| 4 | scaling_list( ScalingList8x8[ i - 6 ], 64, | 1 | |
| 5 | UseDefaultScalingMatrix8x8Flag[ i - 6 ] ) | | |
| 6 | } | | |
| 7 | second_chroma_qp_index_offset | 1 | se(v) |
| 8 | } | | |
| 9 | rbsp_trailing_bits( ) | 1 | |
| 10 | } | | |

FIG. 42

| | | Descriptor |
|---|---|---|
| 1 | pic_parameter_set_rbsp( ) { | |
| 2 | pic_parameter_set_id | ue(v) |
| 3 | seq_parameter_set_id | ue(v) |
| 4 | sign_data_hiding_flag | u(1) |
| 5 | cabac_init_present_flag | u(1) |
| 6 | num_ref_idx_l0_default_active_minus1 | ue(v) |
| 7 | num_ref_idx_l1_default_active_minus1 | ue(v) |
| 8 | pic_init_qp_minus26 | se(v) |
| 9 | constrained_intra_pred_flag | u(1) |
| 10 | transform_skip_enabled_flag | u(1) |
| 11 | cu_qp_delta_enabled_flag | u(1) |
| 12 | if ( cu_qp_delta_enabled_flag ) | |
| 13 | diff_cu_qp_delta_depth | ue(v) |
| 14 | pic_cb_qp_offset | se(v) |
| 15 | pic_cr_qp_offset | se(v) |
| 16 | pic_slice_level_chroma_qp_offsets_present_flag | u(1) |
| 17 | weighted_pred_flag | u(1) |
| 18 | weighted_bipred_flag | u(1) |
| 19 | output_flag_present_flag | u(1) |
| 20 | transquant_bypass_enable_flag | u(1) |
| 21 | dependent_slice_enabled_flag | u(1) |
| 22 | tiles_enabled_flag | u(1) |
| 23 | entropy_coding_sync_enabled_flag | u(1) |
| 24 | entropy_slice_enabled_flag | u(1) |
| 25 | if( tiles_enabled_flag ) { | |
| 26 | num_tile_columns_minus1 | ue(v) |
| 27 | num_tile_rows_minus1 | ue(v) |
| 28 | uniform_spacing_flag | u(1) |
| 29 | if( !uniform_spacing_flag ) { | |
| 30 | for( i = 0; i < num_tile_columns_minus1; i++ ) | |
| 31 | column_width_minus1[ i ] | ue(v) |
| 32 | for( i = 0; i < num_tile_rows_minus1; i++ ) | |
| 33 | row_height_minus1[ i ] | ue(v) |
| 34 | } | |
| 35 | loop_filter_across_tiles_enabled_flag | u(1) |
| 36 | } | |
| 37 | loop_filter_across_slices_enabled_flag | u(1) |
| 38 | deblocking_filter_control_present_flag | u(1) |
| 39 | if( deblocking_filter_control_present_flag ) { | |
| 40 | deblocking_filter_override_enabled_flag | u(1) |
| 41 | pps_disable_deblocking_filter_flag | u(1) |
| 42 | if( !pps_disable_deblocking_filter_flag ) { | |
| 43 | beta_offset_div2 | se(v) |
| 44 | tc_offset_div2 | se(v) |
| 45 | } | |
| 46 | } | |

FIG. 43

| 1 | pps_scaling_list_data_present_flag | u(1) |
|---|---|---|
| 2 | if( pps_scaling_list_data_present_flag ) | |
| 3 | scaling_list_data( ) | |
| 4 | log2_parallel_merge_level_minus2 | ue(v) |
| 5 | slice_header_extension_present_flag | u(1) |
| 6 | slice_extension_present_flag | u(1) |
| 7 | pps_extension_flag | u(1) |
| 8 | if( pps_extension_flag ) | |
| 9 | while( more_rbsp_data( )) | |
| 10 | pps_extension_data_flag | u(1) |
| 11 | rbsp_trailing_bits( ) | |
| 12 | } | |

FIG. 44

| | | C | Descriptor |
|---|---|---|---|
| 1 | slice_header( ) { | | |
| 2 |   first_mb_in_slice | 2 | ue(v) |
| 3 |   slice_type | 2 | ue(v) |
| 4 |   pic_parameter_set_id | 2 | ue(v) |
| 5 |   if( separate_colour_plane_flag = = 1 ) | | |
| 6 |     colour_plane_id | 2 | u(2) |
| 7 |   frame_num | 2 | u(v) |
| 8 |   if( !frame_mbs_only_flag ) { | | |
| 9 |     field_pic_flag | 2 | u(1) |
| 10 |     if( field_pic_flag ) | | |
| 11 |       bottom_field_flag | 2 | u(1) |
| 12 |   } | | |
| 13 |   if( IdrPicFlag ) | | |
| 14 |     idr_pic_id | 2 | ue(v) |
| 15 |   if( pic_order_cnt_type = = 0 ) { | | |
| 16 |     pic_order_cnt_lsb | 2 | u(v) |
| 17 |     if( bottom_field_pic_order_in_frame_present_flag && !field_pic_flag ) | | |
| 18 |       delta_pic_order_cnt_bottom | 2 | se(v) |
| 19 |   } | | |
| 20 |   if( pic_order_cnt_type = = 1 && !delta_pic_order_always_zero_flag ) { | | |
| 21 |     delta_pic_order_cnt[ 0 ] | 2 | se(v) |
| 22 |     if( bottom_field_pic_order_in_frame_present_flag && !field_pic_flag ) | | |
| 23 |       delta_pic_order_cnt[ 1 ] | 2 | se(v) |
| 24 |   } | | |
| 25 |   if( redundant_pic_cnt_present_flag ) | | |
| 26 |     redundant_pic_cnt | 2 | ue(v) |
| 27 |   if( slice_type = = B ) | | |
| 28 |     direct_spatial_mv_pred_flag | 2 | u(1) |
| 29 |   if( slice_type = = P \|\| slice_type = = SP \|\| slice_type = = B ) { | | |
| 30 |     num_ref_idx_active_override_flag | 2 | u(1) |
| 31 |     if( num_ref_idx_active_override_flag ) { | | |
| 32 |       num_ref_idx_l0_active_minus1 | 2 | ue(v) |
| 33 |       if( slice_type = = B ) | | |
| 34 |         num_ref_idx_l1_active_minus1 | 2 | ue(v) |
| 35 |     } | | |
| 36 |   } | | |
| 37 |   if( nal_unit_type = = 20 ) | | |
| 38 |     ref_pic_list_mvc_modification( ) /* specified in Annex H */ | 2 | |
| 39 |   else | | |
| 40 |     ref_pic_list_modification( ) | 2 | |
| 41 |   if(( weighted_pred_flag && ( slice_type = = P \|\| slice_type = = SP )) \|\|<br>    ( weighted_bipred_idc = = 1 && slice_type = = B )) | | |
| 42 |     pred_weight_table( ) | 2 | |
| 43 |   if( nal_ref_idc != 0 ) | | |
| 44 |     dec_ref_pic_marking( ) | 2 | |
| 45 |   if( entropy_coding_mode_flag && slice_type != I &&<br>slice_type != SI ) | | |

*FIG. 45*

| 1 | cabac_init_idc | 2 | ue(v) |
|---|---|---|---|
| 2 | slice_qp_delta | 2 | se(v) |
| 3 | if( slice_type = = SP || slice_type = = SI ) { | | |
| 4 |    if( slice_type = = SP ) | | |
| 5 |      sp_for_switch_flag | 2 | u(1) |
| 6 |    slice_qs_delta | 2 | se(v) |
| 7 | } | | |
| 8 | if( deblocking_filter_control_present_flag ) { | | |
| 9 |    disable_deblocking_filter_idc | 2 | ue(v) |
| 10 |    if( disable_deblocking_filter_idc != 1 ) { | | |
| 11 |      slice_alpha_c0_offset_div2 | 2 | se(v) |
| 12 |      slice_beta_offset_div2 | 2 | se(v) |
| 13 |    } | | |
| 14 | } | | |
| 15 | if( num_slice_groups_minus1 > 0 &&<br>   slice_group_map_type >= 3 && slice_group_map_type <= 5) | | |
| 16 |    slice_group_change_cycle | 2 | u(v) |
| 17 | } | | |

*FIG. 46*

| | | C | Descriptor |
|---|---|---|---|
| 1 | pred_weight_table( ) { | | |
| 2 | luma_log2_weight_denom | 2 | ue(v) |
| 3 | if( ChromaArrayType != 0 ) | | |
| 4 | chroma_log2_weight_denom | 2 | ue(v) |
| 5 | for( i = 0; i <= num_ref_idx_l0_active_minus1; i++ ) { | | |
| 6 | luma_weight_l0_flag | 2 | u(1) |
| 7 | if( luma_weight_l0_flag ) { | | |
| 8 | luma_weight_l0[ i ] | 2 | se(v) |
| 9 | luma_offset_l0[ i ] | 2 | se(v) |
| 10 | } | | |
| 11 | if ( ChromaArrayType != 0 ) { | | |
| 12 | chroma_weight_l0_flag | 2 | u(1) |
| 13 | if( chroma_weight_l0_flag ) | | |
| 14 | for( j =0; j < 2; j++ ) { | | |
| 15 | chroma_weight_l0[ i ][ j ] | 2 | se(v) |
| 16 | chroma_offset_l0[ i ][ j ] | 2 | se(v) |
| 17 | } | | |
| 18 | } | | |
| 19 | } | | |
| 20 | if( slice_type % 5 == 1 ) | | |
| 21 | for( i = 0; i <= num_ref_idx_l1_active_minus1; i++ ) { | | |
| 22 | luma_weight_l1_flag | 2 | u(1) |
| 23 | if( luma_weight_l1_flag ) { | | |
| 24 | luma_weight_l1[ i ] | 2 | se(v) |
| 25 | luma_offset_l1[ i ] | 2 | se(v) |
| 26 | } | | |
| 27 | if( ChromaArrayType != 0 ) { | | |
| 28 | chroma_weight_l1_flag | 2 | u(1) |
| 29 | if( chroma_weight_l1_flag ) | | |
| 30 | for( j = 0; j < 2; j++ ) { | | |
| 31 | chroma_weight_l1[ i ][ j ] | 2 | se(v) |
| 32 | chroma_offset_l1[ i ][ j ] | 2 | se(v) |
| 33 | } | | |
| 34 | } | | |
| 35 | } | | |
| 36 | } | | |

*FIG. 47*

| | | Descriptor |
|---|---|---|
| 1 | pred_weight_table( ) { | |
| 2 |   luma_log2_weight_denom | ue(v) |
| 3 |   if( chroma_format_idc != 0 ) | |
| 4 |     delta_chroma_log2_weight_denom | se(v) |
| 5 |   for( i = 0; i <= num_ref_idx_l0_active_minus1; i++ ) | |
| 6 |     luma_weight_l0_flag[ i ] | u(1) |
| 7 |   if( chroma_format_idc != 0 ) | |
| 8 |     for( i = 0; i <= num_ref_idx_l0_active_minus1; i++ ) | |
| 9 |       chroma_weight_l0_flag[ i ] | u(1) |
| 10 |   for( i = 0; i <= num_ref_idx_l0_active_minus1; i++ ) { | |
| 11 |     if( luma_weight_l0_flag[ i ] ) { | |
| 12 |       delta_luma_weight_l0[ i ] | se(v) |
| 13 |       luma_offset_l0[ i ] | se(v) |
| 14 |     } | |
| 15 |     if( chroma_weight_l0_flag[ i ] ) | |
| 16 |       for( j =0; j < 2; j++ ) { | |
| 17 |         delta_chroma_weight_l0[ i ][ j ] | se(v) |
| 18 |         delta_chroma_offset_l0[ i ][ j ] | se(v) |
| 19 |       } | |
| 20 |   } | |
| 21 |   if( slice_type == B ) { | |
| 22 |     for( i = 0; i <= num_ref_idx_l1_active_minus1; i++ ) | |
| 23 |       luma_weight_l1_flag[ i ] | u(1) |
| 24 |     for( i = 0; i <= num_ref_idx_l1_active_minus1; i++ ) | |
| 25 |       if( chroma_format_idc != 0 ) | |
| 26 |         chroma_weight_l1_flag[ i ] | u(1) |
| 27 |     for( i = 0; i <= num_ref_idx_l1_active_minus1; i++ ) { | |
| 28 |       if( luma_weight_l1_flag[ i ] ) { | |
| 29 |         delta_luma_weight_l1[ i ] | se(v) |
| 30 |         luma_offset_l1[ i ] | se(v) |
| 31 |       } | |
| 32 |       if( chroma_weight_l1_flag[ i ] ) | |
| 33 |         for( j = 0; j < 2; j++ ) { | |
| 34 |           delta_chroma_weight_l1[ i ][ j ] | se(v) |
| 35 |           delta_chroma_offset_l1[ i ][ j ] | se(v) |
| 36 |         } | |
| 37 |     } | |
| 38 |   } | |
| 39 | } | |

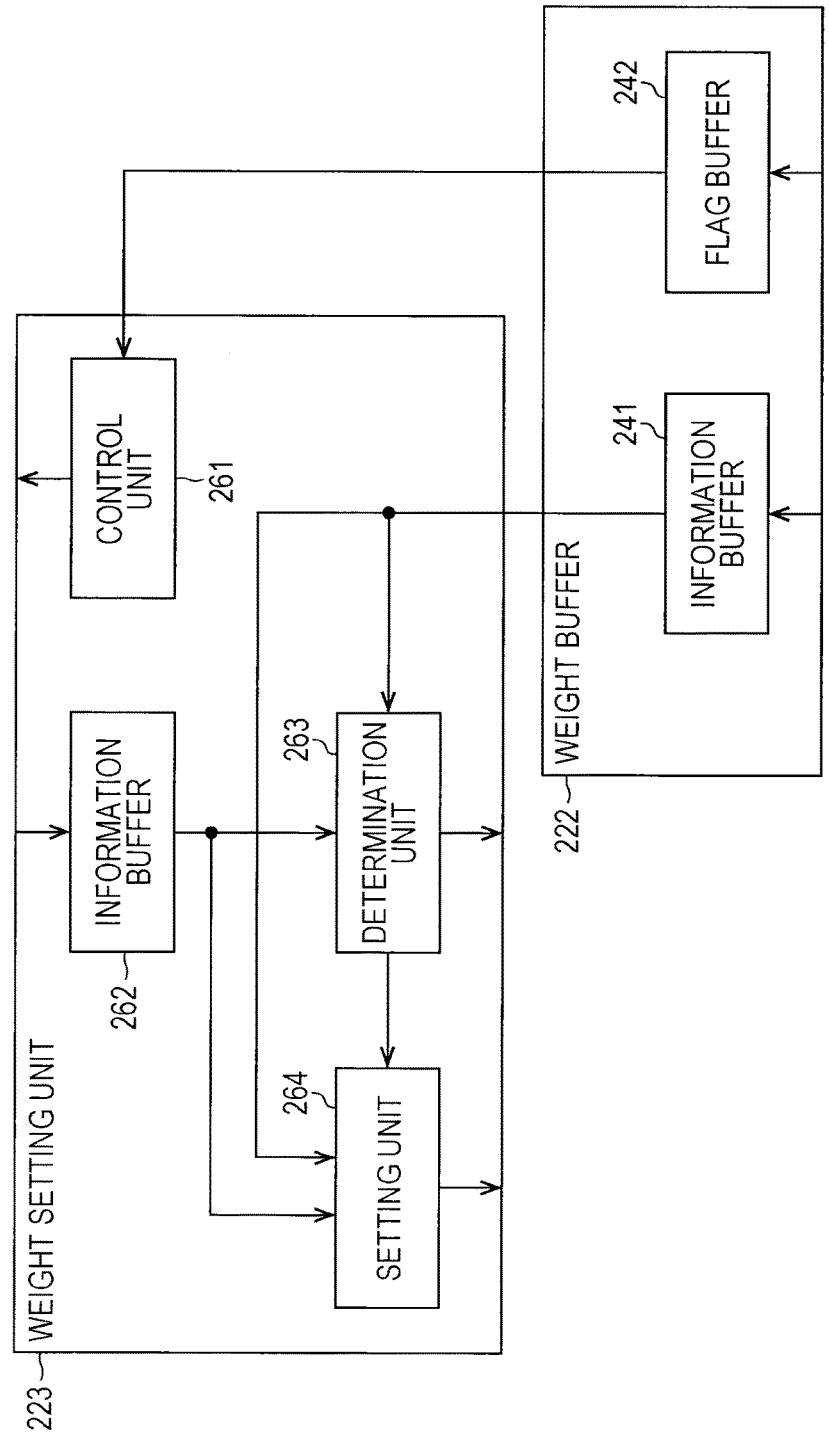

FIG. 51

| | | Descriptor |
|---|---|---|
| 1 | pred_weight_table( ) { | |
| 2 | pred_mode | u(2) |
| 3 | if( pred_mode != 2 ) | |
| 4 | diff_ref_layer_minus1 | u(3) |
| 5 | if( pred_mode == 1 ) { | |
| 6 | diff_luma_log2_weight_denom | se(v) |
| 7 | if( chroma_format_idc != 0 ) | |
| 8 | diff_delta_chroma_log2_weight_denom | se(v) |
| 9 | for( i = 0; i <= num_ref_idx_l0_active_minus1; i++ ) { | |
| 10 | if( luma_weight_l0_flag[ i ][ref_layer] ) | |
| 11 | diff_delta_luma_weight_l0[ i ] | se(v) |
| 12 | diff_luma_offset_l0[ i ] | se(v) |
| 13 | } | |
| 14 | if( chroma_weight_l0_flag[ i ][ref_layer] ) | |
| 15 | for( j =0; j < 2; j++ ) { | |
| 16 | diff_delta_chroma_weight_l0[ i ][ j ] | se(v) |
| 17 | diff_delta_chroma_offset_l0[ i ][ j ] | se(v) |
| 18 | } | |
| 19 | } | |
| 20 | if( slice_type == B ) { | |
| 21 | for( i = 0; i <= num_ref_idx_l1_active_minus1; i++ ) { | |
| 22 | if( luma_weight_l1_flag[ i ] ) { | |
| 23 | diff_delta_luma_weight_l1[ i ] | se(v) |
| 24 | diff_luma_offset_l1[ i ] | se(v) |
| 25 | } | |
| 26 | if( chroma_weight_l1_flag[ i ] ) | |
| 27 | for( j = 0; j < 2; j++ ) { | |
| 28 | diff_delta_chroma_weight_l1[ i ][ j ] | se(v) |
| 29 | diff_delta_chroma_offset_l1[ i ][ j ] | se(v) |
| 30 | } | |
| 31 | } | |
| 32 | } | |
| 33 | }else if( pred_mode == 2 ) { | |
| 34 | luma_log2_weight_denom | ue(v) |
| 35 | if( chroma_format_idc != 0 ) | |
| 36 | delta_chroma_log2_weight_denom | se(v) |
| 37 | for( i = 0; i <= num_ref_idx_l0_active_minus1; i++ ) | |

FIG. 52

| 1  | luma_weight_l0_flag[ i ]                                 | u(1) |
|----|----------------------------------------------------------|------|
| 2  | if( chroma_format_idc  != 0 )                            |      |
| 3  |   for( i = 0; i <= num_ref_idx_l0_active_minus1; i++ )   |      |
| 4  |     chroma_weight_l0_flag[ i ]                           | u(1) |
| 5  | for( i = 0; i <= num_ref_idx_l0_active_minus1; i++ ) {   |      |
| 6  |   if( luma_weight_l0_flag[ i ] ) {                       |      |
| 7  |     delta_luma_weight_l0[ i ]                            | se(v)|
| 8  |     luma_offset_l0[ i ]                                  | se(v)|
| 9  |   }                                                      |      |
| 10 |   if( chroma_weight_l0_flag[ i ] )                       |      |
| 11 |     for( j =0; j < 2; j++ ) {                            |      |
| 12 |       delta_chroma_weight_l0[ i ][ j ]                   | se(v)|
| 13 |       delta_chroma_offset_l0[ i ][ j ]                   | se(v)|
| 14 |     }                                                    |      |
| 15 | }                                                        |      |
| 16 | if( slice_type  = =  B ) {                               |      |
| 17 |   for( i = 0; i <= num_ref_idx_l1_active_minus1; i++ )   |      |
| 18 |     luma_weight_l1_flag[ i ]                             | u(1) |
| 19 |   for( i = 0; i <= num_ref_idx_l1_active_minus1; i++ )   |      |
| 20 |     if( chroma_format_idc  != 0 )                        |      |
| 21 |       chroma_weight_l1_flag[ i ]                         | u(1) |
| 22 |   for( i = 0; i <= num_ref_idx_l1_active_minus1; i++ ) { |      |
| 23 |     if( luma_weight_l1_flag[ i ] ) {                     |      |
| 24 |       delta_luma_weight_l1[ i ]                          | se(v)|
| 25 |       luma_offset_l1[ i ]                                | se(v)|
| 26 |     }                                                    |      |
| 27 |     if( chroma_weight_l1_flag[ i ] )                     |      |
| 28 |       for( j = 0; j < 2; j++ ) {                         |      |
| 29 |         delta_chroma_weight_l1[ i ][ j ]                 | se(v)|
| 30 |         delta_chroma_offset_l1[ i ][ j ]                 | se(v)|
| 31 |       }                                                  |      |
| 32 |     }                                                    |      |
| 33 |   }                                                      |      |
| 34 | }                                                        |      |
| 35 | }                                                        |      |

FIG. 68

| | | Descriptor |
|---|---|---|
| 1 | seq_parameter_set_rbsp( ) { | |
| 2 | ... | |
| 3 | inter_layer_copy_flag | u(1) |
| 4 | if(!inter_layer_copy_flag) { | |
| 5 | num_short_term_ref_pic_sets | ue(v) |
| 6 | for( i = 0; i < num_short_term_ref_pic_sets; i++) | |
| 7 | short_term_ref_pic_set( i ) | |
| 8 | long_term_ref_pics_present_flag | u(1) |
| 9 | if( long_term_ref_pics_present_flag ) { | |
| 10 | num_long_term_ref_pics_sps | ue(v) |
| 11 | for( i = 0; i < num_long_term_ref_pics_sps; i++ ) { | |
| 12 | lt_ref_pic_poc_lsb_sps[ i ] | u(v) |
| 13 | used_by_curr_pic_lt_sps_flag[ i ] | u(1) |
| 14 | } | |
| 15 | } | |
| 16 | } | |
| 17 | ... | |

FIG. 69

| | | Descriptor |
|---|---|---|
| 1 | slice_header( ) { | |
| 2 | ...... | |
| 3 | if( !IdrPicFlag ) { | |
| 4 | pic_order_cnt_lsb | u(v) |
| 5 | inter_layer_copy_flag | u(1) |
| 6 | if (! inter_layer_copy_flag) { | |
| 7 | short_term_ref_pic_set_sps_flag | u(1) |
| 8 | if( !short_term_ref_pic_set_sps_flag ) | |
| 9 | short_term_ref_pic_set( num_short_term_ref_pic_sets ) | |
| 10 | else | |
| 11 | short_term_ref_pic_set_idx | u(v) |
| 12 | if( long_term_ref_pics_present_flag ) { | |
| 13 | ........ | |
| 14 | } | |
| 15 | } | |

FIG. 70

| | Descriptor |
|---|---|
| 1 slice_header( ) { | |
| 2 ...... | |
| 3 if( !IdrPicFlag ) { | |
| 4 pic_order_cnt_lsb | u(v) |
| 5 inter_layer_rps_prediction_flag | (1) |
| 6 if (!inter_layer_rps_prediction_flag) | |
| 7 { | |
| 8 short_term_ref_pic_set_sps_flag | u(1) |
| 9 if( !short_term_ref_pic_set_sps_flag ) | |
| 10 short_term_ref_pic_set( num_short_term_ref_pic_sets ) | |
| 11 else | |
| 12 short_term_ref_pic_set_idx | u(v) |
| 13 if( long_term_ref_pics_present_flag ) { | |
| 14 ...... | |
| 15 } | |
| 16 } | |
| 17 if( slice_type = = P | | slice_type = = B ) { | |
| 18 if( sps_temporal_mvp_enable_flag ) | |
| 19 slice_temporal_mvp_enable_flag | u(1) |
| 20 if (!inter_layer_rps_prediction_flag) | |
| 21 { | |
| 22 num_ref_idx_active_override_flag | u(1) |
| 23 ...... | |
| 24 if( lists_modification_present_flag ) | |
| 25 ref_pic_list_modification( ) | |
| 26 } | |
| 27 if( slice_type = = B ) | |
| 28 mvd_l1_zero_flag | u(1) |
| 29 ...... | |
| 30 } | |
| 31 ...... | |
| 32 } | |

FIG. 80

| | | Descriptor |
|---|---|---|
| 1 | seq_parameter_set_rbsp( ) { | |
| 2 | ... | |
| 3 | inter_layer_short_copy_flag | u(1) |
| 4 | if(!inter_layer_short_copy_flag) { | |
| 5 | num_short_term_ref_pic_sets | ue(v) |
| 6 | for( i = 0; i < num_short_term_ref_pic_sets; i++) | |
| 7 | short_term_ref_pic_set( i ) | |
| 8 | } | |
| 9 | long_term_ref_pics_present_flag | u(1) |
| 10 | if( long_term_ref_pics_present_flag ) { | |
| 11 | inter_layer_long_copy_flag | u(1) |
| 12 | if(!inter_layer_long_copy_flag) { | |
| 13 | num_long_term_ref_pics_sps | ue(v) |
| 14 | for( i = 0; i < num_long_term_ref_pics_sps; i++ ) { | |
| 15 | lt_ref_pic_poc_lsb_sps[ i ] | u(v) |
| 16 | used_by_curr_pic_lt_sps_flag[ i ] | u(1) |
| 17 | } | |
| 18 | } | |
| 19 | } | |
| 20 | ... | |

FIG. 81

| | | Descriptor |
|---|---|---|
| 1 | slice_header( ) { | |
| 2 | ...... | |
| 3 | if( !IdrPicFlag ) { | |
| 4 |   pic_order_cnt_lsb | u(v) |
| 5 |   inter_layer_short_copy_flag | u(1) |
| 6 |   if(!inter_layer_short_copy_flag) { | |
| 7 |     short_term_ref_pic_set_sps_flag | u(1) |
| 8 |     if( !short_term_ref_pic_set_sps_flag ) | |
| 9 |       short_term_ref_pic_set( num_short_term_ref_pic_sets ) | |
| 10 |     else | |
| 11 |       short_term_ref_pic_set_idx | u(v) |
| 12 |   } | |
| 13 |   if( long_term_ref_pics_present_flag ) { | |
| 14 |     inter_layer_long_copy_flag | |
| 15 |     if(!inter_layer_long_copy_flag) { | |
| 16 |       ...... | |
| 17 |     } | |
| 18 |   } | |

FIG. 86

| | | Descriptor |
|---|---|---|
| 1 | vps_extension( ) { | |
| 2 | while( !byte_aligned( ) ) | |
| 3 | vps_extension_byte_alignment_reserved_one_bit | u(1) |
| 4 | avc_base_layer_flag | u(1) |
| 5 | splitting_flag | u(1) |
| 6 | for( i = 0, NumScalabilityTypes = 0; i < 16; i++ ) { | |
| 7 | scalability_mask[ i ] | u(1) |
| 8 | NumScalabilityTypes += scalability_mask[ i ] | |
| 9 | } | |
| 10 | ... | |
| 11 | } | |

FIG. 87

| | | Descriptor |
|---|---|---|
| 1 | seq_parameter_set_rbsp( ) { | |
| 2 | ... | |
| 3 | inter_layer_copy_flag | u(1) |
| 4 | if(!inter_layer_copy_flag) { | |
| 5 | num_short_term_ref_pic_sets | ue(v) |
| 6 | for( i = 0; i < num_short_term_ref_pic_sets; i++) | |
| 7 | short_term_ref_pic_set( i ) | |
| 8 | } | |
| 9 | if(!inter_layer_copy_flag || rpfidx_scalability) { | u(1) |
| 10 | long_term_ref_pics_present_flag | |
| 11 | if( long_term_ref_pics_present_flag ) { | |
| 12 | num_long_term_ref_pics_sps | ue(v) |
| 13 | for( i = 0; i < num_long_term_ref_pics_sps; i++ ) { | |
| 14 | lt_ref_pic_poc_lsb_sps[ i ] | u(v) |
| 15 | used_by_curr_pic_lt_sps_flag[ i ] | u(1) |
| 16 | } | |
| 17 | } | |
| 18 | } | |
| 19 | ... | |

FIG. 88

| | | Descriptor |
|---|---|---|
| 1 | slice_header( ) { | |
| 2 | ...... | |
| 3 | if( !IdrPicFlag ) { | |
| 4 | pic_order_cnt_lsb | u(v) |
| 5 | inter_layer_copy_flag | u(1) |
| 6 | if (! inter_layer_copy_flag) { | |
| 7 | short_term_ref_pic_set_sps_flag | u(1) |
| 8 | if ( !short_term_ref_pic_set_sps_flag ) | |
| 9 | short_term_ref_pic_set( num_short_term_ref_pic_sets ) | |
| 10 | else | |
| 11 | short_term_ref_pic_set_idx | u(v) |
| 12 | } | |
| 13 | if( long_term_ref_pics_present_flag ) { | |
| 14 | if(!inter_layer_copy_flag || rpfidx_scalability) { | |
| 15 | ...... | |
| 16 | } | |
| 17 | } | |

FIG. 93

| | | Descriptor |
|---|---|---|
| 1 | seq_parameter_set_rbsp( ) { | |
| 2 | if(!avc_base_layer) | |
| 3 | inter_layer_copy_flag | u(1) |
| 4 | if(avc_base_layer||!inter_layer_copy_flag) { | |
| 5 | num_short_term_ref_pic_sets | ue(v) |
| 6 | for( i = 0; i < num_short_term_ref_pic_sets; i++) | |
| 7 | short_term_ref_pic_set( i ) | |
| 8 | long_term_ref_pics_present_flag | u(1) |
| 9 | if( long_term_ref_pics_present_flag ) { | |
| 10 | num_long_term_ref_pics_sps | ue(v) |
| 11 | for( i = 0; i < num_long_term_ref_pics_sps; i++ ) { | |
| 12 | lt_ref_pic_poc_lsb_sps[ i ] | u(v) |
| 13 | used_by_curr_pic_lt_sps_flag[ i ] | u(1) |
| 14 | } | |
| 15 | } | |
| 16 | } | |
| 17 | ... | |

FIG. 97

| | | Descriptor |
|---|---|---|
| 1 | seq_parameter_set_rbsp( ) { | |
| 2 | ... | |
| 3 | inter_layer_prediction_flag | u(1) |
| 4 | num_short_term_ref_pic_sets | ue(v) |
| 5 | for( i = 0; i < num_short_term_ref_pic_sets; i++) | |
| 6 | short_term_ref_pic_set( i, inter_layer_prediction_flag ) | |
| 7 | long_term_ref_pics_present_flag | u(1) |
| 8 | if( long_term_ref_pics_present_flag ) { | |
| 9 | num_long_term_ref_pics_sps | ue(v) |
| 10 | for( i = 0; i < num_long_term_ref_pics_sps; i++ ) { | |
| 11 | lt_ref_pic_poc_lsb_sps[ i ] | u(v) |
| 12 | used_by_curr_pic_lt_sps_flag[ i ] | u(1) |
| 13 | } | |
| 14 | } | |
| 15 | ... | |

FIG. 98

| | | Descriptor |
|---|---|---|
| 1 | slice_header( ) { | |
| 2 | ...... | |
| 3 | if( !IdrPicFlag ) { | |
| 4 |   pic_order_cnt_lsb | u(v) |
| 5 |   inter_layer_prediction_flag | u(1) |
| 6 |   short_term_ref_pic_set_sps_flag | u(1) |
| 7 |   if( !short_term_ref_pic_set_sps_flag ) | |
| 8 |     short_term_ref_pic_set( num_short_term_ref_pic_sets, inter_layer_prediction_flag ) | |
| 9 |   else | |
| 10 |     short_term_ref_pic_set_idx | u(v) |
| 11 |   if( long_term_ref_pics_present_flag ) { | |
| 12 |   ...... | |

FIG. 99

| | | Descriptor |
|---|---|---|
| 1 | short_term_ref_pic_set( stRpsIdx, inter_layer_prediction_flag ) { | |
| 2 |   if( stRpsIdx != 0 ) | |
| 3 |     inter_ref_pic_set_prediction_flag | u(1) |
| 4 |   if( inter_ref_pic_set_prediction_flag ) { | |
| 5 |     if( !inter_layer_rps_prediction_flag ){ | |
| 6 |       if( stRpsIdx = = num_short_term_ref_pic_sets ) | |
| 7 |         delta_idx_minus1 | ue(v) |
| 8 |       delta_rps_sign | u(1) |
| 9 |       abs_delta_rps_minus1 | ue(v) |
| 10 |     } | |
| 11 |     for( j = 0; j <= NumDcs[ RefRpsIdx ]; j++ ) { | |
| 12 |       used_by_curr_pic_flag[ j ] | u(1) |
| 13 |       if( !used_by_curr_pic_flag[ j ] ) | |
| 14 |         use_delta_flag[ j ] | u(1) |
| 15 |   } else { | |
| 16 |     num_negative_pics | ue(v) |
| 17 |     num_positive_pics | ue(v) |
| 18 |     for( i = 0; i < num_negative_pics; i++ ) { | |
| 19 |       delta_poc_s0_minus1[ i ] | ue(v) |
| 20 |       used_by_curr_pic_s0_flag[ i ] | u(1) |
| 21 |     } | |
| 22 |     for( i = 0; i < num_positive_pics; i++ ) { | |
| 23 |       delta_poc_s1_minus1[ i ] | ue(v) |
| 24 |       used_by_curr_pic_s1_flag[ i ] | u(1) |
| 25 |     } | |
| 26 |   } | |
| 27 | } | |

FIG. 107

| 1 | short_term_ref_pic_set( stRpsIdx ) { | Descriptor |
|---|---|---|
| 2 |   if( stRpsIdx != 0 ) | |
| 3 |     inter_ref_pic_set_prediction_flag | u(1) |
| 4 |   if( inter_ref_pic_set_prediction_flag ) { | |
| 5 |     inter_layer_rps_predition_flag | u(1) |
| 6 |   if( !inter_layer_rps_predition_flag ) { | |
| 7 |     if( stRpsIdx = = num_short_term_ref_pic_sets ) | |
| 8 |       delta_idx_minus1 | ue(v) |
| 9 |     delta_rps_sign | u(1) |
| 10 |     abs_delta_rps_minus1 | ue(v) |
| 11 |   } | |
| 12 |     for( j = 0; j <= NumDcs[ RefRpsIdx ]; j++ ) { | |
| 13 |       used_by_curr_pic_flag[ j ] | u(1) |
| 14 |       if( !used_by_curr_pic_flag[ j ] ) | |
| 15 |         use_delta_flag[ j ] | u(1) |
| 16 |   } else { | |
| 17 |     num_negative_pics | ue(v) |
| 18 |     num_positive_pics | ue(v) |
| 19 |     for( i = 0; i < num_negative_pics; i++ ) { | |
| 20 |       delta_poc_s0_minus1[ i ] | ue(v) |
| 21 |       used_by_curr_pic_s0_flag[ i ] | u(1) |
| 22 |     } | |
| 23 |     for( i = 0; i < num_positive_pics; i++ ) { | |
| 24 |       delta_poc_s1_minus1[ i ] | ue(v) |
| 25 |       used_by_curr_pic_s1_flag[ i ] | u(1) |
| 26 |     } | |
| 27 |   } | |
| 28 | } | |

ENCODING DEVICE, ENCODING METHOD, DECODING DEVICE, AND DECODING METHOD

TECHNICAL FIELD

The present technology relates to an encoding device, an encoding method, a decoding device, and a decoding method, and more particularly, to an encoding device, an encoding method, a decoding device, and a decoding method, which are capable of sharing or predicting information related to a reference image of an image having a hierarchical structure.

BACKGROUND ART

In recent years, for the purpose of digitalizing image information and transmitting and accumulating information at high efficiency at that time, devices complying with a scheme such as a Moving Picture Experts Group phase (MPEG) in which compression is performed by orthogonal transform such as discrete cosine transform (DCT) and motion compensation using specific redundancy of image information have been spread for both information delivery of broadcasting stations or the like and information reception in general households.

Particularly, an MPEG 2 (ISO/IEC 13818-2) scheme is defined as a general-purpose image coding scheme, and now being widely used for a wide range of applications of professional use and consumer use as a standard covering an interlaced scanned image, a progressive scanned image, a standard resolution image, and a high-definition image. Using the MPEG 2 scheme, for example, a high compression rate and an excellent image quality can be implemented by allocating a coding amount (a bit rate) of 4 to 8 Mbps in the case of an interlaced scanned image of a standard resolution having 720×480 pixels and a coding amount of 18 to 22 MBps in the case of an interlaced scanned image of a high resolution having 1920×1088 pixels.

The MPEG 2 mainly aims for high-quality coding suitable for broadcasting, but does not support a coding scheme of a coding amount (bit rate) lower than that of MPEG 1, that is, a coding scheme of a high compression rate. As mobile terminals are spread, a need for such a coding scheme has been considered to increase in the near future, and an MPEG 4 coding scheme has been standardized. ISO/IEC 14496-2 has been approved on December, 1998 as an international standard for the MPEG 4 image coding scheme.

Further, in recent years, standardization of a standard such as H.26L (ITU-T Q6/16 VCEG) designed for image coding for video conferencing at first has been conducted. H.26L is known to require a more computation amount for encoding and decoding than in a coding scheme such as MPEG 2 or MPEG 4 but be able to implement high coding efficiency.

Further, in recent years, as one of MPEG 4 activities, standardization of incorporating a function that is not supported by H.26L based on H.26L and implementing high coding efficiency has been conducted as Joint Model of Enhanced-Compression Video Coding. This standardization has been approved on March, 2003 as an international standard in the name of H.264 or MPEG-4 Part10 (Advanced Video Coding (AVC)).

Furthermore, as an extension thereof, Fidelity Range Extension (FRExt) including an encoding tool necessary for professional use such as RGB or YUV422 or YUV444 or 8×8 DCT and a quantization matrix which are specified in MPEG-2 has been standardized on February, 2005. As a result, the AVC scheme has become a coding scheme capable of also expressing a film noise included in a movie well and is being used in a wide range of applications such as a BD (Blu-ray (a registered trademark) Disc).

However, in recent years, there is an increasing need for high compression rate coding capable of compressing an image of about 4000×2000 pixels which are 4 times as high as a high-definition image or delivering a high-definition image in a limited transmission capacity environment such as the Internet. To this end, an improvement in coding efficiency has been under continuous review by Video Coding Expert Group (VCEG) under ITU-T.

Currently, in order to further improve coding efficiency to be higher than in the AVC, standardization of a coding scheme called High Efficiency Video Coding (HEVC) has been being conducted by Joint Collaboration Team-Video Coding (JCTVC) which is a joint standardization organization of ITU-T and ISO/IEC. Non Patent Document 1 has been issued as a draft as of August, 2012.

Meanwhile, the image coding schemes such as the MPEG-2 and the AVC have a scalable function of hierarchizing and encoding an image. According to the scalable function, it is possible to transmit encoded data according to a processing performance of a decoding side without performing a transcoding process.

Specifically, for example, it is possible to transmit only an encoded stream of an image of a base layer that is a layer serving as a base to terminals having a low processing performance such as mobile phones. Meanwhile, it is possible to transmit an encoded stream of an image of the base layer and an image of an enhancement layer that is a layer other than the base layer to terminals having a high processing performance such as television receivers or personal computers.

The HEVC scheme also has the scalable function, and in the HEVC scheme, a video parameter set (VPS) including parameters related to the scalable function is defined in addition to a sequence parameter set (SPS) and a picture parameter set (PPS) as described in Non Patent Document 1.

FIG. 1 is a diagram illustrating an exemplary syntax of the VPS in the HEVC version 1.

In an HEVC version 1, since only a scalable function (hereinafter, referred to as a "temporal scalability") of hierarchizing and encoding an image according to a frame rate is provided, only parameters related to the temporal scalability are defined in the VPS as illustrated in FIG. 1.

In an HEVC version 2, standardization of supporting a scalable function other than the temporal scalability as well is scheduled to be conducted.

CITATION LIST

Non Patent Document

Non Patent Document 1: Benjamin Bross, Woo-Jin Han, Jens-Rainer Ohm, Gary J. Sullivan, Thomas Wiegand, "High efficiency video coding (HEVC) text specification draft 8," JCTVC-I1003_d7, 2012.7.11-7.20

SUMMARY OF THE INVENTION

Problems to be Solved by the Invention

When encoding is performed using the scalable function, if an image of a base layer and an image of an enhancement layer are supported, pieces of information related to reference images of both images are considered to have a high correlation.

However, in the HEVC scheme of the related art, since information related to a reference image is set for each layer, the coding efficiency is bad.

The present technology was made in light of the foregoing, and it is desirable to be capable of sharing or predicting information related to a reference image of an image having a hierarchical structure.

Solutions to Problems

An encoding device according to a first aspect of the present technology is an encoding device including a setting unit that sets reference image generation information used for generation of first reference image information using the first reference image information serving as information related to a first reference image used when a first scalable image of an image having a hierarchical structure is encoded and second reference image information serving as information related to a second reference image of a second scalable image, an encoding unit that encodes the first scalable image using the first reference image, and generates encoded data, and a transmission unit that transmits the encoded data generated by the encoding unit and the reference image generation information set by the setting unit.

An encoding method according to the first aspect of the present technology corresponds to the encoding device of the first aspect of the present technology.

In the first aspect of the present technology, the reference image generation information used for generation of the first reference image information is set using the first reference image information serving as the information related to the first reference image used when the first scalable image of the image having a hierarchical structure is encoded and the second reference image information serving as the information related to the second reference image of the second scalable image, the first scalable image is encoded using the first reference image, encoded data is generated, and the encoded data and the reference image generation information are transmitted.

A decoding device according to a second aspect of the present technology is a decoding device including a reception unit that receives reference image generation information used for generation of first reference image information generated using the first reference image information serving as information related to a first reference image used when a first scalable image of an image having a hierarchical structure is encoded and second reference image information serving as information related to a second reference image of a second scalable image and encoded data of the first scalable image, a generation unit that generates the first reference image information using the reference image generation information, and a decoding unit that decodes the encoded data of the first scalable image using the first reference image based on the first reference image information generated by the generation unit.

A decoding method according to the second aspect of the present technology corresponds to the decoding device according to the second aspect of the present technology.

In the second aspect of the present technology, the reference image generation information used for generation of the first reference image information generated using the first reference image information serving as the information related to the first reference image used when the first scalable image of an image having a hierarchical structure is encoded and the second reference image information serving as the information related to the second reference image of the second scalable image and the encoded data of the first scalable image are received, the first reference image information is generated using the reference image generation information, and the encoded data of the first scalable image is decoded based on the generated first reference image information using the first reference image.

Further, the encoding device of the first aspect and the decoding device of the second aspect can be implemented by causing a computer to execute a program.

Further, the program executed by the computer to implement the encoding device of the first aspect and the decoding device of the second aspect can be provided such that the program is transmitted via a transmission medium or recorded in a recording medium.

The encoding device of the first aspect and the decoding device of the second aspect may be an independent device or may be an internal block configuring a single device.

Effects of the Invention

According to the present technology, it is possible to share or predict information related to a reference image of an image having a hierarchical structure.

BRIEF DESCRIPTION OF DRAWINGS

FIG. 1 is a diagram illustrating an exemplary syntax of a VPS in a HEVC version 1.

FIG. 7 is a diagram illustrating an exemplary syntax of an SPS of a base stream.

FIG. 8 is a diagram illustrating an exemplary syntax of an SPS of a base stream.

FIG. 9 is a diagram illustrating an exemplary syntax of a slice header of a base stream.

FIG. 10 is a diagram illustrating an exemplary syntax of a slice header of a base stream.

FIG. 11 is a diagram illustrating an exemplary syntax of a slice header of a base stream.

FIG. 12 is a diagram illustrating an exemplary syntax of an RPS of a base stream.

FIG. 16 is a block diagram illustrating an exemplary configuration of a reference image setting unit of FIG. 14.

FIG. 17 is a diagram illustrating an exemplary syntax of an SPS set by a setting unit of FIG. 13.

FIG. 18 is a diagram illustrating an exemplary syntax of an SPS set by a setting unit of FIG. 13.

FIG. 19 is a diagram illustrating an exemplary configuration of a syntax of a slice header of an enhancement stream.

FIG. 20 is a diagram illustrating an exemplary configuration of a syntax of a slice header of an enhancement stream.

FIG. 21 is a diagram illustrating an exemplary configuration of a syntax of a slice header of an enhancement stream.

FIG. 22 is a diagram illustrating an exemplary syntax of an RPS of an enhancement stream.

FIG. 23 is a diagram illustrating an exemplary syntax of a VPS.

FIG. 40 is a diagram illustrating an exemplary syntax of a PPS in an AVC scheme.

FIG. 41 is a diagram illustrating an exemplary syntax of a PPS in an AVC scheme.

FIG. 42 is a diagram illustrating an exemplary syntax of a PPS of a base stream.

FIG. 43 is a diagram illustrating an exemplary syntax of a PPS of a base stream.

FIG. 44 is a diagram illustrating an exemplary syntax of a slice header in an AVC scheme.

FIG. 45 is a diagram illustrating an exemplary syntax of a slice header in an AVC scheme.

FIG. 46 is a diagram illustrating an exemplary syntax of weighting information in an AVC scheme.

FIG. 47 is a diagram illustrating an exemplary syntax of weighting information of a base stream.

FIG. 50 is a block diagram illustrating an exemplary configuration of a weight buffer and a weight setting unit of FIG. 49.

FIG. 51 is a diagram illustrating an exemplary syntax of weighting information of an enhancement stream.

FIG. 52 is a diagram illustrating an exemplary syntax of weighting information of an enhancement stream.

FIG. 68 is a diagram illustrating an exemplary syntax of an SPS set by a setting unit of FIG. 66.

FIG. 69 is a diagram illustrating an exemplary syntax of a slice header of an enhancement stream.

FIG. 70 is a diagram for describing effects in an encoding device.

FIG. 80 is a diagram illustrating an exemplary syntax of an SPS at a time of another copy flag setting.

FIG. 81 is a diagram illustrating an exemplary syntax of a slice header of an enhancement stream at a time of another copy flag setting.

FIG. 86 is a diagram illustrating an exemplary syntax of an extension of a VPS in the third embodiment.

FIG. 87 is a diagram illustrating an exemplary syntax of an SPS at a time of setting mode utilization.

FIG. 88 is a diagram illustrating an exemplary syntax of a slice header of an enhancement stream at a time of setting mode utilization.

FIG. 93 is a diagram illustrating an exemplary syntax of an SPS at a time of common copy flag setting based on a coding scheme.

FIG. 97 is a diagram illustrating an exemplary syntax of an SPS set by a setting unit of FIG. 95.

FIG. 98 is a diagram illustrating an exemplary syntax of a slice header of an enhancement stream.

FIG. 99 is a diagram illustrating an exemplary syntax of an RPS for a partial RPS copy flag.

FIG. 107 is a diagram illustrating an exemplary syntax of an RPS at a time of common RPS setting.

FIG. 120 is a block diagram illustrating another utilization example of scalable coding.

MODE FOR CARRYING OUT THE INVENTION

<Description of Scalable Function>
(Description of Spatial Scalability)

Figure 2:
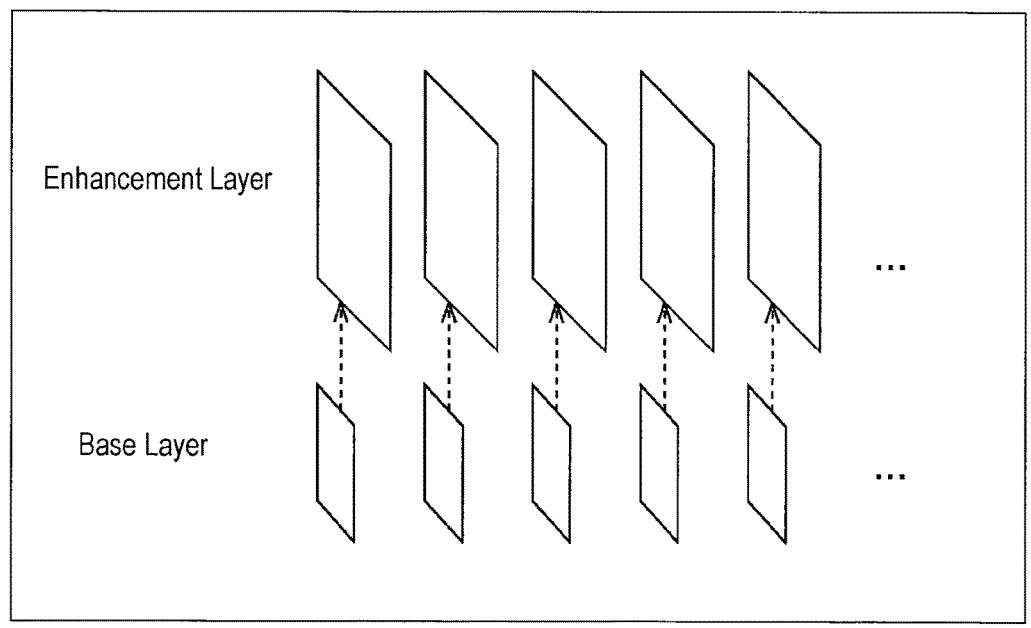
FIG. 2 is a diagram for describing a spatial scalability.

FIG. 2 is a diagram for describing a spatial scalability.

As illustrated in FIG. 2, the spatial scalability is a scalable function of hierarchizing and encoding an image according to a spatial resolution. Specifically, in the spatial scalability, a low resolution image is encoded as a base layer image, and a differential image between a high resolution image and a low resolution image is encoded as an enhancement layer image.

Thus, as an encoding device transmits only encoded data of the base layer image to a decoding device having a low processing performance, the decoding device can generate a low resolution image. Further, as the encoding device transmits encoded data of the base layer image and the enhancement layer image to a decoding device having a high processing performance, the decoding device can generate a high resolution image by decoding and combining the base layer image and the enhancement layer image.

(Description of Temporal Scalability)

Figure 3:
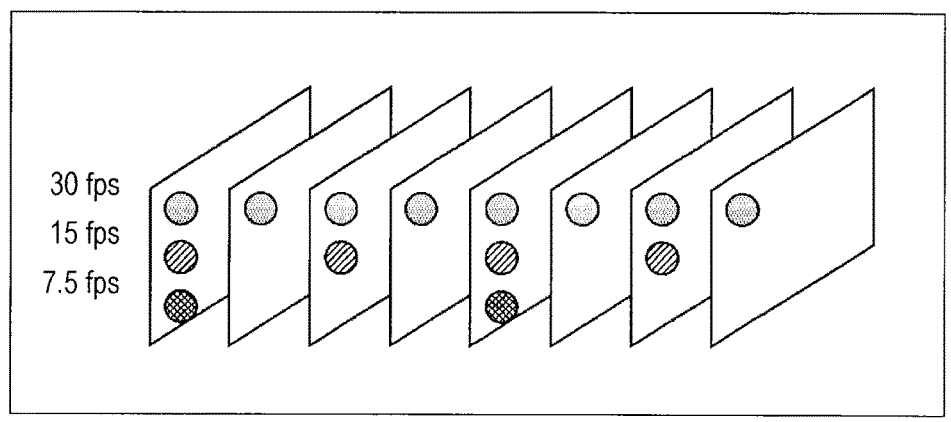
FIG. 3 is a diagram for describing a temporal scalability.

FIG. 3 is a diagram for describing a temporal scalability.

As described above, the temporal scalability is a scalable function of hierarchizing and encoding an image according to a frame rate. Specifically, as illustrated in FIG. 3, in the temporal scalability, for example, an image of a low frame rate (7.5 fps in the example of FIG. 3) is encoded as a base layer image. A differential image between an image of an intermediate frame rate (15 fps in the example of FIG. 3) and an image of a low frame rate is encoded as an enhancement layer image. A differential image between an image of a high frame rate (30 fps in the example of FIG. 3) and an image of an intermediate frame rate is encoded as an enhancement layer image.

Thus, as the encoding device transmits only encoded data of a base layer image to the decoding device having the low processing performance, and the decoding device can generates an image of a low frame rate. Further, as the encoding device transmits encoded data of a base layer image and an enhancement layer image to the decoding device having the high processing performance, the decoding device can generate an image of a high frame rate or an intermediate frame rate by decoding and combining the base layer image and the enhancement layer image.

(Description of SNR Scalability)

Figure 4:
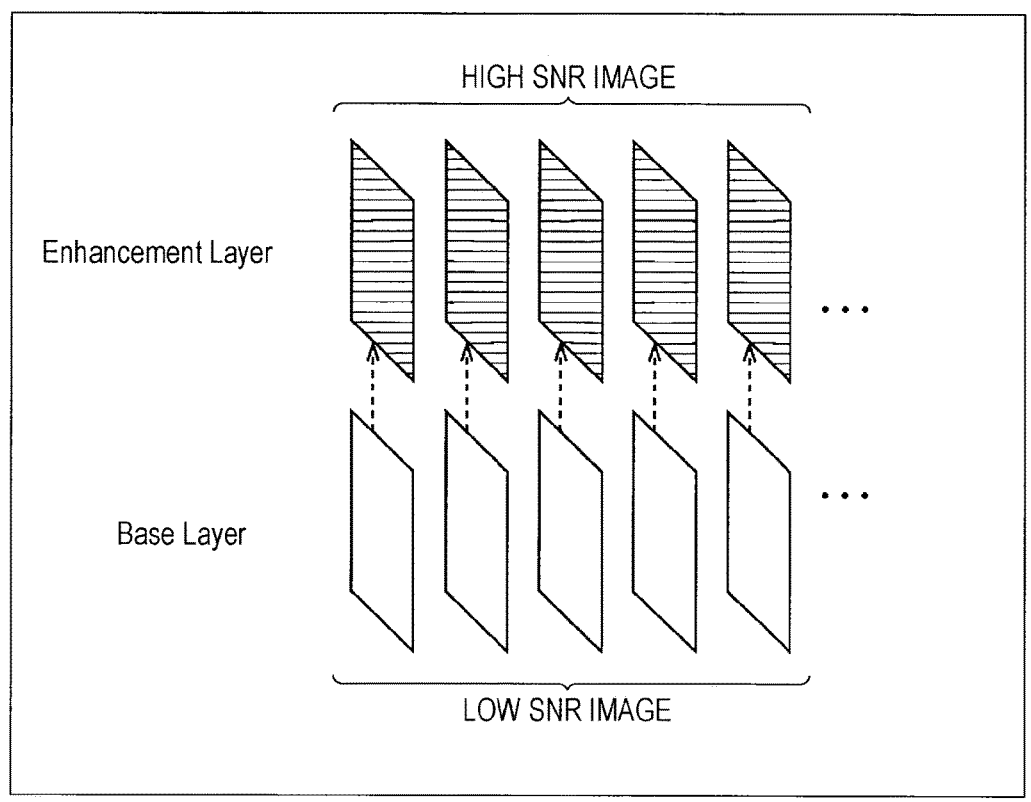
FIG. 4 is a diagram for describing an SNR scalability.

FIG. 4 is a diagram for describing an SNR scalability.

As illustrated in FIG. 4, the SNR scalability is a scalable function of hierarchizing and encoding an image according to a signal-noise ratio (SNR). Specifically, in the SNR scalability, an image of a low SNR is encoded as a base layer image, and a differential image between an image of a high SNR and an image of a low SNR is encoded as an enhancement layer image.

Thus, as the encoding device transmits only encoded data of a base layer image to the decoding device having the low processing performance, the decoding device can generate an image of a low SNR, that is, a low quality image. Further, as the encoding device transmits encoded data of a base layer image and an enhancement layer image to the decoding device having the high processing performance, the decoding device can generate an image of a high SNR, that is, a high quality image by decoding and combining the base layer image and the enhancement layer image.

Further, although not illustrated, in addition to the spatial scalability, the temporal scalability, and the SNR scalability, there are other scalable functions.

For example, as the scalable function, there is also a bit-depth scalability of hierarchizing and encoding an image according to the number of bits. In this case, for example, an 8-bit video image is encoded as a base layer image, and a difference between a 10-bit video image and an 8-bit video image is encoded as an enhancement layer image.

Further, as the scalable function, there is also a chroma scalability of hierarchizing and encoding an image according to a format of a chrominance signal. In this case, for example, a YUV 420 image is encoded as a base layer image, and a differential image between a YUV 422 image and a YUV 420 image is encoded as an enhancement layer image.

The following description will proceed with an example in which the number of enhancement lays is one for convenience of description.

<First Embodiment>

(Description of Overview of First Embodiment)

Figure 5:
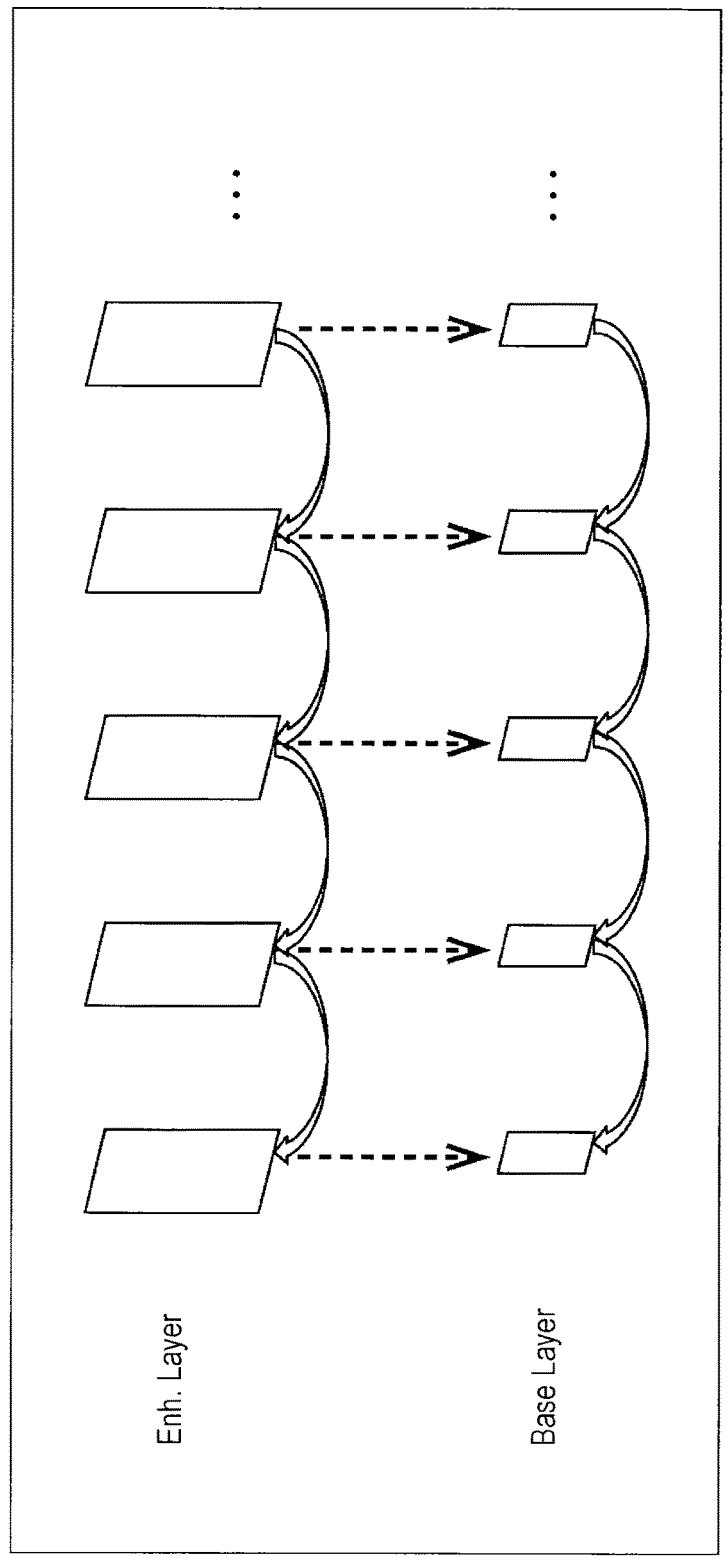
FIG. 5 is a diagram for describing an overview of a first embodiment of the present technology.

FIG. 5 is a diagram for describing an overview of a first embodiment of the present technology.

As illustrated in FIG. 5, in the first embodiment, information (hereinafter, referred to as "reference image specifying information") specifying a reference image serving as information related to a reference image is shared or predicted between different layers other than between same layers.

(Exemplary Configuration of First Embodiment of Encoding Device)

Figure 6:
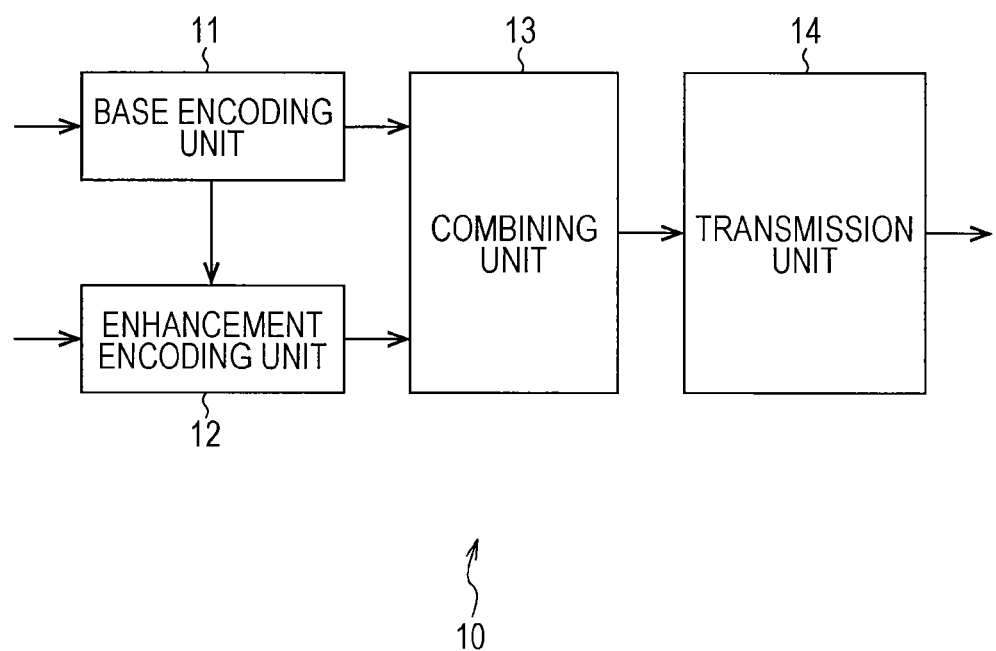
FIG. 6 is a block diagram illustrating an exemplary configuration of an encoding device according to the first embodiment of the present technology.

FIG. 6 is a block diagram illustrating an exemplary configuration of an encoding device according to the first embodiment of the present technology.

An encoding device 10 of FIG. 6 includes a base encoding unit 11, an enhancement encoding unit 12, a combining unit 13, and a transmission unit 14, and encodes an image according to a scheme complying with the HEVC scheme using the scalable function.

A base layer image (hereinafter, referred to as a "base image") is input to the base encoding unit 11 of the encoding device 10 from the outside. The base encoding unit 11 is configured, similarly to the encoding device of the HEVC scheme of the related art, and encodes the base image according to the HEVC scheme. Here, the base encoding unit 11 supplies the reference image specifying information of the reference image used when the base image is encoded to the enhancement encoding unit 12. The base encoding unit 11 supplies an encoded stream including encoded data obtained as the result of encoding, the SPS, the PPS, and the like to the combining unit 13 as a base stream.

An enhancement layer image (hereinafter, referred to as an "enhancement image") is input to the enhancement encoding unit 12 from the outside. The enhancement encoding unit 12 encodes the enhancement image according to the scheme complying with the HEVC scheme. Further, the enhancement encoding unit 12 generates reference image specifying generation information (reference image generation information) used for generation of the reference image specifying information of the enhancement image using the reference image specifying information of the base image and the reference image specifying information of the reference image used when the enhancement image is encoded.

The enhancement encoding unit 12 generates encoded stream by adding the reference image specifying generation information and the like to encoded data of the enhancement image, and supplies the generated encoded stream to the combining unit 13 as an enhancement stream.

The combining unit 13 combines the base stream supplied from the base encoding unit 11 with the enhancement stream supplied from the enhancement encoding unit 12, adds the VPS and the like, and generates an encoded stream for all layers. The combining unit 13 supplies the encoded stream for all layers to the transmission unit 14.

The transmission unit 14 transmits the encoded stream for all layers supplied from the combining unit 13 to the decoding device which will be described later.

Here, the encoding device 10 transmits the encoded stream for all layers but may transmit only the base stream as necessary.

(Exemplary Syntax of SPS of Base Stream)

FIGS. 7 and 8 are diagrams illustrating an exemplary syntax of an SPS included in the base stream.

As illustrated in 9-th to 11-th lines of FIG. 8, the SPS of the base stream includes information related to a reference picture set (RPS) serving as reference image specifying information of a short term of a group of picture (GOP) corresponding to the SPS. Specifically, the number (num_short_term_ref_pic_sets) of RPSs included in the SPS and an RPS (short_term_ref_pic_set) are included in the SPS. An index given in order from 0 is allocated to the RPS.

Further, as illustrated in 12-th to 17-th lines, information related to reference image specifying information of a long term is described in the SPS. Specifically, a long term flag (long_term_ref_pics_present_flag) indicating whether or not a reference image of a long term is available is included in the SPS.

Further, when the long term flag is 1 indicating that the reference image of the long term is available, the number (num_long_term_ref_pics_sps) of pieces of reference image specifying information of a long term included in the SPS is included in the SPS. Further, information (lt_ref_pic_poc_lsb_sps) indicating a least significant bit of a picture order count (POC) of a reference image serving as the reference image specifying information of the long term is included. In addition, a reference flag (used_by_curr_pic_lt_sps_flag) indicating whether or not the reference image specified by the reference image specifying information is referred to by itself is described. The reference image specifying information of the long term is given an index in order from 0.

Hereinafter, when it is unnecessary to particularly distinguish the RPS and the reference image specifying information of the long term from each other, they are referred to simply as "reference image specifying information."

(Exemplary Syntax of Slice Header of Base Stream)

FIGS. 9 to 11 are diagrams illustrating an exemplary syntax of a slice header serving as a header added to encoded data included in a base stream in units of slices.

As illustrated in an 18-th line of FIG. 9, the slice header of the base stream includes an RPS flag (short_term_ref_pic_set_sps_flag) indicating that an RPS of a corresponding slice is an RPS included in the SPS.

Further, as illustrated in 19-th and 20-th lines, when the RPS flag is 0 indicating that an RPS of a corresponding slice is not an RPS included in the SPS, an RPS of a corresponding slice is included in the slice header as an RPS (short_term_ref_pic_set (num_short_term_ref_pic_sets)) having num_short_term_ref_pic_sets as an index.

As illustrated in 21-st and 22-nd lines, when the RPS flag is 1 indicating that an RPS of a corresponding slice is an RPS included in the SPS, an index (short_term_ref_pic_set_idx) of an RPS of a corresponding slice is included in the slice header.

Further, as illustrated in 23-rd to 26-th lines, when the long term flag included in the corresponding SPS is 1, the slice header includes an SPS internal number (num_long_term_sps) serving as the number of pieces of reference image specifying information of a long term included in the SPS and an SPS external number (num_long_term_pics) serving as the number of pieces of reference image specifying information of a long term included in the slice header.

Further, as illustrated in 27-th to 29-th lines, the slice header includes an index (lt_idx_sps) of reference image specifying information of a long term included in the SPS among reference image specifying information of a long term in a corresponding slice. Further, as illustrated in 30-th to 32-nd lines, the slice header includes information (poc_lsb_sps) indicating a least significant bit of a POC of a reference image and a reference flag (used_by_curr_pic_lt_flag) as reference image specifying information of a long term not included in the SPS among reference image specifying information of a long term in a corresponding slice.

(Exemplary Syntax of RPS of Base Stream)

FIG. 12 is a diagram illustrating an exemplary syntax of an RPS of a base stream.

As illustrated in a 2-nd line of FIG. 12, the RPS includes inter_ref_pic_set_prediction_flag. inter_ref_pic_set_prediction_flag is reference information indicating whether or not reference image specifying information of a previous image that is prior in an encoding order to a current encoding image in a GOP of an image to be currently encoded is used as reference image specifying information of the image to be currently encoded.

The reference information is 1 when the reference image specifying information of the previous image is used as the reference image specifying information of an image to be currently encoded but 0 when the reference image specifying information of the previous image is not used as the reference image specifying information of the image to be currently encoded.

As illustrated in 3-rd to 5-th lines of FIG. 12, when inter_ref_pic_set_prediction_flag is 1, the RPS includes previous image specifying information (delta_idx_minus1) specifying a previous image. Specifically, delta_idx_minus1 is a value obtained by subtracting 1 from a value obtained by subtracting an encoding number of a previous image from an encoding number (a coding order) of a current encoding image. Here, the encoding number is a number that is given to each image in a GOP, starting from a small value, as an encoding order.

Further, as illustrated in 6-th and 7-th lines of FIG. 12, the RPS includes a sign (delta_rps_sign) of a difference between (a POC of) the reference image specifying information of the previous image and (a POC of) the reference image specifying information of the image to be currently encoded and an absolute value (abs_delta_rps_minus1) of the difference.

Further, as illustrated in 8-th and 9-th lines of FIG. 12, the RPS includes a flag (used_by_curr_pic_lt_flag) indicating whether or not the reference image specified by the reference image specifying information is used. Further, as illustrated in 10-th and 11-th lines, when the flag (used_by_curr_pic_lt_flag) is 0 indicating that the reference image specified by the reference image specifying information is not used, a flag (use_delta_flag) indicating whether or not the reference image is included in the RPS is included in the RPS.

Further, as illustrated in 14-th to 23-rd lines of FIG. 12, when inter_ref_pic_set_prediction_flag is 0, the number of reference images, information indicating a POC, or the like is included in the RPS.

(Exemplary Configuration of Enhancement Encoding Unit)

Figure 13:
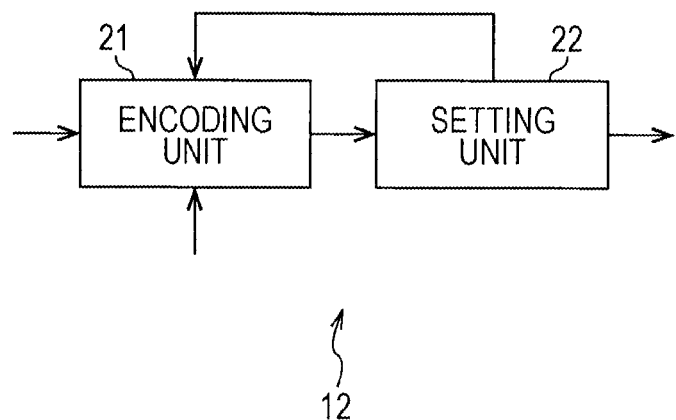
FIG. 13 is a block diagram illustrating an exemplary configuration of an enhancement encoding unit of FIG. 6.

FIG. 13 is a block diagram illustrating an exemplary configuration of the enhancement encoding unit 12 of FIG. 6.

The enhancement encoding unit 12 of FIG. 13 includes an encoding unit 21 and a setting unit 22.

The encoding unit 21 of the enhancement encoding unit 12 receives an enhancement image of a frame unit input from the outside as an input signal. The encoding unit 21 encodes the input signal according to the scheme complying with the HEVC scheme with reference to the reference image specifying information provided from the base encoding unit 11, the reference image specifying generation information provided from the setting unit 22, and the like. The encoding unit 21 supplies encoded data obtained as the result to the setting unit 22.

The setting unit 22 sets the reference image specifying generation information. An index given in order from 0 is allocated to the reference image specifying information of the reference image specifying generation information or a difference of the reference image specifying information. The setting unit 22 supplies the reference image specifying generation information to the encoding unit 21. Further, the setting unit 22 sets the SPS including the reference image specifying generation information, the PPS, or the like.

The setting unit 22 generates an encoded stream based on the set SPS, the PPS, and the encoded data supplied from the encoding unit 21, and supplies the generated encoded stream to the combining unit 13 as the enhancement stream.

(Exemplary Configuration of Encoding Unit)

Figure 14:
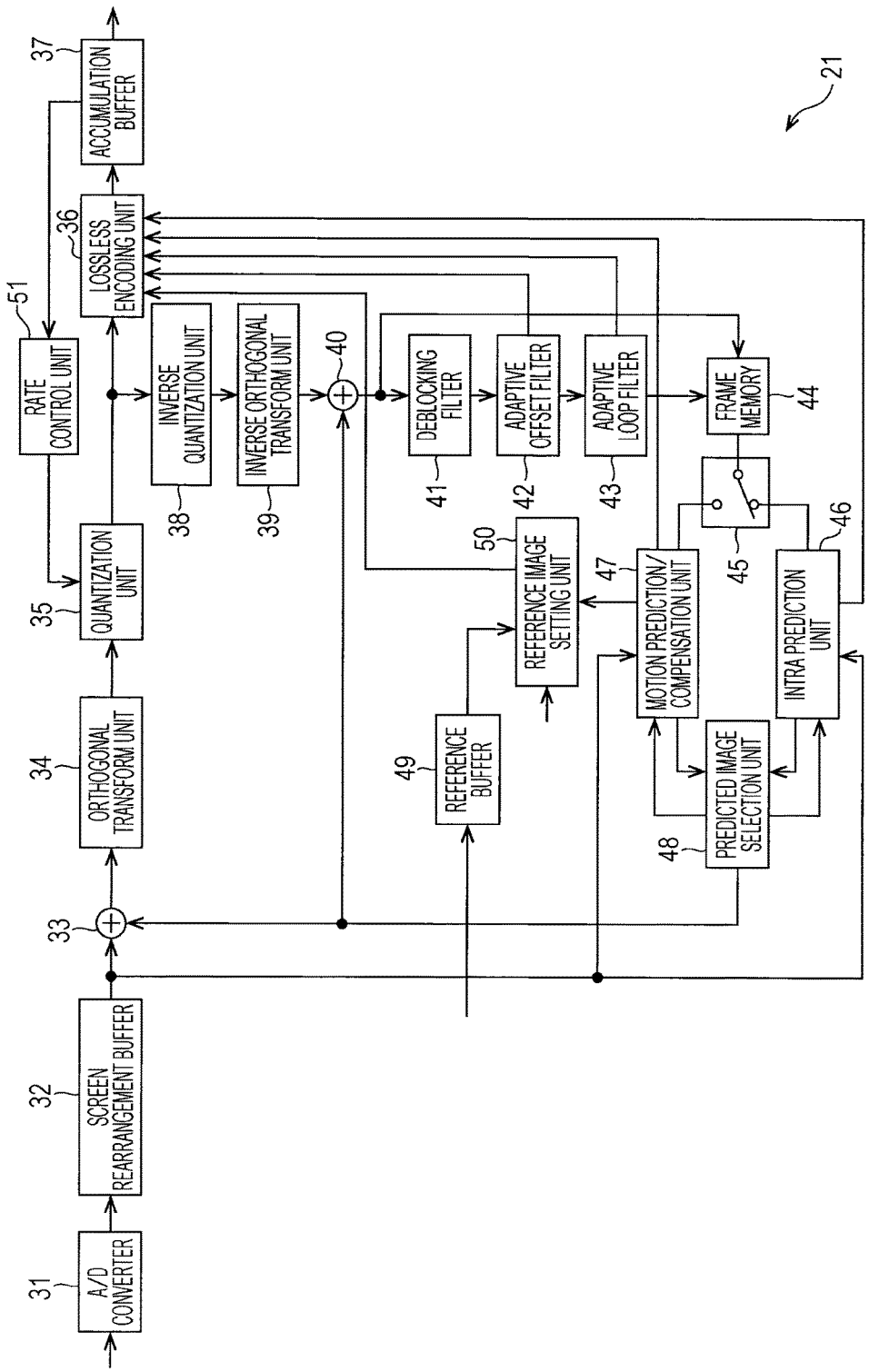
FIG. 14 is a block diagram illustrating an exemplary configuration of an encoding unit of FIG. 13.

FIG. 14 is a block diagram illustrating an exemplary configuration of the encoding unit 21 of FIG. 13.

The encoding unit 21 of FIG. 14 includes an A/D converter 31, a screen rearrangement buffer 32, an operation unit 33, an orthogonal transform unit 34, a quantization unit 35, a lossless encoding unit 36, an accumulation buffer 37, an inverse quantization unit 38, an inverse orthogonal transform unit 39, an addition unit 40, a deblocking filter 41, an adaptive offset filter 42, an adaptive loop filter 43, a frame memory 44, a switch 45, an intra prediction unit 46, a motion prediction/compensation unit 47, a predicted image selection unit 48, a reference buffer 49, a reference image setting unit 50, and a rate control unit 51.

Specifically, the A/D converter 31 of the encoding unit 21 performs A/D conversion on an image of a frame unit input as an input signal, and outputs the converted image to be stored in the screen rearrangement buffer 32. The screen rearrangement buffer 32 rearranges the stored image of the frame unit of a display order in an encoding order according to a GOP structure, and outputs the rearranged image to the operation unit 33, the intra prediction unit 46, and the motion prediction/compensation unit 47.

The operation unit 33 functions as an encoding unit, and performs encoding by calculating a difference between a predicted image supplied from the predicted image selection unit 48 and a current encoding image output from the screen rearrangement buffer 32. Specifically, the operation unit 33 performs encoding by subtracting the predicted image supplied from the predicted image selection unit 48 from the image to be currently encoded output from the screen rearrangement buffer 32. The operation unit 33 outputs an image obtained as the result to the orthogonal transform unit 34 as residual information. Further, when no predicted image is supplied from the predicted image selection unit 48, the operation unit 33 outputs an image read from the screen rearrangement buffer 32 to the orthogonal transform unit 34 without change as the residual information.

The orthogonal transform unit 34 performs orthogonal transform on the residual information provided from the operation unit 33, and supplies generated orthogonal transform coefficients to the quantization unit 35.

The quantization unit 35 quantizes the orthogonal transform coefficients supplied from the orthogonal transform unit 34, and supplies coefficients obtained as the result to the lossless encoding unit 36.

The lossless encoding unit 36 acquires information (hereinafter, referred to as "intra prediction mode information") indicating an optimal intra prediction mode from the intra prediction unit 46. Further, the lossless encoding unit 36 acquires information (hereinafter, referred to as "inter prediction mode information") indicating an optimal inter prediction mode, a motion vector, and the like supplied from the motion prediction/compensation unit 47 from the motion prediction/compensation unit 47. Furthermore, the lossless encoding unit 36 acquires the reference image specifying generation information, the RPS flag, and the like from the reference image setting unit 50.

Further, the lossless encoding unit 36 acquires offset filter information related to an offset filter from the adaptive offset filter 42, and acquires a filter coefficient from the adaptive loop filter 43.

The lossless encoding unit 36 performs lossless coding such as variable length coding (for example, context-adaptive variable length coding (CAVLC)) or arithmetic coding (for example, context-adaptive binary arithmetic coding (CABAC)) on the quantized coefficients supplied from the quantization unit 35.

Further, the lossless encoding unit 36 performs lossless coding on the intra prediction mode information or the inter prediction mode information, the motion vector, the reference image specifying generation information, the RPS flag, the offset filter information, and the filter coefficient as encoding information related to encoding. The lossless encoding unit 36 sets the lossless encoded encoding information as a slice header, sets the lossless encoded coefficients as encoded data, and adds the slice header to the encoded data. The lossless encoding unit 36 supplies the encoded data with the slice header to be accumulated in the accumulation buffer 37.

The accumulation buffer 37 temporarily stores the encoded data supplied from the lossless encoding unit 36. Further, the accumulation buffer 37 supplies the stored encoded data to the setting unit 22 of FIG. 13.

Further, the quantized coefficients output from the quantization unit 35 are also supplied to the inverse quantization unit 38. The inverse quantization unit 38 performs inverse quantization on the coefficients quantized by the quantization unit 35, and supplies the orthogonal transform coefficients obtained as the result to the inverse orthogonal transform unit 39.

The inverse orthogonal transform unit 39 performs fourth-order inverse orthogonal transform on the orthogonal transform coefficients supplied from the inverse quantization unit 38, and supplies the residual information obtained as the result to the addition unit 40.

The addition unit 40 adds the residual information supplied from the inverse orthogonal transform unit 39 to the predicted image supplied from the predicted image selection unit 48, and obtains a locally decoded image. Further, when no predicted image is supplied from the predicted image selection unit 48, the addition unit 40 regards the residual information supplied from the inverse orthogonal transform unit 39 as the locally decoded image. The addition unit 40 supplies the locally decoded image to the deblocking filter 41, and supplies the locally decoded image to be accumulated in the frame memory 44.

The deblocking filter 41 performs an adaptive deblocking filter process of removing block distortion on the locally decoded image supplied from the addition unit 40, and supplies the image obtained as the result to the adaptive offset filter 42.

The adaptive offset filter 42 performs an adaptive offset filter (sample adaptive offset (SAO)) process of mainly removing ringing on the image that has been subjected to the adaptive deblocking filter process by the deblocking filter 41.

Specifically, the adaptive offset filter 42 decides a type of an adaptive offset filter process for each largest coding unit (LCU) serving as a maximum coding unit, and obtains an offset used in the adaptive offset filter process. The adaptive offset filter 42 performs the decided type of the adaptive offset filter process on the image that has been subjected to the adaptive deblocking filter process using the obtained offset. Then, the adaptive offset filter 42 supplies the image that has been subjected to the adaptive offset filter process to the adaptive loop filter 43.

Further, the adaptive offset filter 42 includes a buffer that stores an offset. The adaptive offset filter 42 determines whether or not an offset used in the adaptive offset filter process is already stored in the buffer for each LCU.

When the offset used in the adaptive offset filter process is determined to be already stored in the buffer, the adaptive offset filter 42 sets a storage flag indicating that the offset is being stored in the buffer to a value (here, 1) indicating that the offset is being stored in the buffer.

Then, the adaptive offset filter 42 supplies a storage flag set to 1, an index indicating a storage position of an offset in the buffer, type information indicating a type of a performed adaptive offset filter process to the lossless encoding unit 36 as the offset filter information in units of LCUs.

Meanwhile, when an offset used in the adaptive offset filter process is not stored in the buffer yet, the adaptive offset filter 42 stores the offset in the buffer. Further, the adaptive offset filter 42 sets the storage flag to a value (here, 0) indicating that the offset is not stored in the buffer. Then, the adaptive offset filter 42 supplies the storage flag set to 0, the offset, and the type information to the lossless encoding unit 36 as the offset filter information in units of LCUs.

For example, the adaptive loop filter 43 is configured with a two-dimensional Wiener Filter. The adaptive loop filter 43 performs an adaptive loop filter (ALF) process on the image that has been subjected to the adaptive offset filter process and supplied from the adaptive offset filter 42, for example, in units of LCUs.

Specifically, the adaptive loop filter 43 calculates a filter coefficient used in the adaptive loop filter process in units of LCUs such that a residue between an original image serving as an image output from the screen rearrangement buffer 32 and the image that has been subjected to the adaptive loop filter process is minimized. Then, the adaptive loop filter 43 performs the adaptive loop filter process on the image that has been subjected to the adaptive offset filter process using the calculated filter coefficient in units of LCUs.

The adaptive loop filter 43 supplies the image that has been subjected to the adaptive loop filter process to the frame memory 44. Further, the adaptive loop filter 43 supplies the filter coefficient to the lossless encoding unit 36.

Here, the adaptive loop filter process is assumed to be performed in units of LCUs, but a processing unit of the adaptive loop filter process is not limited to an LCU. Here, processing can be efficiently performed by causing a processing unit of the adaptive offset filter 42 to match a processing unit of the adaptive loop filter 43.

The frame memory 44 accumulates the image supplied from the adaptive loop filter 43 and the image supplied from the addition unit 40. The images accumulated in the frame memory 44 are output to the intra prediction unit 46 or the motion prediction/compensation unit 47 via the switch 45 as the reference image.

The intra prediction unit 46 performs intra prediction processes of all intra prediction modes serving as a candidate using the reference image read from the frame memory 44 via the switch 45.

Further, the intra prediction unit 46 calculates a cost function value (the details will be described later) on all the intra prediction modes serving as a candidate based on the image read from the screen rearrangement buffer 32 and the predicted image generated as a result of the intra prediction process. Then, the intra prediction unit 46 decides an intra prediction mode in which the cost function value is smallest as the optimal intra prediction mode.

The intra prediction unit 46 supplies the predicted image generated in the optimal intra prediction mode and the corresponding cost function value to the predicted image selection unit 48. When a notification of selection of the predicted image generated in the optimal intra prediction mode is given from the predicted image selection unit 48, the intra prediction unit 46 supplies the intra prediction mode information to the lossless encoding unit 36.

Further, the cost function value is also called a rate distortion (RD) cost, and calculated based on a technique of either of a high complexity mode and a low complexity mode decided by a joint model (JM) that is a reference software, for example, in the H.264/AVC scheme. Further, the reference software in the H.264/AVC scheme is open to the public at http://iphome.hhi.de/suehring/tml/index.htm.

Specifically, when the high complexity mode is employed as the cost function value calculation technique, up to decoding is supposedly performed on all prediction modes serving as a candidate, and a cost function value expressed by the following Formula (1) is calculated on each of the prediction modes.

[Mathematical Formula 1]

$$\text{Cost(Mode)} = D + \lambda \cdot R \quad (1)$$

D indicates a difference (distortion) between an original image and a decoded image, R indicates a generated coding amount including an up to orthogonal transform coefficients, and $\lambda$ indicates a Lagrange undetermined multiplier given as a function of a quantization parameter QP.

Meanwhile, when the low complexity mode is employed as the cost function value calculation technique, generation of a predicted image and calculation of a coding amount of encoding information are performed on all prediction modes serving as a candidate, and a cost function expressed by the following Formula (2) is calculated on each of the prediction modes.

[Mathematical Formula 2]

$$\text{Cost(Mode)} = D + Q P \text{toQuant}(QP) \cdot \text{Header\_Bit} \quad (2)$$

D indicates a difference (distortion) between an original image and a predicted image, Header_Bit indicates a coding amount of encoding information, and QPtoQuant indicates a function given as a function of the quantization parameter QP.

In the low complexity mode, since only the predicted image has only to be generated for all the prediction modes, and it is unnecessary to generate the decoded image, a computation amount is small.

The motion prediction/compensation unit 47 performs a motion prediction/compensation process for all the inter prediction modes serving as a candidate. Specifically, the motion prediction/compensation unit 47 detects motion vectors of all the inter prediction modes serving as a candidate based on the image supplied from the screen rearrangement buffer 32 and the reference image read from the frame memory 44 via the switch 45. For example, the reference image is set by the user. The motion prediction/compensation unit 47 performs a compensation process on the reference image based on the detected motion vector, and generates the predicted image.

At this time, the motion prediction/compensation unit 47 calculates the cost function values for all the inter prediction modes serving as a candidate based on the image supplied from the screen rearrangement buffer 32 and the predicted image, and decides the inter prediction mode in which the cost function value is smallest as the optimal inter prediction mode. Then, the motion prediction/compensation unit 47 supplies the cost function value of the optimal inter prediction mode and the corresponding predicted image to the predicted image selection unit 48. Further, when a notification of selection of the predicted image generated in the optimal inter prediction mode is given from the predicted image selection unit 48, the motion prediction/compensation unit 47 outputs the inter prediction mode information, the corresponding motion vector, and the like to the lossless encoding unit 36, and outputs the reference image specifying information to the reference image setting unit 50.

The predicted image selection unit 48 decides one of the optimal intra prediction mode and the optimal inter prediction mode that is smaller in the corresponding cost function value as the optimal prediction mode based on the cost function values supplied from the intra prediction unit 46 and the motion prediction/compensation unit 47. Then, the predicted image selection unit 48 supplies the predicted image of the optimal prediction mode to the operation unit 33 and the addition unit 40. Further, the predicted image selection unit 48 notifies the intra prediction unit 46 or the motion prediction/compensation unit 47 of selection of the predicted image of the optimal prediction mode.

The reference buffer 49 stores the reference image specifying information of the reference image that is supplied from the base encoding unit 11 of FIG. 6 and used when the base image is encoded.

The reference image setting unit 50 compares the reference image specifying information supplied from the motion prediction/compensation unit 47 with the reference image specifying information stored in the reference buffer 49, and decides the prediction mode of the reference image specifying information of the enhancement image. Here, the prediction mode of the reference image specifying information is assumed to include a copy mode, a differential prediction mode, and a non-prediction mode.

The copy mode refers to a prediction mode in which reference image specifying information of a reference layer serving as another layer (here, the base layer) to be referred to is used as the reference image specifying information of the enhancement image. The differential prediction mode refers to a prediction mode in which the reference image specifying information of the enhancement image is predicted by adding a difference between the reference image specifying information of the enhancement image and the reference image specifying information of the reference layer to the reference image specifying information of the reference layer. The non-prediction mode refers to a prediction mode in which the reference image specifying information of the enhancement image is set independently of the reference image specifying information of the reference layer.

When the prediction mode of the reference image specifying information is the copy mode, if the prediction mode of the reference image specifying information serving as the reference image specifying generation information supplied from the setting unit 22 of FIG. 13 is the copy mode, the reference image setting unit 50 supplies 1 serving as the RPS flag to the lossless encoding unit 36. Meanwhile, if the prediction mode of the reference image specifying information serving as the reference image specifying generation information supplied from the setting unit 22 is not the copy mode, 0 serving as the RPS flag is supplied to the lossless encoding unit 36, and the copy mode is set as the reference image specifying generation information and supplied to the lossless encoding unit 36.

Further, when the prediction mode of the reference image specifying information is the differential prediction mode, the reference image setting unit 50 calculates a difference between the reference image specifying information of the enhancement image and the reference image specifying information of the base image. Then, the reference image setting unit 50 compares the calculated difference of the reference image specifying information with the difference of the reference image specifying information serving as the reference image specifying generation information supplied from the setting unit 22.

Then, when both differences are identical to each other, the reference image setting unit 50 recognizes a corresponding index, supplies 1 serving as the RPS flag to the lossless encoding unit 36, sets the index as the reference image specifying generation information, and supplies the reference image specifying generation information to the lossless encoding unit 36.

Meanwhile, when both differences are not identical to each other, the reference image setting unit 50 supplies 0 serving as the RPS flag to the lossless encoding unit 36, sets the calculated difference of the reference image specifying information as the reference image specifying generation information, and supplies the reference image specifying generation information to the lossless encoding unit 36.

Further, when the prediction mode of the reference image specifying information is the non-prediction mode, the reference image setting unit 50 compares the reference image specifying information of the enhancement image with the reference image specifying information serving as the reference image specifying generation information supplied from the setting unit 22. Then, when both pieces of the reference image specifying information are identical, the reference image setting unit 50 recognizes a corresponding index, supplies 1 serving as the RPS flag to the lossless encoding unit 36, sets the index as the reference image specifying generation information, and supplies the reference image specifying generation information to the lossless encoding unit 36.

Meanwhile, when both pieces of the reference image specifying information are not identical, the reference image setting unit 50 supplies 0 serving as the RPS flag to the lossless encoding unit 36, sets the reference image specifying information of the enhancement image as the reference image specifying generation information, and supplies the reference image specifying generation information to the lossless encoding unit 36.

The rate control unit 51 controls a rate of a quantization operation of the quantization unit 35 such that neither an overflow nor an underflow occurs based on encoded data accumulated in the accumulation buffer 37.

(Description of Encoding Process Unit)

Figure 15:
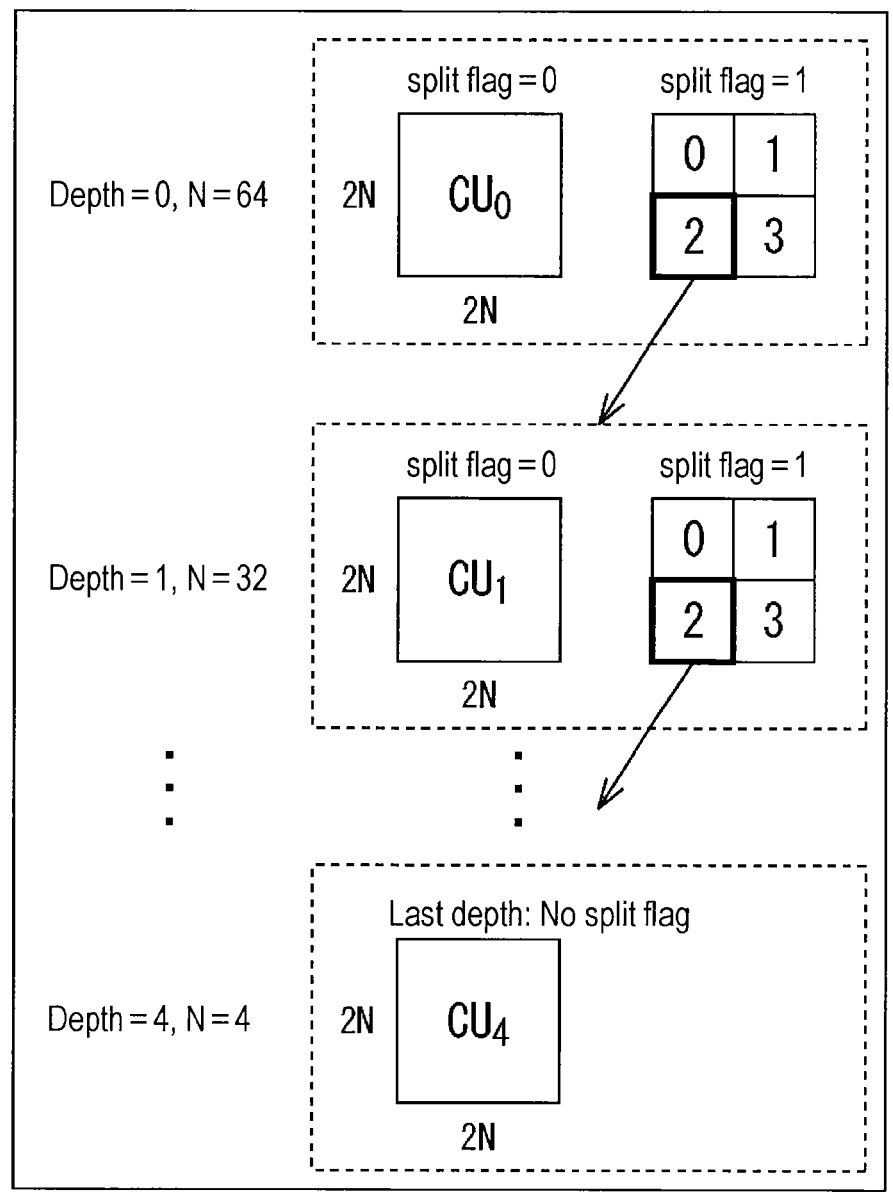
FIG. 15 is a diagram for describing a CU.

FIG. 15 is a diagram for describing a coding unit (CU) serving as an encoding unit in the HEVC scheme.

In the HEVC scheme, since an image of a large image frame such as ultra high definition (UHD) of 4000×2000 pixels is also a target, it is not optimal to fix a size of a coding unit to 16×16 pixels. Thus, in the HEVC scheme, a CU is defined as a coding unit.

The CU is also called a coding tree block (CTB), and undertakes the same role of a macroblock in the AVC scheme. Specifically, the CU is divided into prediction units (PUs) serving as a unit of intra prediction or inter prediction or transform units (TUs) serving as a unit of orthogonal transform. Here, the size of the CU is a square that varies for each sequence and is represented by pixels of a power of 2. Further, currently, in the HEVC scheme, as the size of the TU, 16×16 pixels and 32×32 pixels as well as 4×4 pixels and 8×8 pixels can be used.

In the example of FIG. 15, a size of a largest coding unit (LCU) serving as a CU of a largest size is 128, and a size of a smallest coding unit (SCU) serving as a CU of a smallest size is 8. Thus, a hierarchical depth of a CU having a size of 2N×2N in which hierarchicalization is performed in units of Ns is 0 to 4, and a hierarchical depth number is 5. Further, a CU having a size of 2N×2N is divided into CUs having a size of N×N serving as a layer that is one-level lower when a value of split_flag is 1.

Information designating a size of an LCU and a size of an SCU is included in the SPS. The details of the CU are described in Non Patent Document 1.

(Exemplary Configuration of Reference Image Setting Unit)

FIG. 16 is a block diagram illustrating an exemplary configuration of the reference image setting unit 50 of FIG. 14.

The reference image setting unit 50 of FIG. 16 includes an acquisition unit 71, a determination unit 72, and a generation unit 73.

The acquisition unit 71 of the reference image setting unit 50 acquires the reference image specifying information from the motion prediction/compensation unit 47 of FIG. 14, and supplies the reference image specifying information to the determination unit 72 and the generation unit 73.

The determination unit 72 reads the reference image specifying information of the base image from the reference buffer 49. The determination unit 72 compares the read reference image specifying information of the base image with the reference image specifying information supplied from the acquisition unit 71. Then, when the read reference image specifying information of the base image is identical to the reference image specifying information supplied from the acquisition unit 71, the determination unit 72 decides the copy mode as the prediction mode of the reference image specifying information. The determination unit 72 supplies the copy mode to the generation unit 73.

Further, the determination unit 72 determines whether or not the prediction mode of the reference image specifying information supplied as the reference image specifying generation information from the setting unit 22 of FIG. 13 is the copy mode. When the prediction mode of the reference image specifying information supplied as the reference image specifying generation information is determined to be the copy mode, the determination unit 72 supplies 1 serving as the RPS flag to the lossless encoding unit 36 of FIG. 14. However, when the prediction mode of the reference image specifying information supplied as the reference image specifying generation information is determined to be not the copy mode, the determination unit 72 supplies 0 serving as the RPS flag to the lossless encoding unit 36, and supplies the copy mode to the lossless encoding unit 36 as the reference image specifying generation information.

When the copy mode is not supplied from the determination unit 72, the generation unit 73 reads the reference image specifying information of the base image from the reference buffer 49. The generation unit 73 decides the differential prediction mode or the non-prediction mode as the prediction mode of the reference image specifying information based on an input from the user, and supplies the decided prediction mode to the lossless encoding unit 36 as the reference image specifying generation information.

When the differential prediction mode is decided as the prediction mode of the reference image specifying information, the generation unit 73 calculates a difference between the read reference image specifying information of the base image and the reference image specifying information supplied from the acquisition unit 71. Then, the generation unit 73 compares the calculated difference of the reference image specifying information with the difference of the reference image specifying information serving as the reference image specifying generation information supplied from the setting unit 22.

When both differences are identical to each other, the generation unit 73 recognizes a corresponding index, supplies 1 serving as the RPS flag to the lossless encoding unit 36, and supplies the index to the lossless encoding unit 36 as the reference image specifying generation information.

However, when both differences are not identical to each other, the generation unit 73 supplies 0 serving as the RPS flag to the lossless encoding unit 36, and supplies the calculated difference to the lossless encoding unit 36 as the reference image specifying generation information.

Further, when the non-prediction mode is decided as the prediction mode of the reference image specifying information, the generation unit 73 compares the reference image specifying information supplied from the acquisition unit 71 with the reference image specifying information serving as the reference image specifying generation information supplied from the setting unit 22. Then, when both pieces of the reference image specifying information are identical to each other, the generation unit 73 recognizes a corresponding index, supplies 1 serving as the RPS flag to the lossless encoding unit 36, and supplies the index to the lossless encoding unit 36 as the reference image specifying generation information.

However, when both pieces of the reference image specifying information are not identical to each other, the generation unit 73 supplies 0 serving as the RPS flag to the lossless encoding unit 36, and supplies the reference image specifying information supplied from the acquisition unit 71 to the lossless encoding unit 36 as the reference image specifying generation information.

(Exemplary Syntax of SPS of Enhancement Stream)

FIGS. 17 and 18 are diagrams illustrating an exemplary syntax of an SPS set by the setting unit 22 of FIG. 13.

As illustrated in a 9-th line of FIG. 18, the SPS includes RPS prediction mode information (short_term_ref_pic_pred_mode) indicating a prediction mod of the RPS as the reference image specifying generation information. The RPS prediction mode information is 0 when it indicates the copy mode, 1 when it indicates the differential prediction mode, and 2 when it indicates the non-prediction mode.

As illustrated in 10-th to 13-th lines, when the RPS prediction mode information is not 0, the SPS includes the RPS or a difference of the RPS for each prediction mod of the RPS. An index given in order from 0 is allocated to the RPS or the difference of the RPS.

As illustrated in a 15-th line, the SPS includes the long term flag (long_term_ref_pics_present_flag), similarly to the SPS of the base stream. As illustrated in 16-th and 17-th lines, when the long term flag is 1, the SPS includes long term prediction mode information (long_term_ref_pic_pred_mode) indicating the prediction mode of the reference image specifying information of the long term as the reference image specifying generation information. The long term prediction mode information (long_term_ref_pic_pred_mode) is 0 when it indicates the copy mode, 1 when it indicates the differential prediction mode, and 2 when it indicates the non-prediction mode.

As illustrated in 18-th to 22-nd lines, when the long term prediction mode information is 2, the SPS includes the number of pieces of reference image specifying information of the long term, the reference image specifying information of the long term, and the reference flag as the reference image specifying generation information, similarly to the SPS of the base stream. An index given in order from 0 is allocated to the reference image specifying information of the long term.

However, when the long term prediction mode information is 1, as illustrated in 24-th to 27-th lines, the SPS includes a difference (diff_num_long_term_ref_pics_sps) between the number of pieces of reference image specifying information of the long term included in the SPS and the number of pieces of the reference image specifying information of the long term included in the SPS of the reference layer and a difference (diff_lt_ref_pic_poc_lsb_sps) between the reference image specifying information of the long term to which the same index is given and the reference image specifying information of the long term included in the SPS of the reference layer as the reference image specifying generation information.

Further, when the long term prediction mode information is 1, the SPS of the enhancement stream does not include the reference flag, and the reference flag is regarded as the reference flag of the reference layer.

(Exemplary Syntax of Slice Header of Enhancement Stream)

FIGS. 19 to 21 are diagrams illustrating of an exemplary configuration of a syntax of a slice header of the enhancement stream.

As illustrated in an 18-th line of FIG. 19, the slice header of the enhancement stream includes the RPS flag, similarly to the slice header of the base stream. Further, as illustrated in 19-th and 20-th lines, when the RPS flag is 0, the slice header includes RPS mode information of a corresponding slice as the reference image specifying generation information.

As illustrated in 21-st and 22-nd lines of FIG. 19, when the RPS prediction mode information is not 0, the slice header includes an RPS of a corresponding slice or a difference of an RPS for each prediction mod of the RPS as short_term_ref_pic_set in which an index is num_short_term_ref_pic_sets.

Further, as illustrated in 23-rd and 24-th lines of FIG. 19, when the RPS prediction mode information is not 0, and the RPS flag is 1, the slice header includes an index (short_term_ref_pic_set_idx) of an RPS of a corresponding slice or a difference of an RPS.

Further, as illustrated in 25-th and 26-th lines of FIG. 19, when the long term flag included in the SPS is 1, the slice header includes the long term prediction mode information as the reference image specifying generation information.

As illustrated in 27-th to 30-th lines of FIG. 19, when the long term prediction mode information is 2, the slice header includes the SPS internal number and the SPS external number as the reference image specifying generation information, similarly to the base stream.

Further, as illustrated in 31-st to 36-th lines of FIG. 19, the slice header includes an index (lt_idx_sps), information (poc_lsb_sps), and a reference flag (used_by_curr_pic_lt_flag) as the reference image specifying generation information, similarly to the base stream.

Further, as illustrated in a 38-th line of FIG. 19, the slice header includes most significant bit flag (delta_poc_msb_present_flag) indicating whether or not there is most significant bit information (delta_poc_msb_cycle_lt) indicating a most significant bit of a POC of a reference image of a long term. Further, as illustrated in 39-th and 40-th lines, when the most significant bit flag is 1 indicating that there is the most significant bit information, the slice header includes the most significant bit information.

Meanwhile, as illustrated in 42-nd to 45-th lines of FIG. 19, when the long term prediction mode information is 1, the slice header includes a difference (diff_num_long_term_sps) between the SPS internal number of the corresponding slice and the SPS internal number of the reference layer and a difference (diff_num_long_term_pics) between the SPS external number of the corresponding slice and the SPS external number of the reference layer as the reference image specifying generation information.

Further, as illustrated in a 46-th line of FIG. 19 and 1-st to 4-th lines of FIG. 20, the slice header includes an index (lt_idx_sps) and a difference (diff_poc_lsb_lt) between information (poc_lsb_lt) and information (poc_lsb_lt) of the reference layer as the reference image specifying generation information.

Further, when the long term prediction mode information is 1, the slice header of the enhancement stream does not include the reference flag and the most significant bit flag, and the reference flag and the most significant bit flag are regarded as the reference flag and the most significant bit flag of the reference layer.

Further, as illustrated in 6-th and 7-th lines of FIG. 20, when the most significant bit flag is 1, the slice header includes a difference (diff_delta_poc_msb_cycle_lt) between the most significant bit information of the corresponding slice and the most significant bit information of the reference layer.

(Exemplary Syntax of RPS of Enhancement Stream)

FIG. 22 is a diagram illustrating an exemplary syntax of the RPS of the enhancement stream.

As illustrated in a 2-nd line of FIG. 22, the RPS of the enhancement stream includes reference information, similarly to the RPS of the base stream. As illustrated in 3-rd to 13-th lines, when the reference information is 1, and the RPS prediction mode is 2, the RPS of the enhancement stream includes previous image specifying information, a sign (delta_rps_sign), an absolute value (abs_delta_rps_minus1), a flag (used_by_curr_pic_lt_flag), and a flag (use_delta_flag) as the reference image specifying generation information, similarly to the RPS of the base stream.

Further, as illustrated in 14-th to 17-th lines, when the reference information is 1, and the RPS prediction mode is 1, the RPS includes a difference (diff_delta_idx_minus1) between the previous image specifying information of the corresponding slice and the previous image specifying information of the reference layer and a difference (diff_abs_delta_rps_minus1) between the absolute value (abs_delta_rps_minus1) of the corresponding slice and the absolute value (abs_delta_rps_minus1) of the reference layer.

Further, when the long term prediction mode information is 1, the slice header of the enhancement stream does not include the sign (delta_rps_sign), the flag (used_by_curr_pic_lt_flag), and the flag (use_delta_flag), and the sign (delta_rps_sign), the flag (used_by_curr_pic_lt_flag), and the flag (use_delta_flag) are regarded as a sign (delta_rps_sign), a flag (used_by_curr_pic_lt_flag), and a flag (use_delta_flag) of the reference layer, respectively.

Meanwhile, as illustrated in 21-st to 32-nd lines, when the reference information is 0, and the RPS prediction mode is 2, the RPS includes information such as the number of reference images or a POC of a reference image, similarly to the RPS of the base stream. Further, as illustrated in 33-rd to 40-th lines, when the reference information is 0, and the RPS prediction mode is 1, the RPS includes a difference between information such as the number of reference images or a POC of a reference image of a corresponding slice and information such as the number of reference images or a POC of a reference image of the reference layer.

(Exemplary Syntax of VPS)

FIG. 23 is a diagram illustrating an exemplary syntax of a VPS.

As illustrated in a 6-th line of FIG. 23, the VPS includes information (vps_max_layer_minus1) indicating the number of layers of scalability. Further, as illustrated in a 7-th line, the VPS includes information (vps_max_sub_layer_minus1) indicating the number of layers of the temporal scalability, similarly to the related art.

Further, as illustrated in a 15-th line, the VPS includes 0 as a difference (diff_ref_layer[0]) between the base layer and the reference layer serving as information specifying a base layer whose index is 0. Furthermore, as illustrated in 16-th and 17-th lines, the VPS includes difference (diff_ref_layer) of the enhancement layers.

Here, when a current layer is indicated by curr_layer, and the reference layer is indicated by ref_layer, the reference layer ref_layer is expressed by the following Formula (3) using a difference diff_ref_layer.
[Mathematical Formula 3]

$$ref\_layer = curr\_layer - diff\_ref\_layer \quad (3)$$

Thus, when the difference (diff_ref_layer) between the enhancement layers is 0, the enhancement stream is generated without reference to the reference image specifying information of another layer or the like, similarly to the base stream.

(Description of Processing of Encoding Device)

Figure 24:
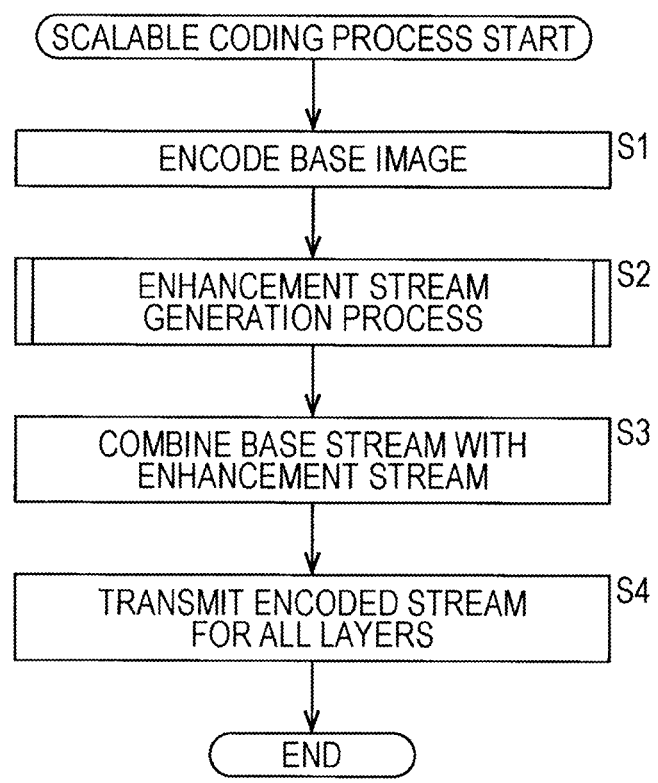
FIG. 24 is a flowchart for describing a scalable coding process of an encoding device of FIG. 6.

FIG. 24 is a flowchart for describing a scalable coding process of the encoding device 10 of FIG. 6. The scalable coding process starts when the base image and the enhancement image are input from the outside.

In step S1 of FIG. 24, the base encoding unit 11 of the encoding device 10 encodes the base image input from the outside according to the HEVC scheme. The base encoding unit 11 supplies the reference image specifying information of the reference image used when the base image is encoded to the enhancement encoding unit 12. The base encoding unit 11 supplies the base stream including encoded data obtained as a result of encoding, an SPS, a PPS, and the like to the combining unit 13 as the base stream.

In step S2, the enhancement encoding unit 12 performs the enhancement stream generation process of generating the enhancement stream from the enhancement image input from the outside. The details of the enhancement stream generation process will be described with reference to FIG. 25 which will be described later.

In step S3, the combining unit 13 combines the base stream supplied from the base encoding unit 11 with the enhancement stream supplied from the enhancement encoding unit 12, adds the VPS and the like, and generates an encoded stream for all layers. The combining unit 13 supplies the encoded stream for all layers to the transmission unit 14.

In step S4, the transmission unit 14 transmits the encoded stream for all layers supplied from the combining unit 13 to the decoding device which will be described later.

Figure 25:
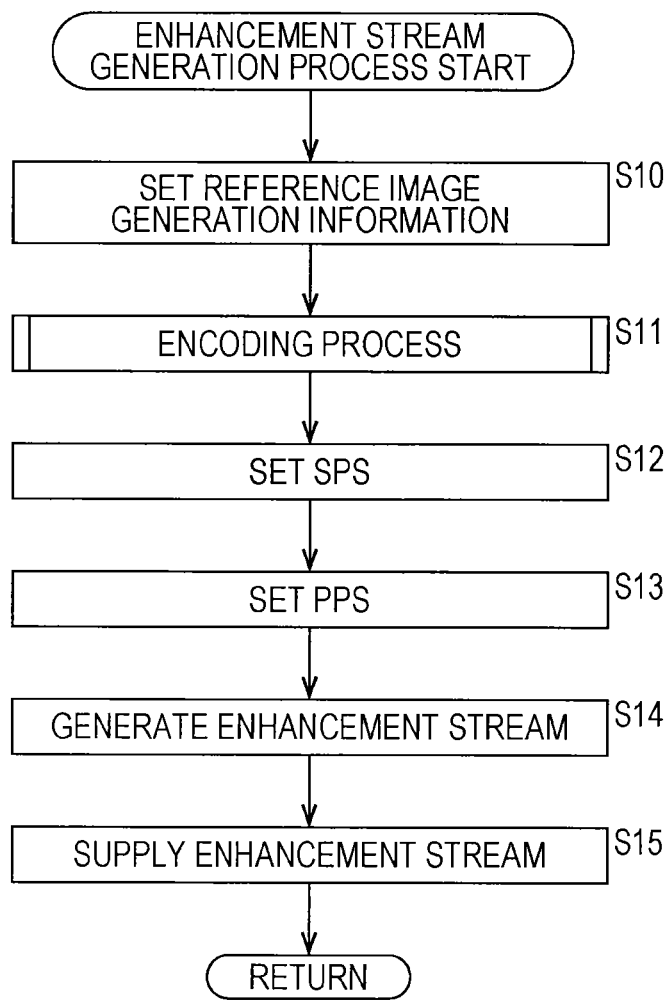
FIG. 25 is a flowchart for describing the details of an enhancement stream generation process of FIG. 24.

FIG. 25 is a flowchart for describing the details of the enhancement stream generation process of step S2 of FIG. 24.

In step S10 of FIG. 25, the setting unit 22 of the enhancement encoding unit 12 sets the reference image specifying generation information, and supplies the reference image specifying generation information to the encoding unit 21. In step S11, the encoding unit 21 performs the encoding process of encoding the enhancement image of a frame unit input as an input signal from the outside according to the scheme complying with the HEVC scheme. The details of the encoding process will be described with reference to FIGS. 26 and 27 which will be described later.

In step S12, the setting unit 22 sets an SPS including the reference image specifying generation information set in step S10. In step S13, the setting unit 22 sets a PPS. In step S14, the setting unit 22 generates an enhancement stream based on the set SPS and the PPS and the encoded data supplied from the encoding unit 21.

In step S15, the setting unit 22 supplies the enhancement stream to the combining unit 13, and ends the process.

Figure 26:
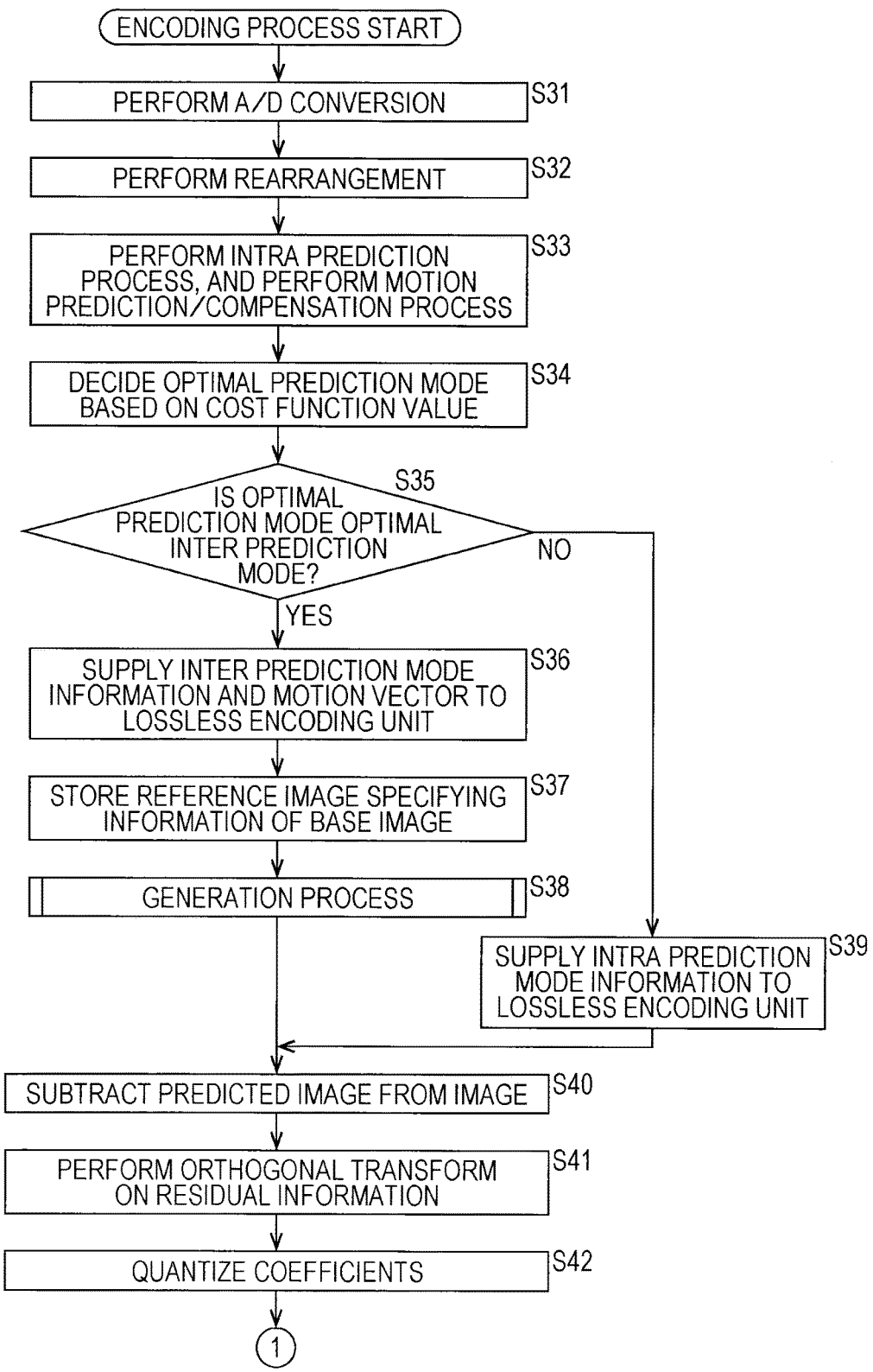
FIG. 26 is a flowchart for describing the details of an encoding process of FIG. 25.
Figure 27:
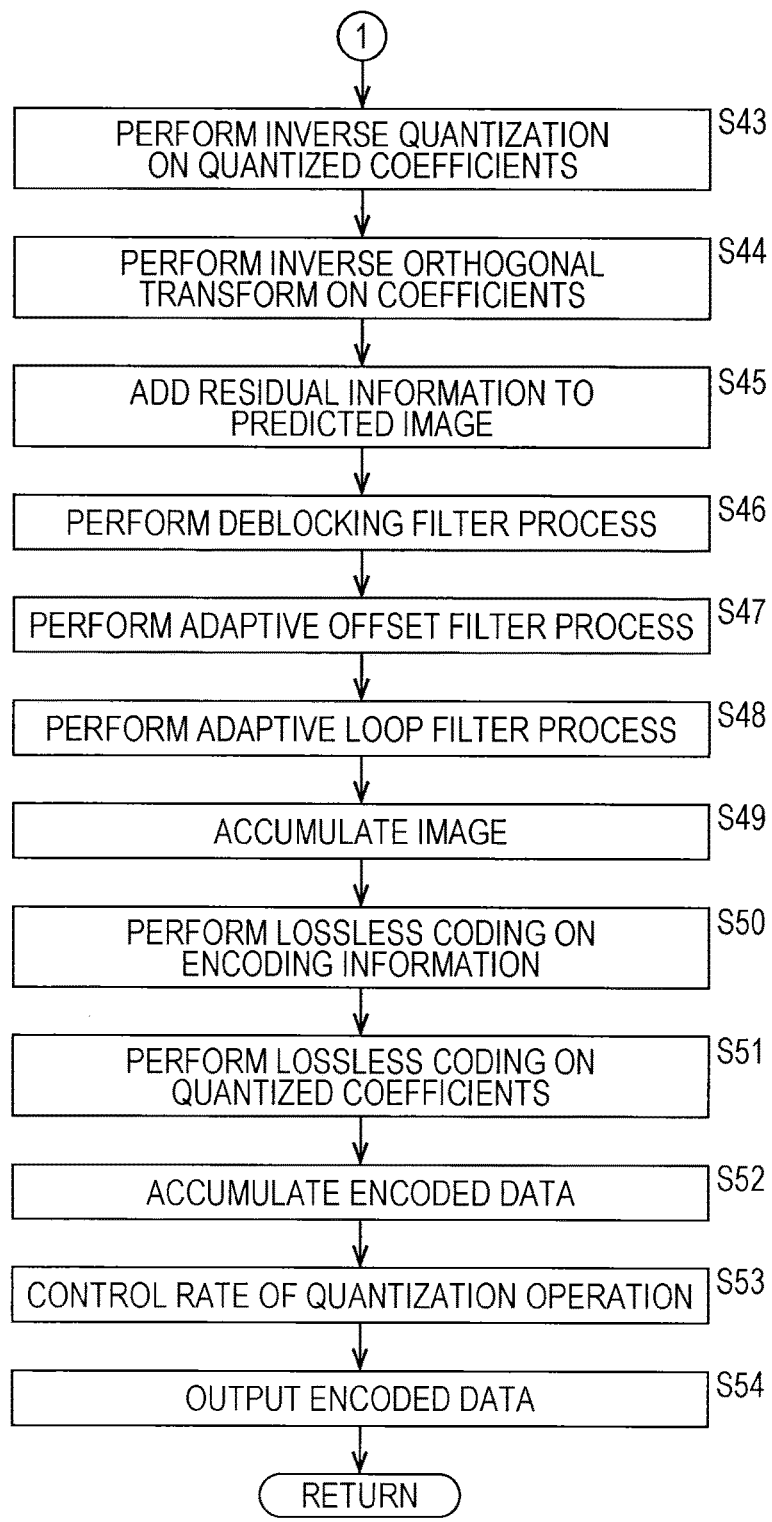
FIG. 27 is a flowchart for describing the details of an encoding process of FIG. 25.

FIGS. 26 and 27 are flowcharts for describing the details of the encoding process of step S11 of FIG. 25.

In step S31 of FIG. 26, the A/D converter 31 of the encoding unit 21 performs A/D conversion on an image of a frame unit input as an input signal, and outputs a resultant image to be stored in the screen rearrangement buffer 32.

In step S32, the screen rearrangement buffer 32 rearranges the stored image of the frame of the display order in the encoding order according to the GOP structure. The screen rearrangement buffer 32 supplies the rearranged image of the frame unit to the operation unit 33, the intra prediction unit 46, and the motion prediction/compensation unit 47.

In step S33, the intra prediction unit 46 performs the intra prediction process for all the intra prediction modes serving as a candidate. Further, the intra prediction unit 46 calculates the cost function values for all the intra prediction modes serving as a candidate based on the image read from the screen rearrangement buffer 32 and the predicted image generated as a result of the intra prediction process. Then, the intra prediction unit 46 decides the intra prediction mode in which the cost function value is smallest as the optimal intra prediction mode. The intra prediction unit 46 supplies the predicted image generated in the optimal intra prediction mode and the corresponding cost function value to the predicted image selection unit 48.

Further, the motion prediction/compensation unit 47 performs the motion prediction/compensation process for all the inter prediction modes serving as a candidate. Further, the motion prediction/compensation unit 47 calculates the cost function values for all the inter prediction modes serving as a candidate based on the image supplied from the screen rearrangement buffer 32 and the predicted image, and decides the inter prediction mode in which the cost function value is smallest as the optimal inter prediction mode. Then, the motion prediction/compensation unit 47 supplies the cost function value of the optimal inter prediction mode and the corresponding predicted image to the predicted image selection unit 48.

In step S34, the predicted image selection unit 48 decides one of the optimal intra prediction mode and the optimal inter prediction mode that is smaller in the cost function value as the optimal prediction mode based on the cost function values supplied from the intra prediction unit 46 and the motion prediction/compensation unit 47 by the process of step S33. Then, the predicted image selection unit 48 supplies the predicted image of the optimal prediction mode to the operation unit 33 and the addition unit 40.

In step S35, the predicted image selection unit 48 determines whether or not the optimal prediction mode is the optimal inter prediction mode. When the optimal prediction mode is determined to be the optimal inter prediction mode in step S35, the predicted image selection unit 48 notifies the motion prediction/compensation unit 47 of selection of the predicted image generated in the optimal inter prediction mode.

Then, in step S36, the motion prediction/compensation unit 47 supplies the inter prediction mode information and the motion vector to the lossless encoding unit 36. In step S37, the reference buffer 49 stores the reference image specifying information of the base image supplied from the base encoding unit 11. In step S38, the reference image setting unit 50 performs the generation process of generating the reference image specifying generation information of the reference image used in the motion prediction/compensation process. The details of the generation process will be described with reference to FIG. 28 which will be described later.

Meanwhile, when the optimal prediction mode is determined to be not the optimal inter prediction mode in step S35, that is, when the optimal prediction mode is the optimal intra prediction mode, the predicted image selection unit 48 notifies the intra prediction unit 46 of selection of the predicted image generated in the optimal intra prediction mode. Then, in step S39, the intra prediction unit 46 supplies the intra prediction mode information to the lossless encoding unit 36, and the process proceeds to step S40.

In step S40, the operation unit 33 performs encoding by subtracting the predicted image supplied from the predicted image selection unit 48 from the image supplied from the screen rearrangement buffer 32. The operation unit 33 outputs the image obtained as the result to the orthogonal transform unit 34 as the residual information.

In step S41, the orthogonal transform unit 34 performs orthogonal transform on the residual information supplied from the operation unit 33, and supplies the orthogonal transform coefficients obtained as the result to the quantization unit 35.

In step S42, the quantization unit 35 performs quantization on the coefficients supplied from the orthogonal transform unit 34, and supplies the coefficients obtained as the result to the lossless encoding unit 36 and the inverse quantization unit 38.

In step S43 of FIG. 27, the inverse quantization unit 38 performs inverse quantization on the quantized coefficients supplied from the quantization unit 35, and supplies the orthogonal transform coefficients obtained as the result to the inverse orthogonal transform unit 39.

In step S44, the inverse orthogonal transform unit 39 performs inverse orthogonal transform on the orthogonal transform coefficients supplied from the inverse quantization unit 38, and supplies the residual information obtained as the result to the addition unit 40.

In step S45, the addition unit 40 adds the residual information supplied from the inverse orthogonal transform unit 39 to the predicted image supplied from the predicted image selection unit 48, and obtains a locally decoded image. The addition unit 40 supplies the obtained image to the deblocking filter 41 and the frame memory 44.

In step S46, the deblocking filter 41 performs the deblocking filter process on the locally decoded image supplied from the addition unit 40. The deblocking filter 41 supplies the image obtained as the result to the adaptive offset filter 42.

In step S47, the adaptive offset filter 42 performs the adaptive offset filter process on the image supplied from the deblocking filter 41 in units of LCUs. The adaptive offset filter 42 supplies the image obtained as the result to the adaptive loop filter 43. Further, the adaptive offset filter 42 supplies the storage flag, the index or the offset, and the type information to the lossless encoding unit 36 in units of LCUs as the offset filter information.

In step S48, the adaptive loop filter 43 performs the adaptive loop filter process on the image supplied from the adaptive offset filter 42 in units of LCUs. The adaptive loop filter 43 supplies the image obtained as the result to the frame memory 44. Further, the adaptive loop filter 43 supplies the filter coefficient used in the adaptive loop filter process to the lossless encoding unit 36.

In step S49, the frame memory 44 accumulates the image supplied from the adaptive loop filter 43 and the image supplied from the addition unit 40. The images accumulated in the frame memory 44 are output to the intra prediction unit 46 or the motion prediction/compensation unit 47 via the switch 45 as the reference image.

In step S50, the lossless encoding unit 36 performs lossless coding on either of the intra prediction mode information and the inter prediction mode information, the motion vector, the reference image specifying generation information, the RPS flag, the offset filter information, and the filter coefficient as the encoding information.

In step S51, the lossless encoding unit 36 performs lossless coding on the quantized coefficients supplied from the quantization unit 35. Then, the lossless encoding unit 36 generates encoded data based on the encoding information lossless encoded by the process of step S50 and the lossless encoded coefficients, and supplies the generated encoded data to the accumulation buffer 37.

In step S52, the accumulation buffer 37 temporarily accumulates the encoded data supplied from the lossless encoding unit 36.

In step S53, the rate control unit 51 controls a rate of a quantization operation of the quantization unit 35 such that neither an overflow nor an underflow occurs based on encoded data accumulated in the accumulation buffer 37.

In step S54, the accumulation buffer 37 outputs the stored encoded data stored to the setting unit 22 of FIG. 13. Then, the process returns to step S11 of FIG. 25 and proceeds to step S12.

Further, in the encoding process of FIGS. 26 and 27, for simplification of description, the intra prediction process and the motion prediction/compensation process are consistently performed, but practically, there are cases in which only one of the intra prediction process and the motion prediction/compensation process is performed according to a picture type or the like.

Figure 28:
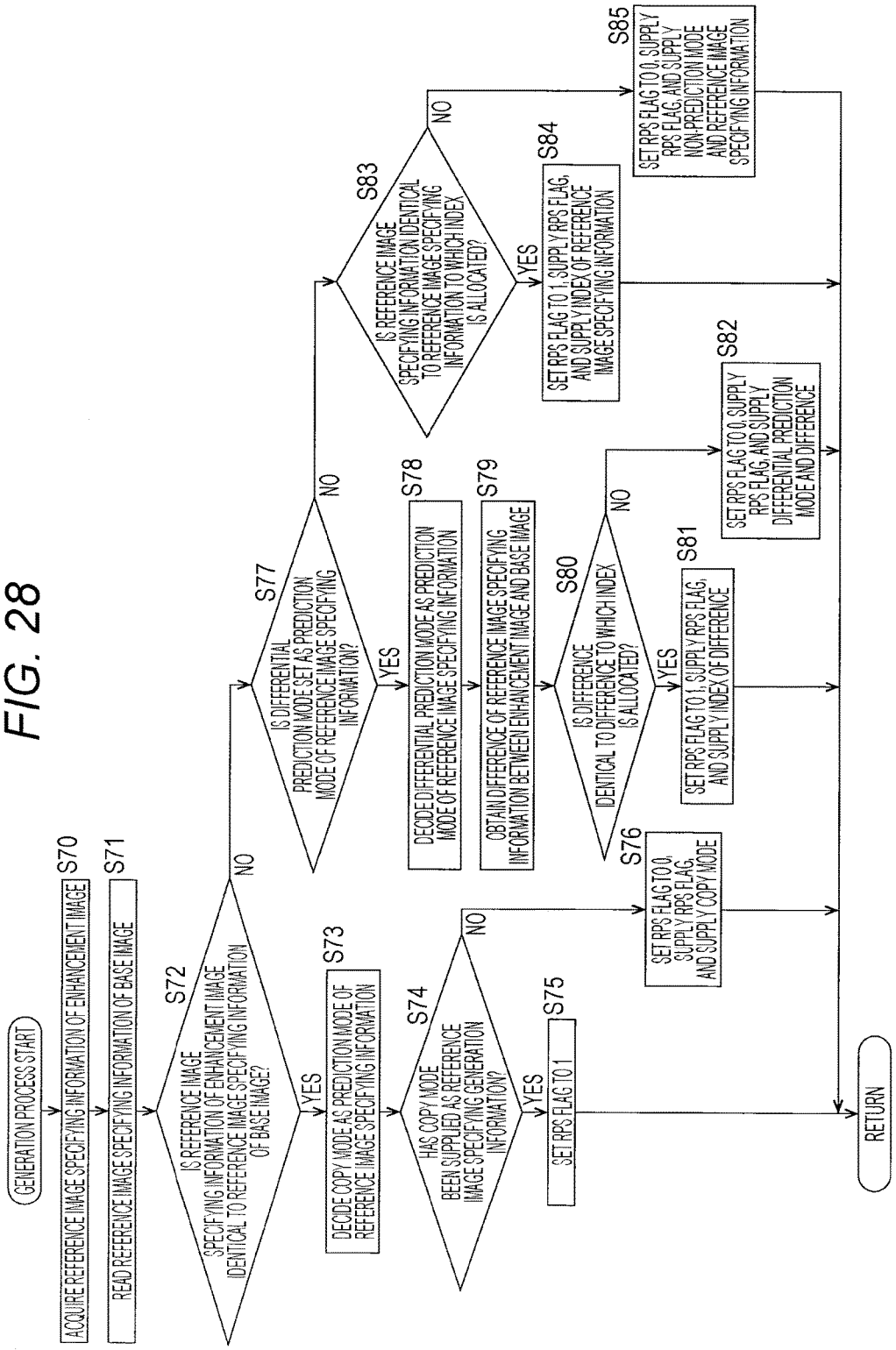
FIG. 28 is a flowchart for describing the details of a generation process of FIG. 26.

FIG. 28 is a flowchart for describing the details of the generation process of step S38 of FIG. 26.

In step S70 of FIG. 28, the acquisition unit 71 of the reference image setting unit 50 acquires the reference image specifying information of the enhancement image from the motion prediction/compensation unit 47, and supplies the reference image specifying information of the enhancement image to the determination unit 72 and the generation unit 73. In step S71, the determination unit 72 and the generation unit 73 read the reference image specifying information of the base image from the reference buffer 49.

In step S72, the determination unit 72 determines whether or not the reference image specifying information of the enhancement image is identical to the reference image specifying information of the base image. When the reference image specifying information of the enhancement image is determined to be identical to the reference image specifying information of the base image in step S72, in step S73, the determination unit 72 decides the copy mode as the prediction mode of the reference image specifying information.

In step S74, the determination unit 72 determines whether or not the copy mode has been supplied from the setting unit 22 of FIG. 13 as the reference image specifying generation information. When the copy mode is determined to have been supplied as the reference image specifying generation information in step S74, in step S75, the determination unit 72 sets the RPS flag to 1, and supplies the RPS flag to the lossless encoding unit 36 of FIG. 14. Then, the process returns to step S38 of FIG. 26, and proceeds to step S40.

Meanwhile, when the copy mode is determined to have not been supplied as the reference image specifying generation information in step S74, the process proceeds to step S76. In step S76, the determination unit 72 sets the RPS flag to 0, supplies the RPS flag to the lossless encoding unit 36, and supplies the copy mode to the lossless encoding unit 36 as the reference image specifying generation information. Then, the process returns to step S38 of FIG. 26 and proceeds to step S40.

Meanwhile, when the reference image specifying information of the enhancement image is determined to be not identical to the reference image specifying information of the base image in step S72, the process proceeds to step S77. In step S77, the generation unit 73 determines whether or not the differential prediction mode is set as the prediction mode of the reference image specifying information based on an input from the user.

When the differential prediction mode is determined to be set as the prediction mode of the reference image specifying information in step S77, the process proceeds to step S78. In step S78, the generation unit 73 decides the differential prediction mode as the prediction mode of the reference image specifying information.

In step S79, the generation unit 73 obtains a difference of the reference image specifying information between the base image and the enhancement image. In step S80, the generation unit 73 determines whether or not the difference calculated in step S79 is identical to the difference of the reference image specifying information to which the index supplied from the setting unit 22 is allocated.

In step S80, when the difference calculated in step S79 is determined to be identical to the difference of the reference image specifying information to which the index is allocated, the process proceeds to step S81. In step S81, the generation unit 73 sets the RPS flag to 1, supplies the RPS flag to the lossless encoding unit 36, and supplies an index corresponding to the same difference as the difference of the reference image specifying information calculated in step S79 to the lossless encoding unit 36. Then, the process returns to step S38 of FIG. 26 and proceeds to step S40.

Meanwhile, when the difference calculated in step S79 is determined to be not identical to the difference of the reference image specifying information to which the index is allocated in step S80, the process proceeds to step S82. In step S82, the generation unit 73 sets the RPS flag to 0, supplies the RPS flag to the lossless encoding unit 36, and supplies the differential prediction mode and the difference of the reference image specifying information calculated in step S79 to the lossless encoding unit 36. Then, the process returns to step S38 of FIG. 26 and proceeds to step S40.

Further, when the differential prediction mode is determined to be not set as the prediction mode of the reference image specifying information in step S77, the generation unit 73 decides the non-prediction mode as the prediction mode of the reference image specifying information, and the process proceeds to step S83.

In step S83, the generation unit 73 determines whether or not the reference image specifying information of the enhancement image is identical to the reference image specifying information to which the index supplied from the setting unit 22 is allocated. When the reference image specifying information of the enhancement image is determined to be identical to the reference image specifying information to which the index is allocated in step S83, the process proceeds to step S84.

In step S84, the generation unit 73 sets the RPS flag to 1, supplies the RPS flag to the lossless encoding unit 36, and supplies the index corresponding to the same reference image specifying information as the reference image specifying information of the enhancement image to the lossless encoding unit 36. Then, the process returns to step S38 of FIG. 26 and proceeds to step S40.

Meanwhile, when the reference image specifying information of the enhancement image is determined to be not identical to the reference image specifying information to which the index is allocated in step S83, the process proceeds to step S85. In step S85, the generation unit 73 sets the RPS flag to 0, supplies the RPS flag to the lossless encoding unit 36, and supplies the non-prediction mode and the reference image specifying information to the lossless encoding unit 36. Then, the process returns to step S38 of FIG. 26 and proceeds to step S40.

As described above, since the reference image specifying generation information is set, the encoding device 10 can share or predict the reference image specifying information between the base layer and the enhancement layer. Thus, it is possible to reduce the information amount of the enhancement stream and improve the coding efficiency.

(Exemplary Configuration of Decoding Device According to First Embodiment)

Figure 29:
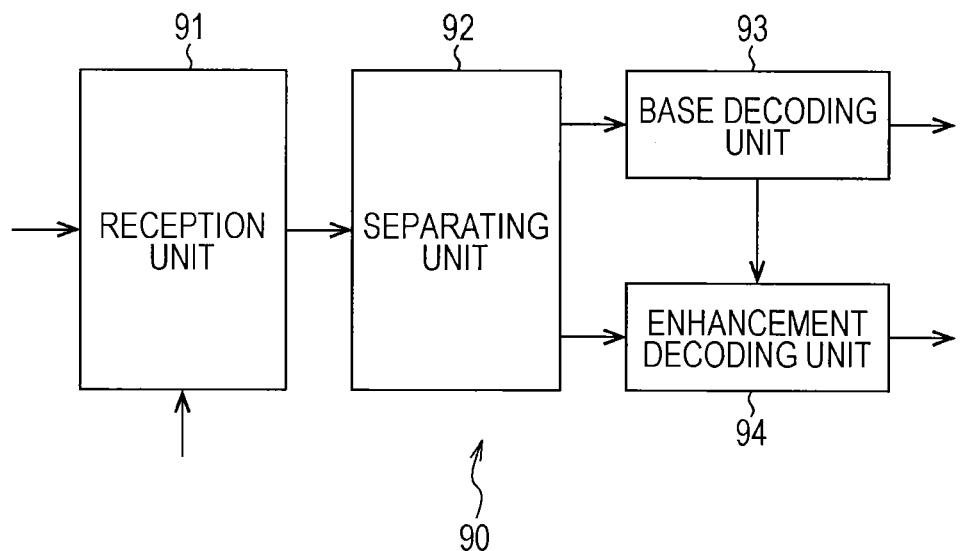
FIG. 29 is a block diagram illustrating an exemplary configuration of a decoding device according to a first embodiment of the present technology.

FIG. 29 is a block diagram illustrating an exemplary configuration of a decoding device according to the first embodiment of the present technology that decodes the encoded stream for all layers transmitted from the encoding device 10 of FIG. 6.

A decoding device 90 of FIG. 29 includes a reception unit 91, a separating unit 92, a base decoding unit 93, and an enhancement decoding unit 94.

The reception unit 91 receives the encoded stream for all layers transmitted from the encoding device 10 of FIG. 6, and supplies the received encoded stream for all layers to the separating unit 92.

The separating unit 92 extracts the VPS from the encoded stream for all layers supplied from the reception unit 91, and recognizes the presence or absence of the reference layer of the enhancement stream based on the difference (diff_ref_layer) included in the VPS. Here, since the encoding device 10 uses the base layer as the reference layer of the enhancement stream, the separating unit 92 recognizes the presence of the reference layer.

When the presence of the reference layer is recognized, the separating unit 92 instructs the base decoding unit 93 that decodes the encoded stream of the reference layer to supply the reference image specifying information to the enhancement decoding unit 94 that decodes the enhancement stream.

Further, the separating unit 92 separates the base stream from the encoded stream for all layers and supplies the base stream to the base decoding unit 93, and separates the enhancement stream and supplies the enhancement stream to the enhancement decoding unit 94.

The base decoding unit 93 has a configuration similar to that of the decoding device of the HEVC scheme according to the related art, and decodes the base stream supplied from the separating unit 92 according to the HEVC scheme, and generates the base image. Here, the base decoding unit 93 supplies the reference image specifying information of the reference image used when the base image is decoded to the enhancement decoding unit 94. The base decoding unit 93 outputs the generated base image.

The enhancement decoding unit 94 decodes the enhancement stream supplied from the separating unit 92 according to the scheme complying with the HEVC scheme, and generates the enhancement image. At this time, the enhancement decoding unit 94 decodes the enhancement stream with reference to the reference image specifying information supplied from the base decoding unit 93. The enhancement decoding unit 94 outputs the generated enhancement image.

(Exemplary Configuration of Enhancement Decoding Unit)

Figure 30:
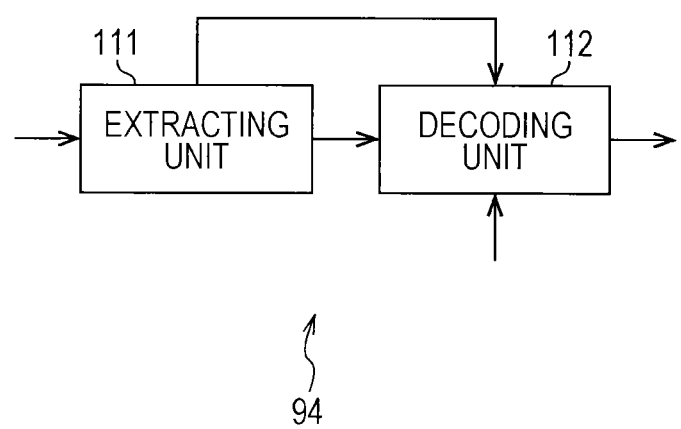
FIG. 30 is a block diagram illustrating an exemplary configuration of an enhancement decoding unit of FIG. 29.

FIG. 30 is a block diagram illustrating an exemplary configuration of the enhancement decoding unit 94 of FIG. 29.

The enhancement decoding unit 94 of FIG. 30 includes an extracting unit 111 and a decoding unit 112.

The extracting unit 111 of the enhancement decoding unit 94 extracts an SPS, a PPS, encoded data, and the like from the enhancement stream supplied from the separating unit 92 of FIG. 29, and supplies the SPS, the PPS, the encoded data, and the like to the decoding unit 112.

The decoding unit 112 decodes the encoded data supplied from the extracting unit 111 according to the scheme complying with the HEVC scheme with reference to the reference image specifying information of the base image supplied from the base decoding unit 93 of FIG. 29. At this time, the decoding unit 112 also refers to the SPS, the PPS, and the like supplied from the extracting unit 111 as necessary. The decoding unit 112 outputs an image obtained as a result of decoding as the enhancement image.

(Exemplary Configuration of Decoding Unit)

Figure 31:
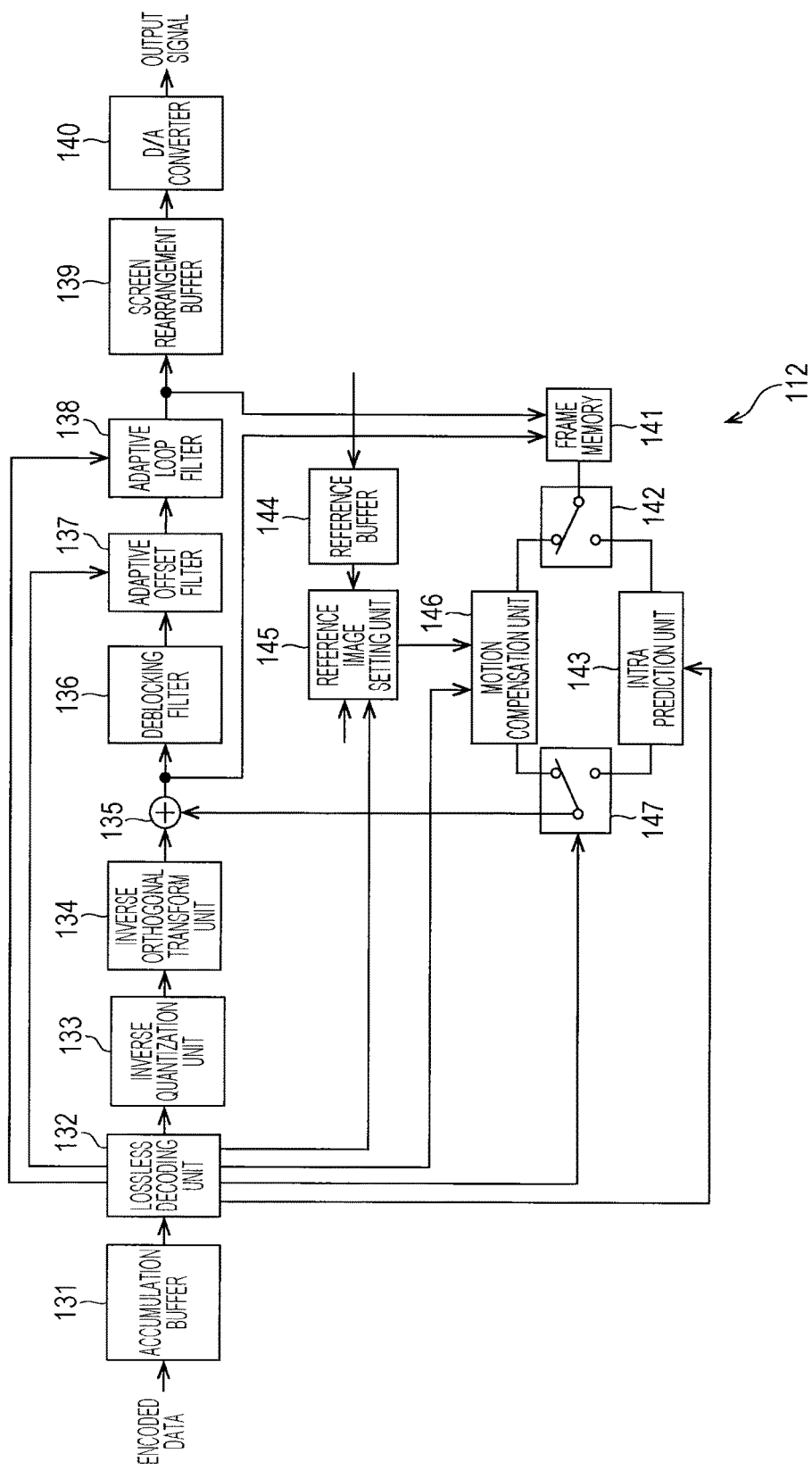
FIG. 31 is a block diagram illustrating an exemplary configuration of a decoding unit of FIG. 30.

FIG. 31 is a block diagram illustrating an exemplary configuration of the decoding unit 112 of FIG. 30.

The decoding unit 112 of FIG. 31 includes an accumulation buffer 131, a lossless decoding unit 132, an inverse quantization unit 133, an inverse orthogonal transform unit 134, an addition unit 135, a deblocking filter 136, an adaptive offset filter 137, an adaptive loop filter 138, a screen rearrangement buffer 139, a D/A converter 140, a frame memory 141, a switch 142, an intra prediction unit 143, a reference buffer 144, a reference image setting unit 145, a motion compensation unit 146, and a switch 147.

The accumulation buffer 131 of the decoding unit 112 receives the encoded data from the extracting unit 111 of FIG. 30, and accumulates the received encoded data. The accumulation buffer 131 supplies the accumulated encoded data to the lossless decoding unit 132.

The lossless decoding unit 132 performs lossless decoding such as variable length decoding or arithmetic decoding on the encoded data supplied from the accumulation buffer 131, and obtains the quantized coefficients and the encoding information. The lossless decoding unit 132 supplies the quantized coefficients to the inverse quantization unit 133. Further, the lossless decoding unit 132 supplies the intra prediction mode information serving as the encoding information and the like to the intra prediction unit 143, and supplies the motion vector, the inter prediction mode information, and the like to the motion compensation unit 146.

Further, the lossless decoding unit 132 supplies the reference image specifying generation information serving as the encoding information, the RPS flag, and the like to the reference image setting unit 145. Further, the lossless decoding unit 132 supplies the intra prediction mode information or the inter prediction mode information serving as the encoding information to the switch 147. The lossless decoding unit 132 supplies the offset filter information serving as the encoding information to the adaptive offset filter 137, and supplies the filter coefficient to the adaptive loop filter 138.

The inverse quantization unit 133, the inverse orthogonal transform unit 134, the addition unit 135, the deblocking filter 136, the adaptive offset filter 137, the adaptive loop filter 138, the frame memory 141, the switch 142, the intra prediction unit 143, and the motion compensation unit 146 performs the same processes as the inverse quantization unit 38, the inverse orthogonal transform unit 39, the addition unit 40, the deblocking filter 41, the adaptive offset filter 42, the adaptive loop filter 43, the frame memory 44, the switch 45, the intra prediction unit 46, and the motion prediction/compensation unit 47 of FIG. 14 to decode an image.

Specifically, the inverse quantization unit 133 performs inverse quantization on the quantized coefficients supplied from the lossless decoding unit 132, and supplies the orthogonal transform coefficients obtained as the result to the inverse orthogonal transform unit 134.

The inverse orthogonal transform unit 134 performs inverse orthogonal transform on the orthogonal transform coefficients supplied from the inverse quantization unit 133. The inverse orthogonal transform unit 134 supplies the residual information obtained as a result of inverse orthogonal transform to the addition unit 135.

The addition unit 135 functions as a decoding unit, and performs decoding by adding the residual information serving as an image to be currently decoded supplied from the inverse orthogonal transform unit 134 to the predicted image supplied from the switch 147. The addition unit 135 supplies an image obtained as a result of decoding to the deblocking filter 136 and the frame memory 141. Further, when the predicted image is not supplied from the switch 147, the addition unit 135 supplies the image serving as the residual information supplied from the inverse orthogonal transform unit 134 to the deblocking filter 136 as an image obtained as a result of decoding, and supplies the image to be accumulated in the frame memory 141.

The deblocking filter 136 performs the adaptive deblocking filter process on the image supplied from the addition unit 135, and supplies the image obtained as the result to the adaptive offset filter 137.

The adaptive offset filter 137 includes a buffer that stores offsets supplied from the lossless decoding unit 132 in order. Further, the adaptive offset filter 137 performs the adaptive offset filter process on the image that has been subjected to the adaptive deblocking filter process by the deblocking filter 136 in units of LCUs based on the offset filter information supplied from the lossless decoding unit 132.

Specifically, when the storage flag included in the offset filter information is 0, the adaptive offset filter 137 performs the adaptive offset filter process of the type indicated by the type information on the image that has been subjected to the deblocking filter process of the LCU unit using the offset included in the offset filter information.

Meanwhile, when the storage flag included in the offset filter information is 1, the adaptive offset filter 137 reads the offset stored at the position indicated by the index included in the offset filter information for the image that has been subjected to the deblocking filter process of the LCU unit. Then, the adaptive offset filter 137 performs the adaptive offset filter process of the type indicated by the type information using the read offset. The adaptive offset filter 137 supplies the image that has been subjected to the adaptive offset filter process to the adaptive loop filter 138.

The adaptive loop filter 138 performs the adaptive loop filter process on the image supplied from the adaptive offset filter 137 in units of LCUs using the filter coefficient supplied from the lossless decoding unit 132. The adaptive loop filter 138 supplies the image obtained as the result to the frame memory 141 and the screen rearrangement buffer 139.

The screen rearrangement buffer 139 stores the image supplied from the adaptive loop filter 138 in units of frames. The screen rearrangement buffer 139 rearranges the stored image of the frame unit of the encoding order in an original display order, and supplies the rearranged image to the D/A converter 140.

The D/A converter 140 performs D/A conversion on the image of the frame unit supplied from the screen rearrangement buffer 139, and outputs the converted image as the enhancement image. The frame memory 141 accumulates the image supplied from the adaptive loop filter 138 and the image supplied from the addition unit 135. The image accumulated in the frame memory 141 is read as the reference image and supplied to the intra prediction unit 143 or the motion compensation unit 146 via the switch 142.

The intra prediction unit 143 performs the intra prediction process of the intra prediction mode indicated by the intra prediction mode information supplied from the lossless decoding unit 132 using the reference image read from the frame memory 141 via the switch 142. The intra prediction unit 143 supplies the predicted image generated as the result to the switch 147.

The reference buffer 144 stores the reference image specifying information of the reference image used when the encoded data of the base image supplied from the base decoding unit 93 of FIG. 29 is decoded.

The reference image setting unit 145 sets the reference image specifying generation information included in the SPS supplied from the extracting unit 111 or the reference image specifying generation information supplied from the lossless decoding unit 132 as the reference image specifying generation information of the encoded data to be currently decoded based on the RPS flag supplied from the lossless decoding unit 132. The reference image setting unit 145 reads the reference image specifying information of the base image from the reference buffer 144 as necessary. The reference image setting unit 145 generates the reference image specifying information based on the reference image specifying generation information of the encoded data to be currently decoded and the read reference image specifying information of the base image, and supplies the reference image specifying information to the motion compensation unit 146.

The motion compensation unit 146 reads the reference image specified by the reference image specifying information supplied from the reference image setting unit 145 from the frame memory 141 via the switch 142. The motion compensation unit 146 performs the motion compensation process of the optimal inter prediction mode indicated by the inter prediction mode information supplied from the lossless decoding unit 132 using the motion vector supplied from the lossless decoding unit 132 and the reference image. The motion compensation unit 146 supplies the predicted image generated as the result to the switch 147.

When the intra prediction mode information is supplied from the lossless decoding unit 132, the switch 147 supplies the predicted image supplied from the intra prediction unit 143 to the addition unit 135. Meanwhile, when the inter prediction mode information is supplied from the lossless decoding unit 132, the switch 147 supplies the predicted image supplied from the motion compensation unit 146 to the addition unit 135.

(Exemplary Configuration of Reference Image Setting Unit)

Figure 32:
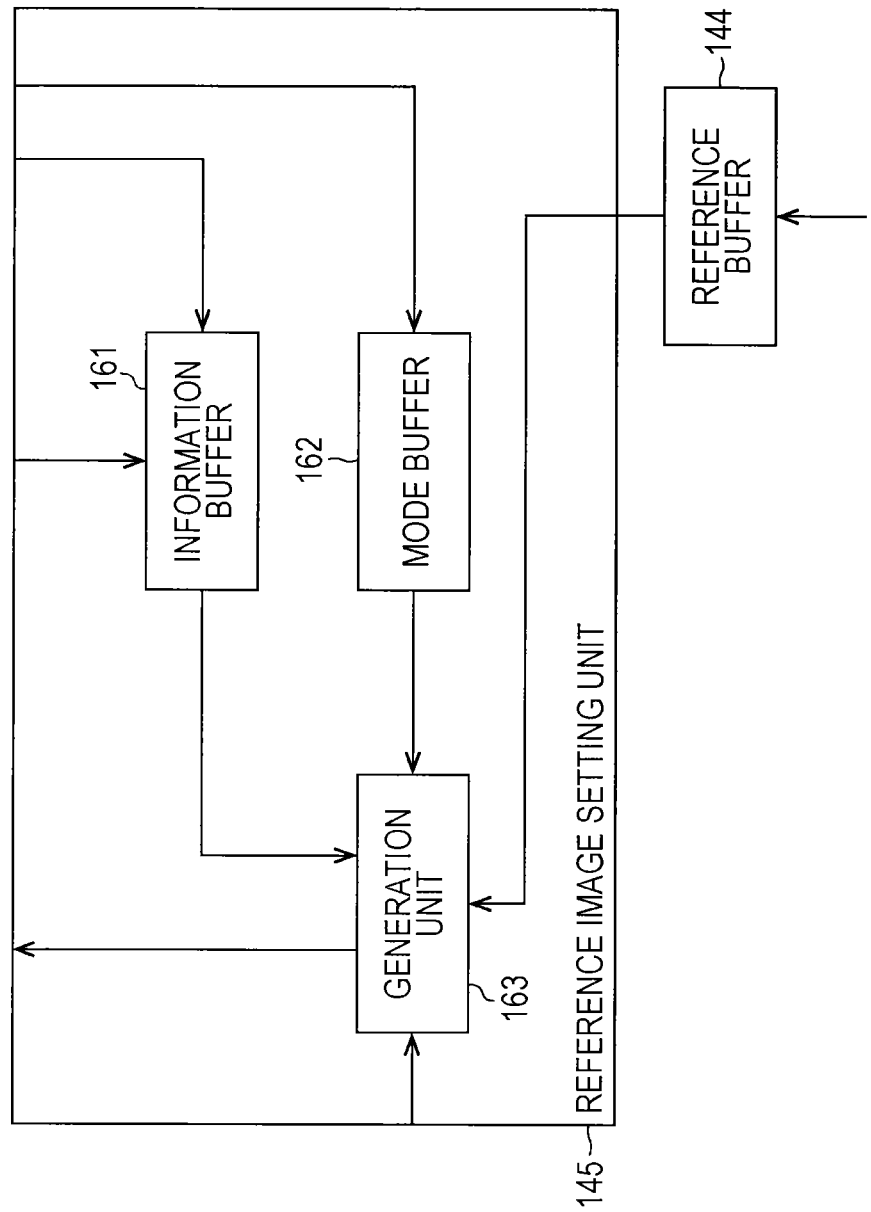
FIG. 32 is a block diagram illustrating an exemplary configuration of a reference image setting unit of FIG. 31.

FIG. 32 is a block diagram illustrating an exemplary configuration of the reference image setting unit 145 of FIG. 31.

The reference image setting unit 145 of FIG. 32 includes an information buffer 161, a mode buffer 162, and a generation unit 163.

The information buffer 161 stores information other than the prediction mode of the reference image specifying information supplied as the reference image specifying generation information from the lossless decoding unit 132 of FIG. 31 and the RPS flag. The mode buffer 162 stores the prediction mode of the reference image specifying information supplied as the reference image specifying generation information from the lossless decoding unit 132.

The generation unit 163 reads the RPS flag from the information buffer 161. The generation unit 163 decides the reference image specifying generation information supplied from the extracting unit 111 of FIG. 30 or the reference image specifying generation information supplied from the lossless decoding unit 132 as the reference image specifying generation information of the encoded data to be currently decoded based on the RPS flag. When the reference image specifying generation information of the encoded data to be currently decoded is the reference image specifying generation information supplied from the lossless decoding unit 132, the generation unit 163 reads information other than the prediction mode of the reference image specifying information from the information buffer 161, and reads the prediction mode of the reference image specifying information from the mode buffer 162.

When the prediction mode of the reference image specifying information serving as the reference image specifying generation information of the encoded data to be currently decoded is the copy mode or the differential prediction mode, the generation unit 163 reads the reference image specifying information of the base image from the reference buffer 144. When the prediction mode of the reference image specifying information is the copy mode, the generation unit 163 generates the read reference image specifying information of the base image as the reference image specifying information of the enhancement image, and supplies the generated read reference image specifying information of the base image to the motion compensation unit 146 of FIG. 31.

Meanwhile, when the prediction mode of the reference image specifying information is the differential prediction mode, and the information other than the prediction mode of the reference image specifying information is the index, the generation unit 163 recognizes the difference of the reference image specifying information to which the index is allocated, which is supplied as the reference image specifying generation information from the extracting unit 111 of FIG. 30. The generation unit 163 adds the difference of the recognized reference image specifying information to the read reference image specifying information of the base image, generates an addition value obtained as the result as the reference image specifying information of the enhancement image, and supplies the generated addition value to the motion compensation unit 146.

Further, when the prediction mode of the reference image specifying information is the differential prediction mode, and the information other than the prediction mode of the reference image specifying information is the difference of the reference image specifying information, the generation unit 163 adds the difference to the read reference image specifying information of the base image. The generation unit 163 generates an addition value obtained as the result as the reference image specifying information of the enhancement image, and supplies the generated addition value to the motion compensation unit 146.

Further, when the prediction mode of the reference image specifying information is the non-prediction mode, and the information other than the prediction mode of the reference image specifying information is the index, the generation unit 163 recognizes the reference image specifying information to which the index is allocated, which is supplied from the extracting unit 111 of FIG. 30 as the reference image specifying generation information. The generation unit 163 generates the recognized reference image specifying information as the reference image specifying information of the enhancement image, and supplies the generated reference image specifying information to the motion compensation unit 146.

Further, when the prediction mode of the reference image specifying information is the non-prediction mode, and the information other than the prediction mode of the reference image specifying information is the reference image specifying information, the generation unit 163 generates the reference image specifying information as the reference image specifying information of the enhancement image, and supplies the generated reference image specifying information to the motion compensation unit 146.

(Description of Processing of Decoding Device)

Figure 33:
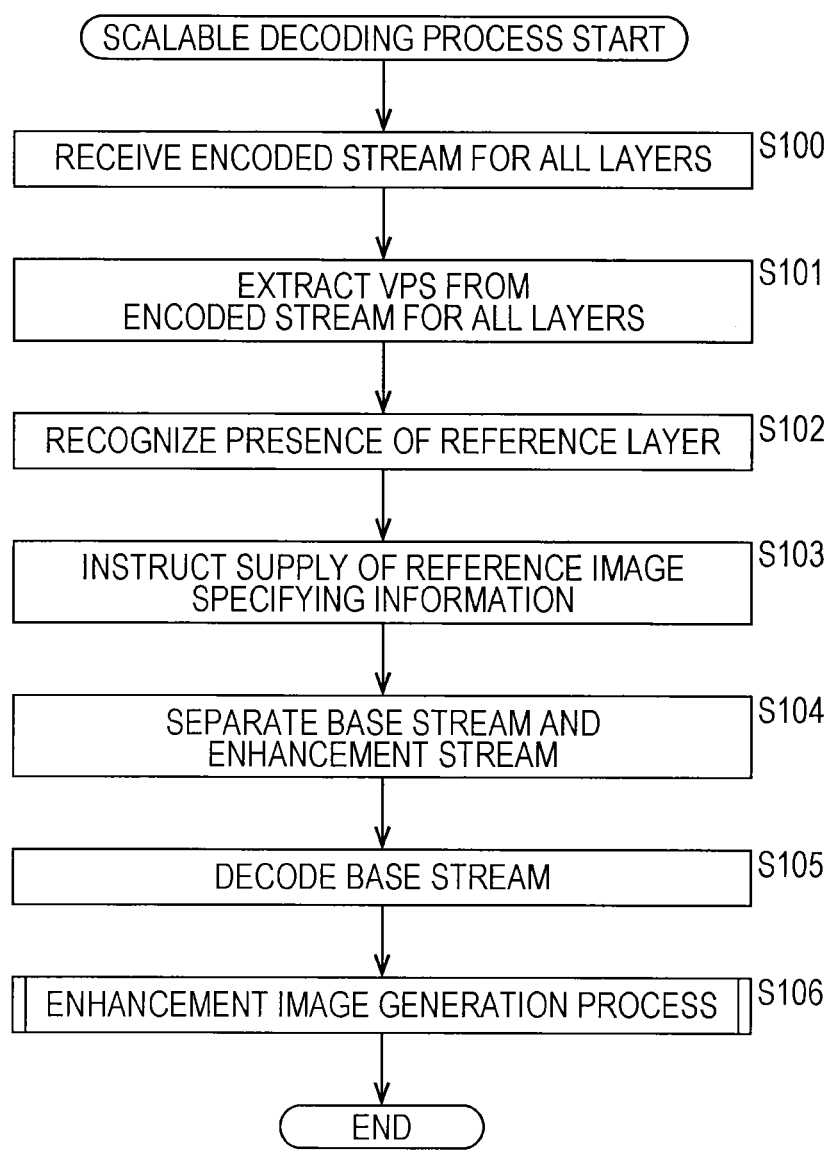
FIG. 33 is a flowchart for describing a scalable decoding process of a decoding device of FIG. 29.

FIG. 33 is a flowchart for describing the scalable decoding process of the decoding device 90 of FIG. 29.

In step S100 of FIG. 33, the reception unit 91 of the decoding device 90 receives the encoded stream for all layers transmitted from the encoding device 10 of FIG. 6, and supplies the received encoded stream for all layers to the separating unit 92. In step S101, the separating unit 92 extracts the VPS from the encoded stream supplied from the reception unit 91.

In step S102, the separating unit 92 recognizes the presence of the reference layer of the enhancement stream based on the difference (diff_ref_layer) included in the VPS. In step S103, the separating unit 92 instructs the base decoding unit 93 that decodes the encoded stream of the reference layer to supply the reference image specifying information to the enhancement decoding unit 94 that decodes the enhancement stream.

In step S104, the separating unit 92 separates the base stream and the enhancement stream from the encoded stream for all layers. The separating unit 92 supplies the base stream to the base decoding unit 93, and supplies the enhancement stream to the enhancement decoding unit 94.

In step S105, the base decoding unit 93 decodes the base stream supplied from the separating unit 92 according to the HEVC scheme, and generates the base image. At this time, the base decoding unit 93 supplies the reference image specifying information of the reference image used when the base image is decoded to the enhancement decoding unit 94. The base decoding unit 93 outputs the generated base image.

In step S106, the enhancement decoding unit 94 performs an enhancement image generation process of generating the enhancement image based on the enhancement stream supplied from the separating unit 92 with reference to the reference image specifying information supplied from the base decoding unit 93. The details of the enhancement image generation process will be described with reference to FIG. 34 which will be described later.

Figure 34:
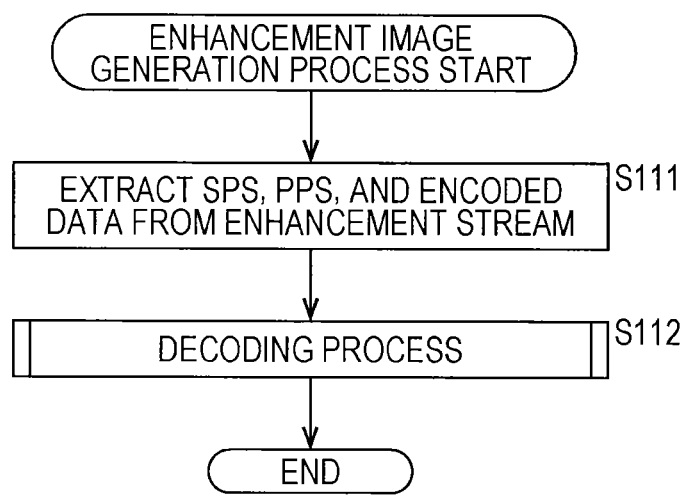
FIG. 34 is a flowchart for describing an enhancement image generation process of FIG. 30.

FIG. 34 is a flowchart for describing the enhancement image generation process of the enhancement decoding unit 94 of FIG. 30.

In step S111 of FIG. 34, the extracting unit 111 of the enhancement decoding unit 94 extracts an SPS, a PPS, encoded data, and the like from the enhancement stream supplied from the separating unit 92, and supplies the SPS, the PPS, the encoded data, and the like to the decoding unit 112.

In step S112, the decoding unit 112 performs a decoding process of decoding the encoded data supplied from the extracting unit 111 according to the scheme complying with the HEVC scheme with reference to the SPS and the PPS supplied from the extracting unit 111, the reference image specifying information supplied from the base decoding unit 93, and the like as necessary. The details of the decoding process will be described with reference to FIG. 35 which will be described later. Then, the process ends.

Figure 35:
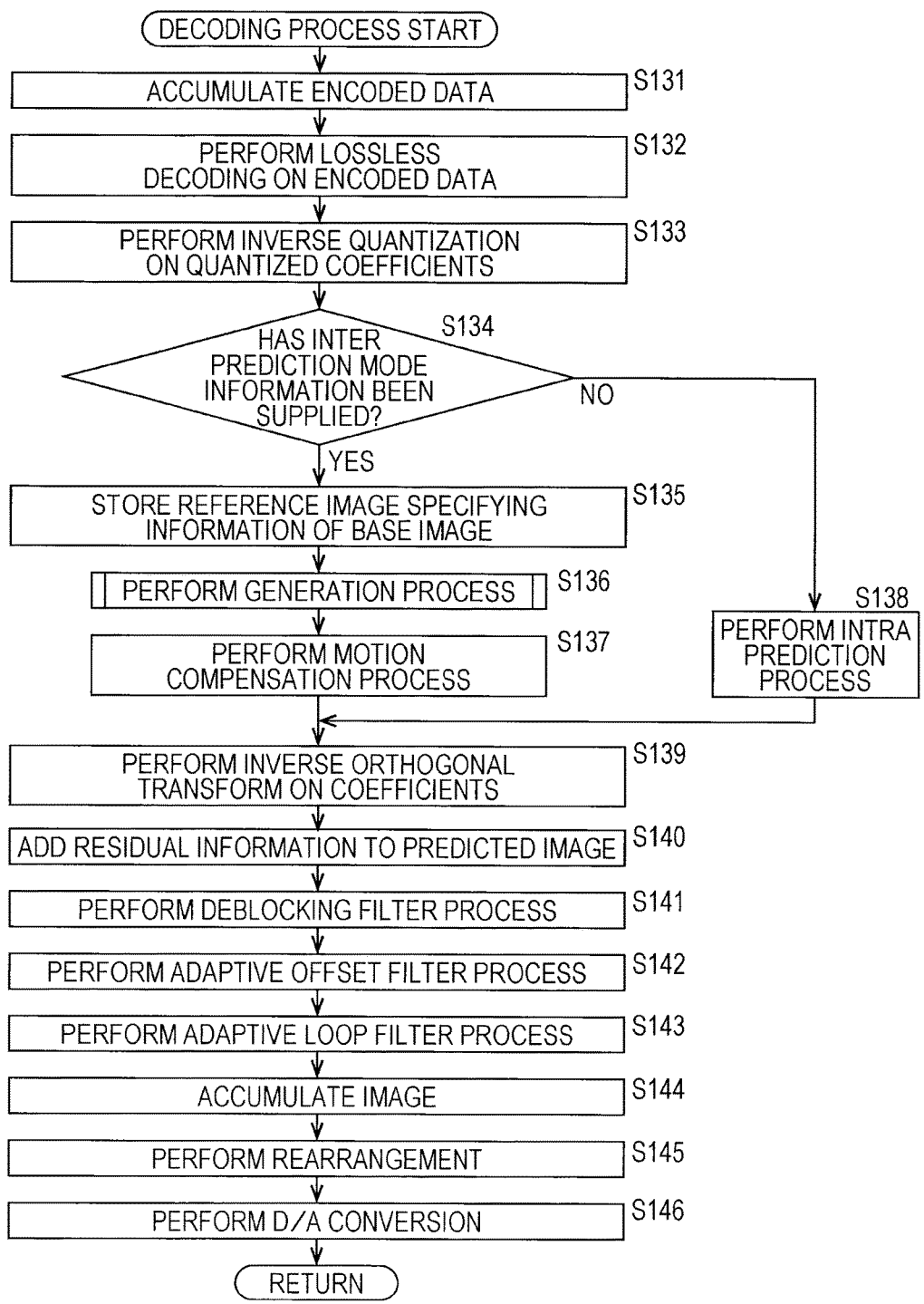
FIG. 35 is a flowchart for describing the details of a decoding process of FIG. 34.

FIG. 35 is a flowchart for describing the details of the decoding process of step S112 of FIG. 34.

In step S131 of FIG. 35, the accumulation buffer 131 of the enhancement decoding unit 112 receives the encoded data of the frame unit from the extracting unit 111 of FIG. 30, and accumulates the received encoded data. The accumulation buffer 131 supplies the accumulated encoded data to the lossless decoding unit 132.

In step S132, the lossless decoding unit 132 performs lossless decoding on the encoded data supplied from the accumulation buffer 131, and obtains the quantized coefficients and the encoding information. The lossless decoding unit 132 supplies the quantized coefficients to the inverse quantization unit 133. Further, the lossless decoding unit 132 supplies the intra prediction mode information serving as the encoding information and the like to the intra prediction unit 143, and supplies the motion vector, the inter prediction mode information, and the like to the motion compensation unit 146.

Further, the lossless decoding unit 132 supplies the reference image specifying generation information serving as the encoding information, the RPS flag, and the like to the reference image setting unit 145. Furthermore, the lossless decoding unit 132 supplies the intra prediction mode information or the inter prediction mode information serving as the encoding information to the switch 147. The lossless decoding unit 132 supplies the offset filter information serving as the encoding information to the adaptive offset filter 137, and supplies the filter coefficient to the adaptive loop filter 138.

In step S133, the inverse quantization unit 133 performs inverse quantization on the quantized coefficients supplied from the lossless decoding unit 132, and supplies the orthogonal transform coefficients obtained as the result to the inverse orthogonal transform unit 134.

In step S134, the motion compensation unit 146 determines whether or not the inter prediction mode information has been supplied from the lossless decoding unit 132. When the inter prediction mode information is determined to have been supplied in step S134, the process proceeds to step S135.

In step S135, the reference buffer 144 stores the reference image specifying information of the reference image used when the encoded data of the base image supplied from the base decoding unit 93 of FIG. 29 is decoded.

In step S136, the reference image setting unit 145 performs the generation process of generating the reference image specifying information of the enhancement image based on the reference image specifying generation information and the RPS flag supplied from the lossless decoding unit 132, the reference image specifying information of the base image stored in the reference buffer 144, and the like. The details of the generation process will be described with reference to FIG. 36 which will be described later.

In step S137, the motion compensation unit 146 reads the reference image based on the reference image specifying information supplied from the reference image setting unit 145, and performs the motion compensation process of the optimal inter prediction mode indicated by the inter prediction mode information using the motion vector and the reference image. The motion compensation unit 146 supplies the predicted image generated as the result to the addition unit 135 via the switch 147, and the process proceeds to step S139.

Meanwhile, when the inter prediction mode information is determined to have not been supplied in step S134, that is, when the intra prediction mode information is supplied to the intra prediction unit 143, the process proceeds to step S138.

In step S138, the intra prediction unit 143 performs the intra prediction process of the intra prediction mode indicated by the intra prediction mode information using the reference image read from the frame memory 141 via the switch 142. The intra prediction unit 143 supplies the predicted image generated as a result of the intra prediction process to the addition unit 135 via the switch 147, and the process proceeds to step S139.

In step S139, the inverse orthogonal transform unit 134 performs inverse orthogonal transform on the orthogonal transform coefficients supplied from the inverse quantization unit 133, and supplies the residual information obtained as the result to the addition unit 135.

In step S140, the addition unit 135 adds the residual information supplied from the inverse orthogonal transform unit 134 to the predicted image supplied from the switch 147. The addition unit 135 supplies the image obtained as the result to the deblocking filter 136 and the frame memory 141.

In step S141, the deblocking filter 136 performs the deblocking filter process on the image supplied from the addition unit 135, and removes block distortion. The deblocking filter 136 supplies the image obtained as the result to the adaptive offset filter 137.

In step S142, the adaptive offset filter 137 performs the adaptive offset filter process on the image that has been subjected to the deblocking filter process by the deblocking filter 136 in units of LCUs based on the offset filter information supplied from the lossless decoding unit 132. The adaptive offset filter 137 supplies the image that has been subjected to the adaptive offset filter process to the adaptive loop filter 138.

In step S143, the adaptive loop filter 138 performs the adaptive loop filter process on the image supplied from the adaptive offset filter 137 in units of LCUs using the filter coefficient supplied from the lossless decoding unit 132. The adaptive loop filter 138 supplies the image obtained as the result to the frame memory 141 and the screen rearrangement buffer 139.

In step S144, the frame memory 141 accumulates the image supplied from the addition unit 135 and the image supplied from the adaptive loop filter 138. The image accumulated in the frame memory 141 is supplied to the intra prediction unit 143 or the motion compensation unit 146 via the switch 142 as the reference image.

In step S145, the screen rearrangement buffer 139 stores the image supplied from the adaptive loop filter 138 in units of frames, rearranges the stored image of the frame unit of the encoding order in the original display order, and supplies the rearranged image to the D/A converter 140.

In step S146, the D/A converter 140 performs D/A conversion on the image of the frame unit supplied from the screen rearrangement buffer 139, and outputs the converted image as the enhancement image. Then, the process returns to step S112 of FIG. 34 and ends.

Figure 36:
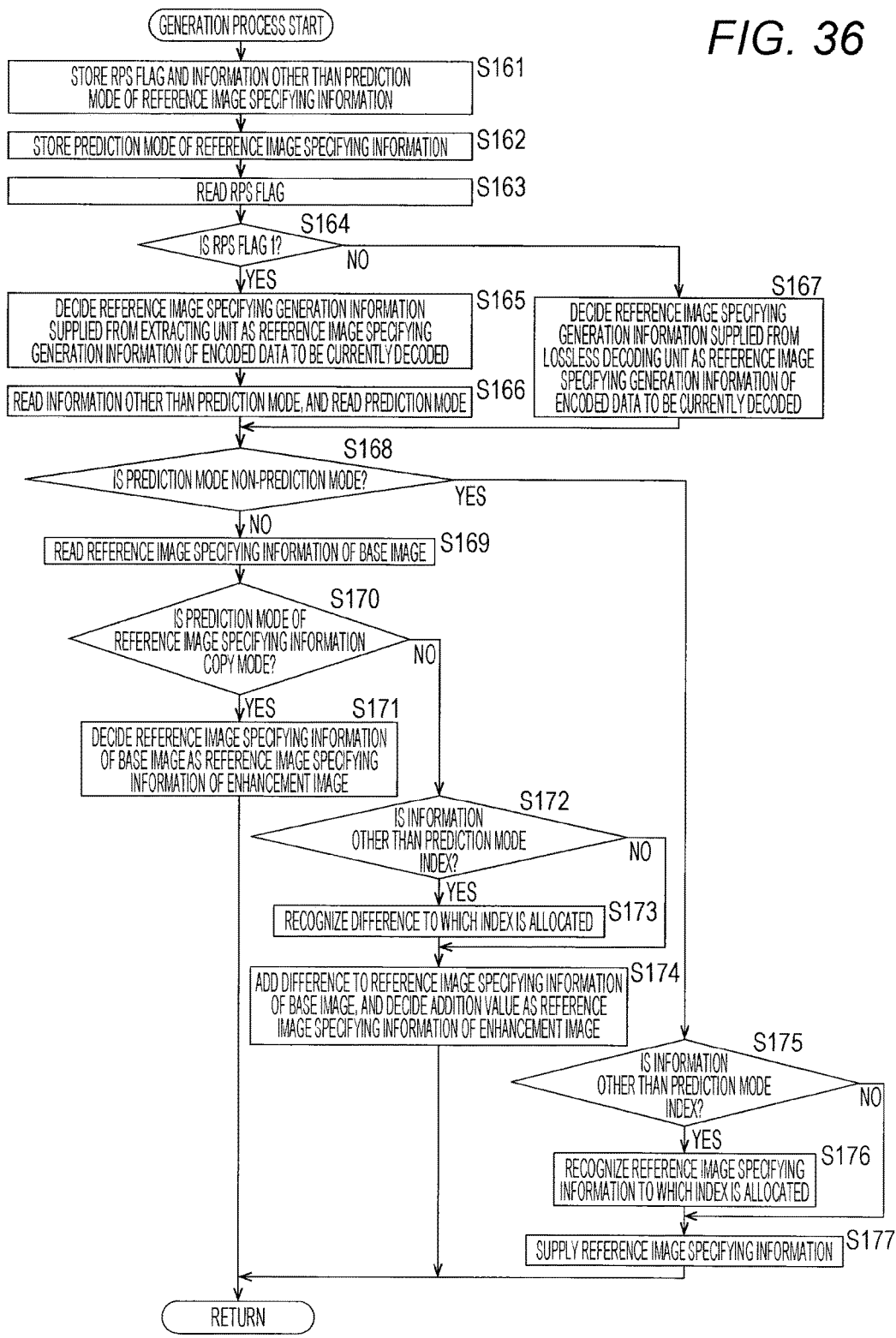
FIG. 36 is a flowchart for describing the details of a generation process of FIG. 35.

FIG. 36 is a flowchart for describing the details of the generation process of step S136 of FIG. 35.

In step S161 of FIG. 36, the information buffer 161 (FIG. 32) of the reference image setting unit 145 stores the RPS flag supplied as the reference image specifying generation information from the lossless decoding unit 132 of FIG. 31 and the information other than the prediction mode of the reference image specifying information. In step S162, the mode buffer 162 stores the prediction mode of the reference image specifying information supplied as the reference image specifying generation information from the lossless decoding unit 132.

In step S163, the generation unit 163 reads the RPS flag from the information buffer 161. In step S164, the generation unit 163 determines whether or not the RPS flag is 1.

When the RPS flag is determined to be 1 in step S164, in step S165, the generation unit 163 decides the reference image specifying generation information supplied from the extracting unit 111 of FIG. 30 as the reference image specifying generation information of the encoded data to be currently decoded.

In step S166, the generation unit 163 reads the information other than the prediction mode of the reference image specifying information from the information buffer 161, and reads the prediction mode of the reference image specifying information from the mode buffer 162. Then, the process proceeds to step S168.

Meanwhile, when the RPS flag is determined to be not 1, that is, determined to be 0 in step S164, in step S167, the generation unit 163 decides the reference image specifying generation information supplied from the lossless decoding unit 132 as the reference image specifying generation information of the encoded data to be currently decoded. Then, the process proceeds to step S168.

In step S168, the generation unit 163 determines whether or not the prediction mode of the reference image specifying information serving as the reference image specifying generation information of the encoded data to be currently decoded is the non-prediction mode. When the prediction mode of the reference image specifying information is determined to be the non-prediction mode in step S168, in step S169, the generation unit 163 reads the reference image specifying information of the base image from the reference buffer 144.

In step S170, the generation unit 163 determines whether or not the prediction mode of the reference image specifying information is the copy mode.

When the prediction mode of the reference image specifying information is determined to be the copy mode in step S170, in step S171, the generation unit 163 decides the read reference image specifying information of the base image as the reference image specifying information of the enhancement image. The generation unit 163 supplies the decided reference image specifying information of the enhancement image to the motion compensation unit 146 of FIG. 31. Then, the process returns to step S136 of FIG. 35 and proceeds to step S137.

Meanwhile, when the prediction mode of the reference image specifying information is determined to be not the copy mode, that is, determined to be the differential prediction mode in step S170, in step S172, the generation unit 163 determines whether or not the information other than the prediction mode of the reference image specifying information is the index.

When the information other than the prediction mode of the reference image specifying information is determined to be the index in step S172, the process proceeds to step S173. In step S173, the generation unit 163 recognizes the difference of the reference image specifying information to which the index is allocated, which is supplied as the reference image specifying generation information from the extracting unit 111, and the process proceeds to step S174.

Meanwhile, when the information other than the prediction mode of the reference image specifying information is determined to be not the index, that is, determined to be the difference of the reference image specifying information in step S172, the process proceeds to step S174.

In step S174, the generation unit 163 adds the difference of the reference image specifying information to the read reference image specifying information of the base image, and decides an addition value obtained as the result as the reference image specifying information of the enhancement image. The generation unit 163 supplies the decided reference image specifying information of the enhancement image to the motion compensation unit 146. Then, the process returns to step S136 of FIG. 35 and proceeds to step S137.

Further, when the prediction mode of the reference image specifying information is determined to be the non-prediction mode in step S168, in step S175, the generation unit 163 determines whether or not the information other than the prediction mode of the reference image specifying information is the index.

When the information other than the prediction mode of the reference image specifying information is determined to be the index in step S175, the process proceeds to step S176. In step S176, the generation unit 163 recognizes the reference image specifying information to which the index is allocated, which is supplied as the reference image specifying generation information from the extracting unit 111, and the process proceeds to step S177.

Meanwhile, when the information other than the prediction mode of the reference image specifying information is determined to be not the index, that is, when the information other than the prediction mode of the reference image specifying information is determined to be the reference image specifying information in step S175, the process proceeds to step S177.

In step S177, the generation unit 163 supplies the reference image specifying information recognized in step S175 or the reference image specifying information serving as the information other than the prediction mode of the reference image specifying information to the motion compensation unit 146 as the reference image specifying information of the enhancement image. Then, the process returns to step S136 of FIG. 35 and proceeds to step S137.

As described above, the decoding device 90 generates the reference image specifying information of the enhancement image using the reference image specifying generation information and thus can share or predict the reference image specifying information between the base layer and the enhancement layer. Thus, it is possible to reduce the information amount of the enhancement stream and improve the coding efficiency.

Further, in the first embodiment, the presence or absence of the reference layer may be decided according to the type of the scalable function. In this case, for example, when the scalable function is the SNR scalability, the spatial scalability, the chroma format scalability, the bit scalability, or the depth scalability in which there are many use cases in which an alignment of a picture type is performed between layers, and a reference relation of a picture is likely to be identical between layers, the reference layer is set.

<Second Embodiment>
(Description of Overview of Second Embodiment)

Figure 37:
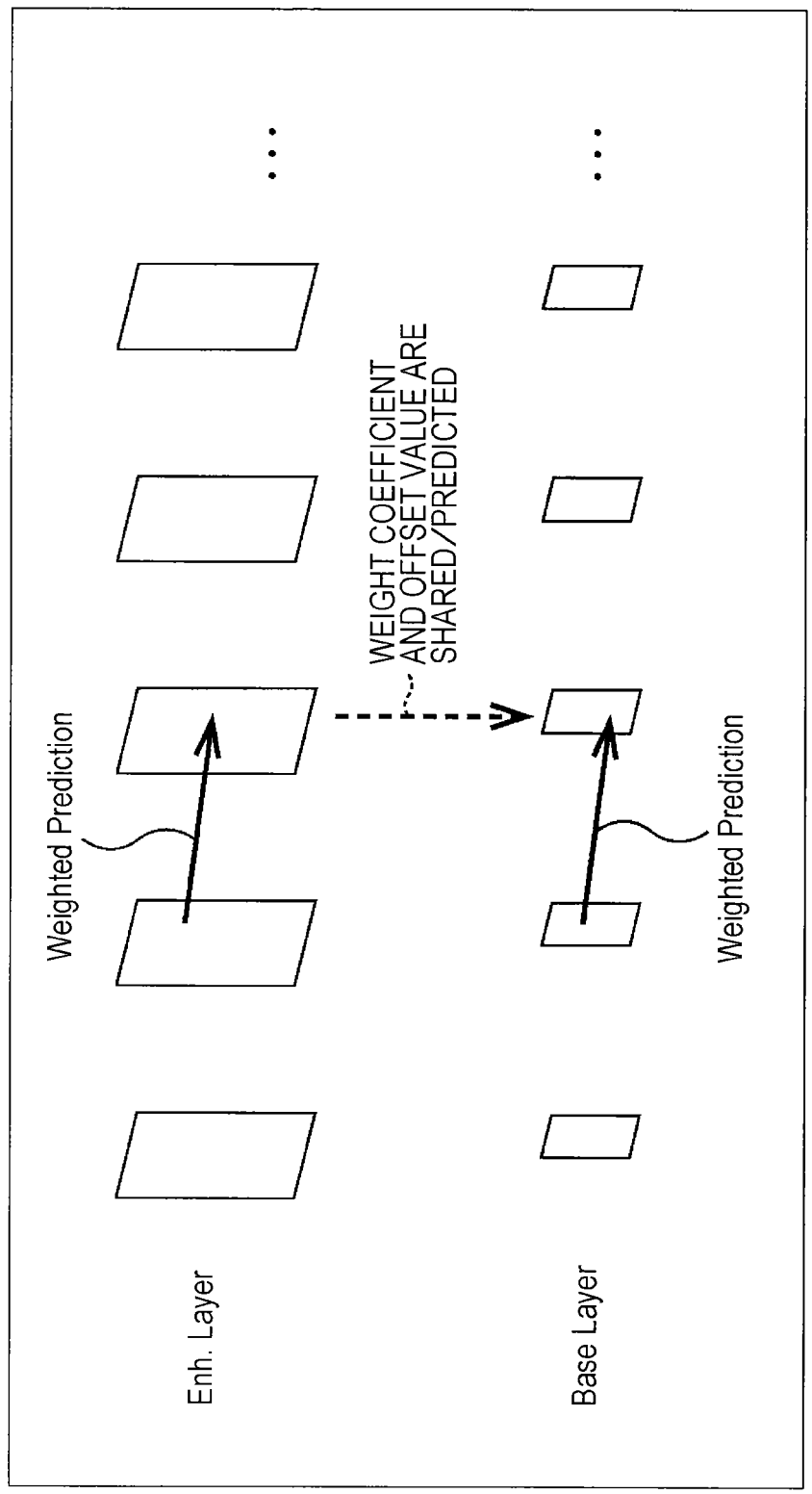
FIG. 37 is a diagram for describing an overview of a second embodiment of the present technology.

FIG. 37 is a diagram for describing an overview of a second embodiment of the present technology.

As illustrated in FIG. 37, in the second embodiment, weighting information including a weight coefficient and an offset value in a weighted prediction, which serves as information related to a reference image is shared or predicted between different layers.

Figure 38:
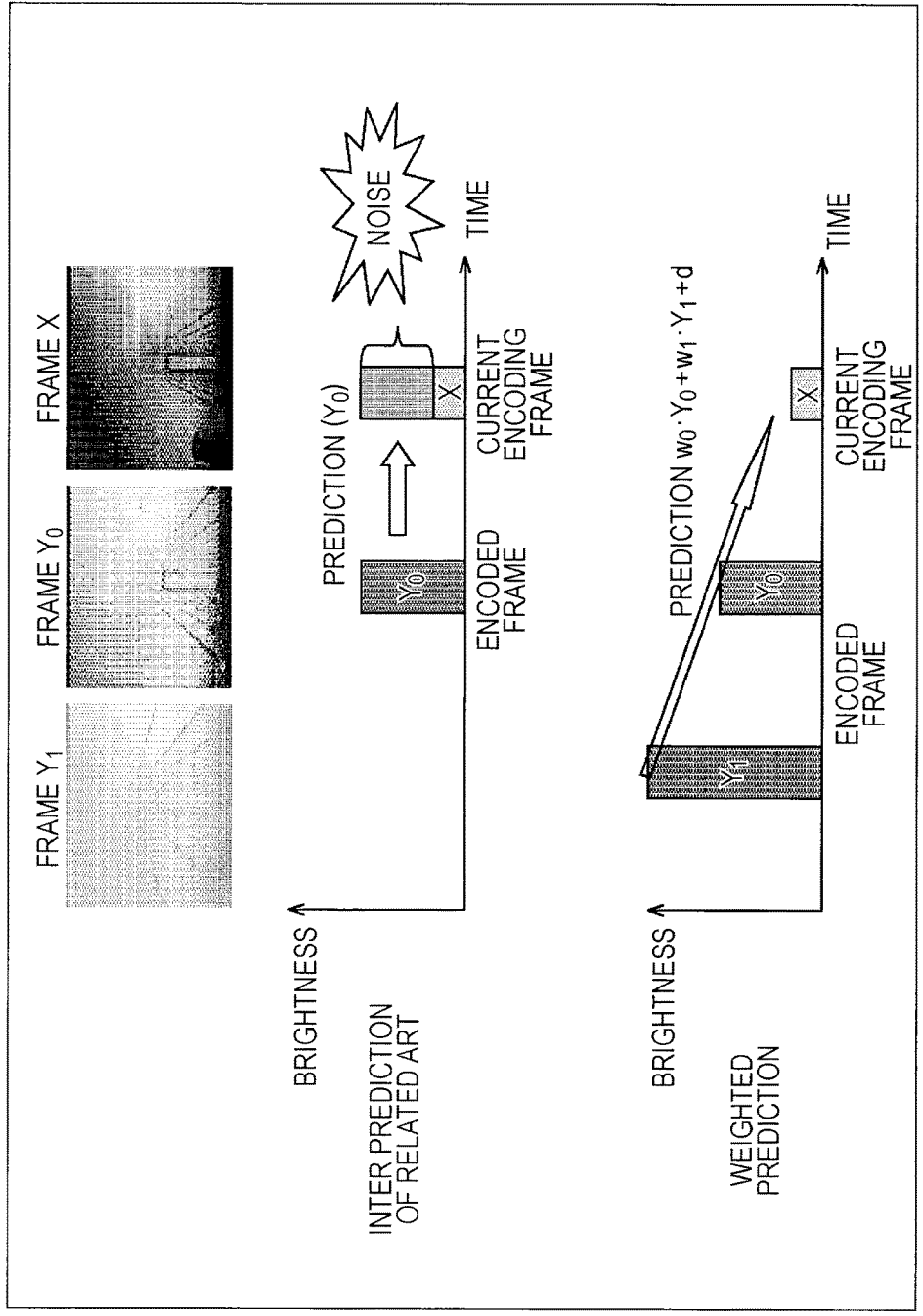
FIG. 38 is a diagram for describing a weighted prediction.

FIG. 38 is a diagram for describing the weighted prediction.

As illustrated in FIG. 38, in the AVC scheme and the HEVC scheme, the weighted prediction is performed at the time of inter prediction. The weighted prediction is a process of weighting the reference image and generating a predicted image. Specifically, for example, when a decoded image of two frames $Y_1$ and $Y_0$ that are prior in an encoding order to a frame X to be currently encoded is used as the reference image, in the weighted prediction, a predicted image X' of the frame X is obtained by the following Formula (4):

[Mathematical Formula 4]

$$X' = w_0 \times Y_0 + w_0 \times Y_1 + d \tag{4}$$

In Formula (4), $w_0$ and $w_1$ are weight coefficients, and d is an offset value. The weight coefficient is calculated based on a POC in the weighted prediction such as the implicit weighted prediction in the AVC scheme. Meanwhile, in the weighted prediction such as the explicit weighted prediction in the AVC scheme or the weighted prediction in the HEVC scheme, the weight coefficient and the offset value are included in an encoded stream and transmitted.

As the weighted prediction is performed, even when a change in brightness between the reference image and an image to be currently encoded occurs due to fade-in, fade-out, cross-fade, or the like, it is possible to reduce a difference between the predicted image and the image to be currently encoded. As a result, it is possible to improve the coding efficiency.

On the other hand, when the weighted prediction is not performed, a change in brightness occurring between the reference image and the image to be currently encoded due to fade-in, fade-out, cross-fade, or the like becomes a difference between the predicted image and the image to be currently encoded as is, and the coding efficiency gets worse.

Here, in encoding by the scalable function, in each scalable image, an SNR, a spatial resolution, a frame rate, the number of bits (a bit depth), a format of a chrominance signal, and the like are different, but content is considered to be the same.

Thus, when fade-in, fade-out, cross-fade, or the like is performed on a certain scalable image, fade-in, fade-out, cross-fade, or the like is considered to be performed on other scalable images. Thus, pieces of weighting information suited to the scalable images are considered to have a correlation. In this regard, in the second embodiment, the coding efficiency is improved by sharing or predicting the weighting information between different layers.

(Exemplary Configuration of Second Embodiment of Encoding Device)

Figure 39:
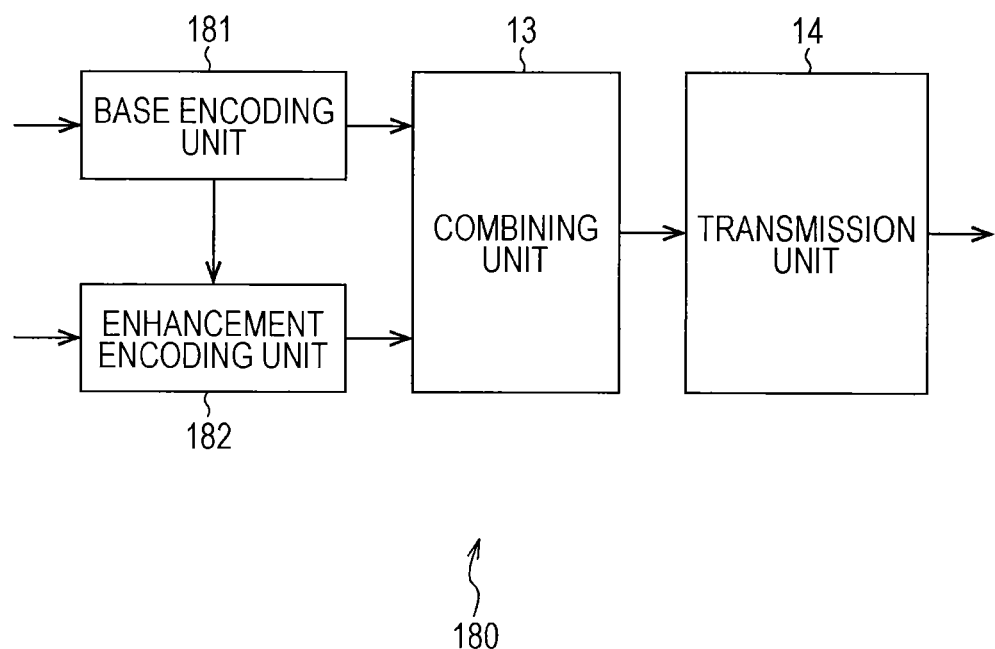
FIG. 39 is a block diagram illustrating an exemplary configuration of an encoding device according to the second embodiment of the present technology.

FIG. 39 is a block diagram illustrating an exemplary configuration of an encoding device according to the second embodiment of the present technology.

Among components illustrated in FIG. 39, the same components as those in FIG. 6 are denoted by the same reference numerals. A duplicated description will be appropriately omitted.

A configuration of an encoding device 180 of FIG. 39 differs from the configuration of FIG. 6 in that a base encoding unit 181 is disposed instead of the base encoding unit 11, an enhancement encoding unit 182 is disposed instead of the enhancement encoding unit 12, and a VPS is the VPS illustrated in FIG. 1. The encoding device 180 generates weighting generation information (reference image generation information) used in generation of the weighting information of the enhancement image, and includes the weighting generation information in the enhancement stream.

Specifically, the base image is input to the base encoding unit 181 of the encoding device 180 from the outside. The base encoding unit 181 has a configuration similar to the encoding device of the HEVC scheme according to the related art, and encodes the base image according to the HEVC scheme. Here, the base encoding unit 181 supplies the weighting information and the like used when the base image is encoded to the enhancement encoding unit 182. The base encoding unit 181 supplies an encoded stream including encoded data, an SPS, a PPS, and the like obtained as a result of encoding to the combining unit 13 as the base stream.

The enhancement image is input to the enhancement encoding unit 182 from the outside. The enhancement encoding unit 182 encodes the enhancement image according to the scheme complying with the HEVC scheme. Further, the enhancement encoding unit 182 generates weighting information generation information using the weighting information of the base image and the weighting information used when the enhancement image is encoded.

The enhancement encoding unit 182 generates an encoded stream by adding the weighting information and the like to the encoded data of the enhancement image, and supplies the generated encoded stream to the combining unit 13 as the enhancement stream.

(Exemplary Syntax of PPS of Base Stream)

FIGS. 40 and 41 are diagrams illustrating an exemplary syntax of the PPS in the AVC scheme, and FIGS. 42 and 43 are diagrams illustrating an exemplary syntax of the PPS of the base stream.

As illustrated in a 28-th line of FIG. 40, the PPS of the AVC scheme includes a flag (weighted_pred_flag) indicating whether or not the weighted prediction is performed on a P slice. Further, as illustrated in a 29-th line, the PPS of the AVC scheme includes information (weighted_bipred_idc) indicating whether or not the two-way weighted predict is performed on a B slice. Further, the two-way weighted prediction is the weighted prediction in which images prior to and subsequent to an image to be currently encoded in an encoding order are used as the reference image.

Further, as illustrated in a 17-th line of FIG. 42, the PPS of the base stream includes the flag (weighted_pred_flag). Furthermore, as illustrated in an 18-th line, the PPS of the base stream includes a flag (weighted_bipred_flag) indicating whether or not the weighted prediction is performed on a B slice.

(Exemplary Syntax of Slice Header of Base Stream)

FIGS. 44 and 45 are diagrams illustrating an exemplary syntax of the slice header in the AVC scheme. The syntax of the slice header of the base stream is the same syntax as that of FIGS. 9 to 11.

As illustrated in a 42-nd line of FIG. 44, the slice header of the AVC scheme includes information (pred_weight_table) related to the weighting information.

Further, as illustrated in a 19-th line of FIG. 10, the slice header of the base stream also includes the information (pred_weight_table) related to the weighting information.

(Exemplary Syntax of Weighting Information of Base Stream)

FIG. 46 is a diagram illustrating an exemplary syntax of the weighting information in the AVC scheme, and FIG. 47 is a diagram illustrating an exemplary syntax of the weighting information of the base stream.

As illustrated in a 2-nd line of FIG. 46, the weighting information in the AVC scheme includes a denominator (luma_log2_weight_denom) of a weight coefficient of a brightness signal. Further, as illustrated in a 4-th line, the weighting information in the AVC scheme includes a denominator (chroma_log2_weight_denom) of a weight coefficient of a chrominance signal.

On the other hand, as illustrated in a 2-nd line of FIG. 47, the weighting information of the base stream also includes the denominator (luma_log2_weight_denom) of the weight coefficient of the brightness signal. Further, as illustrated in a 4-th line, the weighting information of the base stream includes a difference (delta_chroma_log2_weight_denom) between the denominator of the weight coefficient of the brightness signal and the denominator of the weight coefficient of the chrominance signal. The weight coefficient of the chrominance signal (chroma_log2_weight_denom) is calculated by the following Formula (5) using the difference (delta_chroma_log2_weight_denom).

[Mathematical Formula 5]

$$\text{chroma\_log2\_weight\_denom} = \text{luma\_log2\_weight\_denom} + \text{delta\_chroma\_log2\_weight\_denom} \quad (5)$$

Further, as illustrated in 6-th and 22-nd lines of FIG. 46, the weighting information in the AVC scheme includes a flag (luma_weight_l0_flag,luma_weight_l1_flag) indicating whether or not there is the weighting information for the brightness signal.

As illustrated in 7-th, 8-th, 23-rd, and 24-th lines, when the flag (luma_weight_l0_flag,luma_weight_l1_flag) is 1 indicating whether or not there is the weighting information for the brightness signal, the weighting information in the AVC scheme includes the weight coefficient (luma_weight_l0,luma_weight_l1) of the brightness signal. Further, as illustrated in 9-th and 25-th lines, an offset (luma_offset_l0,luma_offset_l1) of the brightness signal is included.

On the other hand, as illustrated in 6-th and 23-rd lines of FIG. 47, the weighting information of the base stream also includes the flag (luma_weight_l0_flag, luma_weight_l1_flag). As illustrated in 11-th, 12-th, 28-th, and 29-th lines, when the flag (luma_weight_l0_flag, luma_weight_l1_flag) is 1, the weighting information of the base stream includes information (delta luma_weight_l0, delta luma_weight_l1) of the weight coefficient of the brightness signal.

The weight coefficient (luma_weight_l0,luma_weight_l1) of the brightness signal is calculated by the following Formula (6) using the information (delta luma_weight_l0, delta luma_weight_l1) of the weight coefficient of the brightness signal.

[Mathematical Formula 6]

$$\text{luma\_weight\_l0}[i] = (1 << \text{luma\_log2\_weight\_denom}) + \text{delta\_luma\_weight\_l0}[i]$$

$$\text{luma\_weight\_l1}[i] = (1 << \text{luma\_log2\_weight\_denom}) + \text{delta\_luma\_weight\_l1}[i] \quad (6)$$

Further, as illustrated in 13-th and 30-th lines of FIG. 47, the weighting information of the base stream also includes the offset (luma_offset_l0, luma_offset_l1) of the brightness signal.

Further, as illustrated in 12-th and 28-th lines of FIG. 46, the weighting information in the AVC scheme includes a flag (chroma_weight_l0 flag,chroma_weight_l1_flag) indicating whether or not there is the weighting information for the chrominance signal.

When the flag (chroma_weight_l0 flag, chroma_weight_l1 flag) is 1 indicating that there is the weighting information for the chrominance signal, as illustrated in 13-th to 15-th lines and 29-th to 31-st lines, the weighting information in the AVC scheme includes a weight coefficient (chroma_weight_l0, chroma_weight_l1) of the chrominance signal. Further, as illustrated in 16-th and 32-nd lines, an offset (chroma_offset_l0,chroma_offset_l1) of the chrominance signal is included.

On the other hand, as illustrated in 9-th and 26-th lines of FIG. 47, the weighting information of the base stream also includes the flag (chroma_weight_l0 flag, chroma_weight_l1_flag). As illustrated in 15-th to 17-th lines and 32-nd to 34-th lines, when the flag (chroma_weight_l0_flag,chroma_weight_l1_flag) is 1, the weighting information of the base stream includes information (delta_chroma_weight_l0, delta_chroma_weight_l1) of the weight coefficient of the chrominance signal.

The weight coefficient (chroma_weight_l0,chroma_weight_l1) of the chrominance signal is calculated by the following Formula (7) using the information (delta_chroma_weight_l0,delta_chroma_weight_l1) of the weight coefficient of the chrominance signal.

[Mathematical Formula 7]

$$\text{chroma\_weight\_l0}[i][j] = (1 << \text{chroma\_log2\_weight\_denom}) + \text{delta\_chroma\_weight\_l0}[i][j]$$

$$\text{chroma\_weight\_l1}[i][j] = (1 << \text{chroma\_log2\_weight\_denom}) + \text{delta\_chroma\_weight\_l1}[i][j] \quad (7)$$

Further, as illustrated in 18-th and 35-th lines of FIG. 47, the weighting information of the base stream includes information (delta_chroma_offset_l0,delta_chroma_offset_l1) of the offset of the chrominance signal. The offset (chroma_offset_l0,chroma_offset_l1) of the chrominance signal is calculated by the following Formula (8) using the information (delta_chroma_offset_l0,delta_chroma_offset_l1) of the offset of the chrominance signal.

[Mathematical Formula 8]

$$\text{chroma\_offset\_l0}[i][j] = \text{Clip3}(-128, 127, (\text{delta\_chroma\_offset\_l0}[i][j] - ((\text{shift} * \text{chroma\_weight\_l0}[i][j]) >> \text{chroma\_log2\_weight\_denom}) - \text{shift}))$$

$$\text{chroma\_offset\_l1}[i][j] = \text{Clip3}(-128, 127, (\text{delta\_chroma\_offset\_l1}[i][j] - ((\text{shift} * \text{chroma\_weight\_l1}[i][j]) >> \text{chroma\_log2\_weight\_denom}) - \text{shift}))$$

$$\text{Here, shift} = 1 << (\text{BitDepthC} - 1) \quad (8)$$

(Exemplary Configuration of Enhancement Encoding Unit)

Figure 48:
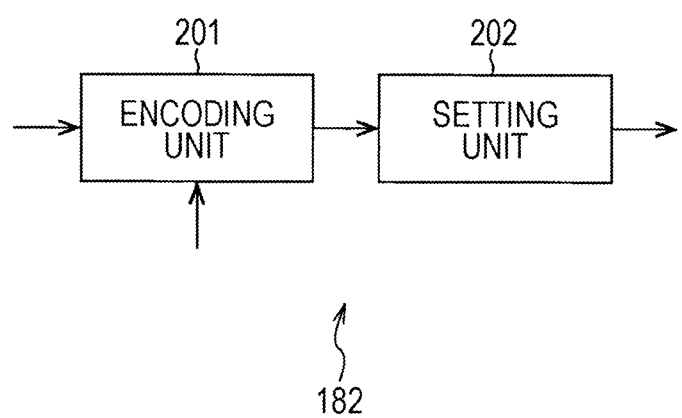
FIG. 48 is a block diagram illustrating an exemplary configuration of an enhancement encoding unit of FIG. 39.

FIG. 48 is a block diagram illustrating an exemplary configuration of the enhancement encoding unit 182 of FIG. 39.

The enhancement encoding unit 182 of FIG. 48 includes an encoding unit 201 and a setting unit 202.

The encoding unit 201 of the enhancement encoding unit 182 receives an enhancement image of a frame unit input from the outside as an input signal. The encoding unit 201 encodes the input signal according to the scheme complying with the HEVC scheme with reference to the weighting information or the like supplied from the base encoding unit 11. The encoding unit 201 supplies encoded data obtained as the result to the setting unit 202.

The setting unit 202 sets the SPS, the PPS, and the like. Further, the PPS does not include the flag (weighted_pred_flag) and the flag (weighted_bipred_flag), and the flag (weighted_pred_flag) and the flag (weighted_bipred_flag) included in the PPS of the base stream serving as the encoded stream of the reference layer are used as the flag (weighted_pred_flag) and the flag (weighted_bipred_flag) of the enhancement image.

Thus, when weighting is performed on the reference image of the base image, weighting is performed on the reference image of the enhancement image, and when weighting is not performed on the reference image of the base image, weighting is not performed on the reference image of the enhancement image.

The setting unit 202 generates an encoded stream based on the set SPS, the PPS, and the encoded data supplied from the encoding unit 201, and supplies the generated encoded stream to the combining unit 13 as the enhancement stream.

(Exemplary Configuration of Encoding Unit)

Figure 49:
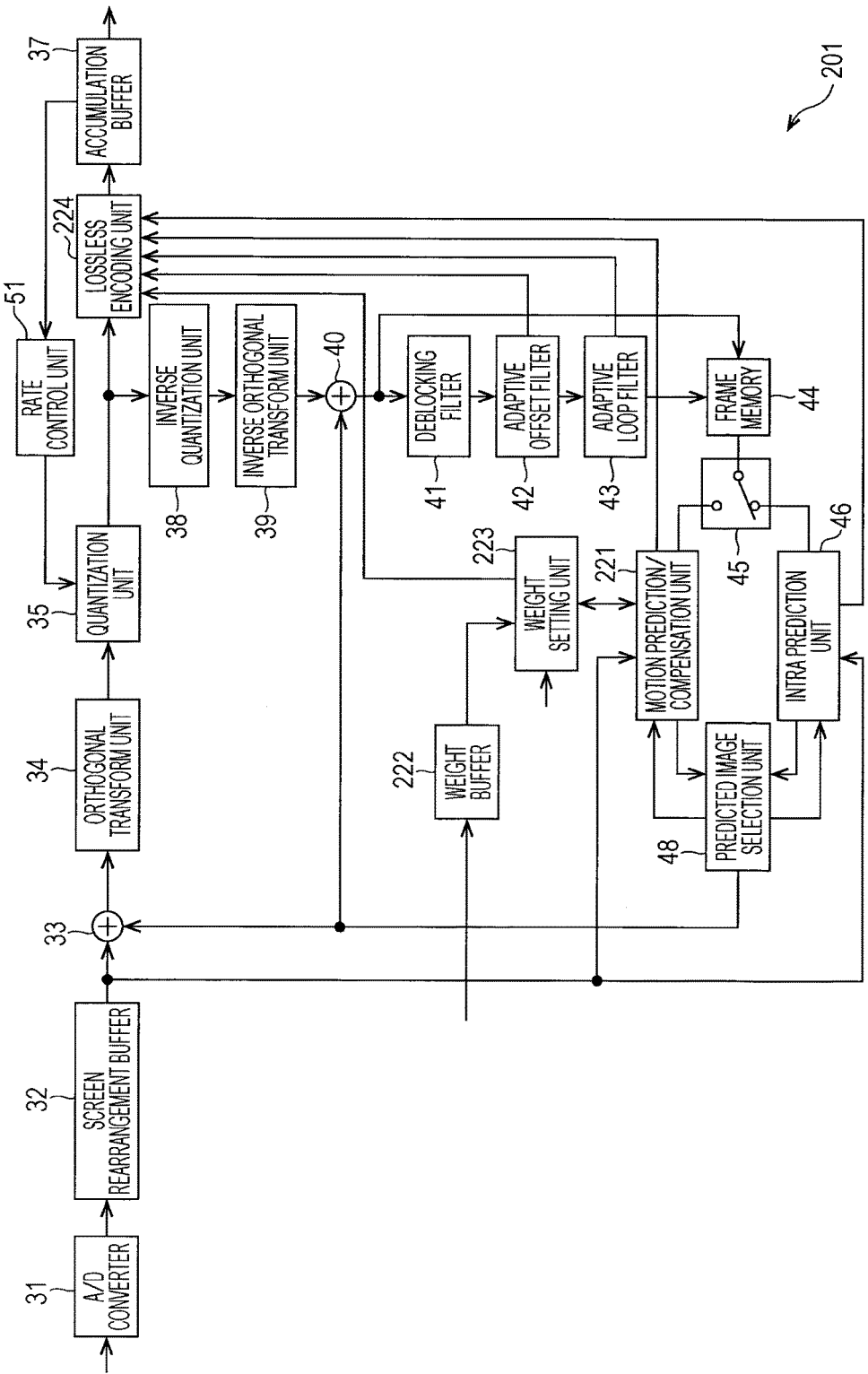
FIG. 49 is a block diagram illustrating an exemplary configuration of an encoding unit of FIG. 48.

FIG. 49 is a block diagram illustrating an exemplary configuration of the encoding unit 201 of FIG. 48.

Among components illustrated in FIG. 49, the same components as those of FIG. 14 are denoted by the same reference numerals. A duplicated description will be appropriately omitted.

A configuration of the encoding unit 201 of FIG. 49 differs from the configuration of FIG. 14 in that a motion prediction/compensation unit 221, a weight buffer 222, a weight setting unit 223, and a lossless encoding unit 224 are disposed instead of the motion prediction/compensation unit 47, the reference buffer 49, the reference image setting unit 50, and the lossless encoding unit 36.

The motion prediction/compensation unit 221 functions as a weighting processing unit, and performs the motion prediction/compensation process using the weighted prediction for all the inter prediction modes serving as a candidate based on a weighted prediction instruction given from the weight setting unit 223. Specifically, the motion prediction/compensation unit 221 detects motion vectors of all the inter prediction modes serving as a candidate based on the image supplied from the screen rearrangement buffer 32 and the reference image read from the frame memory 44 via the switch 45. For example, the reference image is set by the user.

The motion prediction/compensation unit 221 performs the compensation process on the reference image based on the detected motion vector. The motion prediction/compensation unit 221 calculates the weighting information in the weighted prediction. The motion prediction/compensation unit 221 performs the weighted prediction on the reference image that has been subjected to the compensation process using the calculated weighting information, and generates the predicted image.

At this time, the motion prediction/compensation unit 221 calculates the cost function values for all the inter prediction modes serving as a candidate based on the image supplied from the screen rearrangement buffer 32 and the predicted image, and decides the inter prediction mode in which the cost function value is smallest as the optimal inter prediction mode. Then, the motion prediction/compensation unit 221 supplies the cost function value of the optimal inter prediction mode and the corresponding predicted image to the predicted image selection unit 48.

Further, when a notification of selection of the predicted image generated in the optimal inter prediction mode is given from the predicted image selection unit 48, the motion prediction/compensation unit 221 outputs the inter prediction mode information, the corresponding motion vector, the reference image specifying information, and the like to the lossless encoding unit 224. Furthermore, the motion prediction/compensation unit 221 supplies the weighting information in the weighted prediction to the weight setting unit 223.

The weight buffer 222 stores a flag (weighted_bipred_flag) and the flag (weighted_pred_flag) included in the PPS of the base stream supplied from the base encoding unit 181 of FIG. 39. Further, the weight buffer 222 stores the weighting information included in the slice header of the base stream supplied from the base encoding unit 181.

The weight setting unit 223 reads the flag (weighted_pred_flag) and the flag (weighted_bipred_flag) from the weight buffer 222. The weight setting unit 223 instructs the motion prediction/compensation unit 221 to perform the weighted prediction based on the flag (weighted_pred_flag), the flag (weighted_bipred_flag), and a type of a slice of an image to be currently encoded.

The weight setting unit 223 compares the weighting information supplied from the motion prediction/compensation unit 221 with the weighting information stored in the weight buffer 222, and decides the prediction mode of the weighting information of the enhancement image. Here, the prediction mode of the weighting information is assumed to include the copy mode, the differential prediction mode, and the non-prediction mode.

The copy mode is a prediction mode in which the weighting information of the reference layer (here, the base layer) is used as the weighting information of the enhancement image. The differential prediction mode is a prediction mode of adding a difference of the weighting information between the enhancement image and the reference layer to the weighting information of the reference layer and generating the weighting information of the enhancement image. The non-prediction mode is a prediction mode of setting the weighting information of the enhancement image dependently of the weighting information of the reference layer.

When the prediction mode of the weighting information is the copy mode, the weight setting unit 223 sets the copy mode as the weighting generation information, and supplies the copy mode to the lossless encoding unit 224. Further, when the prediction mode of the weighting information is the differential prediction mode, the weight setting unit 223 calculates a difference between the weighting information of the enhancement image and the weighting information of the base image. Then, the weight setting unit 223 sets the calculated difference of the weighting information and the differential prediction mode as the weighting generation information, and supplies the calculated difference of the weighting information and the differential prediction mode to the lossless encoding unit 224.

Further, when the prediction mode of the weighting information is the non-prediction mode, the weight setting unit 223 sets the weighting information of the enhancement image as the weighting generation information, and supplies the weighting information of the enhancement image to the lossless encoding unit 224.

The lossless encoding unit 224 acquires the intra prediction mode information from the intra prediction unit 46, similarly to the lossless encoding unit 36 of FIG. 14. Further, the lossless encoding unit 224 acquires the inter prediction mode information, the motion vector, the reference image specifying information, and the like supplied from the motion prediction/compensation unit 221 from the motion prediction/compensation unit 221. Furthermore, the lossless encoding unit 224 acquires the weighting generation information from the weight setting unit 223.

The lossless encoding unit 224 acquires the offset filter information from the adaptive offset filter 42, and acquires the filter coefficient from the adaptive loop filter 43, similarly to the lossless encoding unit 36.

The lossless encoding unit 224 performs lossless coding on the quantized coefficients supplied from the quantization unit 35, similarly to the lossless encoding unit 36. Further, the lossless encoding unit 224 performs lossless coding using either of the intra prediction mode information and the inter prediction mode information, the motion vector, the reference image specifying information, the weighting generation information, the offset filter information, and the filter coefficient as the encoding information related to encoding.

Similarly to the lossless encoding unit 36, the lossless encoding unit 224 sets the lossless encoded encoding information as the slice header, sets the lossless encoded coefficients as encoded data, and adds the slice header to the encoded data. Similarly to the lossless encoding unit 36, the lossless encoding unit 224 supplies the encoded data with the slice header added thereto to be accumulated in the accumulation buffer 37.

(Exemplary Configuration of Weight Buffer and Weight, Setting Unit)

FIG. 50 is a block diagram illustrating an exemplary configuration of the weight buffer 222 and the weight setting unit 223 of FIG. 49.

The weight buffer 222 of FIG. 50 includes an information buffer 241 and a flag buffer 242.

The information buffer 241 of the weight buffer 222 stores the weighting information included in the slice header of the base stream supplied from the base encoding unit 181 of FIG. 39. The flag buffer 242 stores the flag (weighted_bipred_flag) and the flag (weighted_pred_flag) included in the PPS of the base stream supplied from the base encoding unit 181.

The weight setting unit 223 of FIG. 50 includes a control unit 261, an information buffer 262, a determination unit 263, and a setting unit 264.

The control unit 261 of the weight setting unit 223 reads the flag (weighted_pred_flag) and the flag (weighted_bipred_flag) from the flag buffer 242. The weight setting unit 223 instructs the motion prediction/compensation unit 221 of FIG. 49 to perform the weighted prediction based on the flag (weighted_pred_flag), the flag (weighted_bipred_flag), and a type of a slice of an image to be currently encoded.

The information buffer 262 acquires the weighting information from the motion prediction/compensation unit 221, and stores the weighting information. The determination unit 263 reads the weighting information of the base image from the information buffer 241, and reads the weighting information of the enhancement image from the information buffer 262. The determination unit 263 compares the read weighting information of the base image with the weighting information of the enhancement image.

Then, when the weighting information of the base image is identical to the weighting information of the enhancement image, the determination unit 263 decides the copy mode as the prediction mode of the weighting information. The determination unit 263 supplies the copy mode to the setting unit 264. Further, the determination unit 263 sets the copy mode as the weighting generation information, and supplies the copy mode to the lossless encoding unit 224 of FIG. 49.

When the copy mode is not supplied from the determination unit 263, the setting unit 264 reads the weighting information of the base image from the information buffer 241, and reads the weighting information of the enhancement image from the information buffer 262. The setting unit 264 decides the prediction mode of the weighting information as the differential prediction mode or the non-prediction mode based on an input from the user.

When the differential prediction mode is decided as the prediction mode of the weighting information, the setting unit 264 calculates a difference between the read weighting information of the base image and the weighting information of the enhancement image. Then, the weight setting unit 223 sets the calculated difference of the weighting information and the differential prediction mode as the weighting generation information, and supplies the set weighting generation information to the lossless encoding unit 224.

Meanwhile, when the non-prediction mode is decided as the prediction mode of the weighting information, the setting unit 264 sets the weighting information of the enhancement image and the non-prediction mode as the weighting generation information, and supplies the set weighting generation information to the lossless encoding unit 36.

(Syntax of Slice Header of Enhancement Stream)

Since the syntax of the slice header of the enhancement stream is similar to the syntax of the slice header of the base stream except for the weighting information, only a syntax of the information (pred_weight_table) related to the weighting information is described.

FIGS. 51 and 52 are diagrams illustrating an exemplary syntax of the weighting information of the enhancement stream.

As illustrated in a 2-nd line of FIG. 51, information related to the weighting information includes a prediction mode (pred_mode) of the weighting information. The prediction mode of the weighting information is 0 when it indicates the copy mode, 1 when it indicates the differential prediction mode, and 2 when it indicates the non-prediction mode.

As illustrated in 3-rd and 4-th lines, when the prediction mode of the weighting information is not 2, that is, when the prediction mode of the weighting information is the copy mode or the differential prediction mode, a difference (diff_ref_layer_minus1) between the base layer and the reference layer is included. Here, when a current layer is indicated by curr_layer, and the reference layer is indicated by ref_layer, the reference layer ref_layer is expressed by the following Formula (9) using the difference diff_ref_layer_minus1.

[Mathematical Formula 9]

$$ref\_layer = curr\_layer - diff\_ref\_layer\_minus1 \quad (9)$$

Further, as illustrated in 5-th and 6-th lines, when the prediction mode of the weighting information is 1, the information related to the weighting information includes a difference (diff_luma_log2_weight_denom) of the denominator (luma_log2_weight_denom) between the corresponding slice and the reference layer. Further, as illustrated in an 8-th line, a difference (diff_delta_chroma_log2_weight_denom) of the difference (delta_chroma_log2_weight_denom) between the corresponding slice and the reference layer is included.

Further, the information related to the weighting information does not include the flag (luma_weight_l0_flag, luma_weight_l1_flag) and the flag (chroma_weight_l0_flag, chroma_weight_l1_flag).

In other words, as described above, in encoding by the scalable function, when fade-in, fade-out, cross-fade, or the like is performed on a certain scalable image, fade-in, fade-out, cross-fade, or the like is considered to be also performed on other scalable images. Thus, when the weighted prediction is performed on the base image of the reference layer, it is preferable that the weighted prediction be performed even on the enhancement image in terms of the coding efficiency.

Thus, the flag (luma_weight_l0_flag, luma_weight_l1_flag) and the flag (chroma_weight_l0_flag, chroma_weight_l1_flag) of the enhancement image are not transmitted, and the flag (luma_weight_l0_flag, luma_weight_l1_flag) and the flag (chroma_weight_l0_flag,chroma_weight_l1_flag) of the reference layer are used.

Further, as illustrated in 10-th to 12-th lines and 22-nd to 24-th lines, when the flag (luma_weight_l0_flag, luma_weight_l1_flag) of the reference layer is 1, the information related to the weighting information includes a difference (diff_delta_luma_weight_l0, diff_delta_luma_weight_l1) of the information (delta_luma_weight_l0, delta_luma_weight_l1) of the weight coefficient of the brightness signal between the corresponding slice and the reference layer. Further, a difference (diff_luma_offset_l0, diff_luma_offset_l1) of the offset (luma_offset_l0, luma_offset_l1) of the brightness signal between the corresponding slice and the reference layer is included.

Further, as illustrated in 14-th to 17-th lines and 26-th to 29-th lines, when the flag (chroma_weight_l0_flag, chroma_weight_l1_flag) of the reference layer is 1, the information related to the weighting information includes a difference (diff_delta_chroma_weight_l0, diff_delta_chroma_weight_l1) of the information (delta_chroma_weight_l0, delta_chroma_weight_l1) of the weight coefficient of the chrominance signal between the corresponding slice and the reference layer. Further, a difference (diff_chroma_offset_l0, diff_chroma_offset_l1) of the offset (chroma_offset_l0, chroma_offset_l1) of the chrominance signal between the corresponding slice and the reference layer is included.

Meanwhile, when the prediction mode of the weighting information is 2, as illustrated in 33-rd to 37-th lines of FIG. 51 and FIG. 52, the information related to the weighting information includes the same information as the weighting information of the base stream.

Further, the information (pred_weight_table) related to the weighting information may be included in a layer higher than the slice header such as the VPS and the SPS in units of layers.

(Description of Processing of Encoding Device)

The scalable coding process of the encoding device 180 of FIG. 39 is similar to the scalable coding process of FIG. 24 except that the information supplied from the base encoding unit 181 to the enhancement encoding unit 182 includes the weighting information, the flag (weighted_pred_flag), and the flag (weighted_bipred_flag), and an enhancement stream generation process of step S2 of FIG. 24 is performed, and thus the description will proceed with the enhancement stream generation process.

Figure 53:
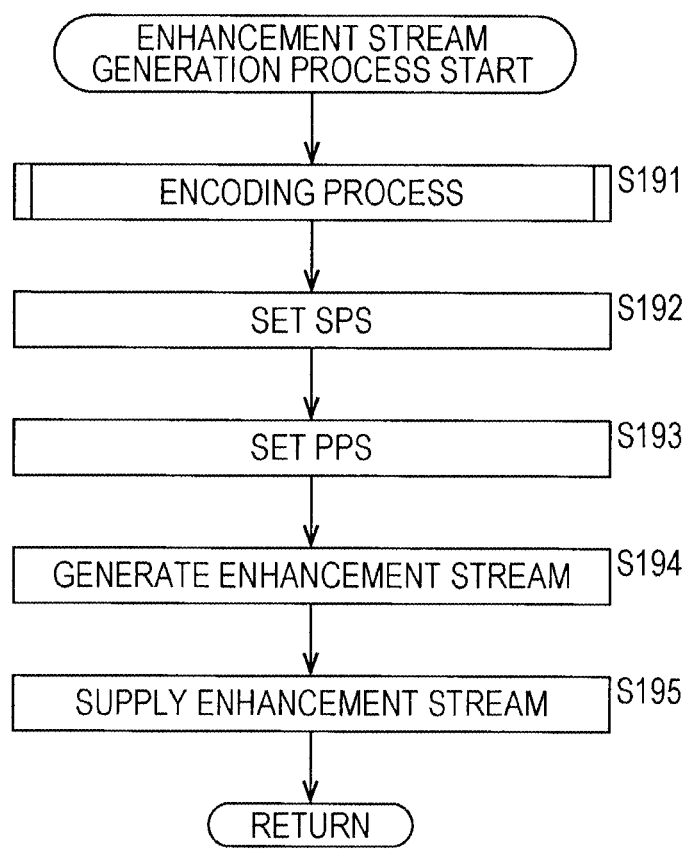
FIG. 53 is a flowchart for describing an enhancement stream generation process of FIG. 48.

FIG. 53 is a flowchart for describing the enhancement stream generation process of the enhancement encoding unit 182 of FIG. 48.

In step S191 of FIG. 53, the encoding unit 201 of the enhancement encoding unit 182 performs an encoding process of encoding the enhancement image of the frame unit input as an input signal from the outside according to the scheme complying with the HEVC scheme. The details of the encoding process will be described with reference to FIGS. 54 and 55 which will be described later.

In step S192, the setting unit 202 sets an SPS. In step S193, the setting unit 202 sets a PPS that does not include the flag (weighted_pred_flag) and the flag (weighted_bipred_flag). The process of steps S194 and S195 is similar to the process of steps S14 and 15 of FIG. 25, and thus a description thereof is omitted.

Figure 54:
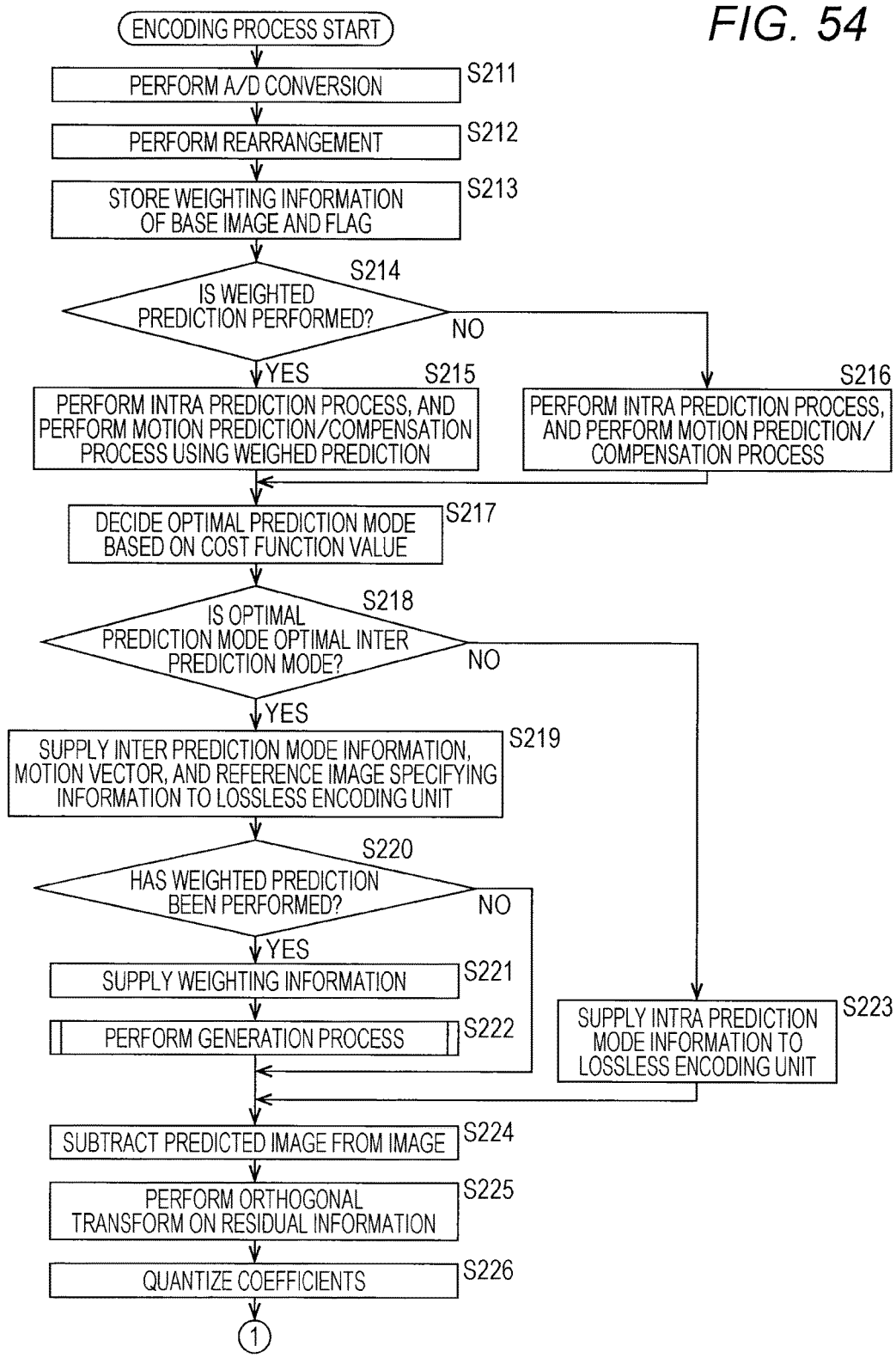
FIG. 54 is a flowchart for describing the details of an encoding process of FIG. 53.
Figure 55:
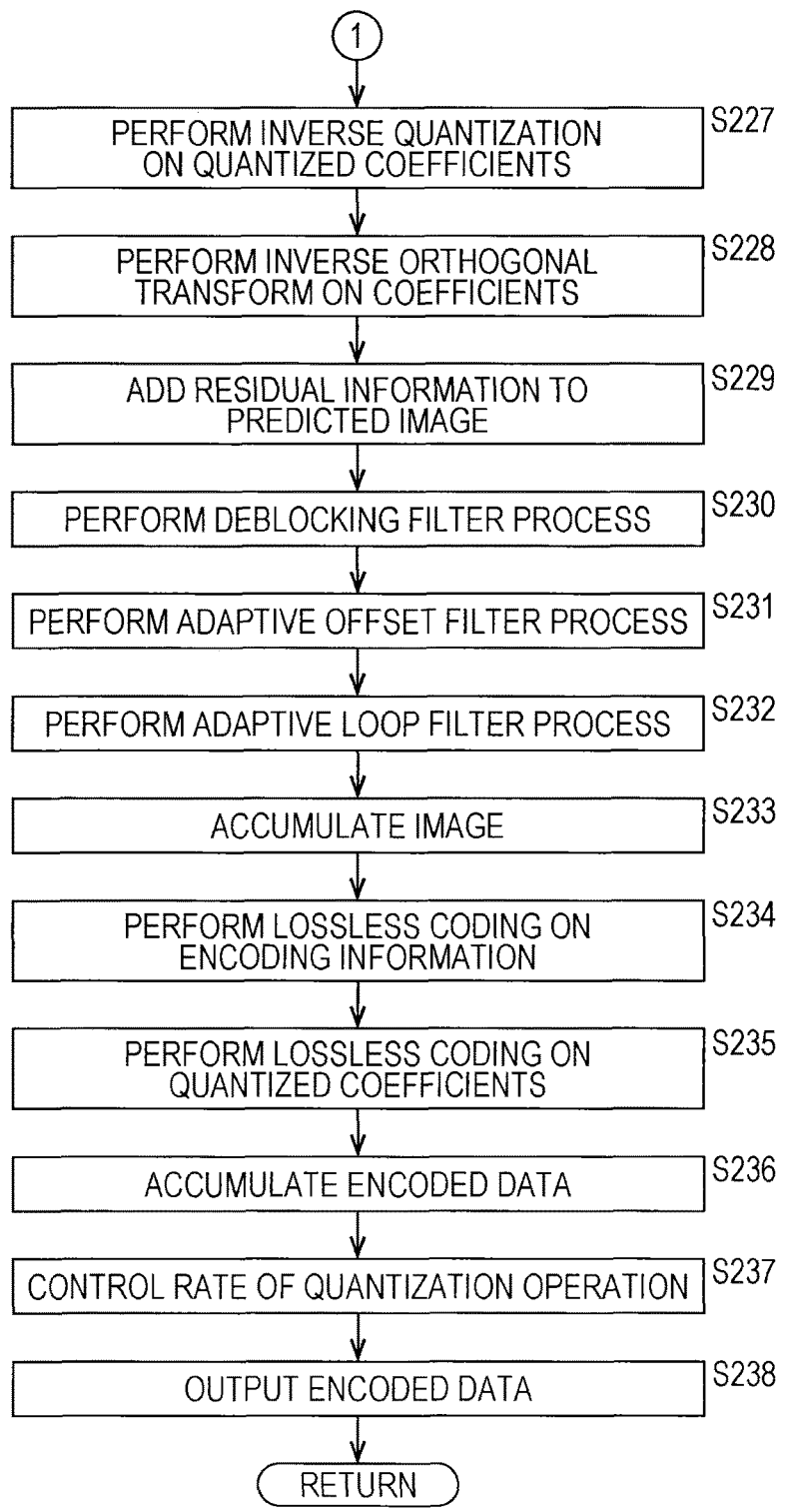
FIG. 55 is a flowchart for describing the details of an encoding process of FIG. 53.

FIGS. 54 and 55 are flowcharts for describing the details of the encoding process of step S191 of FIG. 53.

The process of steps S211 and S212 of FIG. 54 is similar to the process of steps S31 and S32 of FIG. 26, and thus a description thereof is omitted.

In step S213, the information buffer 241 of the weight buffer 222 stores the weighting information supplied from the base encoding unit 181 of FIG. 39, and the flag buffer 242 stores the flag (weighted_bipred_flag) and the flag (weighted_pred_flag).

In step S214, the control unit 261 determines whether or not the weighted prediction is performed based on the flag (weighted_pred_flag) and the flag (weighted_bipred_flag) stored in the flag buffer 242 and a type of a slice of an image to be currently encoded.

When the weighted prediction is determined to be performed in step S214, the control unit 261 instructs the motion prediction/compensation unit 221 to perform the weighted prediction, and the process proceeds to step S215.

In step S215, the intra prediction unit 46 performs the intra prediction process for all the intra prediction modes serving as a candidate. Further, the intra prediction unit 46 calculates the cost function values for all the intra prediction modes serving as a candidate based on the image read from the screen rearrangement buffer 32 and the predicted image generated as a result of the intra prediction process. Then, the intra prediction unit 46 decides the intra prediction mode in which the cost function value is smallest as the optimal intra prediction mode. The intra prediction unit 46 supplies the predicted image generated in the optimal intra prediction mode and the corresponding cost function value to the predicted image selection unit 48.

Further, the motion prediction/compensation unit 221 performs the motion prediction/compensation process using the weighted prediction for all the inter prediction modes serving as a candidate. Further, the motion prediction/compensation unit 221 calculates the cost function values for all the inter prediction modes serving as a candidate based on the image supplied from the screen rearrangement buffer 32 and the predicted image, and decides the inter prediction mode in which the cost function value is smallest as the optimal inter prediction mode. Then, the motion prediction/compensation unit 221 supplies the cost function value of the optimal inter prediction mode and the corresponding predicted image to the predicted image selection unit 48.

Meanwhile, when the weighted prediction is determined to be not performed in step S214, the control unit 261 causes the process to proceed to step S216.

In step S216, similarly to the process of step S215, the intra prediction unit 46 performs the intra prediction process for all the intra prediction modes serving as a candidate, and calculates the cost function values. Then, the intra prediction unit 46 decides the intra prediction mode in which the cost function value is smallest as the optimal intra prediction mode, and supplies the predicted image generated in the optimal intra prediction mode and the corresponding cost function value to the predicted image selection unit 48.

Further, the motion prediction/compensation unit 221 performs the motion prediction/compensation process for all the inter prediction modes serving as a candidate. Further, the motion prediction/compensation unit 221 calculates the cost function values for all the inter prediction modes serving as a candidate based on the image supplied from the screen rearrangement buffer 32 and the predicted image, and decides the inter prediction mode in which the cost function value is smallest as the optimal inter prediction mode. Then, the motion prediction/compensation unit 221 supplies the cost function value of the optimal inter prediction mode and the corresponding predicted image to the predicted image selection unit 48.

After the process of steps S215 and S216, the process proceeds to step S217. The process of steps S217 and S218 is similar to the process of steps S34 and S35 of FIG. 26, and thus a description thereof is omitted.

In step S219, the motion prediction/compensation unit 221 supplies the inter prediction mode information, the motion vector, and the reference image specifying information to the lossless encoding unit 36. In step S220, the motion prediction/compensation unit 221 determines whether or not the weighted prediction has been performed. When the weighted prediction is determined to have been performed in step S220, in step S221, the motion prediction/compensation unit 221 supplies the weighting information in the weighted prediction to the weight setting unit 223.

In step S222, the weight setting unit 223 performs a generation process of generating the weighting generation information. The details of the generation process will be described with reference to FIG. 56 which will be described later. After the process of step S222, the process proceeds to step S224.

Meanwhile, when the weighted prediction is determined to have not been performed in step S220, the process of steps S221 and S222 is skipped, and the process proceeds to step S224.

The process of steps S223 to S238 is similar to the process of steps S39 to S54 of FIGS. 26 and 27 except that the encoding information includes either of the intra prediction mode information and the inter prediction mode information, the motion vector, the reference image specifying information, the weighting generation information, the offset filter information, and the filter coefficient, and thus a description thereof is omitted.

Figure 56:
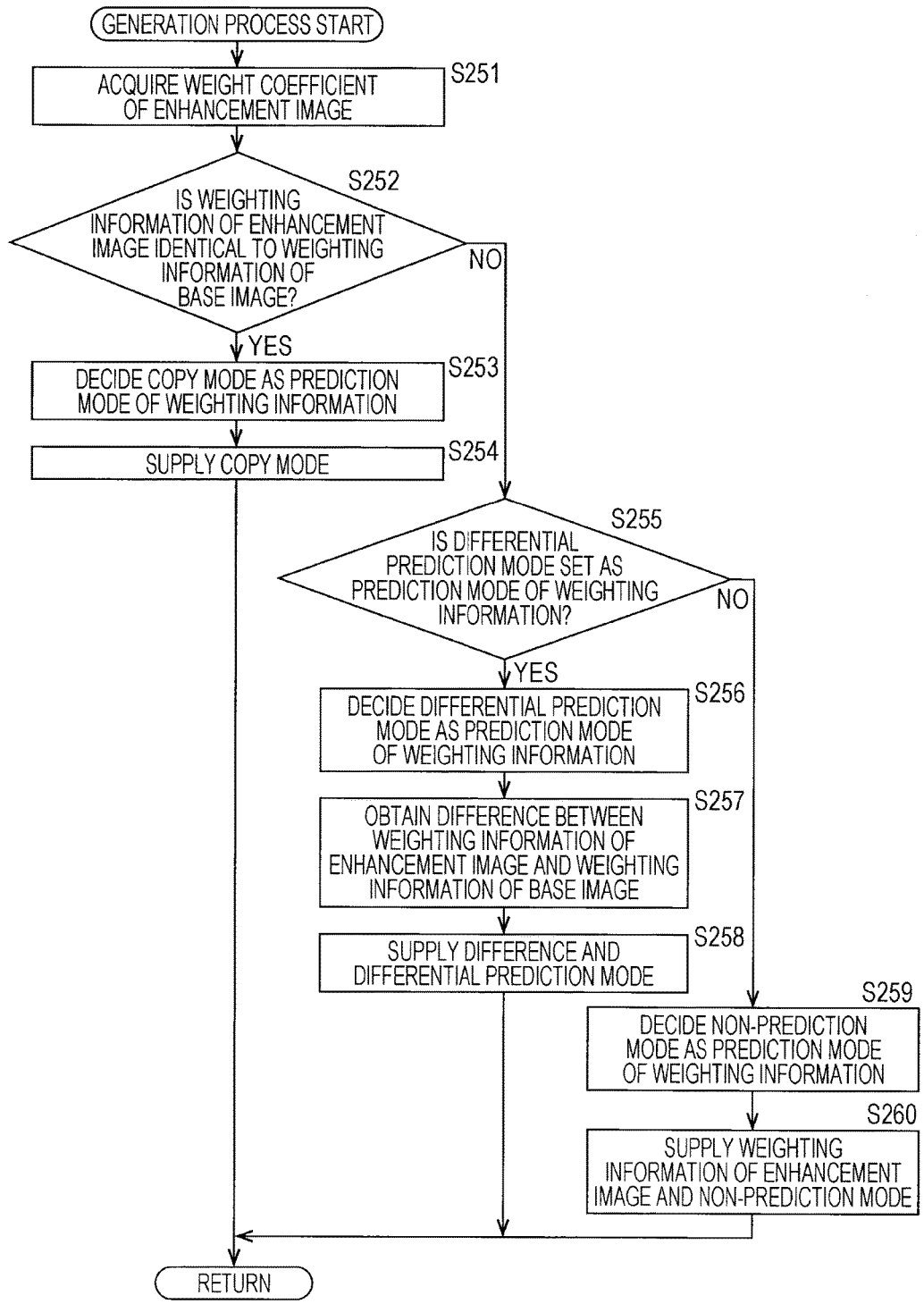
FIG. 56 is a flowchart for describing the details of a generation process of FIG. 54.

FIG. 56 is a flowchart for describing the details of the generation process of step S222 of FIG. 54.

In step S251 of FIG. 56, the information buffer 262 of the weight setting unit 223 acquires the weighting information of the enhancement image from the motion prediction/compensation unit 47 of FIG. 49, and stores the acquired weighting information of the enhancement image. In step S252, the determination unit 263 determines whether or not the weighting information of the enhancement image stored in the information buffer 262 is identical to the weighting information of the base image stored in the information buffer 241.

When the weighting information of the enhancement image is determined to be identical to the weighting information of the base image in step S252, in step S253, the determination unit 263 decides the copy mode as the prediction mode of the weighting information. In step S254, the determination unit 263 supplies the copy mode to the setting unit 264. Further, the determination unit 263 sets the copy mode as the weighting generation information, and supplies the set copy mode to the lossless encoding unit 224 of FIG. 49. Then, the process returns to step S222 of FIG. 54 and proceeds to step S224.

Meanwhile, the weighting information of the enhancement image is determined to be not identical to the weighting information of the base image in step S252, the process proceeds to step S255. In step S255, the setting unit 264 determines whether or not the differential prediction mode is set as the prediction mode of the weighting information based on an input from the user.

When the differential prediction mode is determined to be set as the prediction mode of the weighting information in step S255, in step S256, the setting unit 264 decides the differential prediction mode as the prediction mode of the weighting information.

In step S257, the setting unit 264 obtains a difference between the weighting information of the enhancement image and the weighting information of the base image. In step S258, the weight setting unit 223 sets the difference of the weighting information obtained in step S257 and the differential prediction mode as the weighting generation information, and supplies the set weighting generation information to the lossless encoding unit 224. Then, the process returns to step S222 of FIG. 54 and proceeds to step S224.

Meanwhile, when the differential prediction mode is determined to be not set as the prediction mode of the weighting information in step S255, in step S259, the setting unit 264 decides the non-prediction mode as the prediction mode of the weighting information.

In step S260, the setting unit 264 sets the weighting information of the enhancement image and the non-prediction mode as the weighting generation information, and supplies the set weighting generation information to the lossless encoding unit 36. Then, the process returns to step S222 of FIG. 54 and proceeds to step S224.

As described above, the encoding device 180 sets the weighting generation information, and thus the weighting information can be shared or predicted between the base layer and the enhancement layer. Thus, it is possible to reduce the information amount of the enhancement stream and improve the coding efficiency.

(Exemplary Configuration of Decoding Device According to Second Embodiment)

Figure 57:
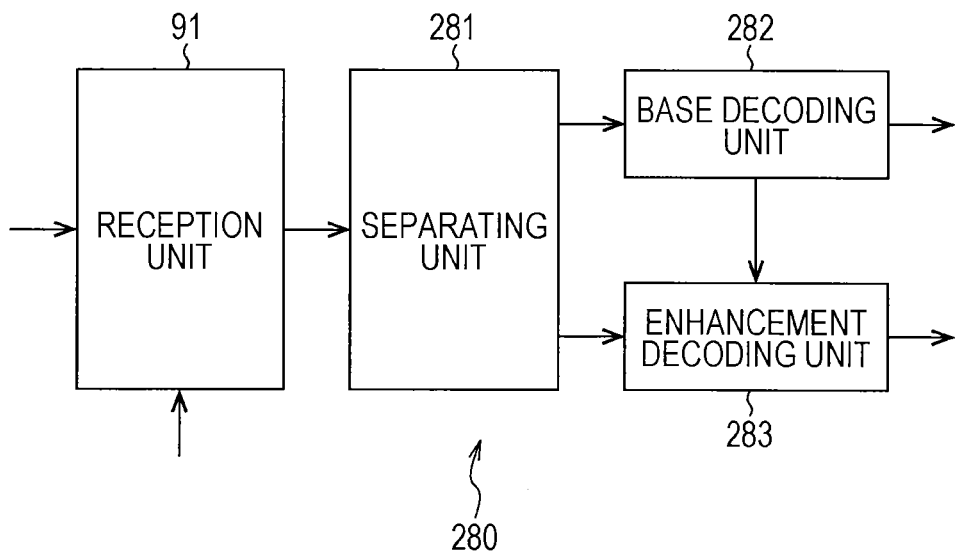
FIG. 57 is a block diagram illustrating an exemplary configuration of a decoding device according to the second embodiment of the present technology.

FIG. 57 is a block diagram illustrating an exemplary configuration of a decoding device according to a second embodiment of the present technology that decodes the encoded stream for all layers transmitted from the encoding device 180 of FIG. 39.

Among components illustrated in FIG. 57, the same components of FIG. 29 are denoted by the same reference numerals. A duplicated description will be appropriately omitted.

A configuration of a decoding device 280 of FIG. 57 differs from the configuration of FIG. 29 in that a separating unit 281, a base decoding unit 282, and an enhancement decoding unit 283 are disposed instead of the separating unit 92, the base decoding unit 93, and the enhancement decoding unit 94.

The separating unit 281 of the decoding device 280 separates the base stream from the encoded stream for all layers supplied from the reception unit 91, supplies the base stream to the base decoding unit 282, separates the enhancement stream, and supplies the enhancement stream to the enhancement decoding unit 283.

The base decoding unit 282 has the same configuration as the decoding device of the HEVC scheme according to the related art, and decodes the base stream supplied from the separating unit 281 according to the HEVC scheme and generates the base image. Here, the base decoding unit 282 supplies the weighting information used when the base image is decoded and the flag (weighted_bipred_flag) and the flag (weighted_pred_flag) included in the PPS of the base stream to the enhancement decoding unit 283. The base decoding unit 282 outputs the generated base image.

The enhancement decoding unit 283 decodes the enhancement stream supplied from the separating unit 281 according to the scheme complying with the HEVC scheme, and generates the enhancement image. At this time, the enhancement decoding unit 283 decodes the enhancement stream with reference to the weighting information, the flag (weighted_bipred_flag), and the flag (weighted_pred_flag) supplied from the base decoding unit 282. The enhancement decoding unit 283 outputs the generated enhancement image.

(Exemplary Configuration of Enhancement Decoding Unit)

Figure 58:
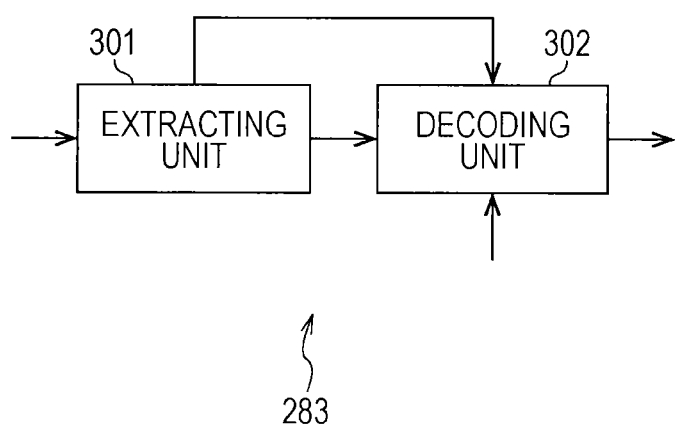
FIG. 58 is a block diagram illustrating an exemplary configuration of an enhancement decoding unit of FIG. 57.

FIG. 58 is a block diagram illustrating an exemplary configuration of the enhancement decoding unit 283 of FIG. 57.

The enhancement decoding unit 283 of FIG. 58 includes an extracting unit 301 and a decoding unit 302.

The extracting unit 301 of the enhancement decoding unit 283 extracts an SPS, a PPS, encoded data, and the like from the enhancement stream supplied from the separating unit 281 of FIG. 57, and supplies the SPS, the PPS, the encoded data, and the like to the decoding unit 302.

The decoding unit 302 decodes the encoded data supplied from the extracting unit 301 according to the scheme complying with the HEVC scheme with reference to the weighting information of the base image, the flag (weighted_bipred_flag), and the flag (weighted_pred_flag) supplied from the base decoding unit 282 of FIG. 57. At this time, the decoding unit 302 also refers to the SPS, the PPS, or the like supplied from the extracting unit 301 as necessary. The decoding unit 302 outputs an image obtained as a result of decoding as the enhancement image.

(Exemplary Configuration of Decoding Unit)

Figure 59:
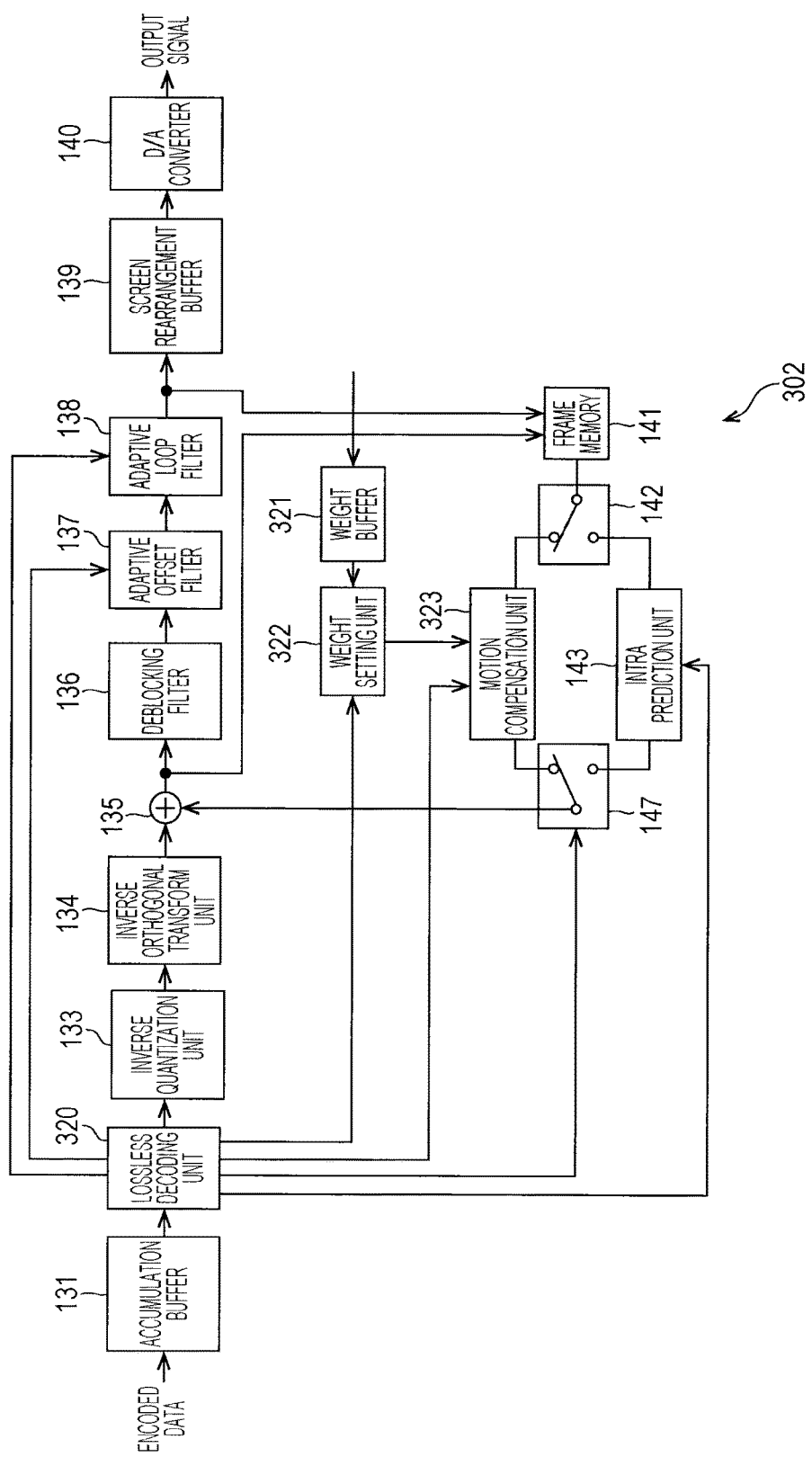
FIG. 59 is a block diagram illustrating an exemplary configuration of a decoding unit of FIG. 58.

FIG. 59 is a block diagram illustrating an exemplary configuration of the decoding unit 302 of FIG. 58.

Among components illustrated in FIG. 59, the same components of FIG. 31 are denoted by the same reference numerals. A duplicated description will be appropriately omitted.

A configuration of the decoding unit 302 of FIG. 59 differs from the configuration of FIG. 31 in that a lossless decoding unit 320, a weight buffer 321, a weight setting unit 322, and a motion compensation unit 323 are disposed instead of the lossless decoding unit 132, the reference buffer 144, the reference image setting unit 145, and the motion compensation unit 146.

The lossless decoding unit 320 of the decoding unit 302 performs lossless decoding such as variable length decoding or arithmetic decoding on the encoded data supplied from the accumulation buffer 131, and obtains the quantized coefficients and the encoding information. The lossless decoding unit 320 supplies the quantized coefficients to the inverse quantization unit 133. Further, the lossless decoding unit 320 supplies the intra prediction mode information serving as the encoding information and the like to the intra prediction unit 143, and supplies the motion vector, the inter prediction mode information, the reference image specifying information, and the like to the motion compensation unit 146.

Further, the lossless decoding unit 320 supplies the weighting generation information serving as the encoding information to the weight setting unit 322. Furthermore, the lossless decoding unit 320 supplies the intra prediction mode information or the inter prediction mode information serving as the encoding information to the switch 147. The lossless decoding unit 320 supplies the offset filter information serving as the encoding information to the adaptive offset filter 137, and supplies the filter coefficient to the adaptive loop filter 138.

The weight buffer 321 stores the weighting information of the base image, the flag (weighted_bipred_flag), and the flag (weighted_pred_flag) supplied from the base decoding unit 282 of FIG. 57.

The weight setting unit 322 instructs the motion compensation unit 323 to perform the weighted prediction based on the flag (weighted_bipred_flag) and the flag (weighted_ pred_flag) stored in the weight buffer 321 and a type of a slice of an image to be currently decoded.

Further, the weight setting unit 322 generates the weighting information of the enhancement image based on the weighting information of the base image stored in the weight buffer 321 and the weighting generation information supplied from the lossless decoding unit 320. The weight setting unit 322 supplies the generated weighting information to the motion compensation unit 323.

The motion compensation unit 323 reads the reference image specified by the reference image specifying information supplied from the lossless decoding unit 320 from the frame memory 141 via the switch 142. The motion compensation unit 323 performs the motion compensation process using the weighted prediction of the optimal inter prediction mode indicated by the inter prediction mode information by using the motion vector, the reference image, and the weighting information supplied from the weight setting unit 322 based on the weighted prediction instruction supplied from the weight setting unit 322.

Specifically, the motion compensation unit 323 functions as a weighting processing unit, and performs the compensation process on the reference image based on the motion vector, performs the weighted prediction on the reference image that has been subjected to the compensation process using the weighting information, and generates the predicted image. The motion compensation unit 323 supplies the predicted image to the switch 147.

(Exemplary Configuration of Weight Buffer and Weight Setting Unit)

Figure 60:
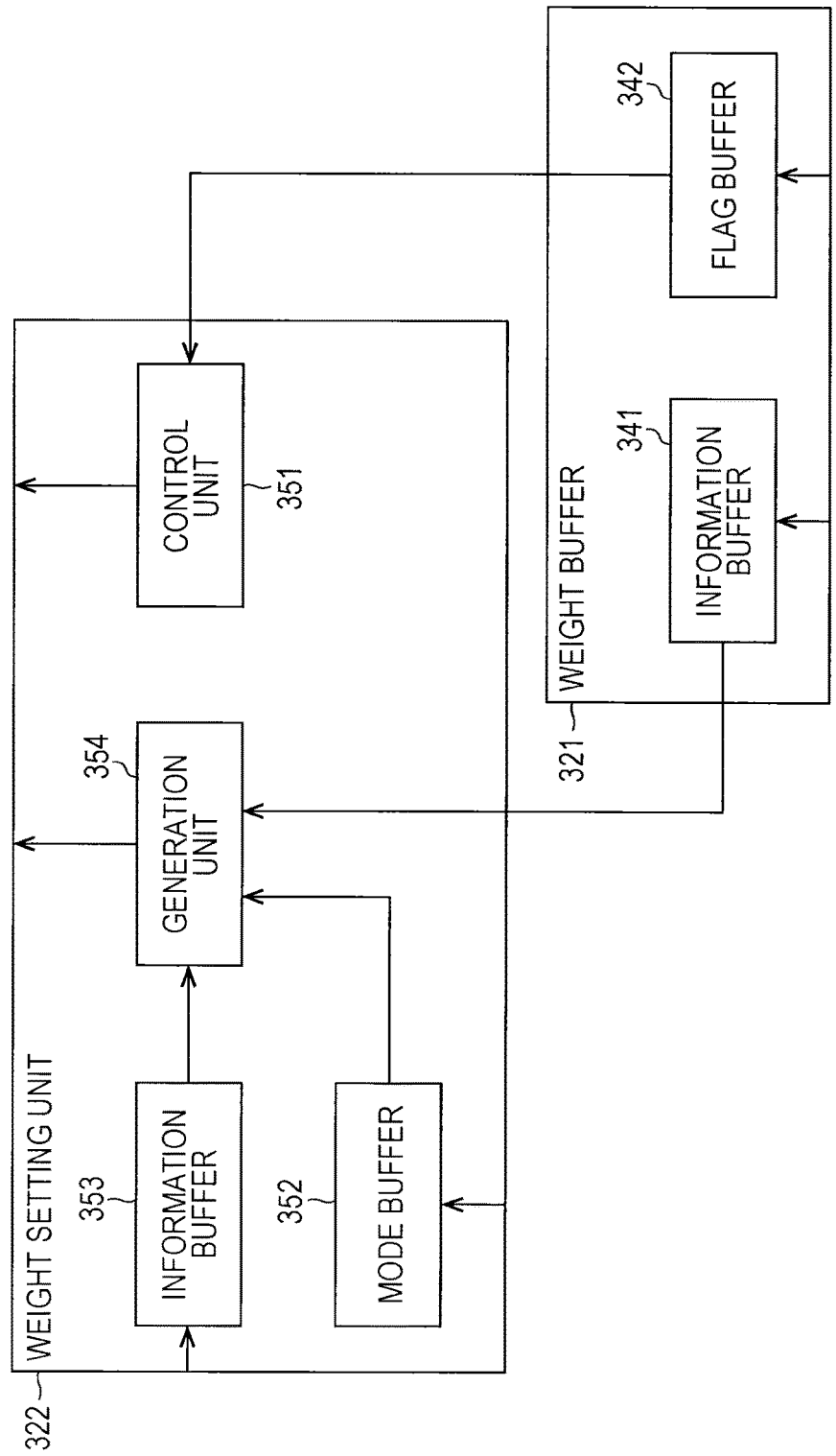
FIG. 60 is a block diagram illustrating an exemplary configuration of a weight buffer and a weight setting unit of FIG. 59.

FIG. 60 is a block diagram illustrating an exemplary configuration of the weight buffer 321 and the weight setting unit 322 of FIG. 59.

The weight buffer 321 of FIG. 60 includes an information buffer 341 and a flag buffer 342.

The information buffer 341 of the weight buffer 321 stores the weighting information included in the slice header of the base stream supplied from the base decoding unit 282 of FIG. 57. The flag buffer 342 stores the flag (weighted_bipred_flag) and the flag (weighted_pred_flag) included in the PPS of the base stream supplied from the base decoding unit 282.

The weight setting unit 322 of FIG. 60 includes a control unit 351, a mode buffer 352, an information buffer 353, and a generation unit 354.

The control unit 351 of the weight setting unit 322 reads the flag (weighted_pred_flag) and the flag (weighted_bipred_flag) from the flag buffer 342. The weight setting unit 322 instructs the motion compensation unit 323 to perform the weighted prediction based on the flag (weighted_pred_flag), the flag (weighted_bipred_flag), and a type of a slice of an image to be currently decoded.

The mode buffer 352 acquires the prediction mode of the weighting information among the weighting generation information supplied from the lossless decoding unit 320 of FIG. 59, and stores the acquired prediction mode of the weighting information. The information buffer 353 acquires the weighting information or the difference of the weighting information among the weighting generation information supplied from the lossless decoding unit 320, and stores the acquired weighting information or the acquired difference of the weighting information.

The generation unit 354 reads the prediction mode of the weighting information from the mode buffer 352. When the prediction mode of the weighting information is the copy mode or the differential prediction mode, the generation unit 354 reads the weighting information of the base image from the information buffer 341. When the prediction mode of the weighting information is the copy mode, the generation unit 354 generates the weighting information of the base image as the weighting information of the enhancement image.

Meanwhile, when the prediction mode of the weighting information is the differential prediction mode, the generation unit 354 reads the difference of the weighting information from the information buffer 353. The generation unit 354 adds the difference of the weighting information to the weighting information of the base image, and generates an addition value obtained as the result as the weighting information of the enhancement image.

Further, when the prediction mode of the weighting information is the non-prediction mode, the generation unit 354 reads the weighting information from the information buffer 353, and generates the weighting information as the weighting information of the enhancement image. The generation unit 354 supplies the generated weighting information of the enhancement image to the motion compensation unit 323.

(Description of Processing of Decoding Device)

Figure 61:
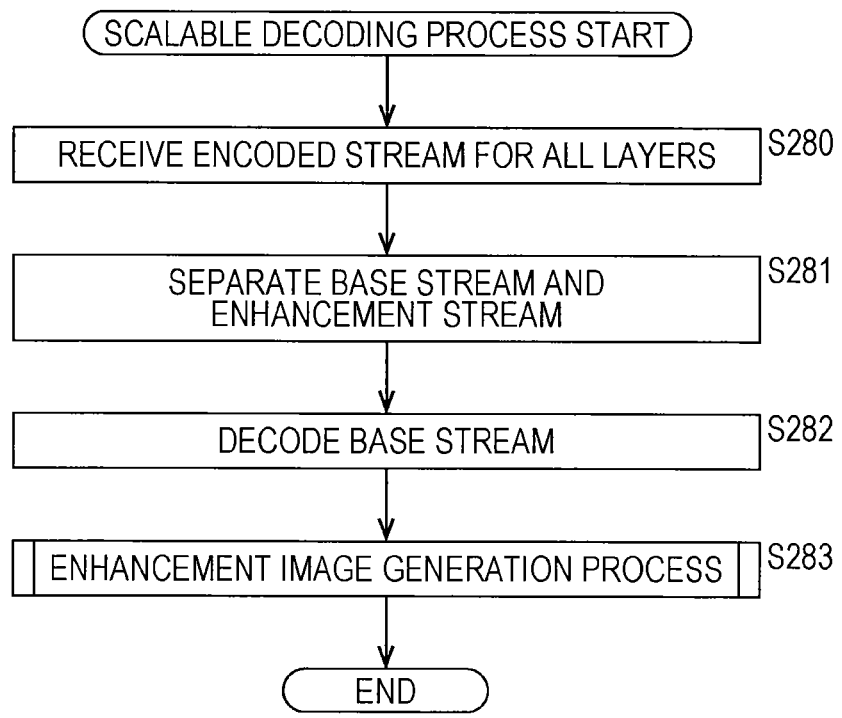
FIG. 61 is a flowchart for describing a scalable decoding process of a decoding device of FIG. 57.

FIG. 61 is a flowchart for describing the scalable decoding process of the decoding device 280 of FIG. 57.

In step S280 of FIG. 61, the reception unit 91 of the decoding device 280 receives the encoded stream for all layers transmitted from the encoding device 180 of FIG. 39, and supplies the received encoded stream to the separating unit 281.

In step S281, the separating unit 281 separates the base stream and the enhancement stream from the encoded stream for all layers. The separating unit 281 supplies the base stream to the base decoding unit 282, and supplies the enhancement stream to the enhancement decoding unit 283.

In step S282, the base decoding unit 282 decodes the base stream supplied from the separating unit 281 according to the HEVC scheme, and generates the base image. At this time, the base decoding unit 282 supplies the weighting information used when the base image is decoded and the flag (weighted_bipred_flag) and the flag (weighted_pred_flag) included in the PPS of the base stream to the enhancement decoding unit 283. The base decoding unit 282 outputs the generated base image.

In step S283, the enhancement decoding unit 283 performs the enhancement image generation process with reference to the weighting information supplied from the base decoding unit 282, the flag (weighted_bipred_flag), and the flag (weighted_pred_flag). The enhancement image generation process is similar to the enhancement image generation process of FIG. 34 except for the decoding process of step S112 of FIG. 34, and the following description will proceed with the decoding process.

Figure 62:
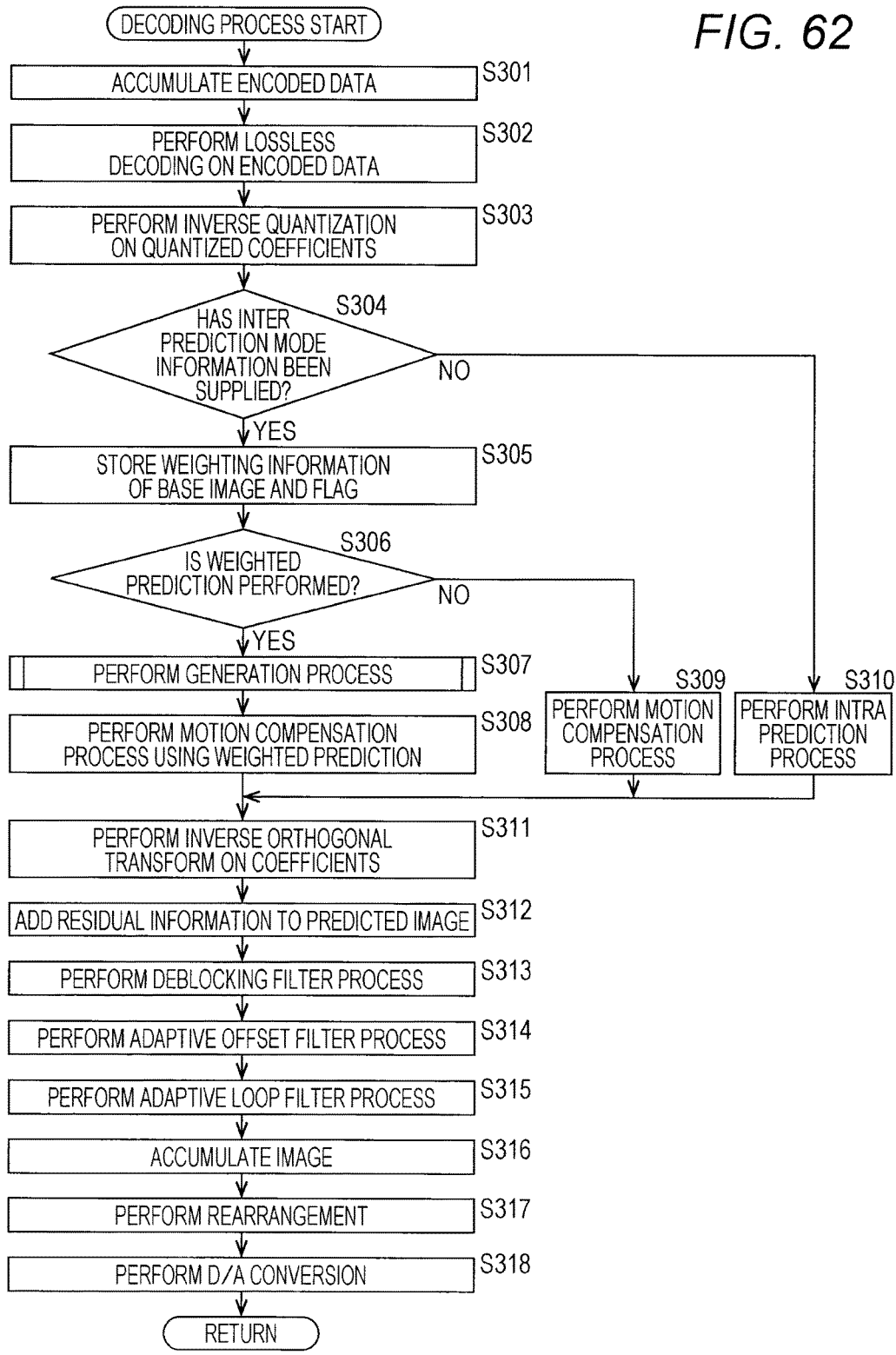
FIG. 62 is a flowchart for describing the details of a decoding process of a decoding unit of FIG. 59.

FIG. 62 is a flowchart for describing the details of the decoding process of the decoding unit 302 of FIG. 59.

In step S301 of FIG. 62, the accumulation buffer 131 of the enhancement decoding unit 283 receives the encoded data of the frame unit from the extracting unit 301 of FIG. 58, and accumulates the encoded data. The accumulation buffer 131 supplies the accumulated encoded data to the lossless decoding unit 320.

In step S302, the lossless decoding unit 320 performs lossless decoding on the encoded data supplied from the accumulation buffer 131, and obtains the quantized coefficients and the encoding information. The lossless decoding unit 320 supplies the quantized coefficients to the inverse quantization unit 133. Further, the lossless decoding unit 320 supplies the intra prediction mode information serving as the encoding information and the like to the intra prediction unit 143, and supplies the motion vector, the inter prediction mode information, the reference image specifying information, and the like to the motion compensation unit 323.

Further, the lossless decoding unit 320 supplies the weighting generation information serving as the encoding information to the weight setting unit 322. Furthermore, the lossless decoding unit 320 supplies the intra prediction mode information or the inter prediction mode information serving as the encoding information to the switch 147. The lossless decoding unit 320 supplies the offset filter information serving as the encoding information to the adaptive offset filter 137, and supplies the filter coefficient to the adaptive loop filter 138.

The process of steps S303 and S304 is similar to the process of steps S133 and S134 of FIG. 35, and thus a description thereof is omitted.

In step S305, the information buffer 341 (FIG. 60) of the weight buffer 321 stores the weighting information of the base image supplied from the base decoding unit 282 of FIG. 57, and the flag buffer 342 stores the flag (weighted_bipred_flag) and the flag (weighted_pred_flag).

In step S306, the control unit 351 determines whether or not the weighted prediction is performed based on the flag (weighted_bipred_flag) and the flag (weighted_pred_flag) stored in the flag buffer 342 and a type of a slice of an image to be currently decoded.

When the weighted prediction is determined to be performed in step S306, the control unit 351 instructs the motion compensation unit 323 to perform the weighted prediction, and the process proceeds to step S307. In step S307, the weight setting unit 322 performs a generation process of generating the weighting information of the enhancement image based on the weighting generation information supplied from the lossless decoding unit 320, the weighting information of the base image stored in the weight buffer 321, and the like. The details of the generation process will be described with reference to FIG. 63 which will be described later.

In step S308, the motion compensation unit 323 reads the reference image based on the reference image specifying information supplied from the lossless decoding unit 320, and performs the motion compensation process using the weighted prediction of the optimal inter prediction mode indicated by the inter prediction mode information by using the motion vector, the reference image, and the weighting information supplied from the weight setting unit 322. The motion compensation unit 146 supplies the predicted image generated as the result to the addition unit 135 via the switch 147, and the process proceeds to step S311.

Meanwhile, when the weighted prediction is determined to be not performed in step S306, in step S309, the motion compensation unit 323 reads the reference image based on the reference image specifying information supplied from the lossless decoding unit 320, and performs the motion compensation process of the optimal inter prediction mode indicated by the inter prediction mode information using the motion vector and the reference image. The motion compensation unit 146 supplies the predicted image generated as the result to the addition unit 135 via the switch 147, and the process proceeds to step S311.

The process of steps S310 to S318 is similar to the process of steps S138 to S146 of FIG. 35, and thus a description thereof is omitted.

Figure 63:
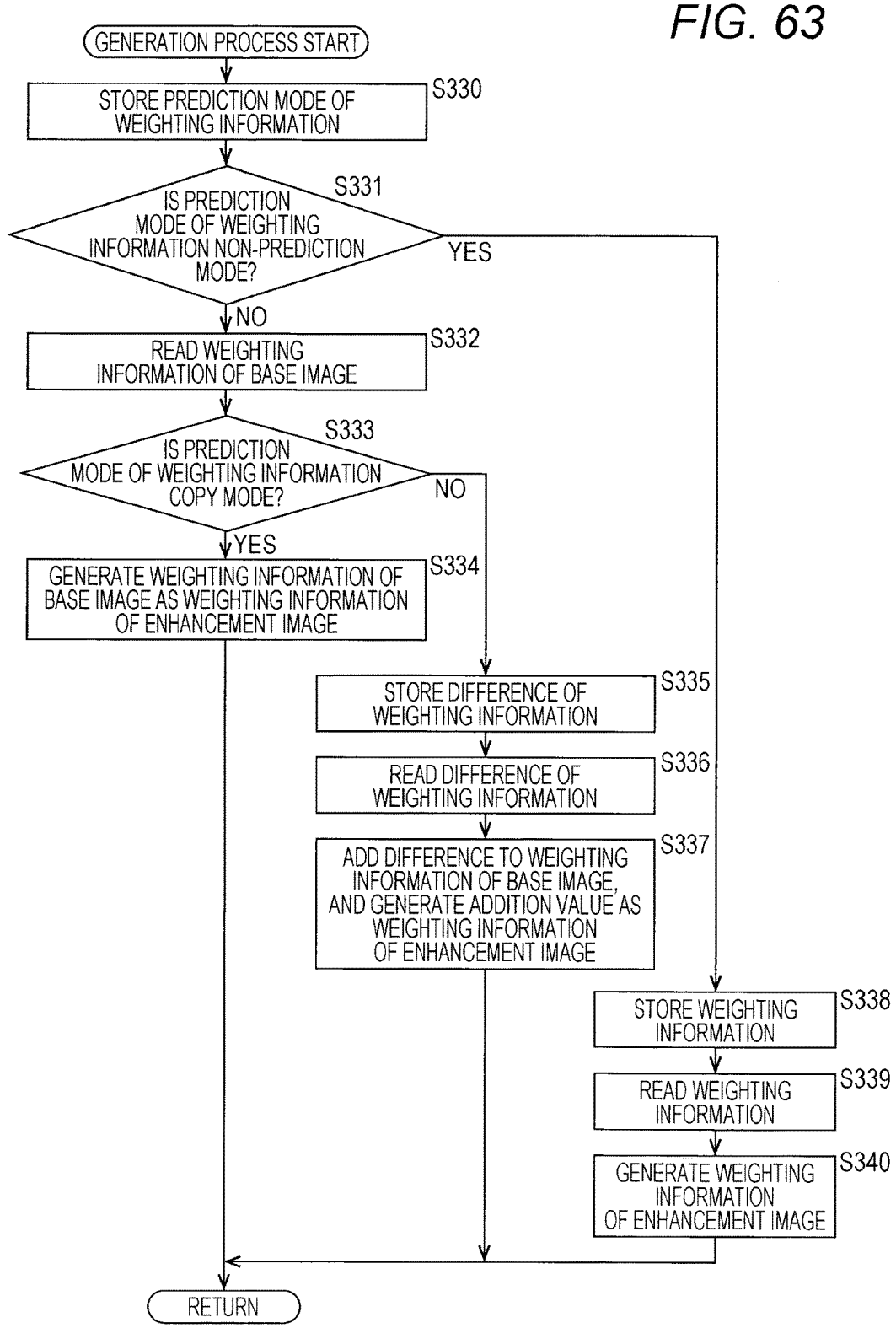
FIG. 63 is a flowchart for describing the details of a generation process of FIG. 62.

FIG. 63 is a flowchart for describing the details of the generation process of step S307 of FIG. 62.

In step S330 of FIG. 63, the mode buffer 352 of the weight setting unit 322 acquires the prediction mode of the weighting information among the weighting generation information supplied from the lossless decoding unit 320 of FIG. 59, and stores the acquired prediction mode of the weighting information.

In step S331, the generation unit 354 determines whether or not the prediction mode of the weighting information stored in the mode buffer 352 is the non-prediction mode.

When the prediction mode of the weighting information is determined to be not the non-prediction mode in step S331, that is, when the prediction mode of the weighting information is the copy mode or the differential prediction mode, the process proceeds to step S332. In step S332, the weighting information of the base image is read from the information buffer 341.

In step S333, the generation unit 354 determines whether or not the prediction mode of the weighting information is the copy mode. When the prediction mode of the weighting information is determined to be the copy mode in step S333, in step S334, the generation unit 354 generates the weighting information of the base image as the weighting information of the enhancement image, and supplies the generated weighting information of the base image to the motion compensation unit 323. Then, the generation process ends.

Meanwhile, when the prediction mode of the weighting information is determined to be not the copy mode in step S333, that is, when the prediction mode of the weighting information is the differential prediction mode, the process proceeds to step S335. In step S335, the information buffer 353 acquires the difference of the weighting information among the weighting generation information supplied from the lossless decoding unit 320, and stores the difference of the weighting information. In step S336, the generation unit 354 reads the difference of the weighting information from the information buffer 353.

In step S337, the generation unit 354 adds the difference of the weighting information to the weighting information of the base image, and generates an addition value obtained as the result as the weighting information of the enhancement image. The generation unit 354 supplies the generated weighting information of the enhancement image to the motion compensation unit 323, and the generation process ends.

Further, when the prediction mode of the weighting information is determined to be the non-prediction mode in step S331, in step S338, the information buffer 353 acquires the weighting information among the weighting generation information supplied from the lossless decoding unit 320, and stores the acquired weighting information. In step S339, the generation unit 354 reads the weighting information from the information buffer 353.

In step S340, the generation unit 354 generates the weighting information read in step S339 as the weighting information of the enhancement image, and supplies the generated weighting information to the motion compensation unit 323. Then, the generation process ends.

As described above, the decoding device 280 generates the weighting information of the enhancement image using the weighting generation information, and thus the weighting information can be shared or predicted between the base layer and the enhancement layer. Thus, it is possible to reduce the information amount of the enhancement stream and improve the coding efficiency.

Further, in the second embodiment, similarly to the first embodiment, the VPS may be the VPS illustrated in FIG. 23.

Further, in the first and second embodiments, the number of layers is 2, but the number of layers may be 2 or larger. The reference layer may be set in units of pictures or may be set in units of GOPs. The same is true of a third embodiment and a fourth embodiment which will be described later.

Further, in the first and second embodiments, the base image is encoded according to the HEVC scheme but may be encoded according to the AVC scheme. In this case, in the second embodiment, the information (pred_weight_table) related to the weighting information of the base image in the AVC scheme is converted into the information (pred_weight_table) related to the weighting information in the HEVC scheme through Formulas (5) to (8) and then used.

<Third Embodiment>

(Description of Overview of Third Embodiment)

Figure 64:
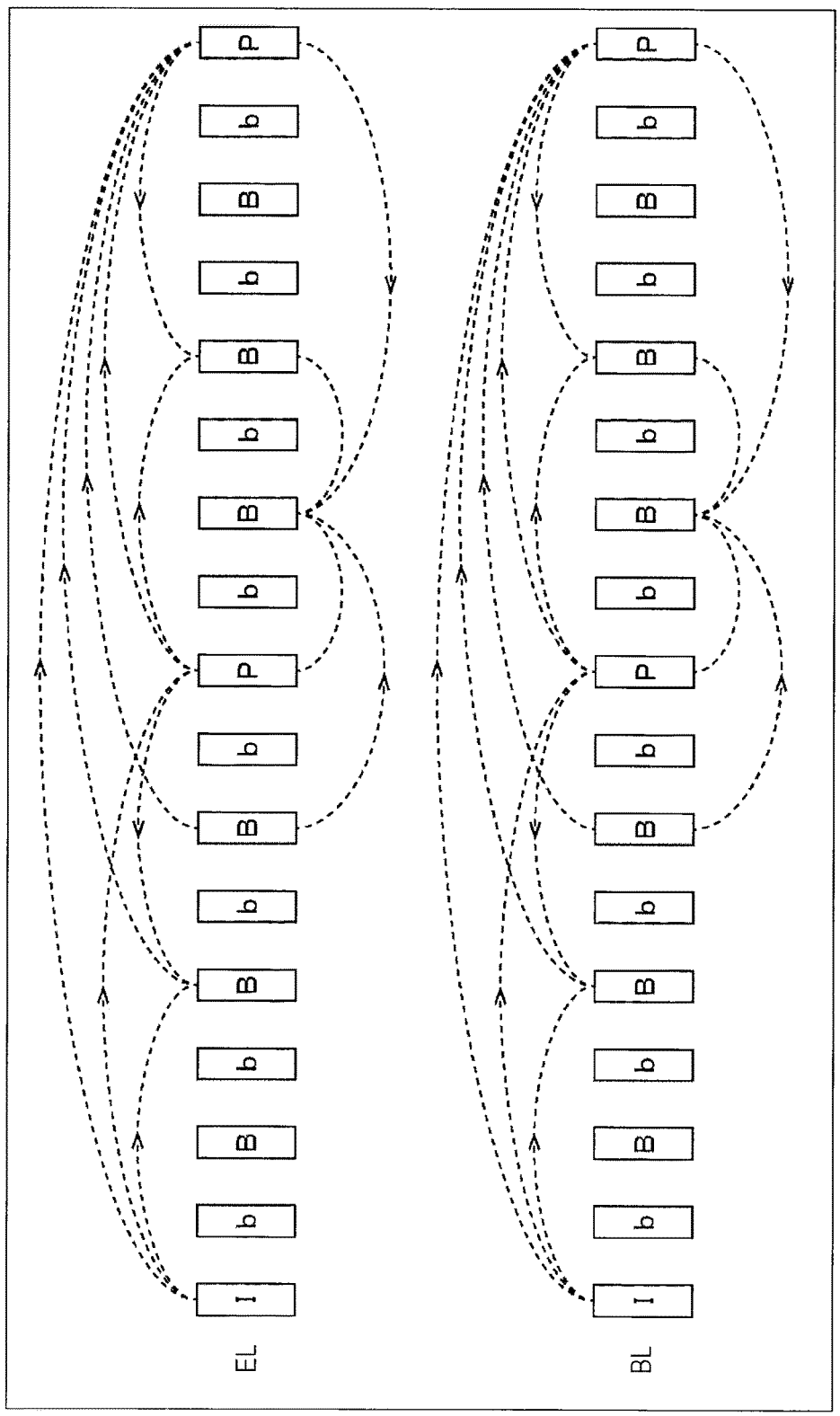
FIG. 64 is a diagram for describing an overview of a third embodiment of the present technology.

FIG. 64 is a diagram for describing an overview according to a third embodiment of the present technology.

As illustrated in FIG. 64, there are many cases in which a GOP (Group of Picture) structure of the base image (BL) is identical to a GOP structure of the enhancement image (EL). In other words, the base image and the enhancement are consistently identical in a slice type and a reference relation in a time direction at a same time. Thus, in the third embodiment, the reference image specifying information is shared between different layers. Specifically, as the reference image specifying information of a certain slice of the enhancement image, the reference image specifying information of a slice of the base image collocated with the slice is used.

Further, "collated" means that positions on a screen correspond to each other. For example, a slice of the base image collated with a slice of the enhancement image is a slice including an LCU of the base image that corresponds in a position on a screen to an LCU at the head of the slice of the image.

(Exemplary Configuration of Encoding Device According to Third Embodiment)

Figure 65:
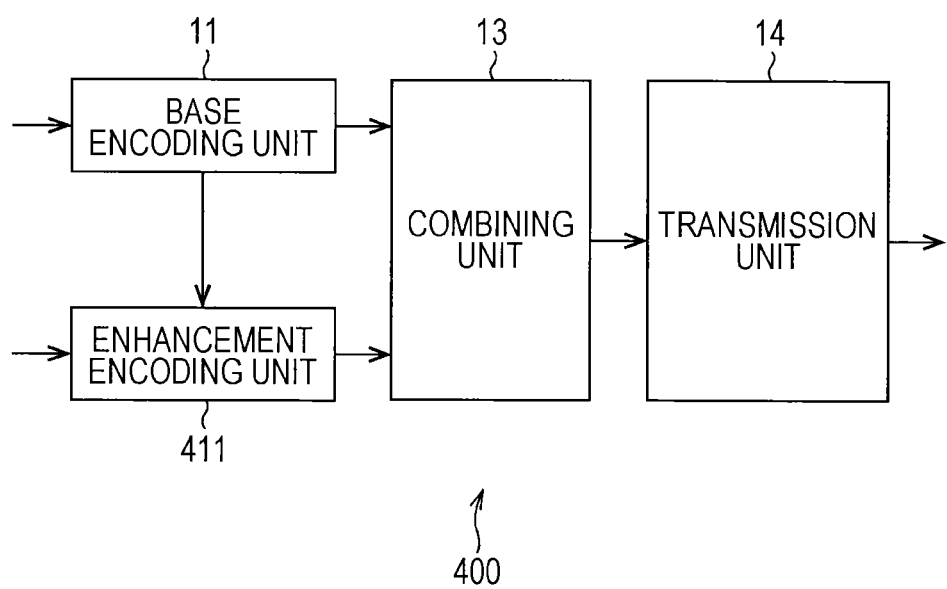
FIG. 65 is a block diagram illustrating an exemplary configuration of an encoding device according to the third embodiment of the present technology.

FIG. 65 is a block diagram illustrating an exemplary configuration of an encoding device according to the third embodiment of the present technology.

Among components illustrated in FIG. 65, the same components of FIG. 6 are denoted by the same reference numerals. A duplicated description will be appropriately omitted.

The encoding device 400 of FIG. 65 differs from a configuration of FIG. 6 in that an enhancement encoding unit 411 is disposed instead of the enhancement encoding unit 12. In the encoding device 400, all reference image specifying information is shared between the base image and the enhancement image.

Specifically, the enhancement image is input to the enhancement encoding unit 411 of the encoding device 400 from the outside. The enhancement encoding unit 411 encodes the enhancement image according to the scheme complying with the HEVC scheme.

Further, the enhancement encoding unit 411 sets a copy flag as the reference image specifying generation information (the reference image generation information) using the reference image specifying information of the base image supplied from the base encoding unit 11. Then, the enhancement encoding unit 411 adds the copy flag and the like to the encoding result, and generates encoded data. Further, the copy flag is a flag indicating whether or not all reference image specifying information of the base image is used as the reference image specifying information of the enhancement image.

The enhancement encoding unit 411 supplies the encoded stream including the encoded data, the SPS, the PPS, and the like to the combining unit 13 as the enhancement stream.

Here, the encoding device 400 is assumed transmit the encoded stream for all layers but may transmit only the base stream as necessary.

(Exemplary Configuration of Enhancement Encoding Unit)

Figure 66:
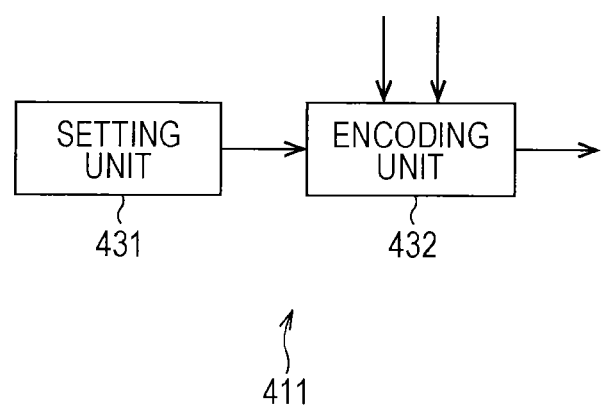
FIG. 66 is a block diagram illustrating an exemplary configuration of an enhancement encoding unit of FIG. 65.

FIG. 66 is a block diagram illustrating an exemplary configuration of the enhancement encoding unit 411 of FIG. 65.

The enhancement encoding unit 411 of FIG. 66 includes a setting unit 431 and an encoding unit 432.

The setting unit 431 of the enhancement encoding unit 411 sets a parameter set including the copy flag such as the SPS and the PPS as necessary. The setting unit 431 supplies the set parameter set to the encoding unit 432.

The encoding unit 432 receives the enhancement image of the frame unit input from the outside as the input signal, and encodes the enhancement image according to the scheme complying with the HEVC scheme. Further, the encoding unit 432 sets the copy flag based on the reference image specifying information used at a time of encoding and the reference image specifying information supplied from the base encoding unit 11.

The encoding unit 432 adds the copy flag and the like to the encoding result based on the set copy flag and the copy flag included in the SPS supplied from the setting unit 431, and generates encoded data. Then, the encoding unit 432 generates an enhancement stream based on the encoded data and the parameter set supplied from the setting unit 431, and supplies the enhancement stream to the combining unit 13 of FIG. 65.

(Exemplary Configuration of Encoding Unit)

Figure 67:
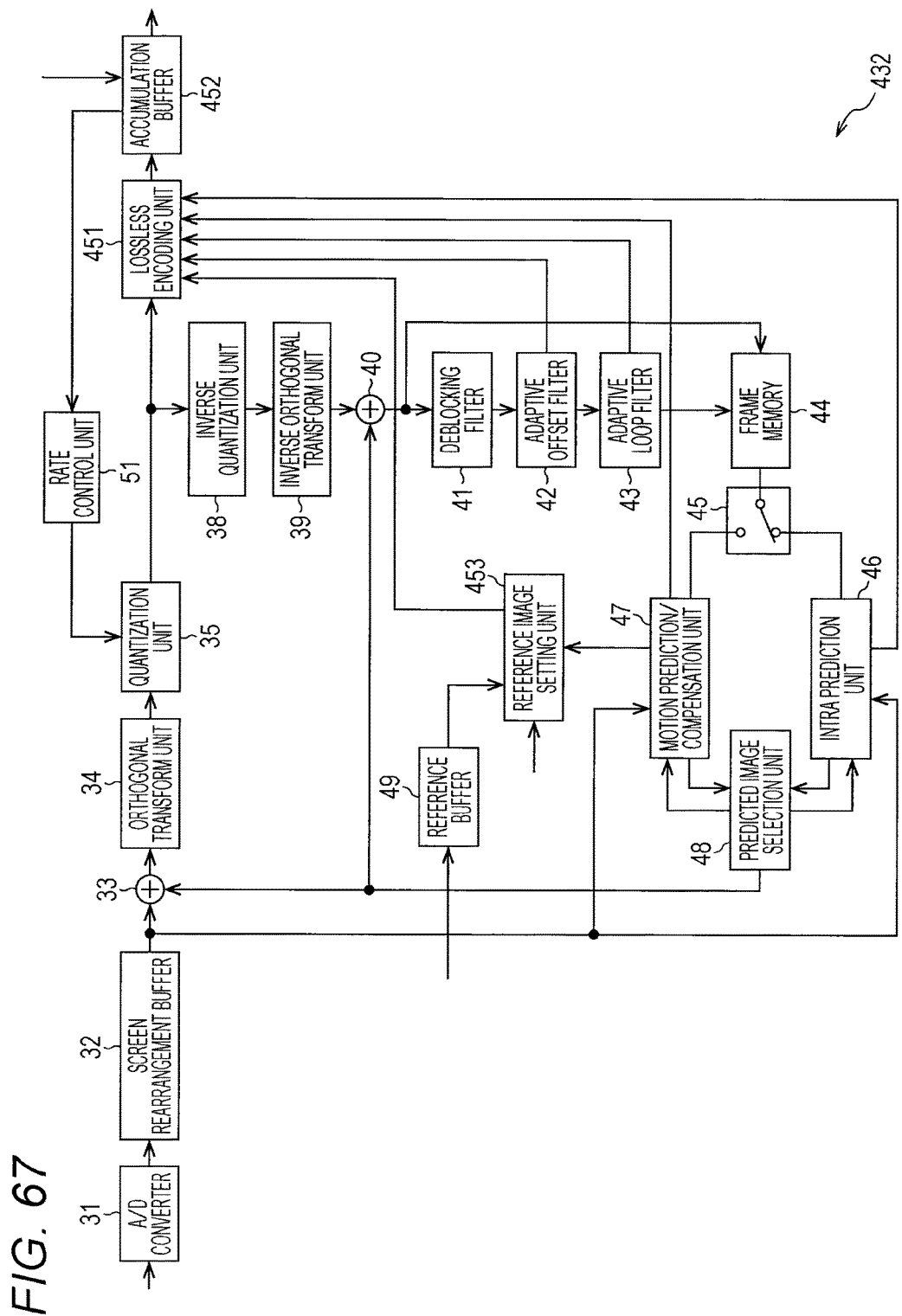
FIG. 67 is a block diagram illustrating an exemplary configuration of an encoding unit of FIG. 66.

FIG. 67 is a block diagram illustrating an exemplary configuration of the encoding unit 432 of FIG. 66.

Among components illustrated in FIG. 67, the same components of FIG. 14 are denoted by the same reference numerals. A duplicated description will be appropriately omitted.

A configuration of the encoding unit 432 of FIG. 67 differs from the configuration of FIG. 14 in that a lossless encoding unit 451, an accumulation buffer 452, and a reference image setting unit 453 are disposed instead of the lossless encoding unit 36, the accumulation buffer 37, and the reference image setting unit 50.

The lossless encoding unit 451 acquires the intra prediction mode information from the intra prediction unit 46. Further, the lossless encoding unit 451 acquires the inter prediction mode information, the motion vector, and the like supplied from the motion prediction/compensation unit 47 from the motion prediction/compensation unit 47. Furthermore, the lossless encoding unit 451 acquires the RPS flag, the copy flag, and the like from the reference image setting unit 453. Further, the lossless encoding unit 451 acquires the offset filter information from the adaptive offset filter 42, and acquires the filter coefficient from the adaptive loop filter 43.

The lossless encoding unit 451 performs lossless coding on the quantized coefficients supplied from the quantization unit 35. Further, the lossless encoding unit 451 performs lossless coding on either of the intra prediction mode information or the inter prediction mode information, the motion vector, the RPS flag, the copy flag, the offset filter information, and the filter coefficient as the encoding information. The lossless encoding unit 451 adds the lossless encoded encoding information to the lossless-encoded coefficients, and generates encoded data. The lossless encoding unit 451 supplies the encoded data to be accumulated in the accumulation buffer 452.

The accumulation buffer 452 temporarily stores the encoded data supplied from the lossless encoding unit 451. Further, the accumulation buffer 452 supplies the stored encoded data to the combining unit 13 (FIG. 65) as the enhancement stream together with the parameter set supplied from the setting unit 431 of FIG. 66.

The reference image setting unit 453 compares the reference image specifying information supplied from the motion prediction/compensation unit 47 with the reference image specifying information stored in the reference buffer 49, and sets the copy flag. Then, when the set copy flag is different from the copy flag included in the SPS supplied from the setting unit 431, the reference image setting unit 453 supplies the set copy flag to the lossless encoding unit 451.

Further, the reference image setting unit 453 compares the reference image specifying information supplied from the motion prediction/compensation unit 47 with the reference image specifying information included in the SPS based on the set copy flag, sets the RPS flag, and supplies the RPS flag to the lossless encoding unit 451. Furthermore, the reference image setting unit 453 supplies the reference image specifying information supplied from the motion prediction/compensation unit 47 to the lossless encoding unit 451 based on the RPS flag, and supplies the index specifying the reference image specifying information included in the SPS that is identical to the reference image specifying information to the lossless encoding unit 451.

(First Example of Syntax of SPS of Enhancement Stream)

FIG. 68 is a diagram illustrating an exemplary syntax of an SPS set by the setting unit 431 of FIG. 66.

As illustrated in a 3-rd line of FIG. 68, a copy flag (inter_layer_copy_flag) is set to the SPS of the enhancement stream. The copy flag is 1 when the reference image specifying information of the base image is used as the reference image specifying information of the enhancement image and 0 when the reference image specifying information of the base image is not used as the reference image specifying information of the enhancement image.

Further, as illustrated in 4-th to 14-th lines of FIG. 68, when the copy flag is 0, similarly to the SPS of the base stream, information related to the RPS and information related to the reference image specifying information of the long term are set.

(First Example of Syntax of Slice Header of Enhancement Stream)

FIG. 69 is a diagram illustrating an exemplary syntax of a slice header of an enhancement stream.

As illustrated in a 5-th line of FIG. 69, when the copy flag of the corresponding slice is different from the copy flag included in the SPS, the copy flag is set to the slice header of the enhancement stream. Further, as illustrated in 6-th to 15-th lines, when the copy flag of the corresponding slice is 0, similarly to the slice header of the base stream, the RPS flag and the RPS or the index of the RPS are set, and the reference image specifying information of the long term is set according to the long term flag.

(Description of Effects)

FIG. 70 is a diagram for describing effects in the encoding device 400.

As described above, in the encoding device 400, when the copy flag is set to the SPS, when the copy flag of each slice is different from the copy flag of the SPS, the copy flag is set to the slice header of the slice. Thus, a decoding device which will be described later has only to update the copy flag only when the copy flag is included in the slice header and thus can easily perform a process of recognizing the reference image specifying information using the copy flag.

On the other hand, in Do-Kyoung Kwon, Madhukar Budagavi, Minhua Zhou, "Inter-layer slice header syntax element prediction in SHVC", JCTVC-L0231, 2013.1.14-1.23, it is proposed that the copy flag is not set to the SPS, and as illustrated in a 5-th line of FIG. 70, a copy flag (inter_layer_rps_prediction_flag) is consistently set to each slice header. In this case, in the decoding device, it is necessary to update the copy flag in units of slices, and thus the process of recognizing the reference image specifying information using the copy flag is complicated.

(Description of First Example of Processing of Encoding Device)

Figure 71:
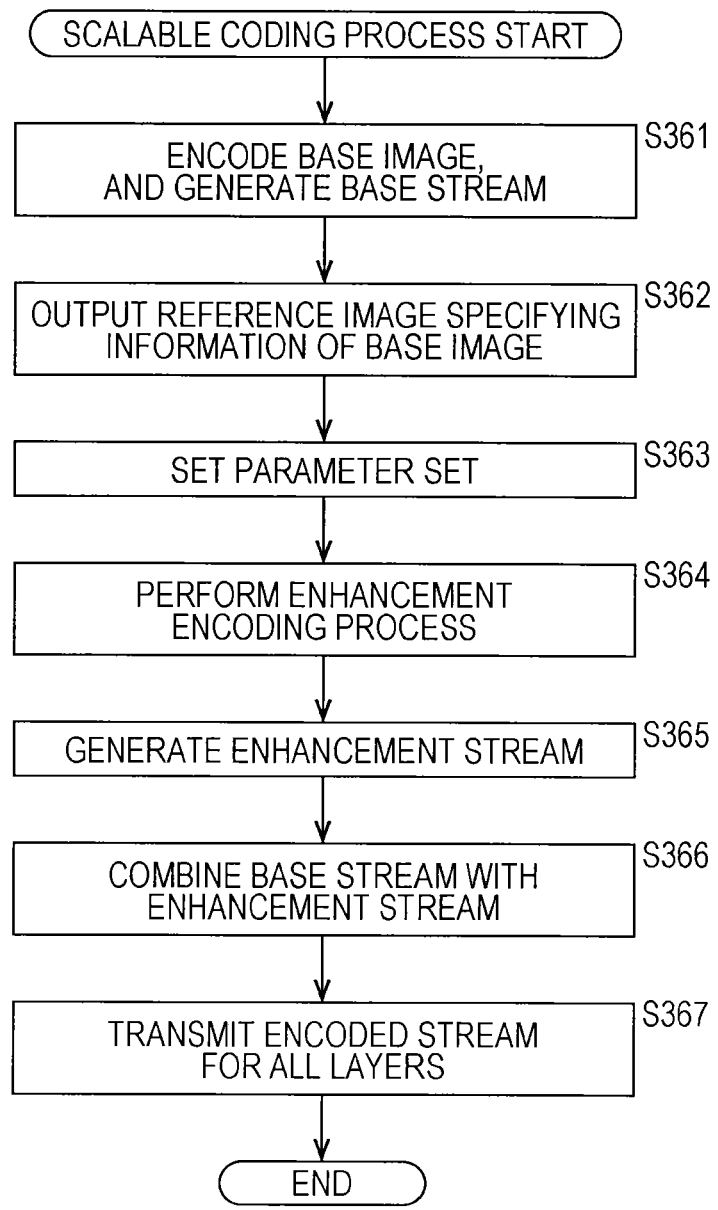
FIG. 71 is a flowchart for describing a scalable coding process of the encoding device of FIG. 65.

FIG. 71 is a flowchart for describing a scalable coding process of the encoding device 400 of FIG. 65.

In step S361 of FIG. 71, the base encoding unit 11 of the encoding device 400 encodes a base image input from the outside according to the HEVC scheme, adds the parameter set, and generates a base stream. Then, the base encoding unit 11 supplies the base stream to the combining unit 13.

In step S362, the base encoding unit 11 outputs the reference image specifying information of the base image to the enhancement encoding unit 411.

In step S363, the setting unit 431 (FIG. 66) of the enhancement encoding unit 411 sets the parameter set of the enhancement image. In step S364, the encoding unit 432 performs an enhancement encoding process of encoding the enhancement image input from the outside.

The enhancement encoding process is similar to the encoding process of FIGS. 26 and 27 except that a copy flag setting process of setting the copy flag and the like is performed instead of the generation process of step S38 of FIG. 26, and the process of step S54 of FIG. 27 is not performed. Thus, the copy flag setting process will be described in detail with reference to FIG. 73 which will be described later.

In step S365, the accumulation buffer 452 (FIG. 67) of the encoding unit 432 generates an enhancement stream based on the encoded data generated in step S364 and the parameter set supplied from the setting unit 431, and outputs the enhancement stream to the combining unit 13.

In step S366, the combining unit 13 combines the base stream supplied from the base encoding unit 11 with the enhancement stream supplied from the enhancement encoding unit 411, adds the VPS and the like, and generates an encoded stream for all layers. The combining unit 13 supplies the encoded stream for all layers to the transmission unit 14.

In step S367, the transmission unit 14 transmits the encoded stream for all layers supplied from the combining unit 13 to the decoding device which will be described later, and the process ends.

Figure 72:
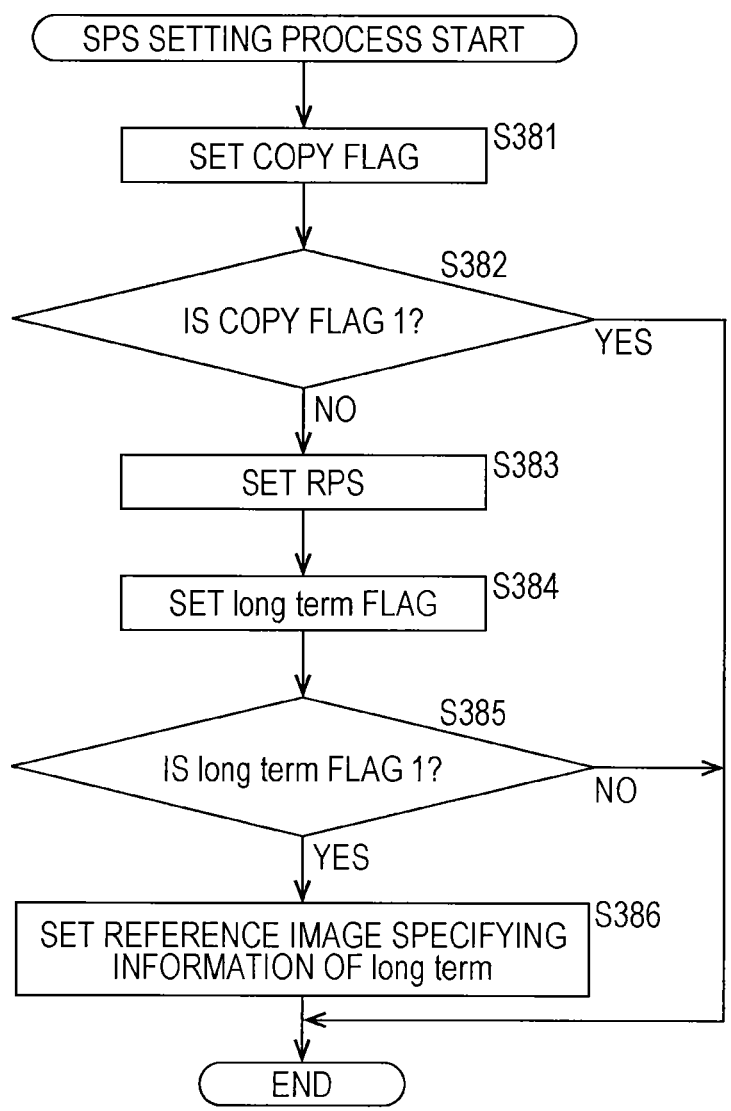
FIG. 72 is a flowchart for describing the details of a SPS setting process in the scalable coding process of FIG. 71.

FIG. 72 is a flowchart for describing the details of an SPS setting process of setting an SPS in the process of step S363 of FIG. 71.

In step S381 of FIG. 72, the setting unit 431 sets the copy flag to the SPS. In step S382, the setting unit 431 determines whether or not the copy flag set to the SPS is 1.

When the copy flag is determined to be not 1 in step S382, that is, when the copy flag is 0, in step S383, the setting unit 431 sets the RPS to the SPS.

In step S384, the setting unit 431 sets the long term flag to the SPS. In step S385, the setting unit 431 determines whether or not the long term flag set to the SPS is 1. When the long term flag is determined to be 1 in step S385, in step S386, the setting unit 431 sets the reference image specifying information of the long term, and the process ends.

Meanwhile, when the copy flag is determined to be 1 in step S382 or when the long term flag is determined to be not 1 in step S385, the process ends.

Figure 73:
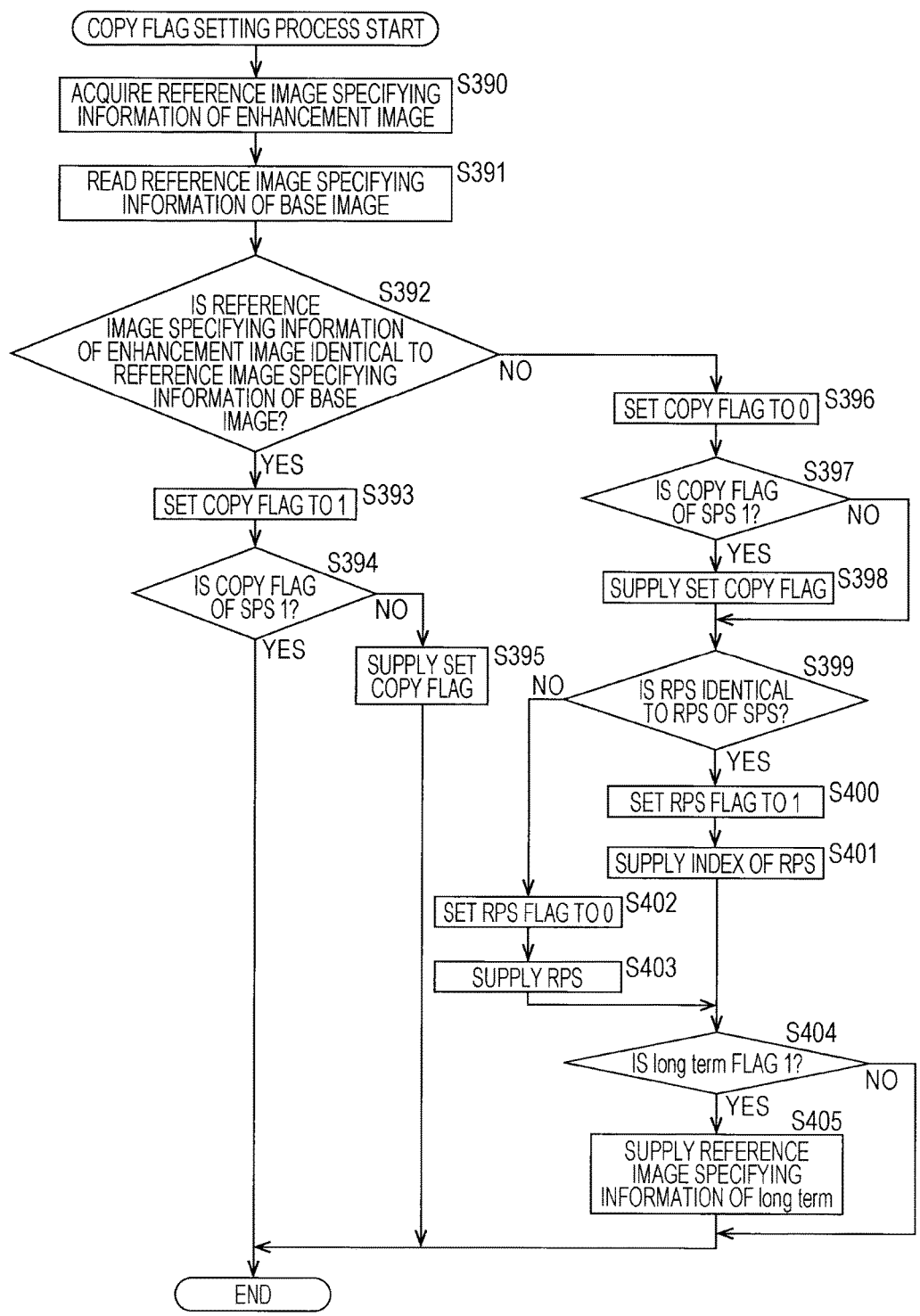
FIG. 73 is a flowchart for describing the details of a copy flag setting process in an enhancement encoding process of FIG. 71.

FIG. 73 is a flowchart for describing the details of a copy flag setting process of the enhancement encoding process of step S364 of FIG. 71. The copy flag setting process is performed, for example, in units of slices.

In step S390 of FIG. 73, the reference image setting unit 453 of FIG. 67 acquires the reference image specifying information of the enhancement image from the motion prediction/compensation unit 47. In step S391, the reference image setting unit 453 reads the reference image specifying information of the base image from the reference buffer 49.

In step S392, the reference image setting unit 453 determines whether or not the reference image specifying information of the enhancement image is identical to the reference image specifying information of the base image. When the reference image specifying information of the enhancement image is determined to be identical to the reference image specifying information of the base image in step S392, in step S393, the reference image setting unit 453 sets the copy flag to 1.

In step S394, the reference image setting unit 453 determines whether or not the copy flag of the SPS supplied from the setting unit 431 of FIG. 66 is 1. When the copy flag is determined to be 1 in step S394, the process ends.

Meanwhile, when the copy flag is determined to be not 1 in step S394, the reference image setting unit 453 supplies the set copy flag to the lossless encoding unit 451, and the process ends.

Meanwhile, when the reference image specifying information of the enhancement image is determined to be not identical to the reference image specifying information of the base image in step S392, in step S396, the reference image setting unit 453 sets the copy flag to 0. In step S397, the reference image setting unit 453 determines whether or not the copy flag of the SPS supplied from the setting unit 431 is 1.

When the copy flag of the SPS is determined to be 1 in step S397, in step S398, the reference image setting unit 453 supplies the set copy flag to the lossless encoding unit 451, and the process proceeds to step S399.

Meanwhile, when the copy flag of the SPS is determined to be not 1 in step S397, that is, when the copy flag of the SPS is identical to the set copy flag, i.e., 0, the process of step S398 is skipped, and the process proceeds to step S399.

In step S399, the reference image setting unit 453 determines whether or not the RPS among the reference image specifying information supplied from the motion prediction/compensation unit 47 is identical to the RPS of the SPS. When the RPS supplied from the motion prediction/compensation unit 47 is determined to be identical to the RPS of the SPS in step S399, in step S400, the reference image setting unit 453 sets the RPS flag to 1.

In step S401, the reference image setting unit 453 supplies the index of the RPS of the SPS that is identical to the RPS supplied from the motion prediction/compensation unit 47 to the lossless encoding unit 451, and the process proceeds to step S404.

Meanwhile, when the RPS supplied from the motion prediction/compensation unit 47 is determined to be not identical to the RPS of the SPS in step S399, in step S402, the reference image setting unit 453 sets the RPS flag to 0.

In step S403, the reference image setting unit 453 supplies the RPS supplied from the motion prediction/compensation unit 47 to the lossless encoding unit 451, and the process proceeds to step S404.

In step S404, the reference image setting unit 453 determines whether or not the long term flag included in the SPS is 1. When the long term flag is determined to be 1 in step S404, the process proceeds to step S405.

In step S405, the reference image setting unit 453 supplies the reference image specifying information of the long term and the like among the reference image specifying information supplied from the motion prediction/compensation unit 47 to the lossless encoding unit 451. Specifically, when the reference image specifying information of the long term of the SPS among the reference image specifying information of the long term supplied from the motion prediction/compensation unit 47 is different, the reference image setting unit 453 supplies the index of the same information to the lossless encoding unit 451. Then, the process ends.

As described above, in the encoding device 400, since the copy flag is set, the reference image specifying information can be shared between the base layer and the enhancement layer. Thus, it is possible to reduce the information amount of the enhancement stream and improve the coding efficiency.

(Exemplary Configuration of Decoding Device According to Third Embodiment)

Figure 74:
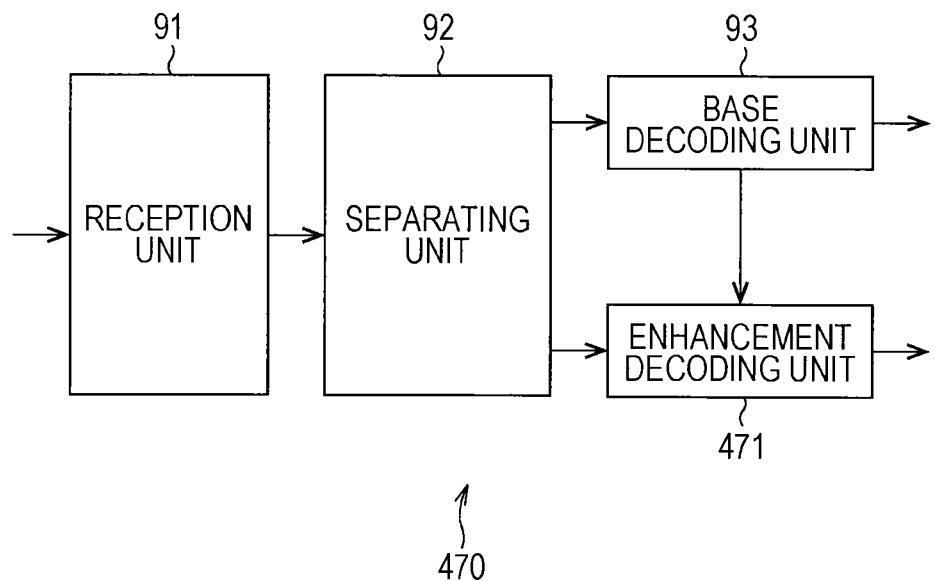
FIG. 74 is a block diagram illustrating an exemplary configuration of a decoding device according to the third embodiment of the present disclosure.

FIG. 74 is a block diagram illustrating an exemplary configuration of a decoding device according to the third embodiment of the present disclosure that decodes the encoded stream for all layers transmitted from the encoding device 400 of FIG. 65.

Among components illustrated in FIG. 74, the same components of FIG. 29 are denoted by the same reference numerals. A duplicated description will be appropriately omitted.

A configuration of a decoding device 470 of FIG. 74 differs from the configuration of the decoding device 90 of FIG. 29 in that an enhancement decoding unit 471 is disposed instead of the enhancement decoding unit 94.

The enhancement decoding unit 471 of the decoding device 470 decodes the enhancement stream supplied from the separating unit 92 according to the scheme complying with the HEVC scheme, and generates the enhancement image. At this time, the enhancement decoding unit 471 refers to the reference image specifying information supplied from the base decoding unit 93 of the base image, the copy flag included in the SPS or the slice header, and the like. The enhancement decoding unit 471 outputs the generated enhancement image.

(Exemplary Configuration of Enhancement Decoding Unit)

Figure 75:
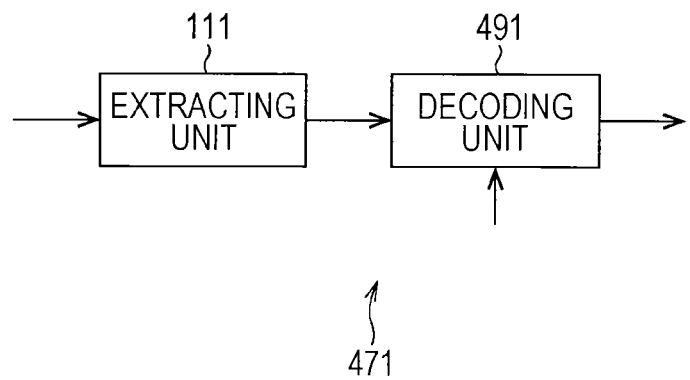
FIG. 75 is a block diagram illustrating an exemplary configuration of an enhancement decoding unit of FIG. 74.

FIG. 75 is a block diagram illustrating an exemplary configuration of the enhancement decoding unit 471 of FIG. 74.

Among components illustrated in FIG. 75, the same components of FIG. 30 are denoted by the same reference numerals. A duplicated description will be appropriately omitted.

A configuration of the enhancement decoding unit 471 of FIG. 75 differs from the configuration of the enhancement decoding unit 94 of FIG. 30 in that a decoding unit 491 is disposed instead of the decoding unit 112.

The decoding unit 491 of the enhancement decoding unit 471 decodes the encoded data supplied from the extracting unit 111 according to the scheme complying with the HEVC scheme with reference to the reference image specifying information of the base image supplied from the base decoding unit 93 of FIG. 74 and the copy flag included in the SPS or the slice header supplied from the extracting unit 111.

The decoding unit 491 outputs an image obtained as a result of decoding as the enhancement image.

(Exemplary Configuration of Decoding Unit)

Figure 76:
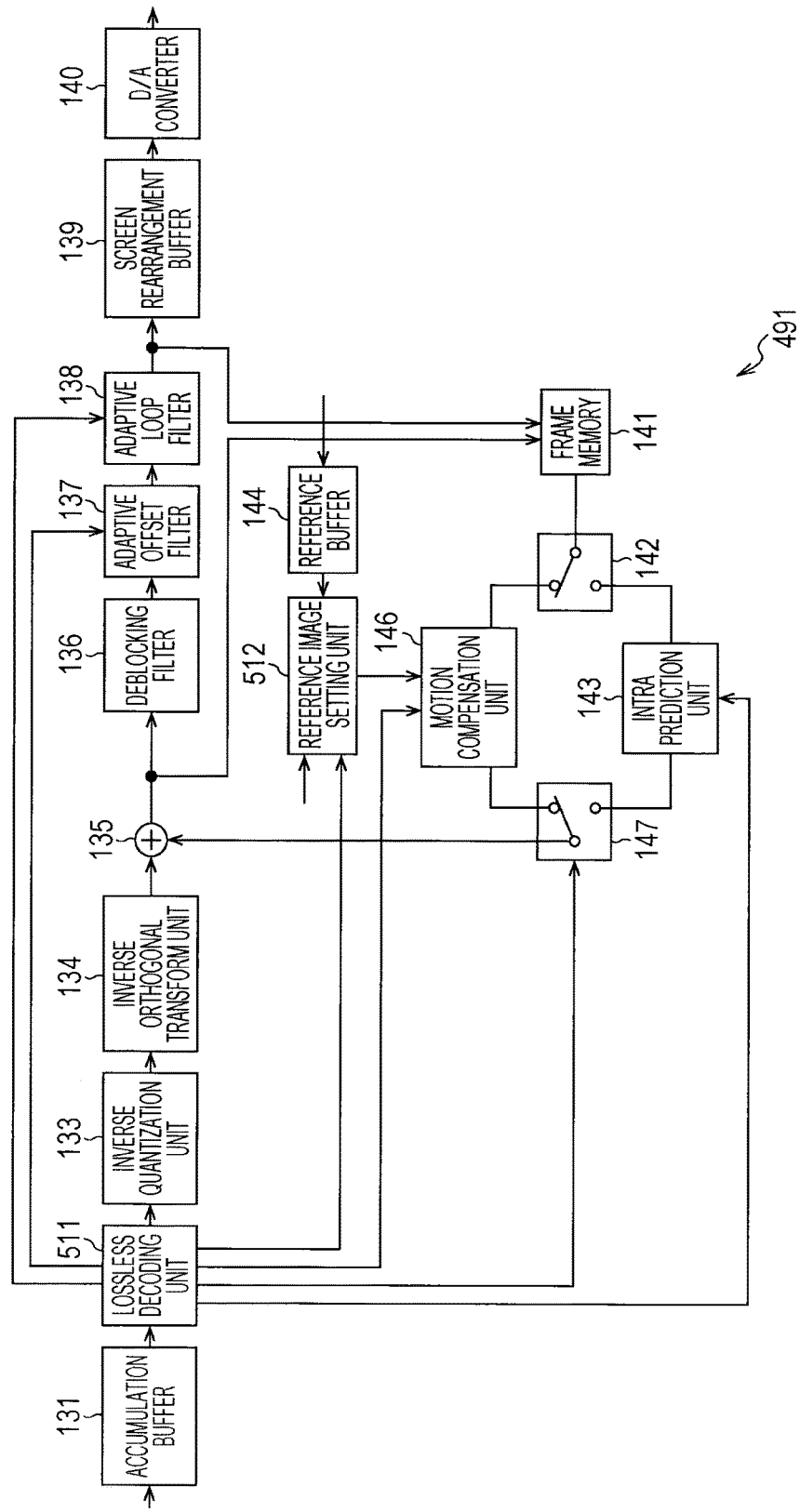
FIG. 76 is a block diagram illustrating an exemplary configuration of a decoding unit of FIG. 75.

FIG. 76 is a block diagram illustrating an exemplary configuration of the decoding unit 491 of FIG. 75.

Among components illustrated in FIG. 76, the same components of FIG. 31 are denoted by the same reference numerals. A duplicated description will be appropriately omitted.

A configuration of the decoding unit 491 of FIG. 76 differs from the configuration of the decoding unit 112 of FIG. 31 in that a lossless decoding unit 511 is disposed instead of the lossless decoding unit 132, and a reference image setting unit 512 is disposed instead of the reference image setting unit 145.

The lossless decoding unit 511 of the decoding unit 491 performs lossless decoding on the encoded data supplied from the accumulation buffer 131, and obtains the quantized coefficients and the encoding information. The lossless decoding unit 511 supplies the quantized coefficients to the inverse quantization unit 133. Further, the lossless decoding unit 511 supplies the intra prediction mode information serving as the encoding information and the like to the intra prediction unit 143, and supplies the motion vector, the inter prediction mode information, and the like to the motion compensation unit 146.

Further, the lossless decoding unit 511 supplies the copy flag, the RPS flag, the reference image specifying information, the index of the RPS, and the like serving as the encoding information to the reference image setting unit 512. Furthermore, the lossless decoding unit 511 supplies the intra prediction mode information or the inter prediction mode information serving as the encoding information to the switch 147. The lossless decoding unit 511 supplies the offset filter information serving as the encoding information to the adaptive offset filter 137, and supplies the filter coefficient to the adaptive loop filter 138.

The reference image setting unit 512 holds the copy flag included in the SPS supplied from the extracting unit 111 of FIG. 75 and the reference image specifying information. The reference image setting unit 512 updates the copy flag and the reference image specifying information being held therein when the copy flag and the reference image specifying information are supplied from the lossless decoding unit 511.

Then, the reference image setting unit 512 reads the reference image specifying information of the base image from the reference buffer 144 based on the held copy flag, and decides the read reference image specifying information of the base image as the reference image specifying information of the current slice. Further, the reference image setting unit 512 decides the updated reference image specifying information or the held reference image specifying information of the index supplied from the lossless decoding unit 511 as the reference image specifying information of the current slice based on the copy flag and the RPS flag supplied from the lossless decoding unit 511.

(Description of First Example of Processing of Decoding Device)

A scalable decoding process of the decoding device 470 of FIG. 74 is similar to the scalable decoding process of FIG. 33 except for the enhancement image generation process of step S106 of FIG. 33. Thus, the enhancement image generation process will be described below.

Figure 77:
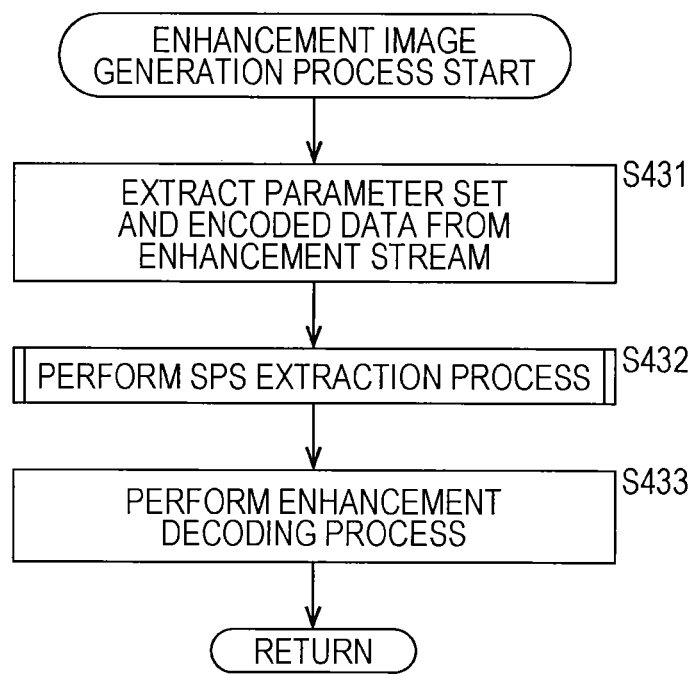
FIG. 77 is a flowchart for describing an enhancement image generation process of the enhancement decoding unit of FIG. 74.

FIG. 77 is a flowchart for describing the enhancement image generation process of the enhancement decoding unit 471 of FIG. 74.

In step S431 of FIG. 77, the extracting unit 111 of the enhancement decoding unit 471 extracts the parameter set such as the SPS or the PPS and the encoded data from the enhancement stream supplied from the separating unit 92 of FIG. 74, and supplies the parameter set and the encoded data to the decoding unit 491.

In step S432, the reference image setting unit 512 of the decoding unit 491 performs an SPS extraction process of extracting the copy flag and the like from the SPS supplied from the extracting unit 111. The details of the SPS extraction process will be described with reference to FIG. 78 which will be described later.

In step S433, the decoding unit 491 performs an enhancement decoding process of decoding the encoded data supplied from the extracting unit 111 according to the scheme complying with the HEVC scheme with reference to the copy flag included in the SPS or the slice header, the reference image specifying information supplied from the base decoding unit 93, and the like. The enhancement decoding process is similar to the decoding process of FIG. 35 except for the generation process of step S136 of FIG. 35. Thus, the generation process will be described below with reference to FIG. 79 which will be described later.

Figure 78:
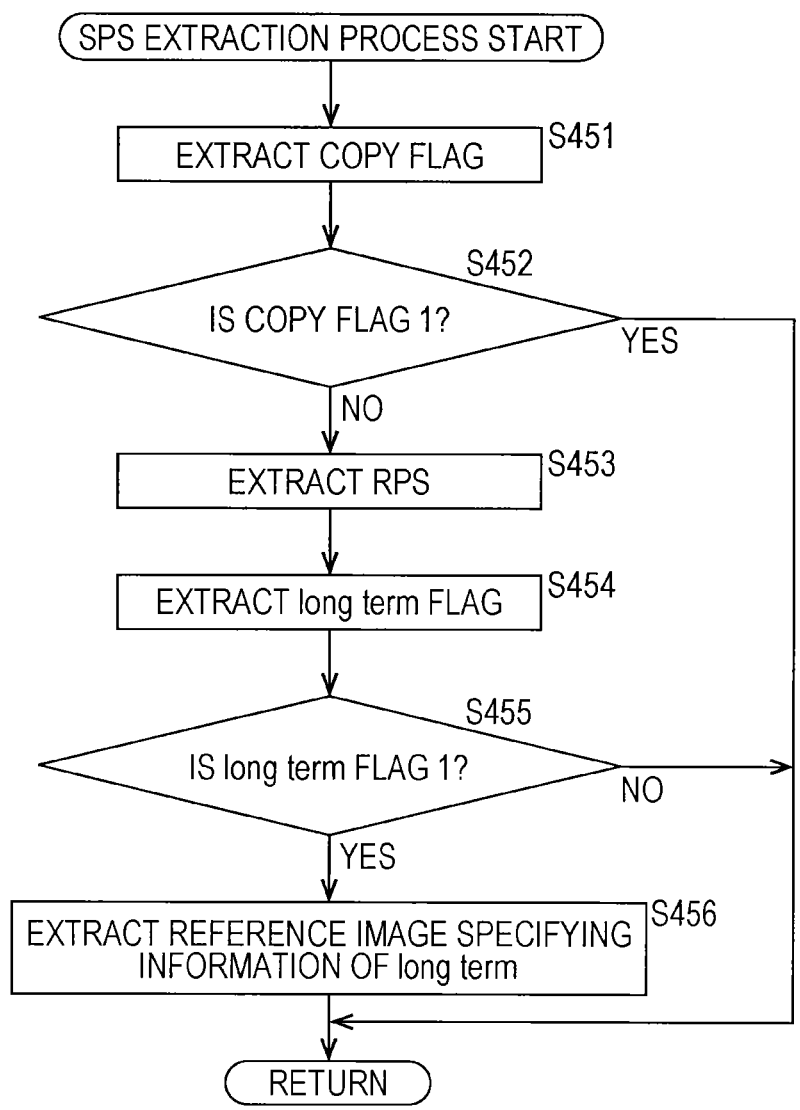
FIG. 78 is a flowchart for describing the details of an SPS extraction process of FIG. 77.

FIG. 78 is a flowchart for describing the details of an SPS extraction process of step S432 of FIG. 77.

In step S451 of FIG. 78, the reference image setting unit 512 extracts the copy flag from the SPS supplied from the extracting unit 111, and holds the extracted copy flag. In step S452, the reference image setting unit 512 determines whether or not the extracted copy flag is 1.

When the copy flag is determined to be not 1 in step S452, that is, when the copy flag is 0, in step S453, the reference image setting unit 512 extracts the RPS from the SPS, and holds the extracted RPS. In step S454, the reference image setting unit 512 extracts the long term flag from the SPS.

In step S455, the reference image setting unit 512 determines whether or not the long term flag is 1, and when the long term flag is determined to be 1, the process proceeds to step S456. In step S456, the reference image setting unit 512 extracts reference image specifying information of a long term from the SPS, and holds the extracted reference image specifying information of the long term. Then, the process returns to step S432 of FIG. 77 and proceeds to step S433.

Meanwhile, when the copy flag is determined to be 1 in step S452 or when the long term flag is determined to be not 1 in step S455, the process returns to step S432 of FIG. 77 and proceeds to step S433.

Figure 79:
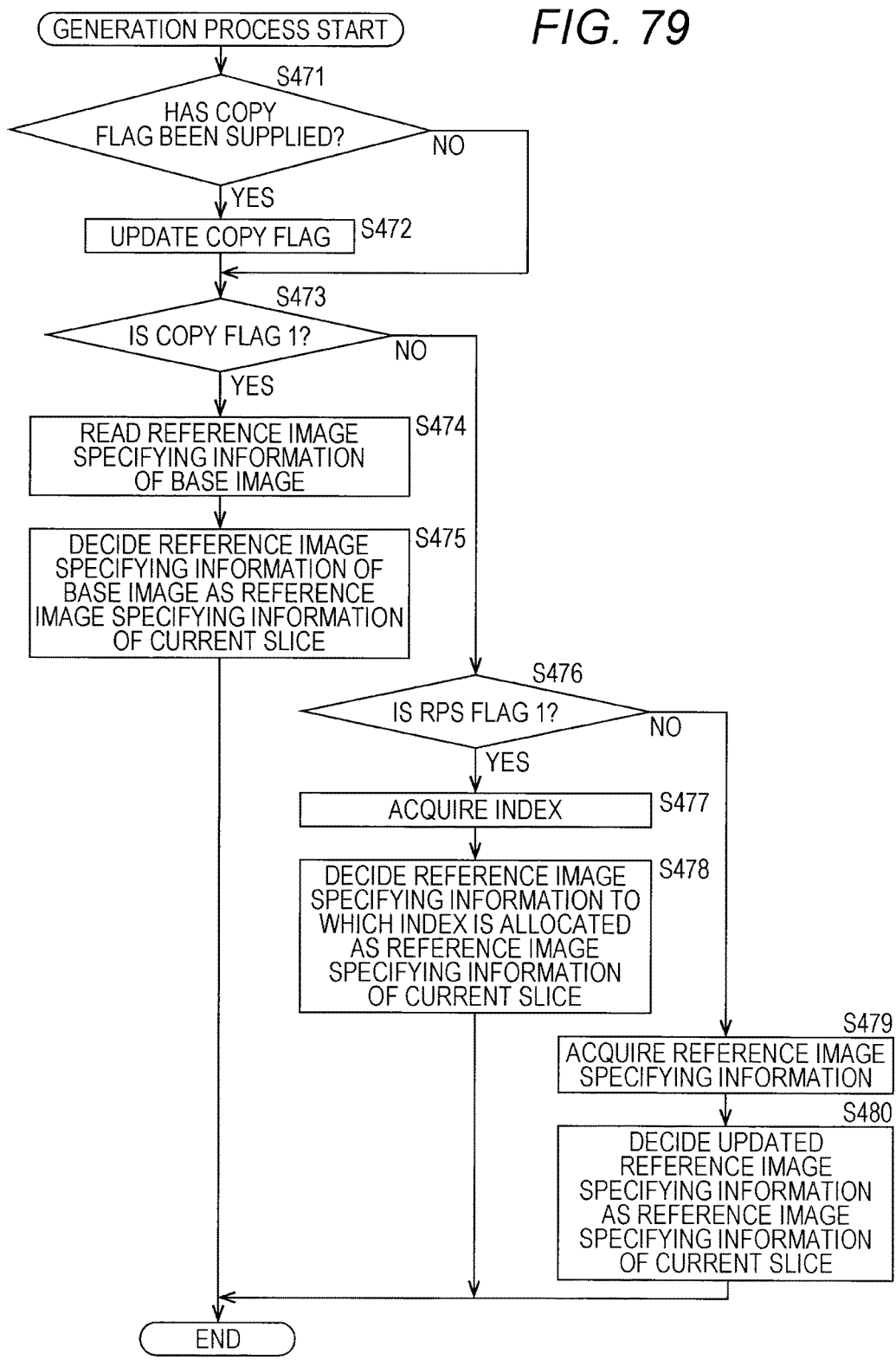
FIG. 79 is a flowchart for describing the details of a generation process of an enhancement decoding process of FIG. 77.

FIG. 79 is a flowchart for describing the details of a generation process in the enhancement decoding process of step S433 of FIG. 77. The generation process is performed, for example, in units of slices.

In step S471 of FIG. 79, the reference image setting unit 512 determines whether or not the copy flag has been supplied from the lossless decoding unit 511. When the copy flag is determined to have been supplied in step S471, in step S472, the reference image setting unit 512 updates the held copy flag included in the SPS to the copy flag supplied from the lossless decoding unit 511. Then, the process proceeds to step S473.

Meanwhile, when the copy flag is determined to have been supplied in step S471, the process proceeds to step S473.

In step S473, the reference image setting unit 512 determines whether or not the held copy flag is 1, and when the copy flag is determined to be 1, and the process proceeds to step S474.

In step S474, the reference image setting unit 512 reads the reference image specifying information of the base image from the reference buffer 144. In step S475, the reference image setting unit 512 decides the reference image specifying information of the base image as the reference image specifying information of the current slice. Then, the reference image setting unit 512 supplies the decided reference image specifying information to the motion compensation unit 146, and the process ends.

Meanwhile, when the copy flag is determined to be not 1 in step S473, that is, when the copy flag is 0, the process proceeds to step S476. In step S476, the reference image setting unit 512 determines whether or not the RPS flag is 1. When the RPS flag is determined to be 1 in step S476, in step S477, the reference image setting unit 512 acquires the index of the reference image specifying information supplied from the lossless decoding unit 511.

In step S478, the reference image setting unit 512 decides the reference image specifying information to which the acquired index is allocated among the held reference image specifying information included in the SPS as the reference image specifying information of the current slice, and supplied the decided reference image specifying information to the motion compensation unit 146.

Further, at this time, when the long term flag included in the SPS is 1, the reference image specifying information of the long term supplied from the lossless decoding unit 511 is also decided as the reference image specifying information of the current slice and supplied to the motion compensation unit 146. After the process of step S478, the process ends.

Meanwhile, when the RPS flag determined to be not 1 in step S476, in step S479, the reference image setting unit 512 acquires the reference image specifying information supplied from the lossless decoding unit 511. Then, the reference image setting unit 512 updates the held reference image specifying information included in the SPS to the reference image specifying information.

In step S480, the reference image setting unit 512 decides the updated reference image specifying information as the reference image specifying information of the current slice, and supplies the decided reference image specifying information to the motion compensation unit 146. Then, the process ends.

After the generation process ends, the copy flag and the reference image specifying information held in the reference image setting unit 512 are restored to the copy flag included in the SPS and the reference image specifying information.

As described above, the decoding device 470 generates the reference image specifying information of the enhancement image using the copy flag, and thus the reference image specifying information can be shared between the base layer and the enhancement layer. Thus, as the reference image specifying information is shared between the base layer and the enhancement layer, it is possible to decode the enhancement stream with the improved coding efficiency.

Further, in the above description, a common copy flag is set to the RPS and the reference image specifying information of the long term, but separate copy flags may be set. This case will be described below as a second example of the third embodiment. Further, in the following, the second example of the third embodiment is referred to as a "time of another copy flag setting," and the first example is referred to as a "time of common copy flag setting."

(Second Example of Syntax of Enhancement Stream of SPS)

FIG. 80 is a diagram illustrating an exemplary syntax of an SPS set by the setting unit 431 of FIG. 66 at the time of another copy flag setting.

As illustrated in a 3-rd line of FIG. 80, an RPS copy flag (inter_layer_short_copy_flag) serving as the copy flag for the RPS is set to the SPS. The RPS copy flag is 1 when the RPS of the base image is used as the RPS of the enhancement image and 0 when the RPS of the base image is not used as the RPS of the enhancement image.

Further, as illustrated in 4-th to 8-th lines of FIG. 80, when the RPS copy flag is 0, the information related to the RPS is set to the SPS, similarly to the SPS of the base stream.

As illustrated in a 9-th line of FIG. 80, the long term flag is set to the SPS. As illustrated in 10-th and 11-th lines, when the long term flag is 1, a long term copy flag (inter_layer_long_copy_flag) serving as the copy flag for the reference image specifying information of the long term is set.

The long term copy flag is 1 when the reference image specifying information of the long term of the base image is used as the reference image specifying information of the long term of the enhancement image. Meanwhile, the long term copy flag is 0 when the reference image specifying information of the long term of the base image is not used as the reference image specifying information of the long term of the enhancement image.

As illustrated in 12-th to 17-th lines of FIG. 80, when the long term copy flag is 0, the number (num_long_term_ref_pics_sps) of pieces of the reference image specifying information of the long term and the reference image specifying information of the long term are set to the SPS.

(Second Example of Syntax of Slice Header of Enhancement Stream)

FIG. 81 is a diagram illustrating an exemplary syntax of a slice header of an enhancement stream at the time of another copy flag setting.

As illustrated in a 5-th line of FIG. 81, when the RPS copy flag of the corresponding slice is different from the RPS copy flag included in the SPS, the RPS copy flag is set to the slice header of the enhancement stream. Further, as illustrated in 6-th to 12-th lines of FIG. 81, when the RPS copy flag of the corresponding slice is 0, the RPS flag and the RPS or the index of the RPS are set, similarly to the slice header of the base stream.

Further, as illustrated in 13-th to 17-th lines of FIG. 81, when the long term flag is 1, the long term copy flag is set to the slice header, when the long term copy flag is 0, the reference image specifying information of the long term is set.

(Description of Second Exam of Processing of Encoding Device)

The scalable coding process at the time of another copy flag setting is similar to the scalable coding process of FIG. 71 except for the SPS setting process and the copy flag setting process. Thus, the following description will proceed with the SPS setting process and the copy flag setting process.

Figure 82:
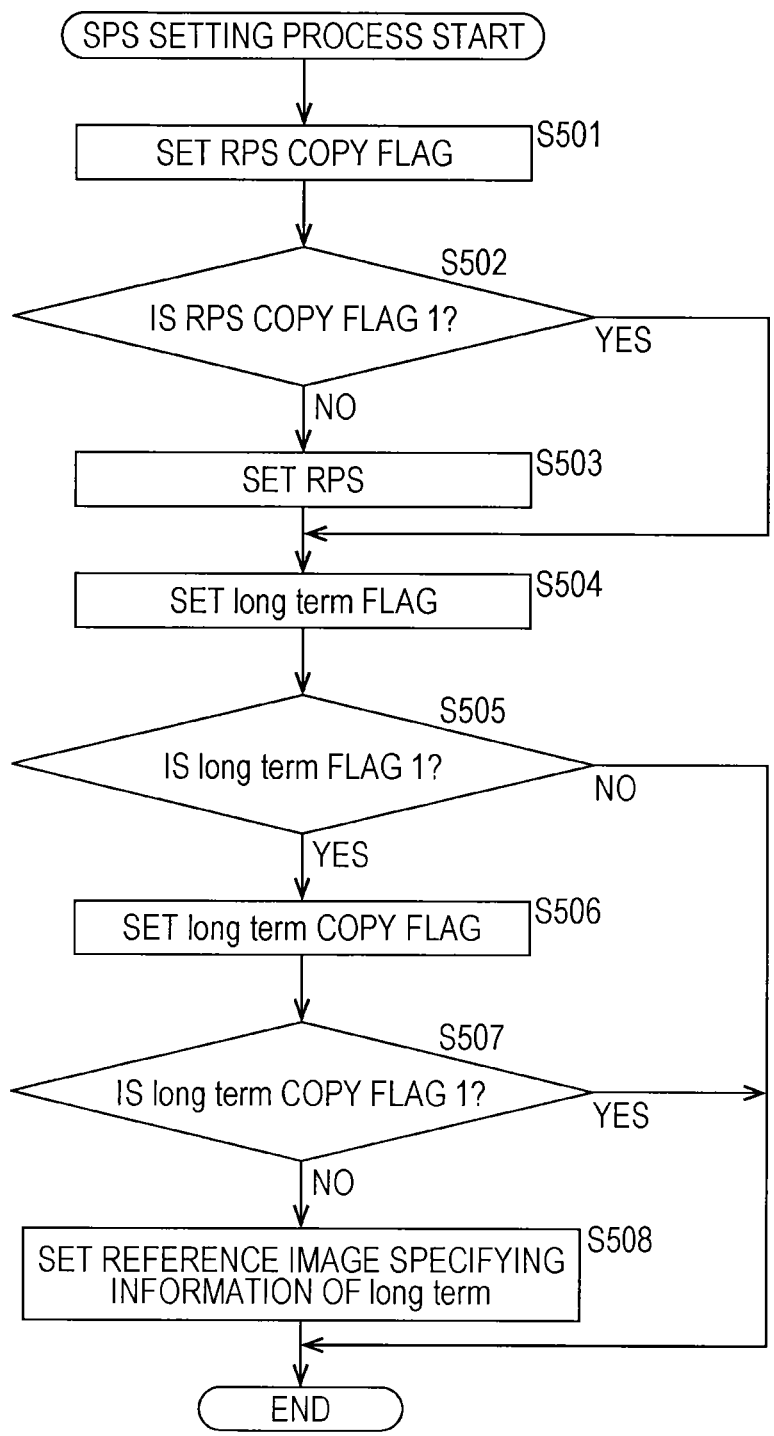
FIG. 82 is a flowchart for describing an SPS setting process at a time of another copy flag setting.

FIG. 82 is a flowchart for describing an SPS setting process at the time of another copy flag setting.

In step S501 of FIG. 82, the setting unit 431 sets the RPS copy flag to the SPS. In step S502, the setting unit 431 determines whether or not the RPS copy flag set to the SPS is 1.

When the RPS copy flag is determined to be not 1 in step S502, that is, when the RPS copy flag is 0, in step S503, the setting unit 431 sets the RPS to the SPS, and the process proceeds to step S504. Meanwhile, when the RPS copy flag is determined to be 1 in step S502, the process proceeds to step S504.

In step S504, the setting unit 431 sets the long term flag to the SPS. In step S505, the setting unit 431 determines whether or not the long term flag set to the SPS is 1. When the long term flag is determined to be 1 in step S505, in step S506, the setting unit 431 sets the long term copy flag to the SPS.

In step S507, it is determined whether or not the long term copy flag set to the SPS is 1. When the long term copy flag is determined to be not 1 in step S507, that is, when the long term copy flag is 0, in step S508, the setting unit 431 sets the reference image specifying information of the long term, and the process ends.

Meanwhile, when the long term flag is determined to be not 1 in step S505 or when the long term copy flag is determined to be 1 in step S507, the process ends.

Figure 83:
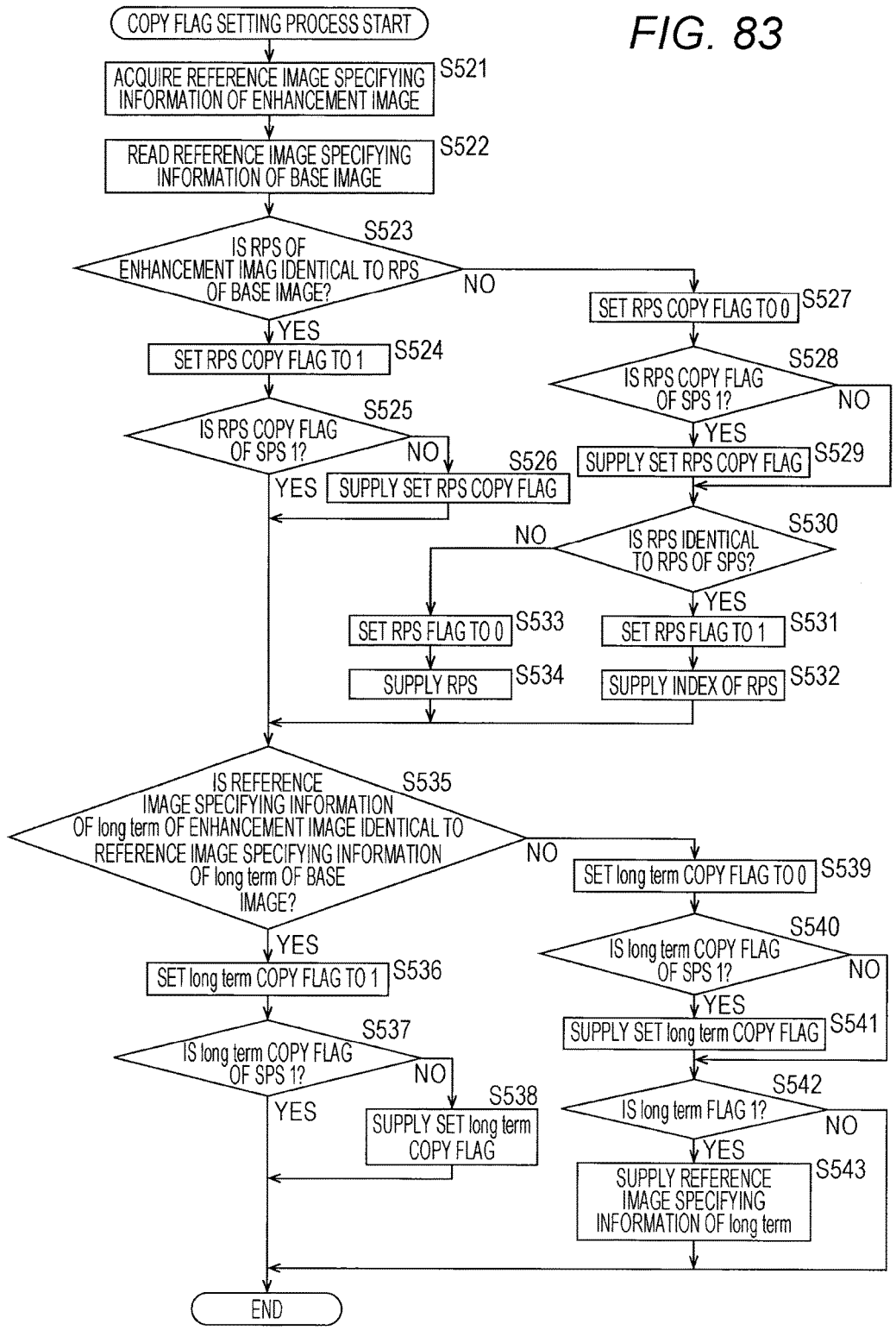
FIG. 83 is a flowchart for describing a copy flag setting process at a time of another copy flag setting.

FIG. 83 is a flowchart for describing a copy flag setting process at the time of another copy flag setting. The copy flag setting process is performed, for example, in units of slices.

The process of steps S521 and S522 of FIG. 83 is similar to the process of steps S390 and S391 of FIG. 73, and thus a description thereof is omitted. Further, the process of steps S523 to S534 is similar to the process of steps S392 to S403 of FIG. 73 except that the copy flag is replaced with the RPS copy flag, and the reference image specifying information is replaced with the RPS, and thus a description thereof is omitted.

When the RPS copy flag of the SPS is determined to be 1 in step S525 or after the process of step S526, S532, or S534, the process proceeds to step S535.

In step S535, the reference image setting unit 453 of FIG. 67 determines whether or not the reference image specifying information of the long term of the enhancement image is identical to the reference image specifying information of the long term of the base image. When the reference image specifying information of the long term of the enhancement image is determined to be identical to the reference image specifying information of the long term of the base image in step S535, in step S536, the reference image setting unit 453 sets the long term copy flag to 1.

In step S537, the reference image setting unit 453 determines whether or not the long term copy flag of the SPS supplied from the setting unit 431 of FIG. 66 is 1. When the long term copy flag of the SPS is determined to be 1 in step S537, the process ends.

Meanwhile, when the long term copy flag of the SPS is determined to be not 1 in step S537, that is, when the long term copy flag of the SPS is 0, in step S538, the reference image setting unit 453 supplies the set long term copy flag to the lossless encoding unit 451. Then, the process ends.

Further, when the reference image specifying information of the long term of the enhancement image is determined to be not identical to the reference image specifying information of the long term of the base image in step S535, in step S539, the reference image setting unit 453 sets the long term copy flag to 0.

In step S540, the reference image setting unit 453 determines whether or not the long term copy flag of the SPS is 1. When the long term copy flag of the SPS is determined to be 1 in step S540, in step S541, the reference image setting unit 453 supplies the set long term copy flag to the lossless encoding unit 451, and the process proceeds to step S542.

Meanwhile, when the long term copy flag of the SPS is determined to be not 1 in step S540, that is, when the long term copy flag of the SPS is 0, the process proceeds to step S542.

The process of steps S542 and S543 is similar to the process of steps S404 and S405 of FIG. 73, and thus a description thereof is omitted. After the process of step S543, the process ends.

(Description of Second Example of Processing of Decoding Device)

The scalable decoding process at the time of another copy flag setting is similar to the scalable decoding process at the time of common copy flag setting except for the SPS extraction process and the generation process. Thus, the following description will proceed with the SPS extraction process and the generation process.

Figure 84:
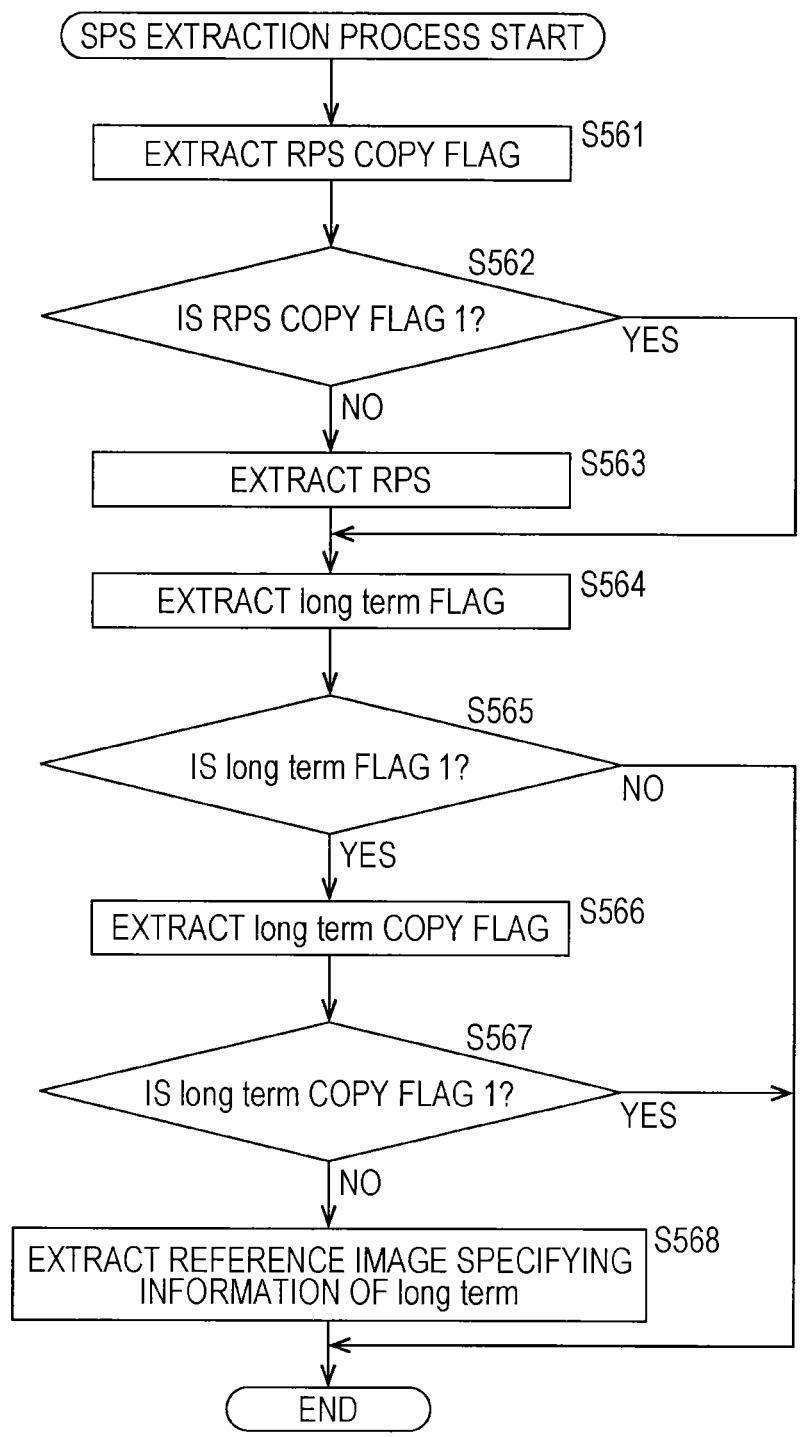
FIG. 84 is a flowchart for describing an SPS extraction process at a time of another copy flag setting.

FIG. 84 is a flowchart for describing an SPS extraction process at the time of another copy flag setting.

In step S561 of FIG. 84, the reference image setting unit 512 extracts the RPS copy flag from the SPS supplied from the extracting unit 111, and holds the extracted RPS copy flag. In step S562, the reference image setting unit 512 determines whether or not the extracted RPS copy flag is 1.

When the RPS copy flag is determined to be not 1 in step S562, that is, when the RPS copy flag is 0, in step S563, the reference image setting unit 512 extracts the RPS from the SPS, and holds the extracted RPS. Then, the process proceeds to step S564.

Meanwhile, when the RPS copy flag is determined to be 1 in step S562, the process proceeds to step S564.

In step S564, the reference image setting unit 512 extracts the long term flag from the SPS.

In step S565, the reference image setting unit 512 determines whether or not the extracted long term flag is 1, and when the extracted long term flag is determined to be 1, and the process proceeds to step S566. In step S566, the reference image setting unit 512 extracts the long term copy flag from the SPS, and holds the extracted long term copy flag.

In step S567, the reference image setting unit 512 determines whether or not the long term copy flag is 1, when the long term copy flag is determined to be not 1, that is, determined to be 0, and the process proceeds to step S568. In step S568, the reference image setting unit 512 extracts the reference image specifying information of the long term from the SPS, and holds the extracted reference image specifying information of the long term, and the process ends.

Meanwhile, when the long term flag is determined to be not 1 in step S565 or when the long term copy flag is determined to be 1 in step S567, the process ends.

Figure 85:
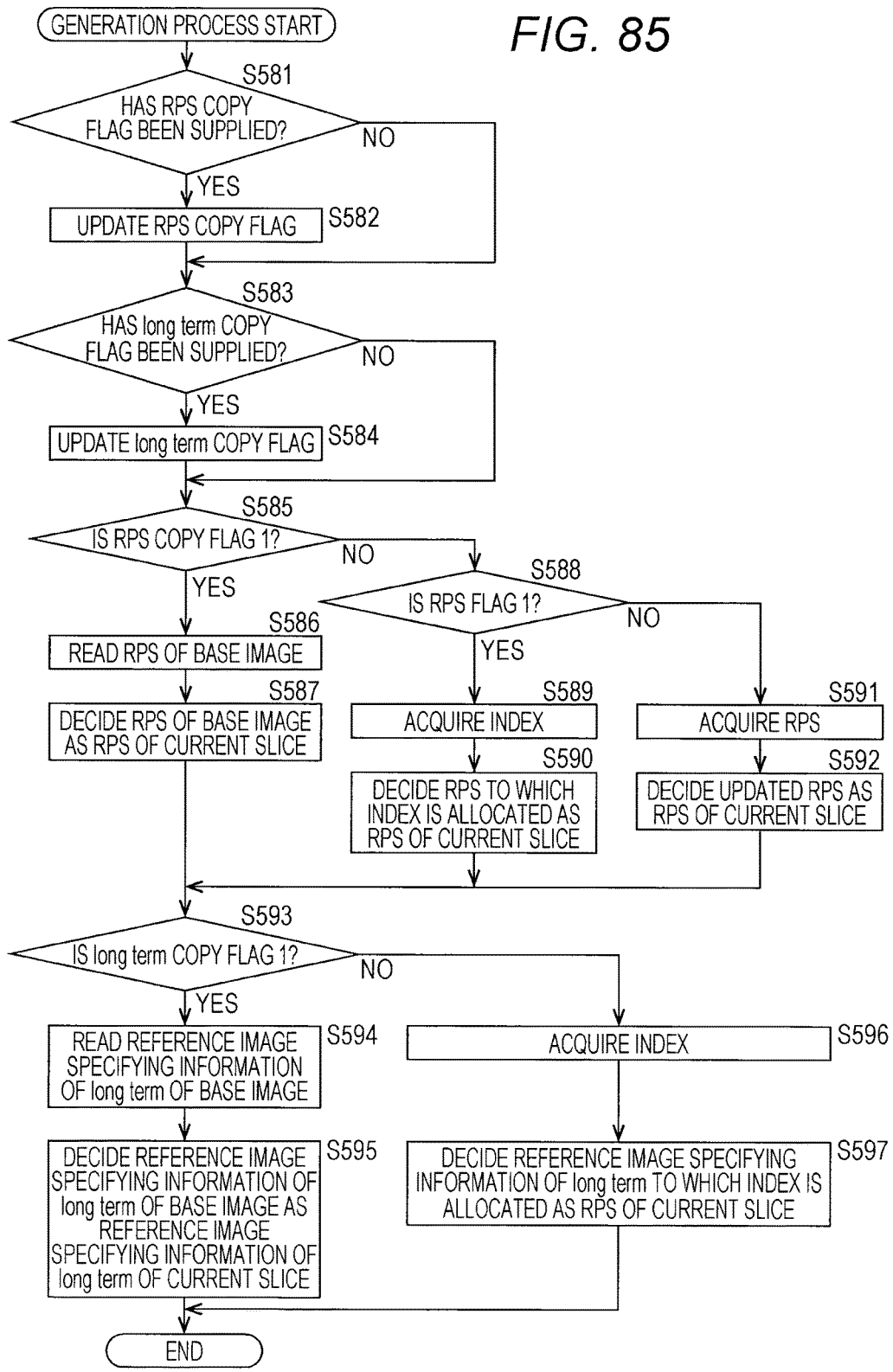
FIG. 85 is a flowchart for describing a generation process at a time of another copy flag setting.

FIG. 85 is a flowchart for describing a generation process at the time of another copy flag setting. The generation process is performed, for example, in units of slices.

In step S581 of FIG. 85, the reference image setting unit 512 determines whether or not the RPS copy flag has been supplied from the lossless decoding unit 511. When the RPS copy flag is determined to have been supplied in step S581, in step S582, the reference image setting unit 512 updates the held RPS copy flag included in the SPS to the RPS copy flag supplied from the lossless decoding unit 511. Then, the process proceeds to step S583.

Meanwhile, when the RPS copy flag is determined to have not been supplied in step S581, the process proceeds to step S583.

In step S583, the reference image setting unit 512 determines whether or not the long term copy flag has been supplied from the lossless decoding unit 511. When the long term copy flag is determined to have been supplied in step S583, in step S584, the reference image setting unit 512 updates the held long term copy flag included in the SPS to the long term copy flag supplied from the lossless decoding unit 511. Then, the process proceeds to step S585.

Meanwhile, when the long term copy flag is determined to have not been supplied in step S583, the process proceeds to step S585.

The process of steps S585 to S592 is similar to the process of steps S473 to S480 of FIG. 79 except that the copy flag is replaced with the RPS copy flag, the reference image specifying information is replaced with the RPS, and the reference image specifying information of the long term of the current slice is not decided, and thus a description thereof is omitted.

After the process of step S587, S590, or S592, the process proceeds to step S593.

In step S593, the reference image setting unit 512 determines whether or not the long term copy flag is 1. When the long term copy flag is determined to be 1 in step S593, in step S594, the reference image setting unit 512 reads the reference image specifying information of the long term of the base image from the reference buffer 144.

In step S595, the reference image setting unit 512 decides the reference image specifying information of the long term of the base image as the reference image specifying information of the long term of the current slice. Then, the reference image setting unit 512 supplies the decided reference image specifying information of the long term to the motion compensation unit 146, and the process ends.

Meanwhile, when the long term copy flag is determined to be not 1 in step S593, that is, when the long term copy flag is 0, the process proceeds to step S596. In step S596, the reference image setting unit 512 acquires the index of the reference image specifying information of the long term supplied from the lossless decoding unit 511.

In step S597, the reference image setting unit 512 decides the reference image specifying information of the long term to which the acquired index is allocated among the held reference image specifying information of the long term included in the SPS as the reference image specifying information of the long term of the current slice. Further, the reference image setting unit 512 decides the reference image specifying information of the long term supplied from the lossless decoding unit 511 as the reference image specifying information of the long term of the current slice as well. Then, the reference image setting unit 512 supplies the reference image specifying information of the long term of the current slice to the motion compensation unit 146, and the process ends.

After the generation process ends, the RPS copy flag, the long term copy flag, and the reference image specifying information held in the reference image setting unit 512 are recovered to the RPS copy flag included in the SPS, the long term copy flag, and the reference image specifying information.

As described above, at the time of another copy flag setting, when any one of the RPS of the base image and the reference image specifying information of the long term is used for the enhancement image, it is unnecessary to redundantly set the used one. Thus, the coding efficiency is improved.

Here, since any one of the RPS of the base image and the reference image specifying information of the long term is used for the enhancement image, for example, there are cases in which the reference image of the enhancement image is set in a ref_idx_framework mode. In this case, since the base image is used as the reference image of the long term of the enhancement image, even when the RPS of the base image is identical to the RPS of the enhancement image, the reference image specifying information of the long term of the base image is different from the reference image specifying information of the long term of the enhancement image.

Further, in this case, the number of reference images of the long term of the enhancement image is larger than that of the base image, and the size of the frame memory 44 (141) increases. Thus, some reference images of the long term of the enhancement image are considered to be deleted in order to reduce the size, reference image other than the base image for which high-accurate prediction is possible is deleted. Thus, in this case, the reference image specifying information of the long term of the base image is different from the reference image specifying information of the long term of the enhancement image.

Further, since the resolution of the enhancement image is higher than the resolution of the base image, there are also cases in which a reference image of either a short term or a long term of the enhancement image is deleted in order to reduce the size of the frame memory 44 (141). In this case, the reference image specifying information of either the short term or the long term of the base image is different from the reference image specifying information of either the short term or the long term of the enhancement image.

Further, since high-accurate prediction is likely to be performed based on the base image when the base image is used as the reference image, there are also cases in which the size of the frame memory 44 (141) is reduced by deleting the reference image of either the short term or the long term of the enhancement image. In this case, the reference image specifying information of either the short term or the long term of the base image is different from the reference image specifying information of either the short term or the long term of the enhancement image.

As described above, when the reference image of the enhancement image is set in the ref_idx_framework mode, the reference image specifying information of the long term of the base image is different from the reference image specifying information of the long term of the enhancement image.

Thus, a redundant setting of the RPS may be prevented such that instead of setting the copy flag separately in the RPS and the reference image specifying information of the long term, the copy flag is set to 0 by invalidating the copy flag for the reference image specifying information of the long term in the ref_idx_framework mode. This case will be described below as a third example of the third embodiment. Hereinafter, the third example of the third embodiment is referred to as a "time of setting mode utilization."

(Exemplary Syntax of VPS)

FIG. 86 is a diagram illustrating an exemplary syntax of an extension (vps_extension) of a VPS in the third embodiment.

Further, a syntax excluding a VPS extension of the VPS in the third embodiment is similar to the VPS in the first and second embodiments.

As illustrated in a 4-th line of FIG. 86, an AVC flag (avc_base_layer_flag) indicating whether or not the coding scheme of the base image is the AVC scheme is set to the extension of the VPS. The AVC flag is 1 when the coding scheme of the base image is the AVC scheme and 0 when the coding scheme of the base image is the HEVC scheme.

Further, as illustrated in a 7-th line, setting mode information (scalavility_mask) indicating a type of a setting mode specific to a scalable function used as a setting mode of the reference image of the enhancement image is set to the extension of the VPS. For example, the installation mode information is 1 when the ref_idx_framework mode is used as the setting mode of the reference image of the enhancement image.

As described above, the information indicating whether or not the setting mode of the reference image of the enhancement image is the ref_idx_framework mode is set to the VPS as the setting mode information. Thus, it is possible to invalidate the copy flag for the reference image specifying information of the long term using the setting mode information.

(Third Example of Syntax of SPS of Enhancement Stream)

FIG. 87 is a diagram illustrating an exemplary syntax of an SPS set by the setting unit 431 of FIG. 66 at the time of setting mode utilization.

As illustrated in a 3-rd line of FIG. 87, the copy flag (inter_layer_copy_flag) is set to the SPS of the enhancement stream, similarly to the example of FIG. 68. Further, as illustrated in 4-th to 8-th lines, the information related to the RPS is set to the SPS, similarly to the example of FIG. 68.

Further, as illustrated in 9-th to a 17-th lines, when the copy flag is 0 or when the setting mode information is 1, the information related to the reference image specifying information of the long term is set to the SPS, similarly to the example of FIG. 68. In other words, although the copy flag is 1, when the setting mode information is 1, the copy flag is invalidated, and the information related to the reference image specifying information of the long term is set to the SPS.

(Third Example of Syntax of Slice Header of Enhancement Stream)

FIG. 88 is a diagram illustrating an exemplary syntax of a slice header of an enhancement stream at the time of setting mode utilization.

As illustrated in a 5-th line of FIG. 88, when the copy flag of the corresponding slice is different from the copy flag included in the SPS, the copy flag is set to the slice header of the enhancement stream, similarly to the example of FIG. 69. Further, as illustrated in 6-th to 12-th lines of FIG. 88, similarly to the example of FIG. 69, when the copy flag of the corresponding slice is 0, the RPS flag and the RPS or the index of the RPS are set.

Further, as illustrated in 13-th to 16-th lines of FIG. 88, when the long term flag is 1, when the copy flag is 0, or when the setting mode information is 1, the reference image specifying information of the long term is set.

(Description of Third Example of Processing of Encoding Device)

The scalable coding process at the time of setting mode utilization is similar to the scalable coding process of FIG. 71 except for the SPS setting process and the copy flag setting process. Thus, the following description will proceed with the SPS setting process and the copy flag setting process.

Figure 89:
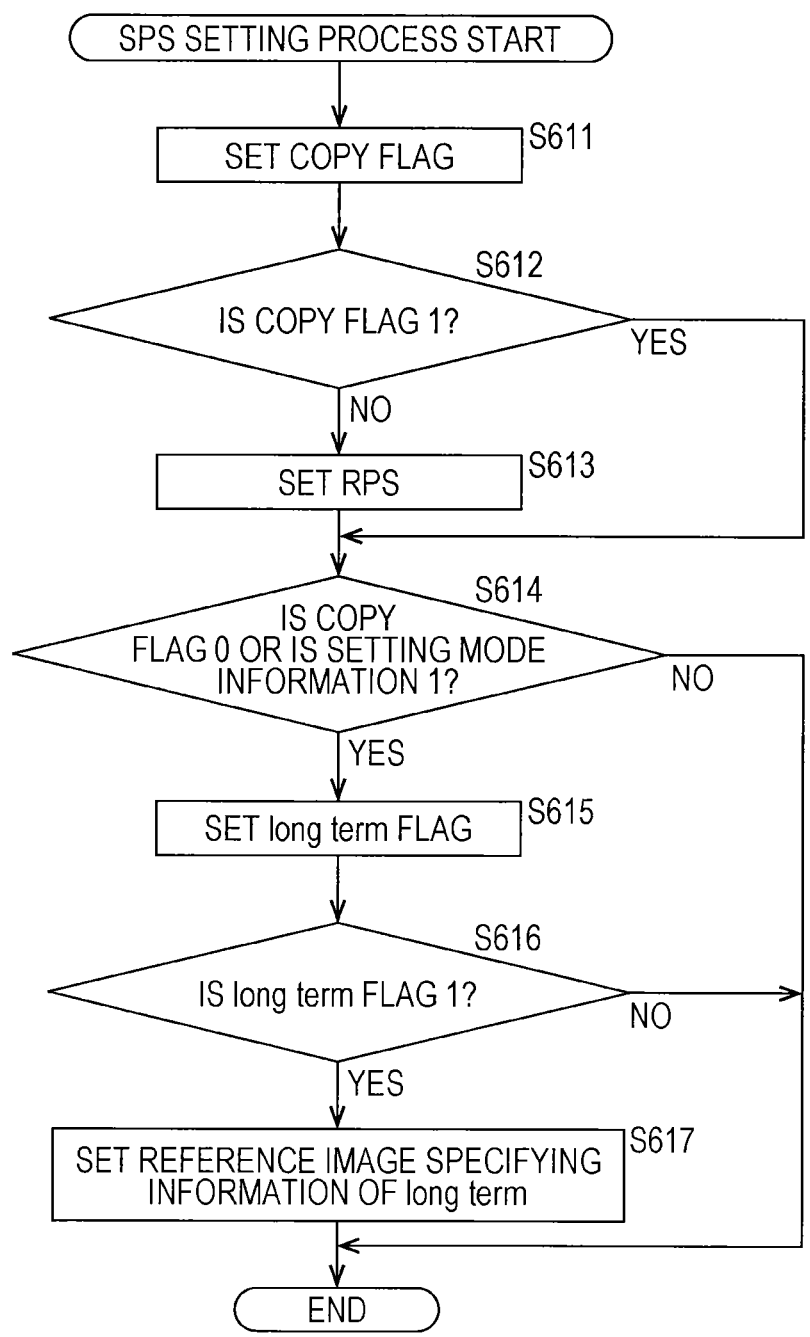
FIG. 89 is a flowchart for describing an SPS setting process at a time of setting mode utilization.

FIG. 89 is a flowchart for describing an SPS setting process at the time of setting mode utilization.

The process of steps S611 to S613 of FIG. 89 is similar to the process of steps S501 to S503 of FIG. 82 except that the RPS copy flag is replaced with the copy flag, and thus a description thereof is omitted.

After the process of step S613 or when the copy flag is determined to be 1 in step S612, the process proceeds to step S614.

In step S614, the setting unit 431 determines whether or not the copy flag or 0 or the setting mode information set to the VPS is 1.

When it is determined in step S614 that the copy flag is 0 or the setting mode information is 1, the process proceeds to step S615. The process of steps S615 to S617 is similar to the process of steps S384 to S386 of FIG. 72, and thus a description thereof is omitted.

Meanwhile, when it is determined in step S614 that the copy flag is not 0 or when the setting mode information is not 1, that is, when the copy flag is 1, and the setting mode information is 0, the process ends.

Figure 90:
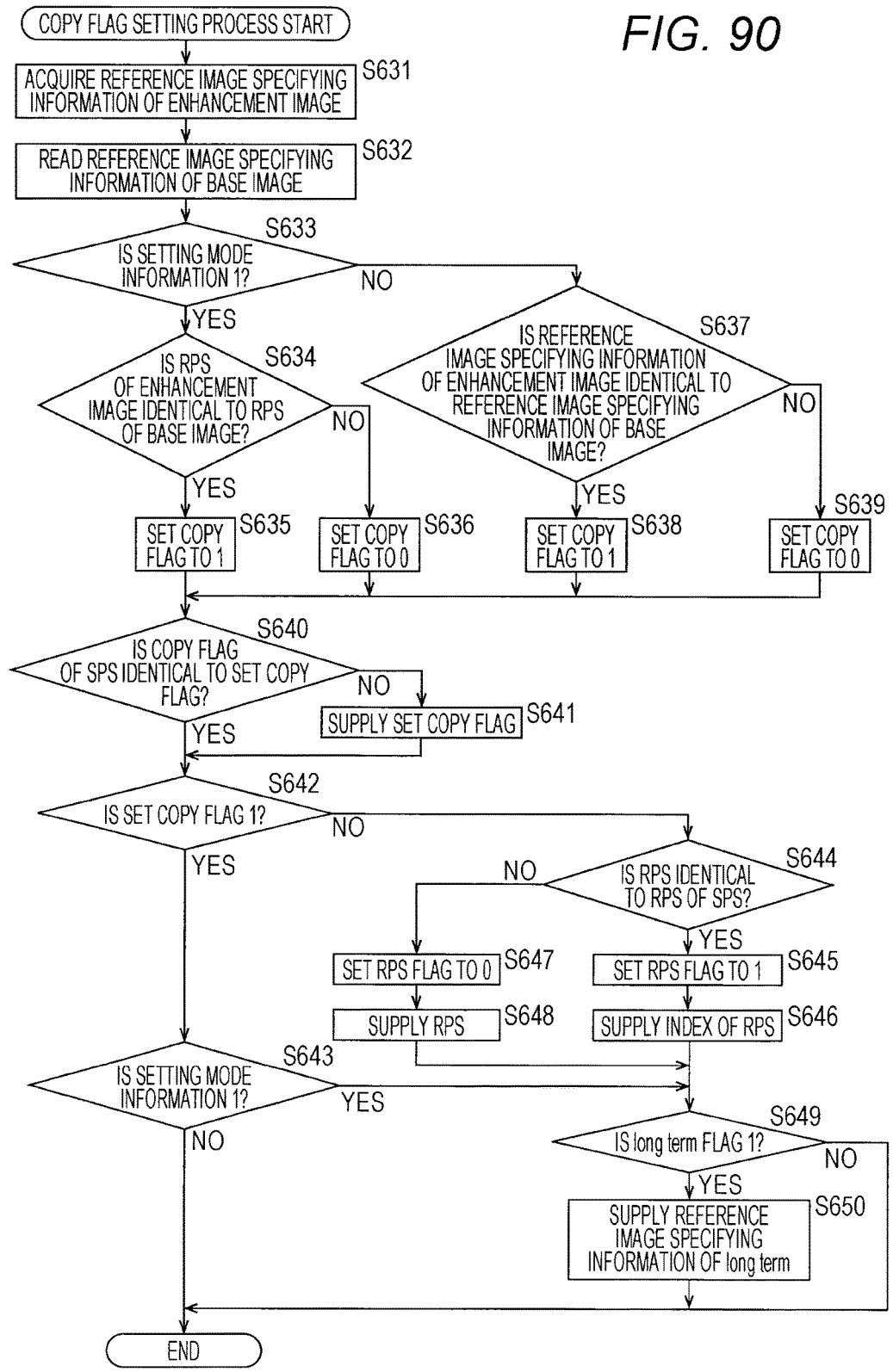
FIG. 90 is a flowchart for describing a copy flag setting process at a time of setting mode utilization.

FIG. 90 is a flowchart for describing a copy flag setting process at the time of setting mode utilization. The copy flag setting process is performed, for example, in units of slices.

The process of steps S631 and S632 of FIG. 90 is similar to the process of steps S390 and S391 of FIG. 73, and thus a description thereof is omitted.

In step S633, the reference image setting unit 453 of FIG. 67 determines whether or not the setting mode information set to the VPS supplied from the setting unit 431 is 1. When the setting mode information is determined to be 1 in step S633, in step S634, the reference image setting unit 453 determines whether or not the RPS of the enhancement image is identical to the RPS of the base image.

When the RPS of the enhancement image is determined to be identical to the RPS of the base image in step S634, in step S635, the reference image setting unit 453 sets the copy flag to 1, and the process proceeds to step S640.

Meanwhile, when the RPS of the enhancement image is determined to be not identical to the RPS of the base image in step S634, in step S636, the reference image setting unit 453 sets the copy flag to 0, and the process proceeds to step S640.

Further, when the setting mode information is determined to be not 1 in step S633, that is, when the setting mode information is 0, the process proceeds to step S637. The process of steps S637 to S639 is similar to the process of step S392, S393, and S396 of FIG. 73, and thus a description thereof is omitted. After the step S638 or S639, the process proceeds to step S640.

In step S640, the reference image setting unit 453 determines whether or not the copy flag of the SPS supplied from the setting unit 431 is identical to the set copy flag. When the copy flag of the SPS is determined to be identical to the set copy flag in step S640, the process proceeds to step S642.

Meanwhile, when the copy flag of the SPS is determined to be not identical to the set copy flag in step S640, in step S641, the reference image setting unit 453 supplies the set copy flag to the lossless encoding unit 451, and the process proceeds to step S642.

In step S642, the reference image setting unit 453 determines whether or not the set copy flag is 1. When the set copy flag is determined to be 1 in step S642, in step S643, the reference image setting unit 453 determines whether or not the setting mode information is 1.

When the setting mode information is determined to be not 1 in step S643, that is, when the setting mode information is 0, the process ends. Meanwhile, when the setting mode information is determined to be 1 in step S643, the process proceeds to step S649.

Further, when the set copy flag is determined to be not 1 in step S642, that is, when the set copy flag is 0, the process proceeds to step S644. The process of steps S644 to S650 is similar to the process of steps S399 to S405 of FIG. 73, and thus a description thereof is omitted.

As described above, at the time of setting mode utilization, when the setting mode information is 1, the copy flag for the reference image specifying information of the long term is invalidated, and thus it is possible to set the copy flag according to whether or not the RPS of the base image is identical to the RPS of the enhancement image. Thus, since the setting mode information is 1, when the reference image specifying information of the long term of the base image is different from the reference image specifying information of the long term of the enhancement image, the copy flag is set to 1, and thus the RPS can be shared between the base image and the enhancement image. As a result, the coding efficiency is improved.

(Description of Third Example of Processing of Decoding Device)

The scalable decoding process at the time of setting mode utilization is similar to the scalable decoding process at the time of common copy flag setting except for the SPS extraction process and the generation process. Thus, the following description will proceed with the SPS extraction process and the generation process.

Figure 91:
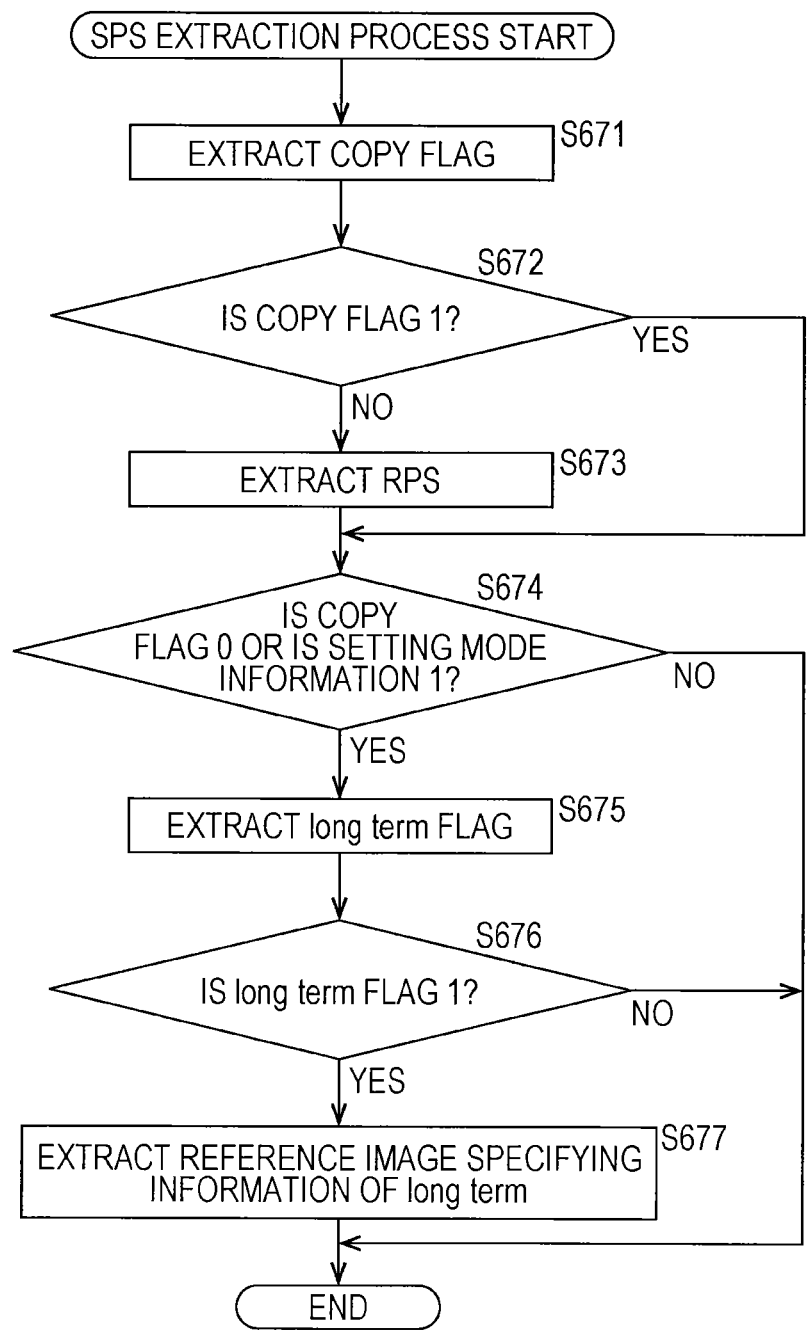
FIG. 91 is a flowchart for describing an SPS extraction process at a time of setting mode utilization.

FIG. 91 is a flowchart for describing an SPS extraction process at the time of setting mode utilization.

The process of steps S671 to S673 of FIG. 91 is similar to the process of steps S451 to S453 of FIG. 78, and thus a description thereof is omitted.

After the process of step S673 or when the copy flag is determined to be 1 in step S672, the process proceeds to step S674.

In step S674, the reference image setting unit 512 determines whether or not whether or not the copy flag included in the SPS supplied from the extracting unit 111 is 0 or the setting mode information included in the VPS is 1.

When it is determined in step S674 that the copy flag is 0 or the setting mode information is 1, the process proceeds to step S675. The process of steps S675 to S677 is similar to the process of steps S454 to S456 of FIG. 78, and thus a description thereof is omitted.

Meanwhile, when it is determined in step S674 that the copy flag is not 0 and the setting mode information is not 1, that is, when the copy flag is 1 and the setting mode information is 0, the process ends.

Figure 92:
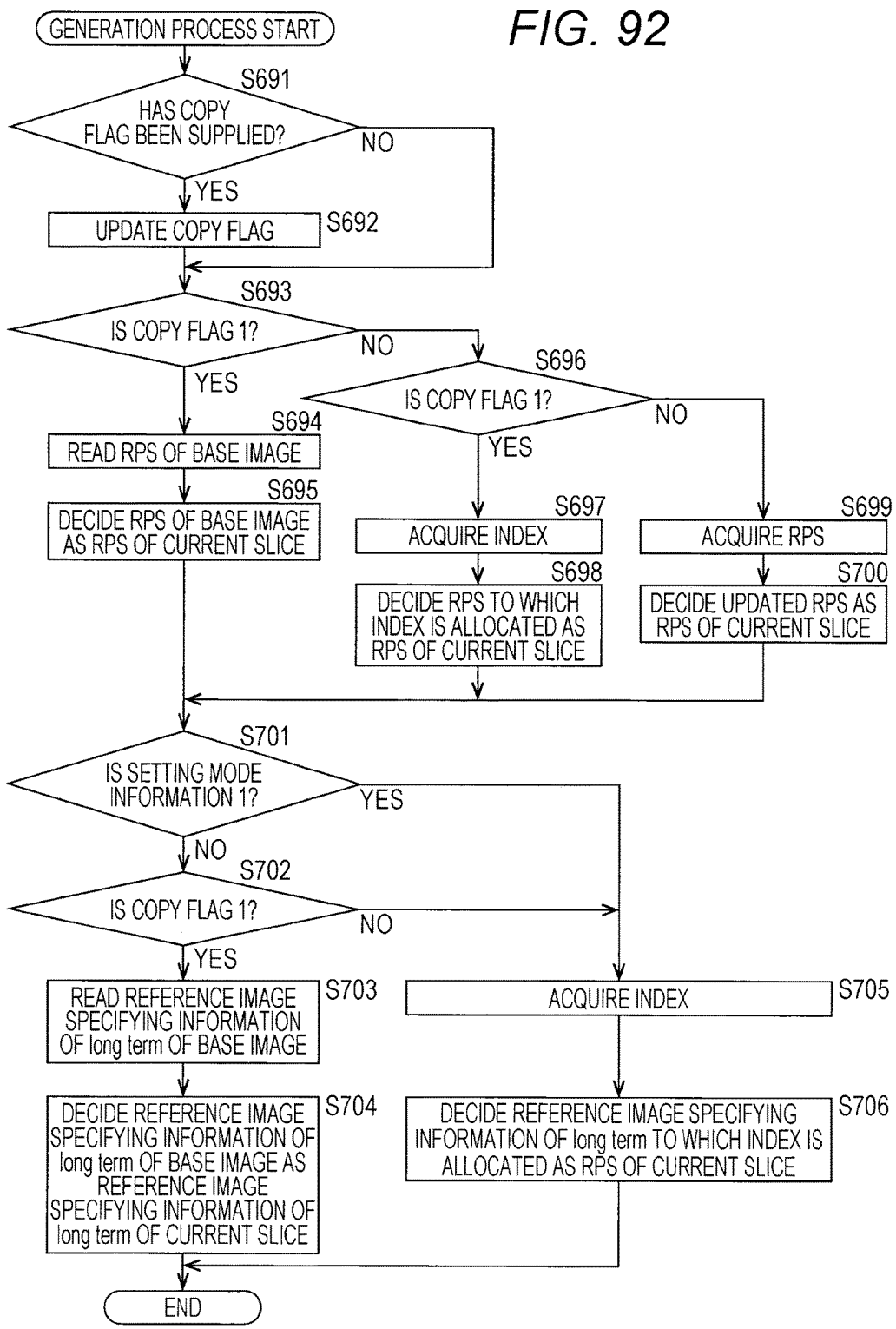
FIG. 92 is a flowchart for describing a generation process at a time of setting mode utilization.

FIG. 92 is a flowchart for describing a generation process at the time of setting mode utilization. The generation process is performed, for example, in units of slices.

The process of steps S691 and S692 of FIG. 92 is similar to the process of steps S471 and S472 of FIG. 79, and thus a description thereof is omitted. The process of steps S693 to S700 is similar to the process of steps S585 to S592 of FIG. 85 except that the RPS copy flag is replaced with the copy flag, and thus a description thereof is omitted.

In step S701, the reference image setting unit 512 determines whether or not the setting mode information included in the VPS set by the separating unit 92 is 1. When the setting mode information is determined to be not 1 in step S701, that is, when the setting mode information is 0, the process proceeds to step S702.

The process of steps S702 to S706 is similar to the process of step S593 to S597 of FIG. 85 except that the long term copy flag is replaced with the copy flag, and thus a description thereof is omitted.

Meanwhile, when the setting mode information is determined to be 1 in step S701, the process proceeds to step S705.

Further, in the above description, the coding scheme of the base image is assumed to be the HEVC scheme but may be a coding scheme other than the HEVC scheme such as the AVC scheme. In this case, it is difficult to share the reference image specifying information of the base image and the reference image specifying information of the enhancement image. Thus, the copy flag may be set only when the coding scheme of the base image is identical to the coding scheme of the enhancement image, and the reference image specifying information of the base image and the reference image specifying information of the enhancement image may be shared.

This case will be described below as a fourth example of the third embodiment. Here, an example at the time of common copy flag setting will be described, but the same applies at the time of another copy flag setting or at the time of setting mode utilization. Hereinafter, the fourth example of the third embodiment is referred to as a "time of common copy flag setting based on a coding scheme."

(Fourth Example of Syntax of SPS of Enhancement Stream)

FIG. 93 is a diagram illustrating an exemplary syntax of an SPS set by the setting unit 431 of FIG. 66 at the time of common copy flag setting based on a coding scheme.

As illustrated in 2-nd and 3-rd lines of FIG. 93, when the AVC flag (avc_base_layer_flag) set to the extension of the VPS of FIG. 86 is 0, that is, when the coding scheme is not the AVC scheme, the copy flag is set to the SPS. Further, as illustrated in 4-th and 14-th lines, when the AVC flag is 1 or when the copy flag is 0, similarly to the SPS of the base stream, the information related to the RPS and the information related to the reference image specifying information of the long term are set to the SPS.

(Description of Fourth Example of Processing of Encoding Device)

The scalable coding process at the time of common copy flag setting based on a coding scheme is similar to the scalable coding process of FIG. 71 except for the SPS setting process and the copy flag setting process.

The SPS setting process at the time of common copy flag setting based on a coding scheme is similar to the SPS setting process of FIG. 72 except that the setting unit 431 determines whether or not the AVC flag set to the VPS is 1 before the SPS setting process of FIG. 72. When the AVC flag is determined to be not 1, the SPS setting process of FIG. 72 is performed, and when the AVC flag is determined to be 0, the process proceeds to step S383.

Further, the copy flag setting process at the time of common copy flag setting based on a coding scheme is similar to the copy flag setting process of FIG. 73 except that the reference image setting unit 453 determines whether or not the AVC flag set to the VPS supplied from the setting unit 431 is 1 before the copy flag setting process of FIG. 73. When the AVC flag is determined to be not 1, the copy flag setting process of FIG. 73 is performed, and when the AVC flag is determined to be 1, the process proceeds to step S399.

(Description of Fourth Example of Processing of Decoding Device)

The scalable decoding process at the time of common copy flag setting based on a coding scheme is similar to the scalable decoding process at the time of common copy flag setting except for the SPS extraction process and the generation process.

The SPS extraction process at the time of common copy flag setting based on a coding scheme is similar to the SPS extraction process of FIG. 78 except that the reference image setting unit 512 determines whether or not the AVC flag included in the VPS extracted by the separating unit 92 is 1 before the SPS extraction process of FIG. 78. When the AVC flag is determined to be not 1, the SPS extraction process of FIG. 78 is performed, and when the AVC flag is determined to be 0, the process proceeds to step S453.

Further, the generation process at the time of common copy flag setting based on a coding scheme is similar to the generation process of FIG. 79 except that the reference image setting unit 512 determines whether or not the AVC flag is 1 before the generation process of FIG. 79. When the AVC flag is determined to be not 1, the generation process of FIG. 79 is performed, and when the AVC flag is determined to be 1, the process proceeds to step S476.

<Fourth Embodiment>

(Exemplary Configuration of Encoding Device of Fourth Embodiment)

Figure 94:
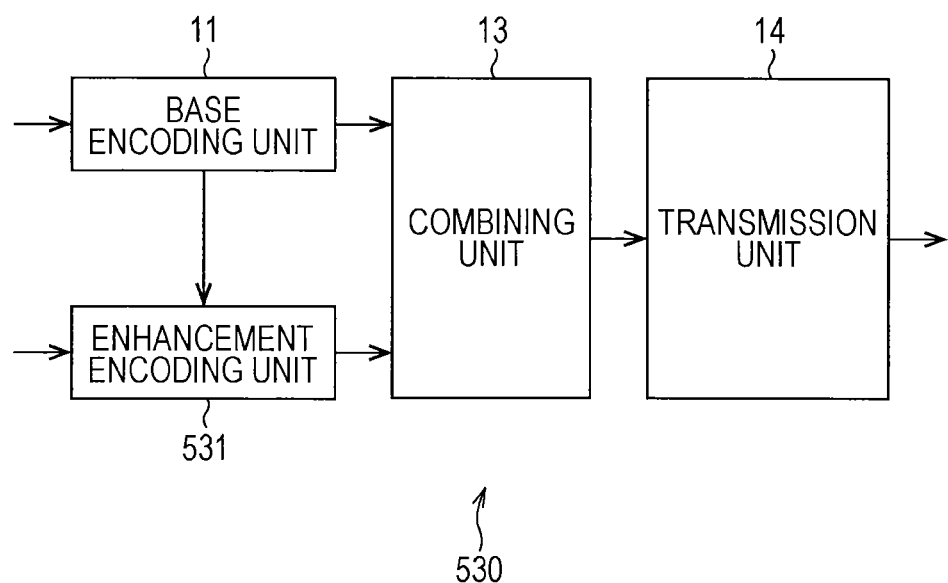
FIG. 94 is a block diagram illustrating an exemplary configuration of an encoding device according to a fourth embodiment of the present technology.

FIG. 94 is a block diagram illustrating an exemplary configuration of an encoding device according to a fourth embodiment of the present technology.

Among components illustrated in FIG. 94, the same components of FIG. 6 are denoted by the same reference numerals. A duplicated description will be appropriately omitted.

A configuration of the encoding device 530 of FIG. 94 differs from the configuration of FIG. 6 in that an enhancement encoding unit 531 is disposed instead of the enhancement encoding unit 12. The encoding device 530 shares at least a part of RPS between the base image and the enhancement image.

Specifically, the enhancement image is input to the enhancement encoding unit 531 of the encoding device 530 from the outside. The enhancement encoding unit 531 encodes the enhancement image according to the scheme complying with the HEVC scheme.

Further, the enhancement encoding unit 531 sets a partial RPS copy flag as the reference image specifying generation information (the reference image generation information) using the RPS of the base image supplied from the base encoding unit 11. Then, the enhancement encoding unit 531 adds the partial RPS copy flag and the like to the encoding result, and generates encoded data. Further, the partial RPS copy flag is a flag indicating whether or not at least a part of RPS of the base image is used as the RPS of the enhancement image.

The enhancement encoding unit 531 supplies an encoded stream including the encoded data, the SPS, the PPS, and the like to the combining unit 13 as the enhancement stream.

Here, the encoding device 530 transmits the encoded stream for all layers but may transmit only the base stream as necessary.

(Exemplary Configuration of Enhancement Encoding Unit)

Figure 95:
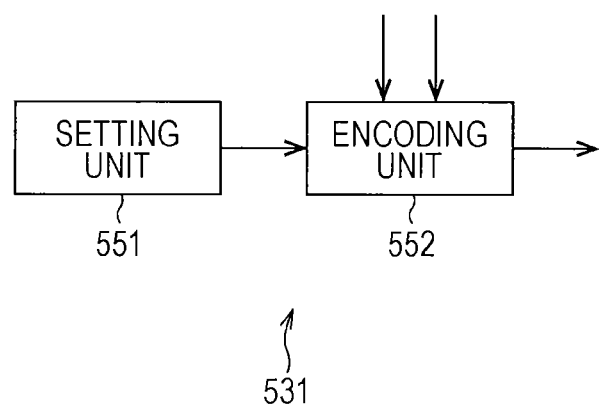
FIG. 95 is a block diagram illustrating an exemplary configuration of an enhancement encoding unit of FIG. 94.

FIG. 95 is a block diagram illustrating an exemplary configuration of the enhancement encoding unit 531 of FIG. 94.

The enhancement encoding unit 531 of FIG. 95 includes a setting unit 551 and an encoding unit 552.

The setting unit 551 of the enhancement encoding unit 531 sets a parameter set including the partial RPS copy flag such as the SPS or the PPS as necessary. The setting unit 551 supplies the set parameter set to the encoding unit 552.

The encoding unit 552 receives the enhancement image of the frame unit input from the outside as the input signal, and encodes the enhancement image according to the scheme complying with the HEVC scheme. Further, the encoding unit 552 sets the partial RPS copy flag based on the RPS used at the time of encoding and the RPS supplied from the base encoding unit 11.

The encoding unit 552 generates encoded data by adding the partial RPS copy flag and the like to the encoding result based on the set partial RPS copy flag and the partial RPS copy flag included in the SPS supplied from the setting unit 551. Then, the encoding unit 552 generates an enhancement stream based on the encoded data and the parameter set supplied from the setting unit 551, and supplies the generated enhancement stream to the combining unit 13 of FIG. 94.

(Exemplary Configuration of Encoding Unit)

Figure 96:
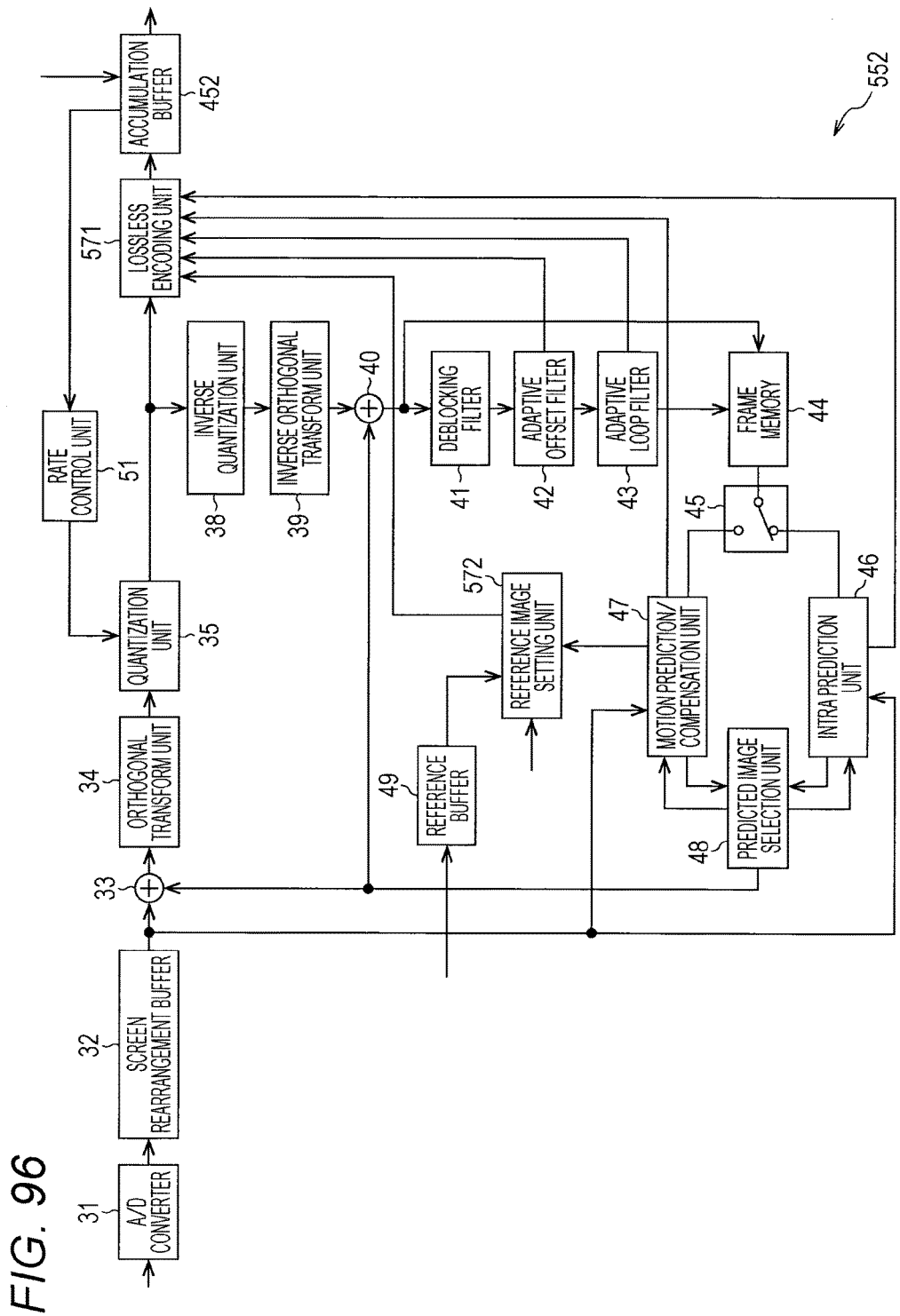
FIG. 96 is a block diagram illustrating an exemplary configuration of an encoding unit of FIG. 95.

FIG. 96 is a block diagram illustrating an exemplary configuration of the encoding unit 552 of FIG. 95.

Among components illustrated in FIG. 96, the same components of FIG. 14 are denoted by the same reference numerals. A duplicated description will be appropriately omitted.

A configuration of the encoding unit 552 of FIG. 96 differs from the configuration of FIG. 14 except that a lossless encoding unit 571, an accumulation buffer 452, and a reference image setting unit 572 are disposed instead of the lossless encoding unit 36, the accumulation buffer 37, and the reference image setting unit 50.

The lossless encoding unit 571 acquires the intra prediction mode information from the intra prediction unit 46. Further, the lossless encoding unit 571 acquires the inter prediction mode information, the motion vector, and the like supplied from the motion prediction/compensation unit 47 from the motion prediction/compensation unit 47. Furthermore, the lossless encoding unit 571 acquires the RPS flag, the partial RPS copy flag, and the like from the reference image setting unit 572. Moreover, the lossless encoding unit 571 acquires the offset filter information the adaptive offset filter 42, and acquires the filter coefficient from the adaptive loop filter 43.

The lossless encoding unit 571 performs lossless coding on the quantized coefficients supplied from the quantization unit 35. Further, the lossless encoding unit 571 performs lossless coding on either of the intra prediction mode information or the inter prediction mode information, the motion vector, the RPS flag, the partial RPS copy flag, the offset filter information, and the filter coefficient as the encoding information. The lossless encoding unit 571 adds the lossless encoded encoding information to the lossless-encoded coefficients, and generates encoded data. The lossless encoding unit 571 supplies the encoded data to be accumulated in the accumulation buffer 452.

The reference image setting unit 572 compares the RPS supplied from the motion prediction/compensation unit 47 with the RPS stored in the reference buffer 49, and sets the partial RPS copy flag. Then, when the set partial RPS copy flag is different from the partial RPS copy flag included in the SPS supplied from the setting unit 551 of FIG. 95, the reference image setting unit 572 supplies the set partial RPS copy flag to the lossless encoding unit 571.

Further, the reference image setting unit 572 generates the RPS for the partial RPS copy flag based on the RPS supplied from the motion prediction/compensation unit 47, the RPS of the base image, and the partial RPS copy flag. Then, the reference image setting unit 572 compares the generated RPS for the partial RPS copy flag with the RPS for the partial RPS copy flag included in the SPS, sets the RPS flag, and supplies the RPS flag to the lossless encoding unit 571. Further, the reference image setting unit 572 supplies the generated RPS for the partial RPS copy flag to the lossless encoding unit 571 based on the RPS flag or supplies the index specifying the RPS for the partial RPS copy flag included in the SPS that is identical to the corresponding RPS to the lossless encoding unit 571.

(First Example of Syntax of SPS of Enhancement Stream)

FIG. 97 is a diagram illustrating an exemplary syntax of an SPS set by the setting unit 551 of FIG. 95.

As illustrated in a 3-rd line of FIG. 97, a partial RPS copy flag (inter_layer_prediction_flag) is set to the SPS of the enhancement stream. The partial RPS copy flag is 1 when at least a part of RPS of the base image is used as the RPS of the enhancement image and 0 when all RPSs of the base image are not used as the RPS of the enhancement image.

Further, as illustrated in a 4-th line, similarly to the SPS of the base stream, the number (num_short_term_ref_pic_sets) of RPSs included in the SPS is set. Further, as illustrated in 5-th and 6-th lines, an RPS (short_term_ref_pic_set (i,inter_layer_prediction_flag) for the partial RPS copy flag set to the SPS is set. Furthermore, as illustrated in 7-th to 13-th lines, similarly to the RPS of the base stream, the information related to the reference image specifying information of the long term is set.

(First Example of Syntax of Slice Header of Enhancement Stream)

FIG. 98 is a diagram illustrating an exemplary syntax of a slice header of an enhancement stream.

As illustrated in a 5-th line of FIG. 98, when the partial RPS copy flag of the corresponding slice is different from the partial RPS copy flag included in the SPS, the partial RPS copy flag is set to the slice header of the enhancement stream. As illustrated in a 6-th line, similarly to the slice header of the base stream, the RPS flag is set.

Further, as illustrated in 7-th and 8-th lines, when the RPS flag is 0, the RPS for the partial RPS copy flag of the corresponding slice is set. As illustrated in 9-th and 10-th lines, when the RPS flag is 1, the index of the RPS for the partial RPS copy flag included in the SPS, which is identical to the RPS for the partial RPS copy flag of the corresponding slice is set. Further, as illustrated in 11-th and 12-th lines, similarly to the slice header of the base stream, the reference image specifying information of the long term is set according to the long term flag.

(First Example of Syntax of RPS)

FIG. 99 is a diagram illustrating an exemplary syntax of an RPS for the partial RPS copy flag.

As illustrated in a 3-rd line of FIG. 99, reference information (inter_ref_pic_set_prediction_flag) is set to the RPS for the partial RPS copy flag. Here, the reference information indicates the presence or absence of reference between different layers other than between the same layers. In other words, when the reference information is 1, the reference information indicates that the RPS of the previous image or the base image is used as the RPS of the enhancement image. Meanwhile, when the reference information is 0, the reference information indicates that the RPS of the previous image and the base image are not used as the RPS of the enhancement image.

As illustrated in 4-th to 10-th lines, when the reference information is 1, and the partial RPS copy flag is 0, that is, when the RPS of the previous image is used as the RPS of the enhancement image, the previous image specifying information (delta_idx_minus1), the sign (delta_rps_sign), and the absolute value (abs_delta_rps_minus1) are set.

Further, as illustrated in 11-th to 14-th lines, when the reference information is 1, a flag (used_by_curr_pic_lt_flag (used_by_curr_pic_flag)) is set, and when a flag (used_by_curr_pic_flag) is 0, a flag (use_delta_flag) is further set. Meanwhile, as illustrated in 15-th to 25-th lines, when the reference information is 0, for example, information indicating the number of reference images or a POC is set.

Thus, when the reference information is 1, the previous image specifying information (delta_idx_minus1), the sign (delta_rps_sign), and the absolute value (abs_delta_rps_minus1) are set to the RPS for the case in which the partial RPS copy flag is 0. Further, the flag (used_by_curr_pic_lt_flag) is set, and the flag (use_delta_flag) is set according to the flag (used_by_curr_pic_flag). When the reference information is 0, for example, information indicating the number of reference images or a POC is set to the RPS for the case in which the partial RPS copy flag is 0.

Meanwhile, to the RPS for the case in which the partial RPS copy flag is 1, a flag (used_by_curr_pic_flag) is set, and a flag (use_delta_flag) is set according to a flag (used_by_curr_pic_flag).

In other words, when the partial RPS copy flag is 1, since an image of a reference destination of the RPS is fixed to the base image of a same time, information specifying the base image is not set. Further, in this case, since at least part of RPS of the base image is used as the RPS of the enhancement image without change, the sign (delta_rps_sign) and the absolute value (abs_delta_rps_minus1) related to the difference of the RPS are not set as well. As a result, the coding efficiency is improved.

Further, when the partial RPS copy flag is 1, a flag (used_by_curr_pic_flag) (utilization information) is set. Thus, it is possible to designate whether or not the RPS of the reference image is used as the RPS of the enhancement image for each reference image of the base image.

Further, when the partial RPS copy flag is 1, the reference information is necessarily 1, and thus there is no case in which the reference information is 0.

(Description of First Example of Processing of Encoding Device)

The scalable coding process of the encoding device 530 of FIG. 94 is similar to the scalable coding process of FIG. 71 except for the SPS setting process and the copy flag setting process. Thus, the following description will proceed with the SPS setting process and the copy flag setting process.

Figure 100:
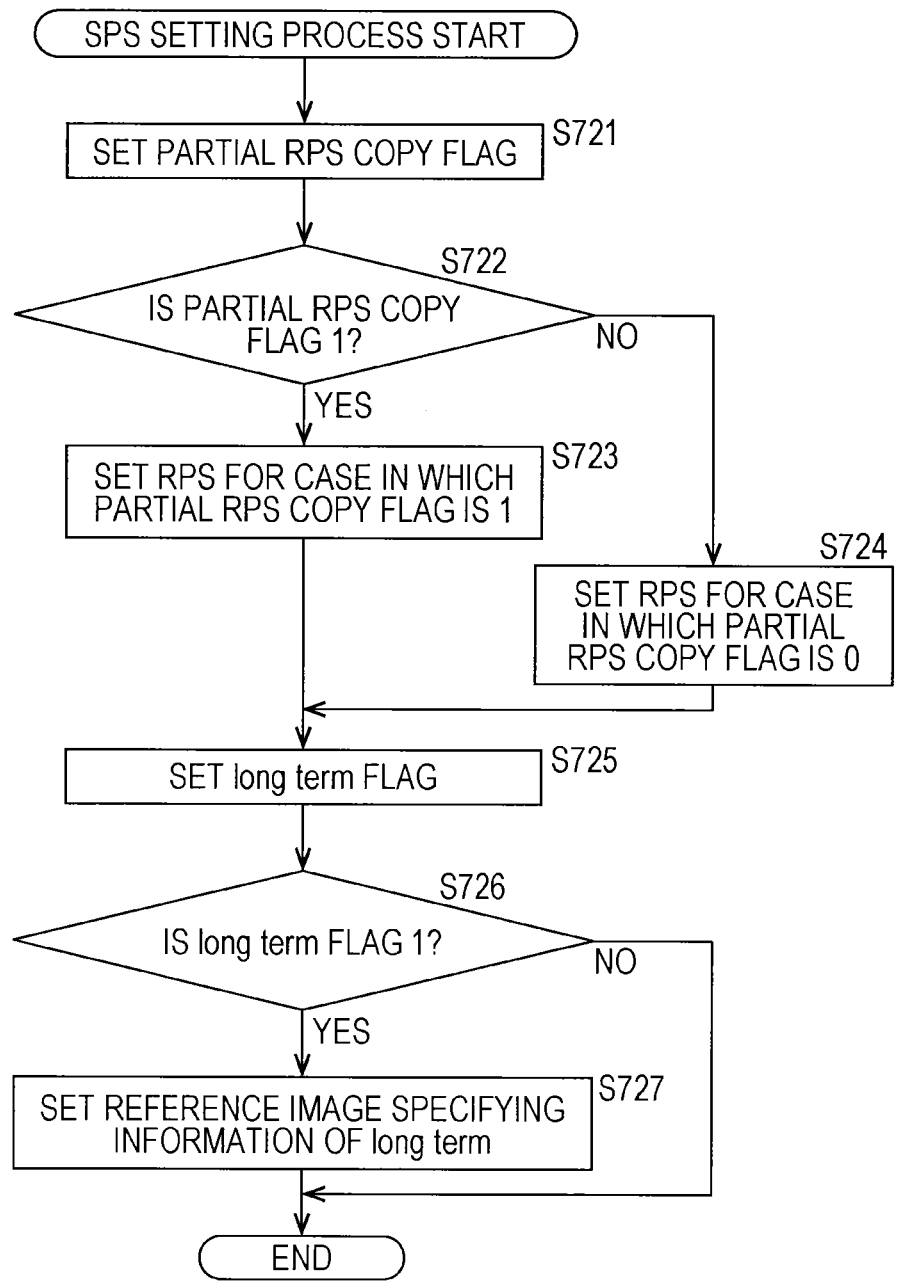
FIG. 100 is a flowchart for describing an SPS setting process of the encoding device of FIG. 94.

FIG. 100 is a flowchart for describing an SPS setting process of the encoding device 530.

In step S721 of FIG. 100, the setting unit 551 of FIG. 95 sets the partial RPS copy flag to the SPS. In step S722, the setting unit 551 determines whether or not the partial RPS copy flag is 1. When the partial RPS copy flag is determined to be 1 in step S722, in step S723, the setting unit 551 sets the RPS for the case in which the partial RPS copy flag is 1 to the SPS by the number (num_short_term_ref_pic_sets) of RPSs.

Specifically, the setting unit 551 sets the RPS for the partial RPS copy flag including 1 serving as the reference information and the flag (used_by_curr_pic_lt_flag) to the SPS by the number (num_short_term_ref_pic_sets) of RPSs. Further, when the flag (used_by_curr_pic_flag) is 0, the flag (use_delta_flag) is set to the RPS for the partial RPS copy flag as well.

Meanwhile, when the partial RPS copy flag is determined to be not 1 in step S722, that is, when the partial RPS copy flag is 0, the process proceeds to step S724. In step S724, the setting unit 551 sets the RPS for the case in which the partial RPS copy flag is 0 to the SPS by the number (num_short_term_ref_pic_sets) of RPSs.

Specifically, the setting unit 551 sets the RPS for the partial RPS copy flag that includes the reference information, includes the previous image specifying information (delta_idx_minus1), the sign (delta_rps_sign), the absolute value (abs_delta_rps_minus1), and the flag (used_by_curr_pic_flag) when the reference information is 1, and includes information indicating the number of reference images or a POC and the like when the reference information is 0 to the SPS by the number (num_short_term_ref_pic_sets) of RPSs. Further, when the flag (used_by_curr_pic_flag) is 0, the flag (use_delta_flag) is set to the RPS for the partial RPS copy flag as well.

After the process of step S723 or S724, the process proceeds to step S725. The process of steps S725 to S727 is similar to the process of steps S384 to S386 of FIG. 72, and thus a description thereof is omitted.

Figure 101:
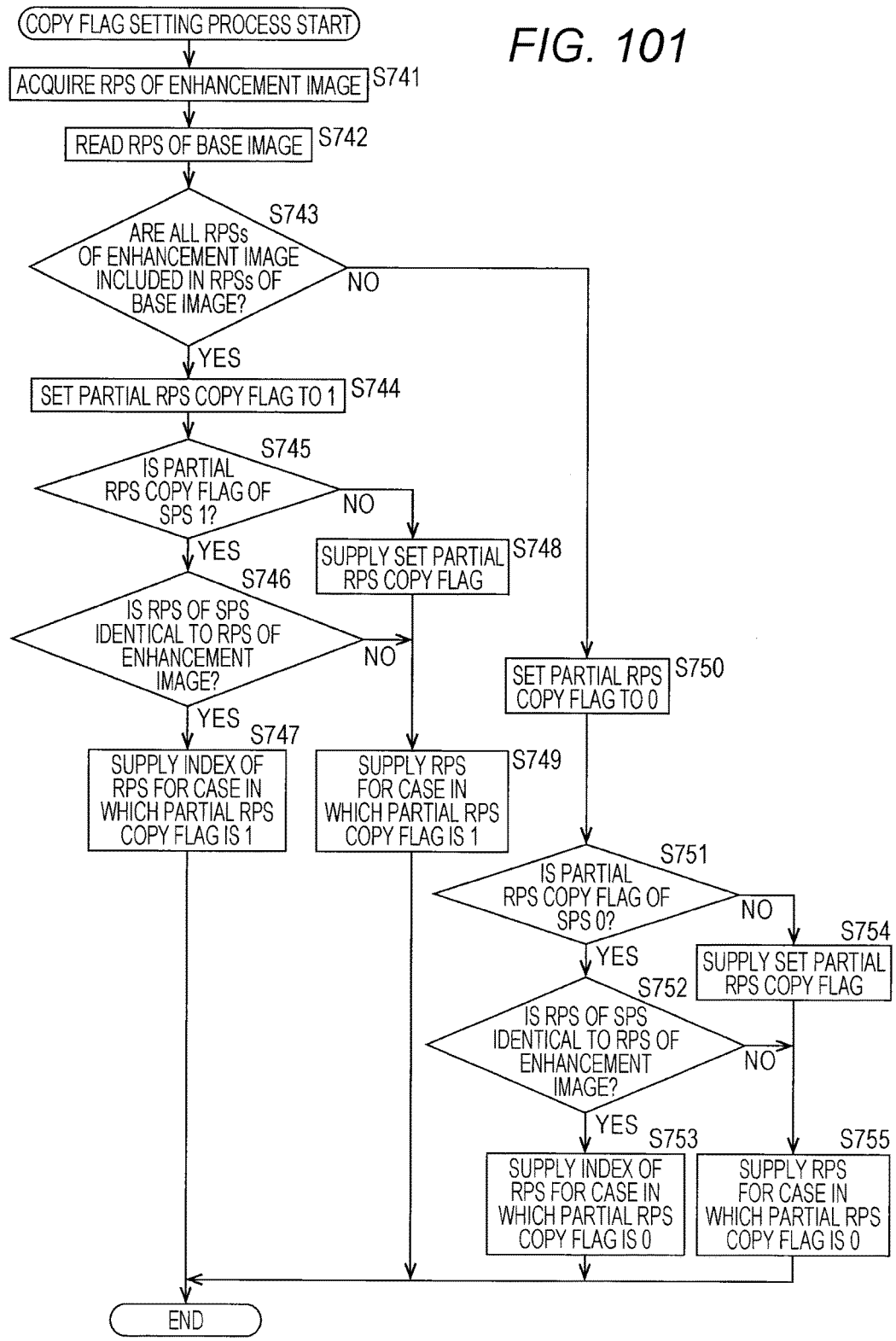
FIG. 101 is a flowchart for describing the details of a copy flag setting process of the encoding device of FIG. 94.

FIG. 101 is a flowchart for describing the details of the copy flag setting process of the encoding device 530. The copy flag setting process is performed, for example, in units of slices.

The process of step S741 and S742 of FIG. 101 is similar to the process of steps S390 and S391 of FIG. 73 except that the reference image specifying information is replaced with the RPS, and thus a description thereof is omitted.

In step S743, the reference image setting unit 572 determines whether or not all RPSs of the enhancement image are included in the RPS of the base image. When all RPSs of the enhancement image are determined to be included in the RPS of the base image in step S743, in step S744, the reference image setting unit 572 sets the partial RPS copy flag to 1.

Further, the reference image setting unit 572 generates the RPS of the enhancement image for the case in which the partial RPS copy flag is 1 based on the RPS of the enhancement image and the RPS of the base image.

Specifically, the reference image setting unit 572 generates the RPS for the case in which the partial RPS copy flag is 1 in which among the reference images specified by the RPS of the base image, the flag (used_by_curr_pic_flag) of the same reference image as the reference image specified by the RPS of the enhancement image is set to 1, and the flag (used_by_curr_pic_flag) of a different reference image is set to 0.

Then, in step S745, the reference image setting unit 572 determines whether or not the partial RPS copy flag of the SPS supplied from the setting unit 551 of FIG. 95 is 1. When the partial RPS copy flag is determined to be 1 in step S745, the process proceeds to step S746.

In step S746, the reference image setting unit 572 determines whether or not the RPS of the SPS for the case in which the partial RPS copy flag is 1 is identical to the RPS of the enhancement image for the case in which the partial RPS copy flag is 1. When the RPS of the SPS is determined to be identical to the RPS of the enhancement image in step S746, the process proceeds to step S747.

In step S747, the reference image setting unit 572 supplies 1 serving as the RPS flag and the index of the RPS of the SPS for the case in which the partial RPS copy flag is 1 that is identical to the RPS of the enhancement image to the lossless encoding unit 571, and the process ends.

Meanwhile, when the partial RPS copy flag is determined to be not 1 in step S745, that is, when the partial RPS copy flag is 0, the process proceeds to step S748. In step S748, the reference image setting unit 572 supplies 0 serving as the set partial RPS copy flag to the lossless encoding unit 571, and the process proceeds to step S749.

Further, when the RPS of the SPS is determined to be identical to the RPS of the enhancement image in step S746, the process proceeds to step S749.

In step S749, the reference image setting unit 572 supplies 0 serving as the RPS flag and the RPS for the case in which the partial RPS copy flag is 1 to the lossless encoding unit 571, and the process ends.

Meanwhile, when at least apart of RPS of the enhancement image is determined to be not included in the RPS of the base image in step S743, in step S750, the reference image setting unit 572 sets the partial RPS copy flag to 0. Further, the reference image setting unit 572 generates the RPS of the enhancement image for the case in which the partial RPS copy flag is 0 based on the RPS of the enhancement image and the RPS of the previous image.

In step S751, the reference image setting unit 572 determines whether or not the partial RPS copy flag of the SPS supplied from the setting unit 551 is 0.

When the partial RPS copy flag of the SPS is determined to be 0 in step S751, the process proceeds to step S752. Meanwhile, when the partial RPS copy flag of the SPS is determined to be not 0 in step S751, that is, when the partial RPS copy flag of the SPS is determined to be 1, the process proceeds to step S754.

The process of steps S752 to S755 is similar to the process of steps S746 to S749 except that the RPS for the case in which the partial RPS copy flag is 1 is replaced with the RPS for the case in which the partial RPS copy flag is 0, and thus a description thereof is omitted.

As described above, the encoding device 530 sets the partial RPS copy flag. Thus, even when the RPS of the base image is not perfectly identical to the RPS of the enhancement image, if the RPS of the enhancement image is included in the RPS of the base image, the RPS can be shared between the base layer and the enhancement layer. As a result, it is possible to reduce the information amount of the enhancement stream and improve the coding efficiency.

Further, the encoding device 530 sets the flag (used_by_curr_pic_flag) and thus can designate a portion of the RPS shared by the base layer and the enhancement layer.

(Exemplary Configuration of Decoding Device of Fourth Embodiment)

Figure 102:
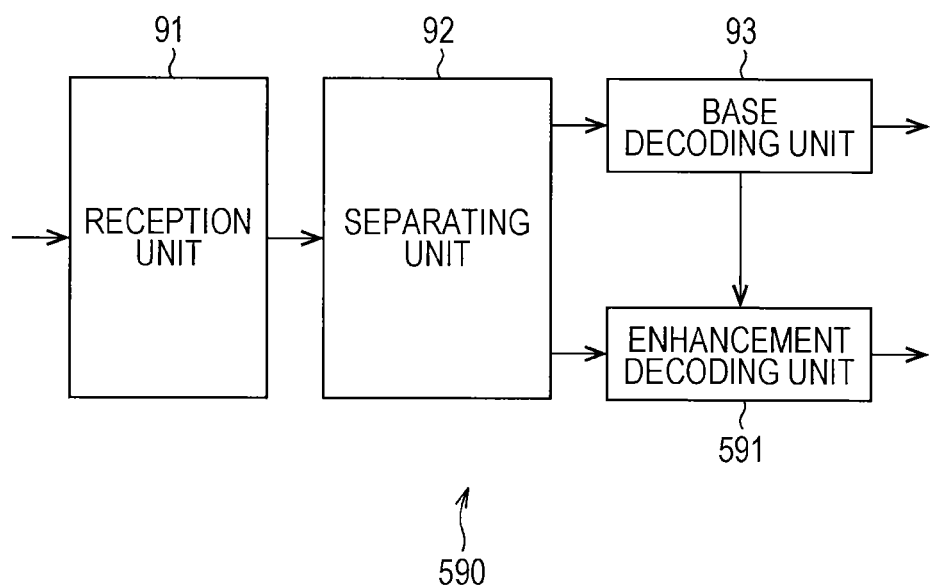
FIG. 102 is a block diagram illustrating an exemplary configuration of a decoding device according to the fourth embodiment of the present disclosure.

FIG. 102 is a block diagram illustrating an exemplary configuration of a decoding device according to a fourth embodiment of the present disclosure that decodes the encoded stream for all layers transmitted from the encoding device 530 of FIG. 94.

Among components illustrated in FIG. 102, the same components of FIG. 29 are denoted by the same reference numerals. A duplicated description will be appropriately omitted.

A configuration of a decoding device 590 of FIG. 102 differs from a configuration of the decoding device 90 of FIG. 29 in that an enhancement decoding unit 591 is disposed instead of the enhancement decoding unit 94.

The enhancement decoding unit 591 of the decoding device 590 decodes the enhancement stream supplied from the separating unit 92 according to the scheme complying with the HEVC scheme, and generates the enhancement image. At this time, the enhancement decoding unit 591 refers to the RPS of the base image supplied from the base decoding unit 93, the partial RPS copy flag included in the SPS or the slice header, or the like. The enhancement decoding unit 591 outputs the generated enhancement image.

(Exemplary Configuration of Enhancement Decoding Unit)

Figure 103:
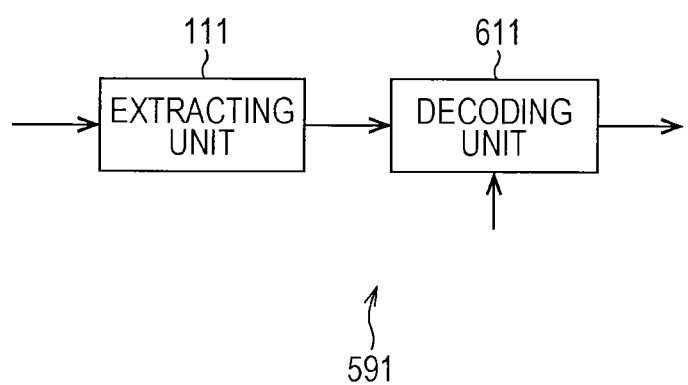
FIG. 103 is a block diagram illustrating an exemplary configuration of an enhancement decoding unit of FIG. 102.

FIG. 103 is a block diagram illustrating an exemplary configuration of the enhancement decoding unit 591 of FIG. 102.

Among components illustrated in FIG. 103, the same components of FIG. 30 are denoted by the same reference numerals. A duplicated description will be appropriately omitted.

A configuration of the enhancement decoding unit 591 of FIG. 103 differs from the configuration of the enhancement decoding unit 94 of FIG. 30 in that a decoding unit 611 is disposed instead of the decoding unit 112.

The decoding unit 611 of the enhancement decoding unit 591 decodes the encoded data supplied from the extracting unit 111 according to the scheme complying with the HEVC scheme with reference to the RPS of the base image supplied from the base decoding unit 93 of FIG. 102 and the partial RPS copy flag included in the SPS or the slice header supplied from the extracting unit 111. The decoding unit 611 outputs an image obtained as a result of decoding as the enhancement image.

(Exemplary Configuration of Decoding Unit)

Figure 104:
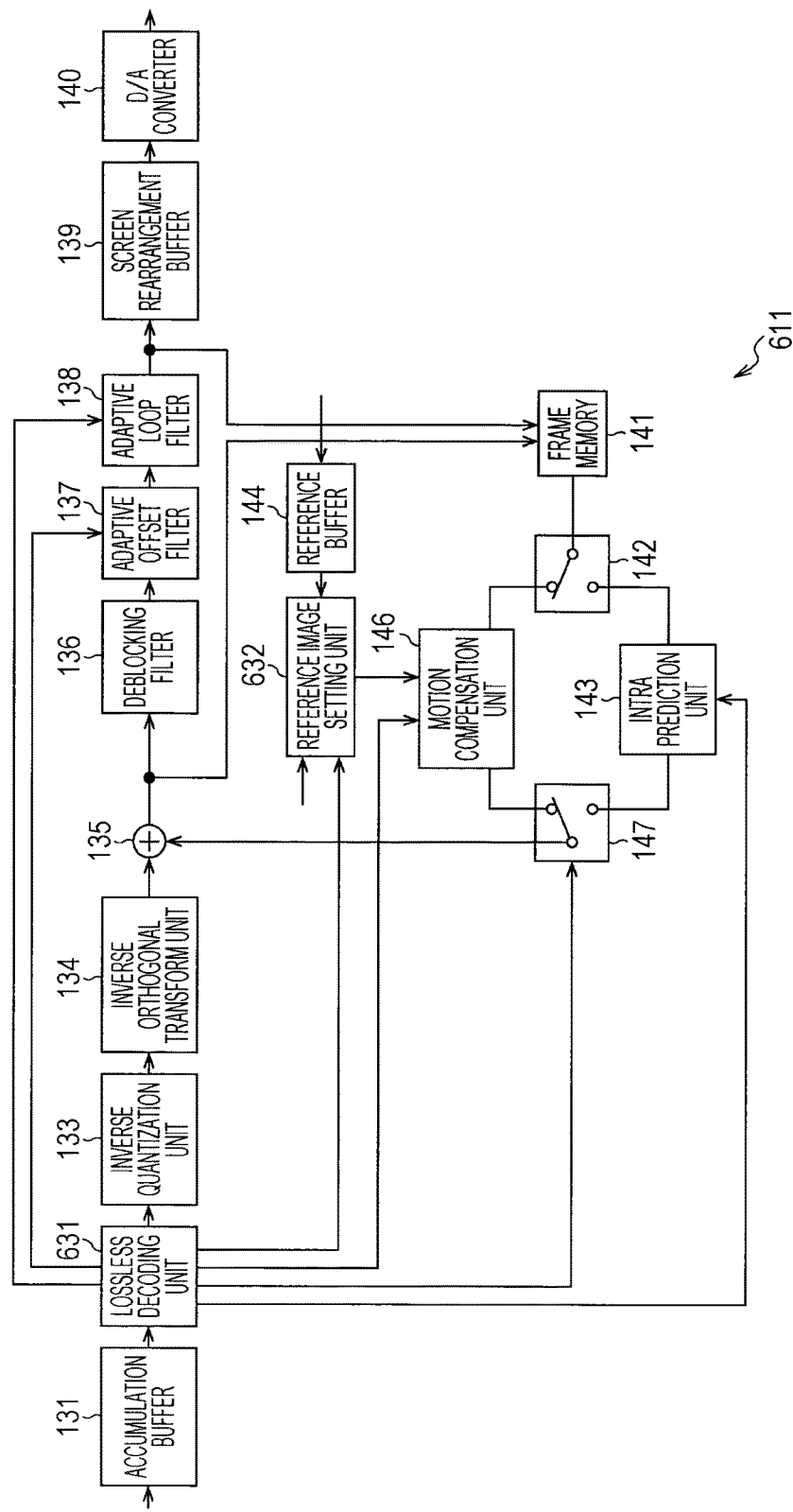
FIG. 104 is a block diagram illustrating an exemplary configuration of a decoding unit of FIG. 103.

FIG. 104 is a block diagram illustrating an exemplary configuration of the decoding unit 611 of FIG. 103.

Among components illustrated in FIG. 104, the same components of FIG. 31 are denoted by the same reference numerals. A duplicated description will be appropriately omitted.

A configuration of the decoding unit 611 of FIG. 104 differs from the configuration of the decoding unit 112 of FIG. 31 in that a lossless decoding unit 631 is disposed instead of the lossless decoding unit 132, and a reference image setting unit 632 is disposed instead of the reference image setting unit 145.

The lossless decoding unit 631 of the decoding unit 611 performs lossless decoding on the encoded data supplied from the accumulation buffer 131, and obtains the quantized coefficients and the encoding information. The lossless decoding unit 631 supplies the quantized coefficients to the inverse quantization unit 133. Further, the lossless decoding unit 631 supplies the intra prediction mode information serving as the encoding information and the like to the intra prediction unit 143, and supplies the motion vector, the inter prediction mode information, and the like to the motion compensation unit 146.

Further, the lossless decoding unit 631 supplies the partial RPS copy flag, the RPS flag, the RPS for the partial RPS copy flag or the index of the RPS, and the like serving as the encoding information to the reference image setting unit 632. Furthermore, the lossless decoding unit 631 supplies the intra prediction mode information or the inter prediction mode information serving as the encoding information to the switch 147. The lossless decoding unit 631 supplies the offset filter information serving as the encoding information to the adaptive offset filter 137, and supplies the filter coefficient to the adaptive loop filter 138.

The reference image setting unit 632 holds the partial RPS copy flag included in the SPS supplied from the extracting unit 111 of FIG. 103 and the RPS for the partial RPS copy flag. When the partial RPS copy flag and the RPS for the partial RPS copy flag are supplied from the lossless decoding unit 631, the reference image setting unit 632 updates the held partial RPS copy flag and the RPS for the partial RPS copy flag.

Then, the reference image setting unit 632 reads the RPS of the base image the reference buffer 144 based on the held partial RPS copy flag. Further, the reference image setting unit 632 acquires the held RPS for the partial RPS copy flag or the RPS for the partial RPS copy flag of the held index supplied from the lossless decoding unit 631 based on the RPS flag supplied from the lossless decoding unit 631.

When the partial RPS copy flag is 1, the reference image setting unit 632 decides at least a part of the RPSs of the base image as the RPS of the current slice based on the RPS of the base image and the RPS for the case in which the partial RPS copy flag is 1. Meanwhile, when the partial RPS copy flag is 0, the reference image setting unit 632 decides the RPS for the case in which the partial RPS copy flag is 0 as the RPS of the current slice.

(Description of First Example of Processing of Decoding Device)

The scalable decoding process of the decoding device 590 of FIG. 102 is similar to the scalable decoding process of the decoding device 470 except for the SPS extraction process and the generation process. Thus, the following description will proceed with the SPS extraction process and the generation process.

Figure 105:
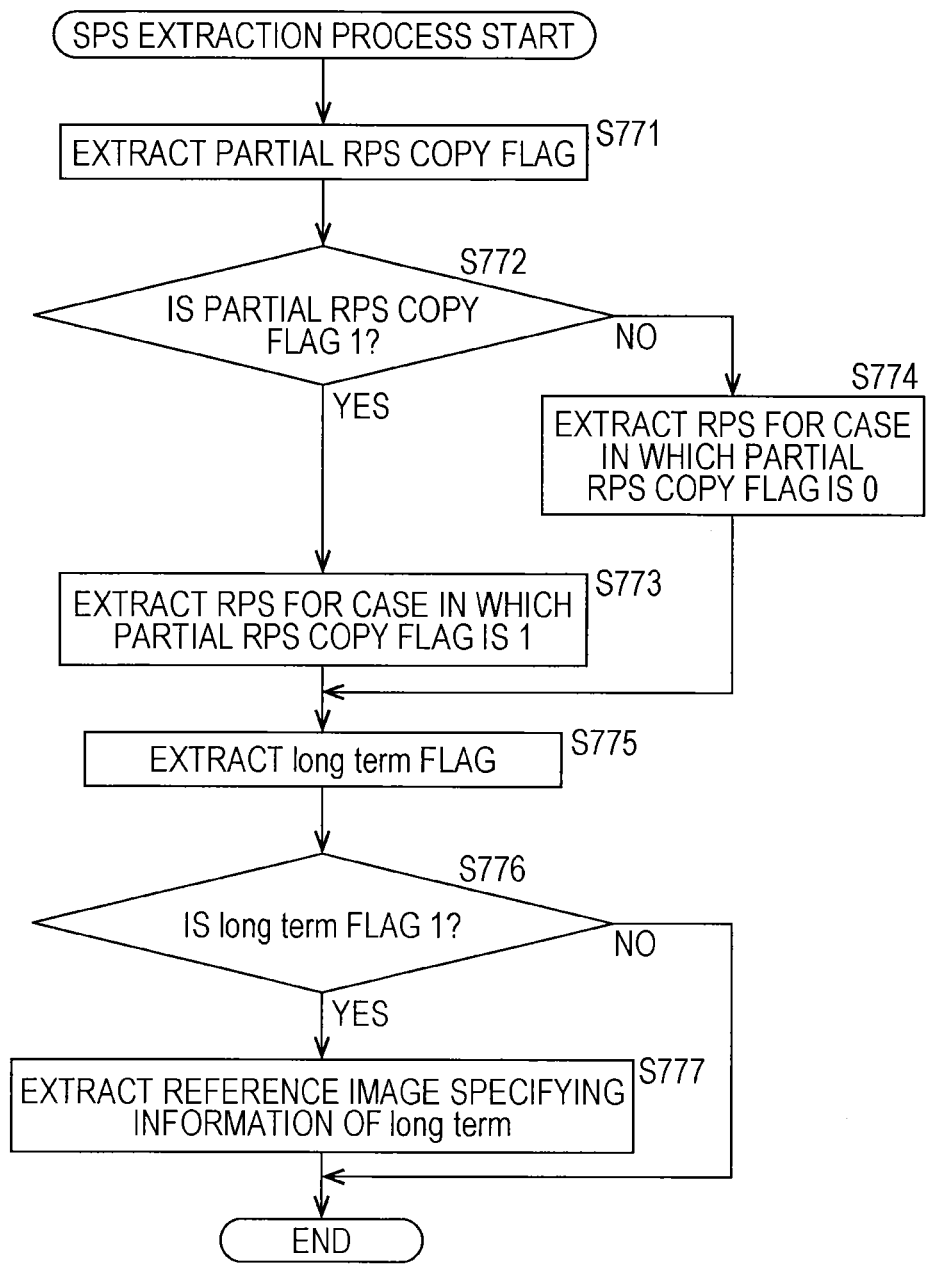
FIG. 105 is a flowchart for describing the details of an SPS extraction process of the decoding device of FIG. 102.

FIG. 105 is a flowchart for describing the details of an SPS extraction process of the decoding device 590.

In step S771 of FIG. 105, the reference image setting unit 632 of FIG. 104 extracts the partial RPS copy flag from the SPS and holds the extracted partial RPS copy flag.

In step S772, the reference image setting unit 632 determines whether or not the partial RPS copy flag is 1. When the partial RPS copy flag is determined to be 1 in step S772, in step S773, the reference image setting unit 632 extracts the RPS for the case in which the partial RPS copy flag is 1 from the SPS by the number (num_short_term_ref_pic_sets) of RPSs, and holds the extracted RPSs.

Meanwhile, when the partial RPS copy flag is determined to be not 1 in step S772, that is, when the partial RPS copy flag is 0, the process proceeds to step S774. In step S774, the reference image setting unit 632 extracts the RPS for the case in which the partial RPS copy flag is 0 from the SPS by the number (num_short_term_ref_pic_sets) of RPSs, and holds the extracted RPSs.

After the process of step S773 or S774, the process proceeds to step S775. The process of steps S775 to S777 is similar to the process of step S454 to S456 of FIG. 78, and thus a description thereof is omitted.

Figure 106:
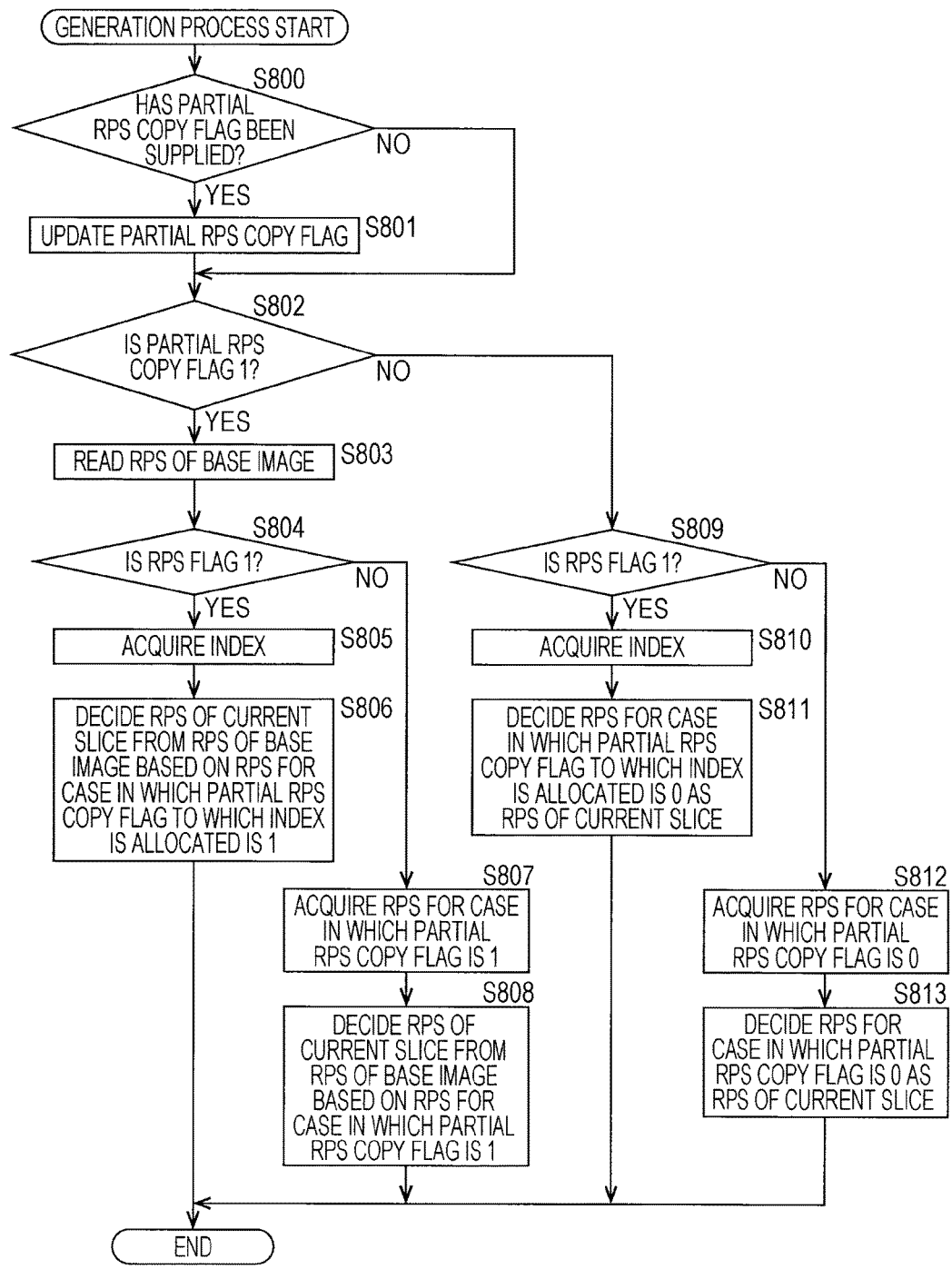
FIG. 106 is a flowchart for describing the details of a generation process of the decoding device of FIG. 102.

FIG. 106 is a flowchart for describing the details of a generation process of the decoding device 590. The generation process is performed, for example, in units of slices.

The process of steps S800 to S802 of FIG. 106 is similar to the process of steps S471 to S473 of FIG. 79 except that the copy flag is replaced with the partial RPS copy flag, and thus a description thereof is omitted.

When the partial RPS copy flag is determined to be 1 in step S802, in step S803, the reference image setting unit 632 reads the RPS of the base image from the reference buffer 144.

In step S804, the reference image setting unit 632 determines whether or not the RPS flag supplied from the lossless decoding unit 631 is 1.

When the RPS flag is determined to be 1 in step S804, in step S805, the reference image setting unit 632 acquires the index of the RPS supplied from the lossless decoding unit 631.

In step S806, the reference image setting unit 632 decides the RPS of the current slice from the RPS of the base image based on the RPS for the case in which the partial RPS copy flag is 1 and to which the acquired index is allocated among the held RPSs. Specifically, the reference image setting unit 632 decides only information specifying the reference image in which the flag (used_by_curr_pic_lt_flag) included in the RPS for the case in which the partial RPS copy flag is 1 among the RPSs of the base image is 1 as the RPS of the current slice. Then, the process ends.

Meanwhile, when the RPS flag determined to be not 1 in step S804, that is, when the RPS flag is 0, in step S807, the reference image setting unit 632 acquires the RPS for the case in which the partial RPS copy flag is 1, which is supplied from the lossless decoding unit 631. Based on the RPS, the RPS for the partial RPS copy flag included in the SPS held in the reference image setting unit 632 is updated.

In step S808, the reference image setting unit 632 decides the RPS of the current slice from the RPS of the base image based on the updated RPS for the case in which the partial RPS copy flag is 1, similarly to step S806. Then, the process ends.

Meanwhile, when the partial RPS copy flag is determined to be not 1 in step S802, that is, when the partial RPS copy flag is 0, the process proceeds to step S809. The process of steps S809, S810, and step S812 is similar to the process of steps S804, S805, and S807 except that the RPS for the case in which the partial RPS copy flag is 1 is replaced with the RPS for the case in which the partial RPS copy flag is 0, and thus a description thereof is omitted.

After the process of step S810, in step S811, the reference image setting unit 632 decides the RPS for the case in which the partial RPS copy flag is 0 and to which the acquired index is allocated among the held RPSs as the RPS of the current slice. Then, the process ends.

Meanwhile, after the process of step S812, in step S813, the reference image setting unit 632 decides the updated RPS for the case in which the partial RPS copy flag is 0 as the RPS of the current slice. Then, the process ends.

Further, after the generation process ends, the partial RPS copy flag and the RPS held in the reference image setting unit 632 are restored to the partial RPS copy flag and the RPS included in the SPS.

As described above, the decoding device 590 generates the RPS of the enhancement image using the partial RPS copy flag. Thus, even when the RPS of the base image is not perfectly identical to the RPS of the enhancement image, if the RPS of the enhancement image is included in the RPS of the base image, it is possible to share the RPS between the base layer and the enhancement layer and decode the enhancement stream with the improved coding efficiency.

Further, the decoding device 590 receives the flag (used_by_curr_pic_flag) and thus can recognize a portion of the RPS shared by the base layer and the enhancement layer.

Further, in the above description, the RPS is set to be distinguished into the RPS for the case in which the partial RPS copy flag is 1 and the RPS for the case in which the partial RPS copy flag is 0 but may be set without being distinguished. This case will be described below as a second example of the fourth embodiment. Hereinafter, the second example of the fourth embodiment is referred to as a "time of common RPS setting."

(Second Example of Syntax of RPS)

FIG. 107 is a diagram illustrating an exemplary syntax of an RPS at the time of common RPS setting.

At the time of common RPS setting, the RPS of FIG. 107 is set as the RPS for the partial RPS copy flag of the SPS of FIG. 97 or the slice header of FIG. 98.

In the RPS of FIG. 107, as illustrated in a 3-rd line, the reference information (inter_ref_pic_set_prediction_flag) is set, similarly to the example of FIG. 99. Further, as illustrated in 4-th and 5-th lines, when the reference information is 1, the partial RPS copy flag is set to the RPS. In other words, when the reference information is 0, the partial RPS copy flag is necessarily 0, and thus only when the reference information is 1, the partial RPS copy flag is set.

Further, as illustrated in 6-th to 11-th lines, when the partial RPS copy flag is 0, that is, when the reference information is 1, and the partial RPS copy flag is 0, the previous image specifying information (delta_idx_minus1), the sign (delta_rps_sign), and the absolute value (abs_delta_rps_minus1) are set to the RPS, similarly to the example of FIG. 99.

Further, as illustrated in 12-th to 15-th lines, when the reference information is 1, similarly to the example of FIG. 99, the flag (used_by_curr_pic_flag) and the flag (use_delta_flag) according to the flag (used_by_curr_pic_flag) are set to the RPS.

Further, as illustrated in 16-th to 27-th lines, when the reference information is 0, for example, information indicating the number of reference images or a POC is set to the RPS, similarly to the example of FIG. 99.

(Description of Second Example of Processing of Encoding Device)

The scalable coding process at the time of common RPS setting is similar to the scalable coding process of FIG. 71 except for the SPS setting process and the copy flag setting process. Thus, the following description will proceed with the SPS setting process and the copy flag setting process.

Figure 108:
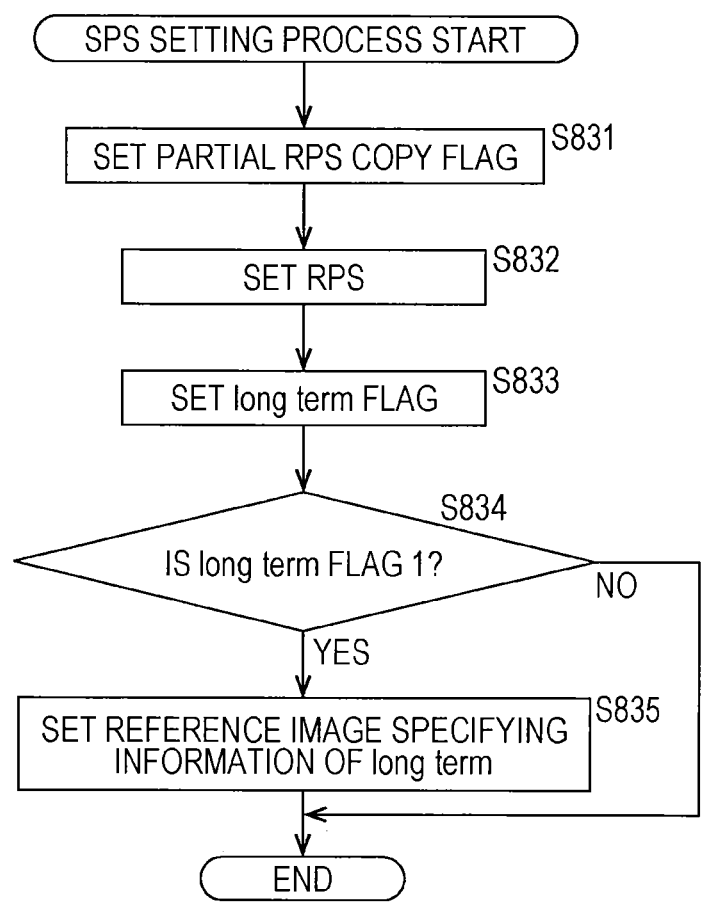
FIG. 108 is a flowchart for describing an SPS setting process at a time of common RPS setting.

FIG. 108 is a flowchart for describing an SPS setting process at the time of common RPS setting.

In step S831 of FIG. 108, the setting unit 551 of FIG. 95 sets the partial RPS copy flag to the SPS. In step S832, the setting unit 551 sets the RPS to the SPS by the number (num_short_term_ref_pic_sets) of RPSs. Specifically, the setting unit 551 sets the RPS in which the reference information is set, the partial RPS copy flag when the reference information is 1 is set, and information according to the reference information and the partial RPS copy flag is set to the SPS by the number (num_short_term_ref_pic_sets) of RPSs.

The process of steps S833 to S835 is similar to the process of steps S384 to S386 of FIG. 72, and thus a description thereof is omitted.

Figure 109:
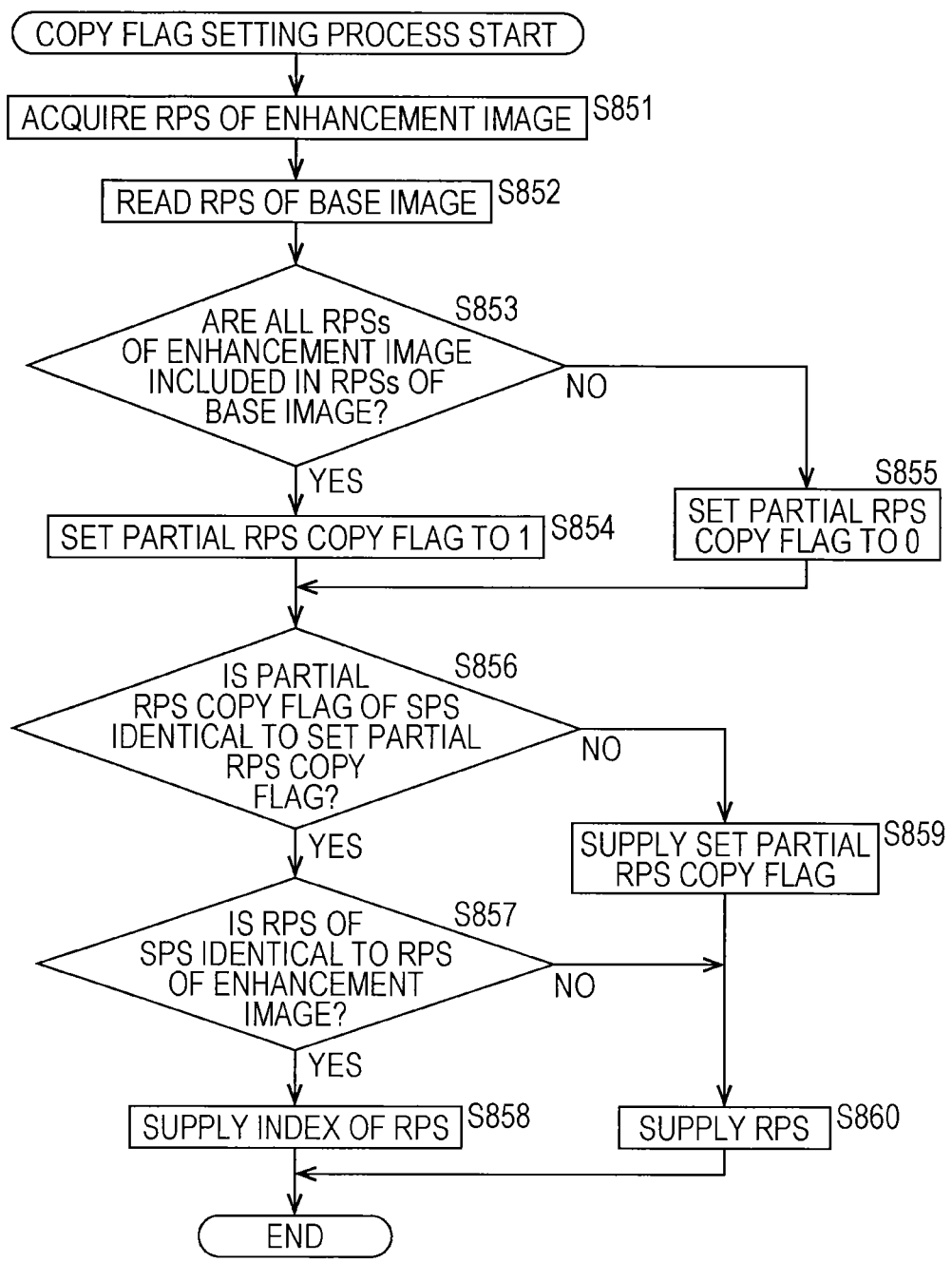
FIG. 109 is a flowchart for describing the details of a copy flag setting process at a time of common RPS setting.

FIG. 109 is a flowchart for describing the details of the copy flag setting process at the time of common RPS setting. The copy flag setting process is performed, for example, in units of slices.

The process of steps S851 to S855 of FIG. 109 is similar to the process of steps S741 to S744 and S750 of FIG. 101, and thus a description thereof is omitted.

After the process of step S854 or S855, the process proceeds to step S856. In step S856, the reference image setting unit 572 determines whether or not the partial RPS copy flag of the SPS supplied from the setting unit 551 of FIG. 95 is identical to the partial RPS copy flag set in step S854 or step S855.

When the partial RPS copy flags are determined to be identical to each other in step S856, in step S857, the reference image setting unit 572 determines whether or not the RPS of the SPS is identical to the RPS of the enhancement image. When the RPS of the SPS is determined to be identical to the RPS of the enhancement image in step S857, the process proceeds to step S858.

In step S858, the reference image setting unit 572 supplies 1 serving as the RPS flag and the index of the RPS to the lossless encoding unit 571, and the process ends.

Meanwhile, when the partial RPS copy flags are determined to be not identical to each other in step S856, in step S859, the reference image setting unit 572 supplies the set partial RPS copy flag to the lossless encoding unit 571, and the process proceeds to step S860.

Further, when the RPS of the SPS is determined to be not identical to the RPS of the enhancement image in step S857, the process proceeds to step S860.

In step S860, the reference image setting unit 572 supplies 0 serving as the RPS flag and the RPS to the lossless encoding unit 571, and the process ends.

(Description of Second Example of Processing of Decoding Device)

The scalable decoding process at the time of common RPS setting is similar to the scalable decoding process of the decoding device 470 except for the SPS extraction process and the generation process. Thus, the following description will proceed with the SPS extraction process and the generation process.

Figure 110:
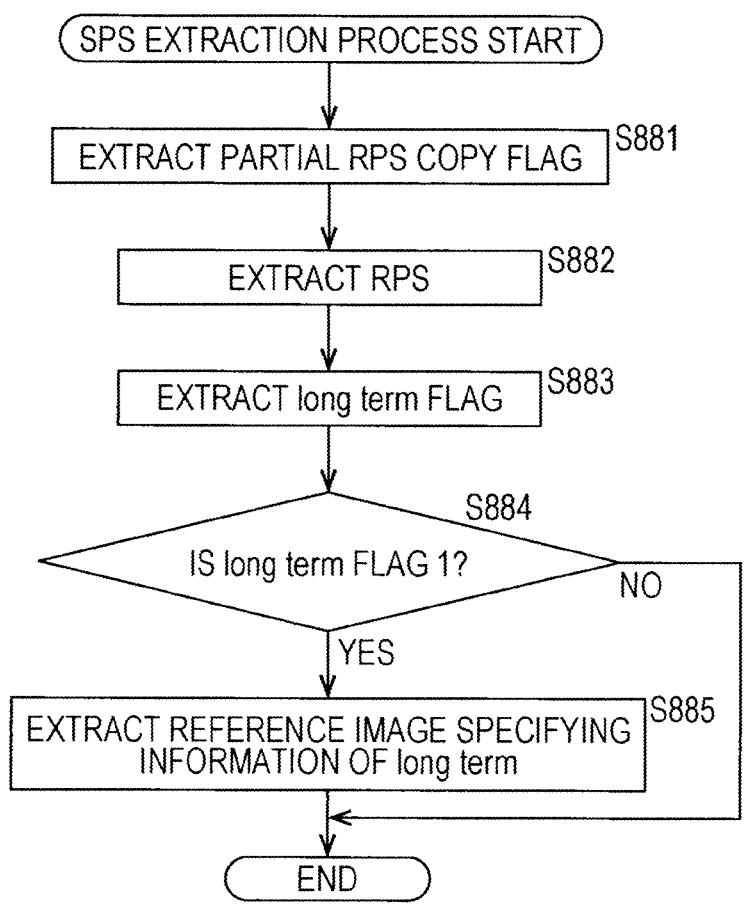
FIG. 110 is a flowchart for describing an SPS extraction process at a time of common RPS setting.

FIG. 110 is a flowchart for describing an SPS extraction process at the time of common RPS setting.

In step S881 of FIG. 110, the reference image setting unit 632 of FIG. 104 extracts the partial RPS copy flag from the SPS, and holds the extracted partial RPS copy flag. In step S882, the reference image setting unit 632 extracts the RPS from the SPS, and holds the extracted RPS.

The process of steps S883 to S885 is similar to the process of step S454 to S456 of FIG. 78, and thus a description thereof is omitted.

The generation process at the time of common RPS setting is similar to the generation process of FIG. 106 except that the RPS for the case in which the partial RPS copy flag is 1 and the RPS for the case in which the partial RPS copy flag is 0 are replaced with the RPS.

Further, in the fourth embodiment, similarly to the third embodiment, the coding scheme other than the HEVC scheme such as the AVC scheme can be used as the coding scheme of the base image. In this case, only when the coding scheme of the base image is identical to the coding scheme of the enhancement image, the partial RPS copy flag is set, and at least part of RPS is shared by the base image and the enhancement image.

<Application to Multi-View Image Coding and Multi-View Image Decoding>

Figure 111:
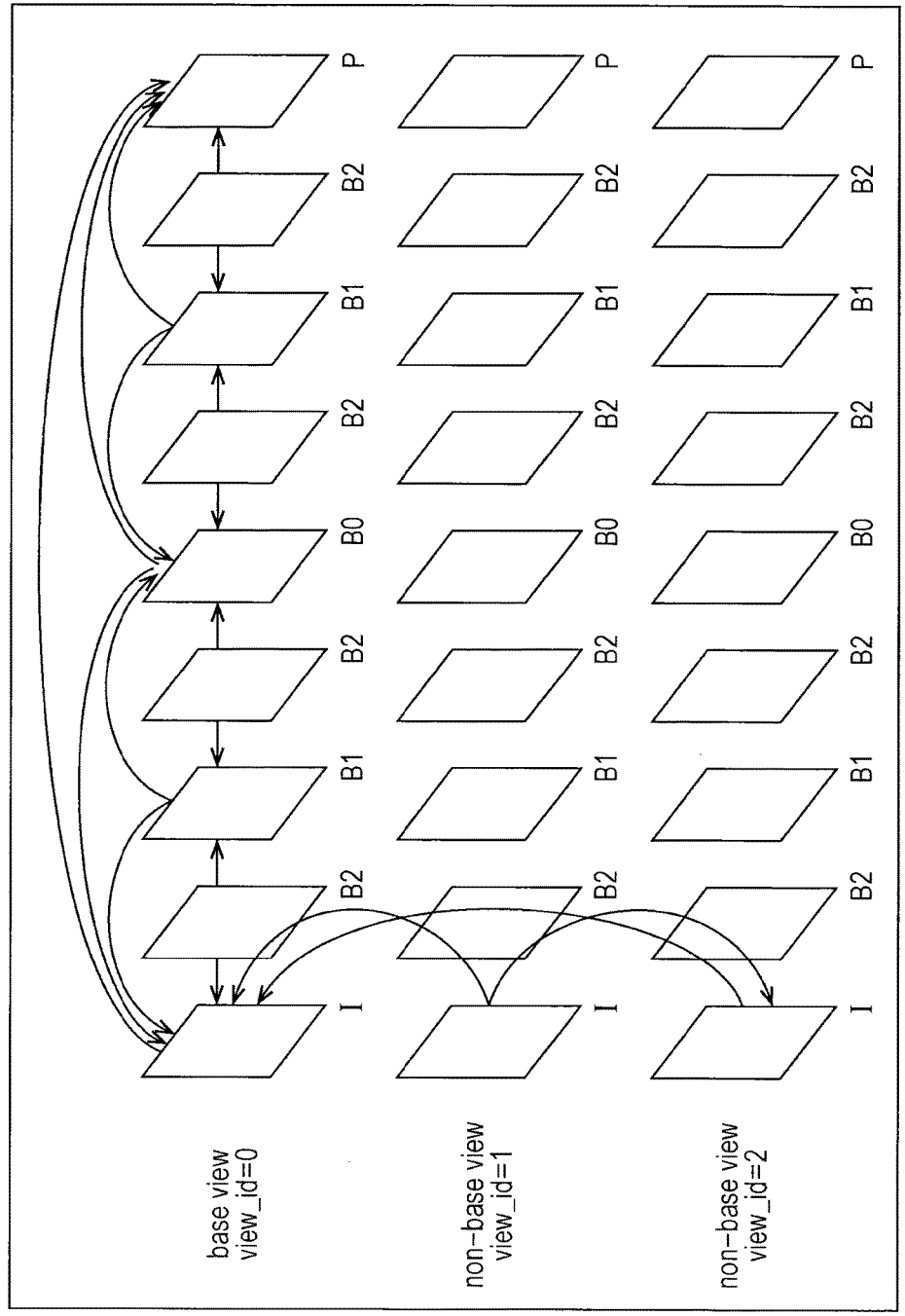
FIG. 111 is a diagram illustrating an exemplary multi-view image coding scheme.

The above-described series of processes can be applied to multi-view image coding and multi-view image decoding. FIG. 111 illustrates an exemplary multi-view image coding scheme.

As illustrated in FIG. 111, a multi-view image includes images of a plurality of views, and an image of a certain view among a plurality of views is designated as a base view image. An image of each view other than a base view image is dealt as a non-base view image. When multi-view image coding is performed by the scalable function, a base view image is encoded as a base layer image, and a non-base view image is encoded as an enhancement image.

As the multi-view image coding of FIG. 111 is performed, a difference of the quantization parameter can be obtained in each view (the same view).

(1) base-view:
(1-1) dQP(base view)=Current_CU_QP(base view)−LCU_QP(base view)
(1-2) dQP(base view)=Current_CU_QP(base view)−Previsous_CU_QP(base view)
(1-3) dQP(base view)=Current_CU_QP(base view)−Slice_QP(base view)
(2) non-base-view:
(2-1) dQP(non-base view)=Current_CU_QP(non-base view)−LCU_QP(non-base view)
(2-2) dQP(non-base view)=CurrentQP(non-base view)−PrevisousQP(non-base view)
(2-3) dQP(non-base view)=Current_CU_QP(non-base view)−Slice_QP(non-base view)

When the multi-view image coding is performed, a difference of the quantization parameter can be obtained in each view (a different view).

(3) base-view/non-base view:
(3-1) dQP(inter-view)=Slice_QP(base view)−Slice_QP(non-base view)
(3-2) dQP(inter-view)=LCU_QP(base view)−LCU_QP(non-base view)
(4) non-base view/non-base view:
(4-1) dQP(inter-view)=Slice_QP(non-base view i)−Slice_QP(non-base view j)
(4-2) dQP(inter-view)=LCU_QP(non-base view i)−LCU_QP(non-base view j)

In this case, (1) to (4) can be combined and used. For example, in the non-base view, a technique (a combination of 3-1 and 2-3) of obtaining the differences of the quantization parameters between the base view and the non-base view at a slice level or a technique (a combination of 3-2 and 2-1) of obtaining the differences of the quantization parameters between the base view and the non-base view at an LCU level is considered. As described above, as the difference is repeatedly applied, even when multi-view coding is performed, the coding efficiency can be improved.

Similarly to the above-described technique, a flag identifying whether or not there is dQP having a non-zero value may be set to each dQP.

<Another Exemplary Encoding by Scalable Function>

Figure 112:
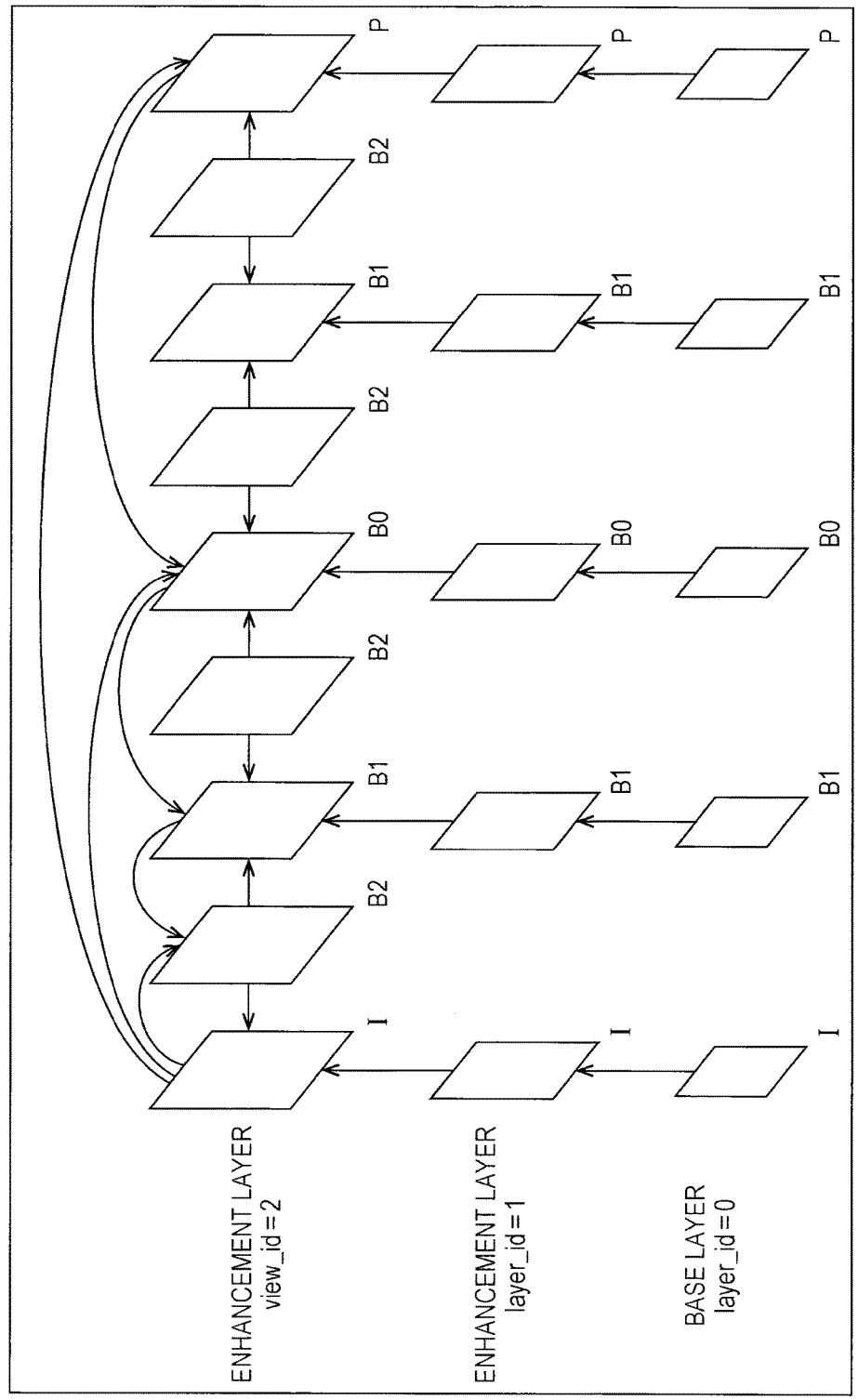
FIG. 112 illustrates another exemplary encoding by a scalable function.

FIG. 112 illustrates another exemplary encoding by the scalable function.

As illustrated in FIG. 112, in encoding by the scalable function, the difference of the quantization parameter can be obtained in each layer (the same layer).

(1) base-layer:
(1-1) dQP(base layer)=Current_CU_QP(base layer)−LCU_QP(base layer)
(1-2) dQP(base layer)=Current_CU_QP(base layer)−Previsous_CU_QP(base layer)
(1-3) dQP(base layer)=Current_CU_QP(base layer)−Slice_QP(base layer)
(2) non-base-layer:
(2-1) dQP(non-base layer)=Current_CU_QP(non-base layer)−LCU_QP(non-base layer)
(2-2) dQP(non-base layer)=CurrentQP(non-base layer)−PrevisousQP(non-base layer)
(2-3) dQP(non-base layer)=Current_CU_QP(non-base layer)−Slice_QP(non-base layer)

Further, the difference of the quantization parameter can be obtained in each layer (a different layer):

(3) base-layer/non-base layer:
(3-1) dQP(inter-layer)=Slice_QP(base layer)−Slice_QP(non-base layer)
(3-2) dQP(inter-layer)=LCU_QP(base layer)−LCU_QP(non-base layer)
(4) non-base layer/non-base layer:
(4-1) dQP(inter-layer)=Slice_QP(non-base layer i)−Slice_QP(non-base layer j)
(4-2) dQP(inter-layer)=LCU_QP(non-base layer i)−LCU_QP(non-base layer j)

In this case, (1) to (4) can be combined and used. For example, in the non-base layer, a technique (a combination of 3-1 and 2-3) of obtaining the differences of the quantization parameters between the base layer and the non-base layer at a slice level or a technique (a combination of 3-2 and 2-1) of obtaining the differences of the quantization parameters between the base layer and the non-base layer at an LCU level is considered. As described above, as the difference is repeatedly applied, even when scalable coding is performed, the coding efficiency can be improved.

Similarly to the above-described technique, a flag identifying whether or not there is dQP having a non-zero value may be set to each dQP.

<Fifth Embodiment>

(Description of Computer to which Present Technology is Applied)

The above-described series of processes may be executed by hardware or software. When the series of processes are executed by software, a program configuring the software is installed in a computer. Here, examples of the computer includes a computer incorporated into dedicated hardware and a general purpose personal computer that includes various programs installed therein and is capable of executing various kinds of functions.

Figure 113:
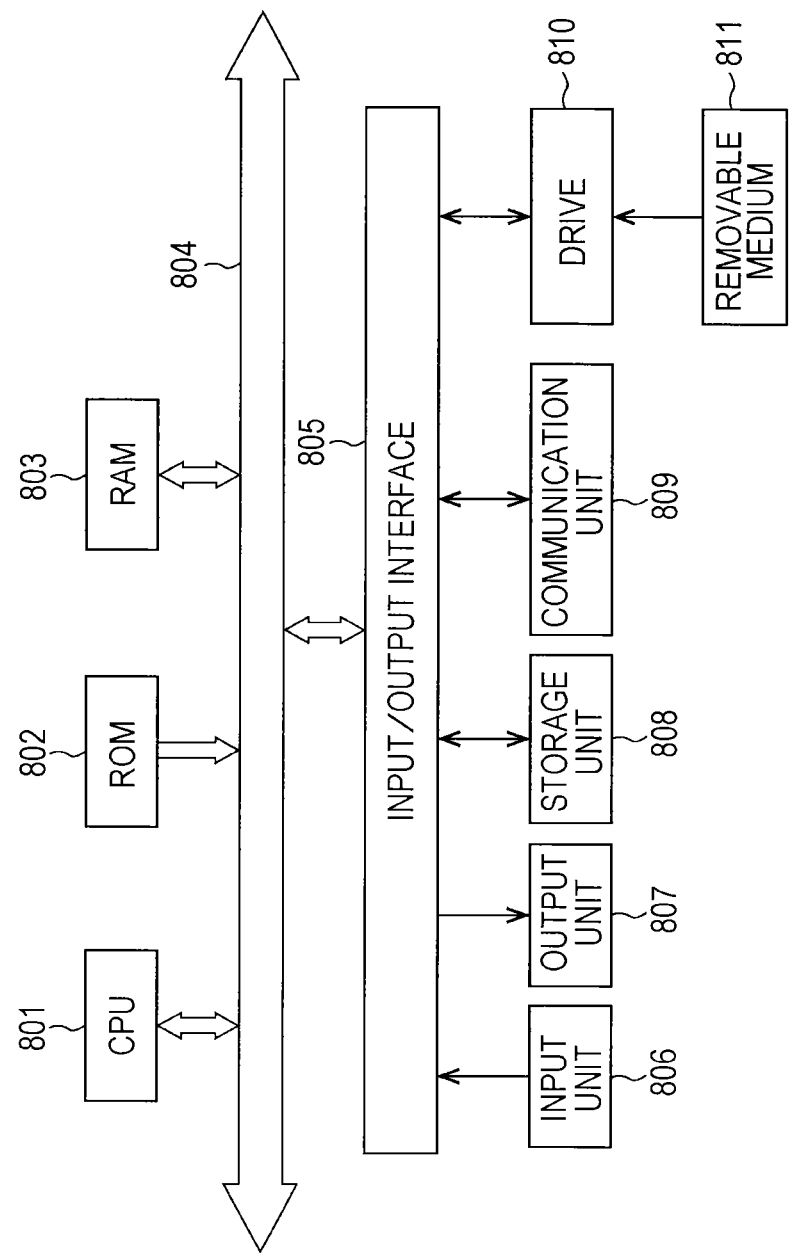
FIG. 113 is a block diagram illustrating an exemplary hardware configuration of a computer.

FIG. 113 is a block diagram illustrating an exemplary hardware configuration of a computer that executes the above-described series of processes by a program.

In a computer, a central processing unit (CPU) 801, a read only memory (ROM) 802, and a random access memory (RAM) 803 are connected with one another via a bus 804.

An input/output interface 805 is also connected to the bus 804. An input unit 806, an output unit 807, a storage unit 808, a communication unit 809, and a drive 810 are connected to the input/output interface 805.

The input unit 806 includes a keyboard, a mouse, a microphone, and the like. The output unit 807 includes a display, a speaker, and the like. The storage unit 808 includes a hard disk, a non-volatile memory, and the like. The communication unit 809 includes a network interface. The drive 810 drives a removable medium 811 such as a magnetic disk, an optical disk, a magneto optical disk, or a semiconductor memory.

In the computer having the above configuration, the CPU 801 executes the above-described series of processes, for example, by loading the program stored in the storage unit 808 onto the RAM 803 through the input/output interface 805 and the bus 804 and executing the program.

For example, the program executed by the computer (the CPU 801) may be recorded in the removable medium 811 as a package medium or the like and provided. Further, the program may be provided through a wired or wireless transmission medium such as a local area network (LAN), the Internet, or digital satellite broadcasting.

In the computer, the removable medium 811 is mounted to the drive 810, and then the program may be installed in the storage unit 808 through the input/output interface 805. Further, the program may be received by the communication unit 809 via a wired or wireless transmission medium and then installed in the storage unit 808. In addition, the program may be installed in the ROM 802 or the storage unit 808 in advance.

Further, the program may be a program in which the processes are chronologically performed in the order described in this specification or may be a program in which the processes are performed in parallel or at necessary timings such as called timings.

<Sixth Embodiment>

(Exemplary Configuration of Television Device)

Figure 114:
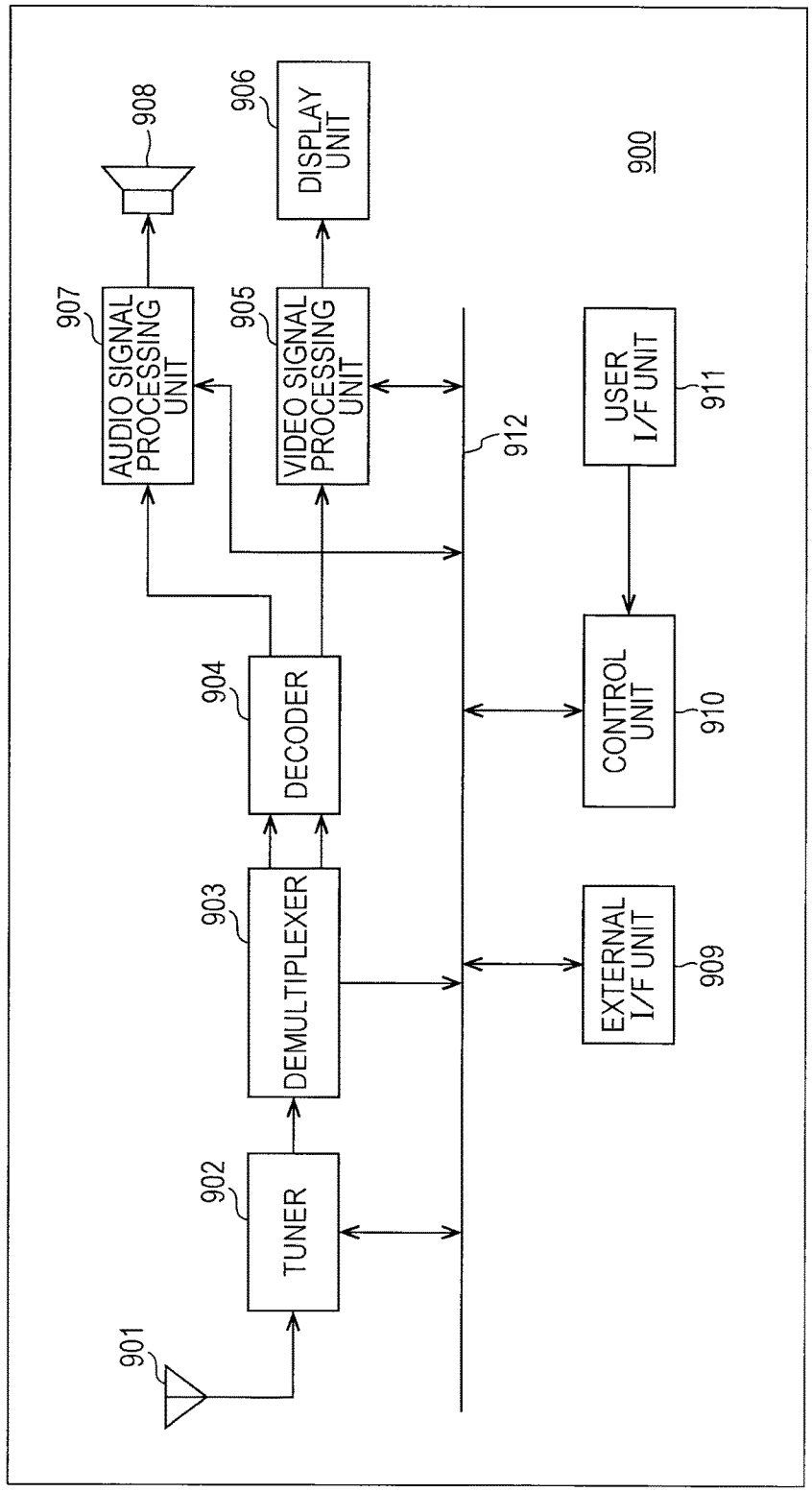
FIG. 114 is a diagram illustrating an exemplary schematic configuration of a television device according to the present technology.

FIG. 114 illustrates a schematic configuration of a television device to which the present technology is applied. A television device 900 includes an antenna 901, a tuner 902, a demultiplexer 903, a decoder 904, a video signal processing unit 905, a display unit 906, an audio signal processing unit 907, a speaker 908, and an external I/F unit 909. The television device 900 further includes a control unit 910, a user I/F unit 911, and the like.

The tuner 902 tunes to a desired channel from a broadcast signal received by the antenna 901, performs demodulation, and outputs an obtained encoded bitstream to the demultiplexer 903.

The demultiplexer 903 extracts video or audio packets of a program of a viewing target from the encoded bitstream, and outputs data of the extracted packets to the decoder 904. The demultiplexer 903 provides packets of data such as an electronic program guide (EPG) to the control unit 910. Further, when scrambling has been performed, descrambling is performed by the demultiplexer or the like.

The decoder 904 performs a decoding process of decoding the packets, and outputs video data and audio data generated by the decoding process to the video signal processing unit 905 and the audio signal processing unit 907, respectively.

The video signal processing unit 905 performs a noise canceling process or video processing according to a user setting on the video data. The video signal processing unit 905 generates video data of a program to be displayed on the display unit 906, image data according to processing based on an application provided via a network, or the like. The video signal processing unit 905 generates video data for displaying, for example, a menu screen used to select an item, and causes the video data to be superimposed on video data of a program. The video signal processing unit 905 generates a drive signal based on the video data generated as described above, and drives the display unit 906.

The display unit 906 drives a display device (for example, a liquid crystal display device or the like) based on the drive signal provided from the video signal processing unit 905, and causes a program video or the like to be displayed.

The audio signal processing unit 907 performs a certain process such as a noise canceling process on the audio data, performs a digital to analog (D/A) conversion process and an amplification process on the processed audio data, and provides resultant data to the speaker 908 to output a sound.

The external I/F unit 909 is an interface for a connection with an external device or a network, and performs transmission and reception of data such as video data or audio data.

The user I/F unit 911 is connected with the control unit 910. The user I/F unit 911 includes an operation switch, a remote control signal receiving unit, and the like, and provides an operation signal according to the user's operation to the control unit 910.

The control unit 910 includes a CPU, a memory, and the like. The memory stores a program executed by the CPU, various kinds of data necessary when the CPU performs processing, EPG data, data acquired via a network, and the like. The program stored in the memory is read and executed by the CPU at a certain timing such as a timing at which the television device 900 is activated. The CPU executes the program, and controls the respective units such that the television device 900 is operated according to the user's operation.

The television device 900 is provided with a bus 912 that connects the tuner 902, the demultiplexer 903, the video signal processing unit 905, the audio signal processing unit 907, the external I/F unit 909, and the like with the control unit 910.

In the television device having the above configuration, the decoder 904 is provided with the function of the decoding device (the decoding method) according to the present disclosure. Thus, it is possible to share or predict information related to a reference image of an image having a hierarchical structure.

<Seventh Embodiment>

(Exemplary Configuration of Mobile Phone)

Figure 115:
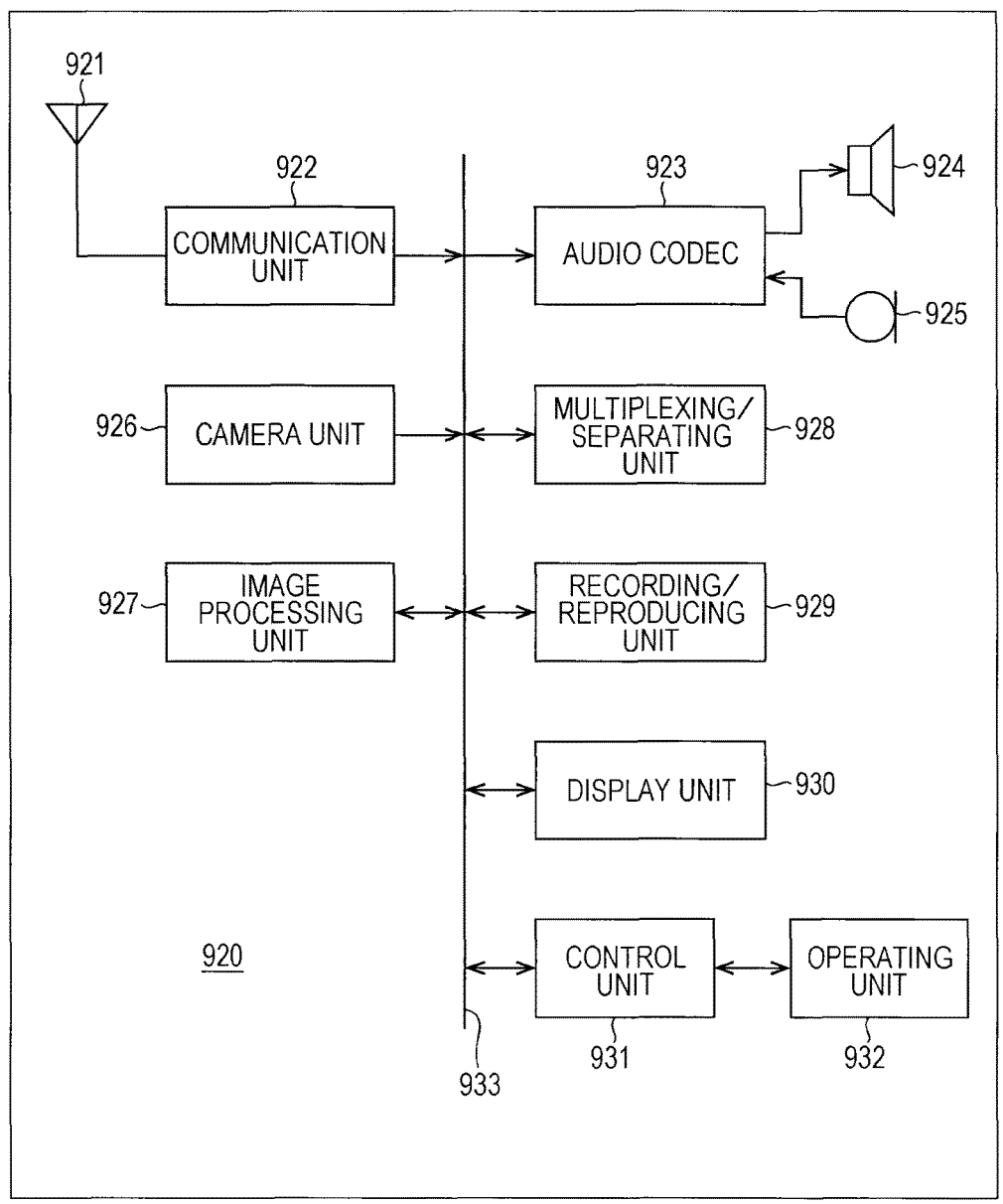
FIG. 115 is a diagram illustrating an exemplary schematic configuration of a mobile phone according to the present technology.

FIG. 115 illustrates a schematic configuration of a mobile telephone to which the present technology is applied. A mobile telephone 920 includes a communication unit 922, a voice codec 923, a camera unit 926, an image processing unit 927, a multiplexing/separating unit 928, a recording/reproducing unit 929, a display unit 930, and a control unit 931. These units are connected with one another via a bus 933.

Further, an antenna 921 is connected to the communication unit 922, and a speaker 924 and a microphone 925 are connected to the voice codec 923. Further, an operating unit 932 is connected to the control unit 931.

The mobile telephone 920 performs various kinds of operations such as transmission and reception of a voice signal, transmission and reception of an electronic mail or image data, image capturing, or data recording in various modes such as a voice call mode and a data communication mode.

In the voice call mode, a voice signal generated by the microphone 925 is converted to voice data through the voice codec 923, compressed, and then provided to the communication unit 922. The communication unit 922 performs, for example, a modulation process and a frequency transform process of the voice data, and generates a transmission signal. Further, the communication unit 922 provides the transmission signal to the antenna 921 so that the transmission signal is transmitted to a base station (not illustrated). Further, the communication unit 922 performs an amplification process, a frequency transform process, and a demodulation process of a reception signal received through the antenna 921, and provides the obtained voice data to the voice codec 923. The voice codec 923 decompresses the voice data, converts the compressed data to an analog voice signal, and outputs the analog voice signal to the speaker 924.

In the data communication mode, when mail transmission is performed, the control unit 931 receives text data input by operating the operating unit 932, and causes the input text to be displayed on the display unit 930. Further, the control unit 931 generates mail data, for example, based on a user instruction input through the operating unit 932, and provides the mail data to the communication unit 922. The communication unit 922 performs, for example, a modulation process and a frequency transform process of the mail data, and transmits an obtained transmission signal through the antenna 921. Further, the communication unit 922 performs, for example, an amplification process, a frequency transform process, and a demodulation process of a reception signal received through the antenna 921, and restores the mail data. The mail data is provided to the display unit 930 so that mail content is displayed.

The mobile telephone 920 can store the received mail data in a storage medium through the recording/reproducing unit 929. The storage medium is an arbitrary rewritable storage medium. Examples of the storage medium include a semiconductor memory such as a RAM or an internal flash memory, a hard disk, a magnetic disk, a magneto optical disk, an optical disk, and a removable medium such as a universal serial bus (USB) memory or a memory card.

In the data communication mode, when image data is transmitted, image data generated through the camera unit 926 is provided to the image processing unit 927. The image processing unit 927 performs an encoding process of encoding the image data, and generates encoded data.

The multiplexing/separating unit 928 multiplexes the encoded data generated through the image processing unit 927 and the voice data provided from the voice codec 923 according to a certain scheme, and provides resultant data to the communication unit 922. The communication unit 922 performs, for example, a modulation process and a frequency transform process of the multiplexed data, and transmits an obtained transmission signal through the antenna 921. Further, the communication unit 922 performs, for example, an amplification process, a frequency transform process, and a demodulation process of a reception signal received through the antenna 921, and restores multiplexed data. The multiplexed data is provided to the multiplexing/separating unit 928. The multiplexing/separating unit 928 separates the multiplexed data, and provides the encoded data and the voice data to the image processing unit 927 and the voice codec 923, respectively. The image processing unit 927 performs a decoding process of decoding the encoded data, and generates image data. The image data is provided to the display unit 930 so that a received image is displayed. The voice codec 923 converts the voice data into an analog voice signal, provides the analog voice signal to the speaker 924, and outputs a received voice.

In the mobile telephone having the above configuration, the image processing unit 927 is provided with the function of the encoding device and the decoding device (the encoding method and the decoding method) according to the present disclosure. Thus, it is possible to share or predict information related to a reference image of an image having a hierarchical structure.

<Eighth Embodiment>

(Exemplary Configuration of Recording/Reproducing Device)

Figure 116:
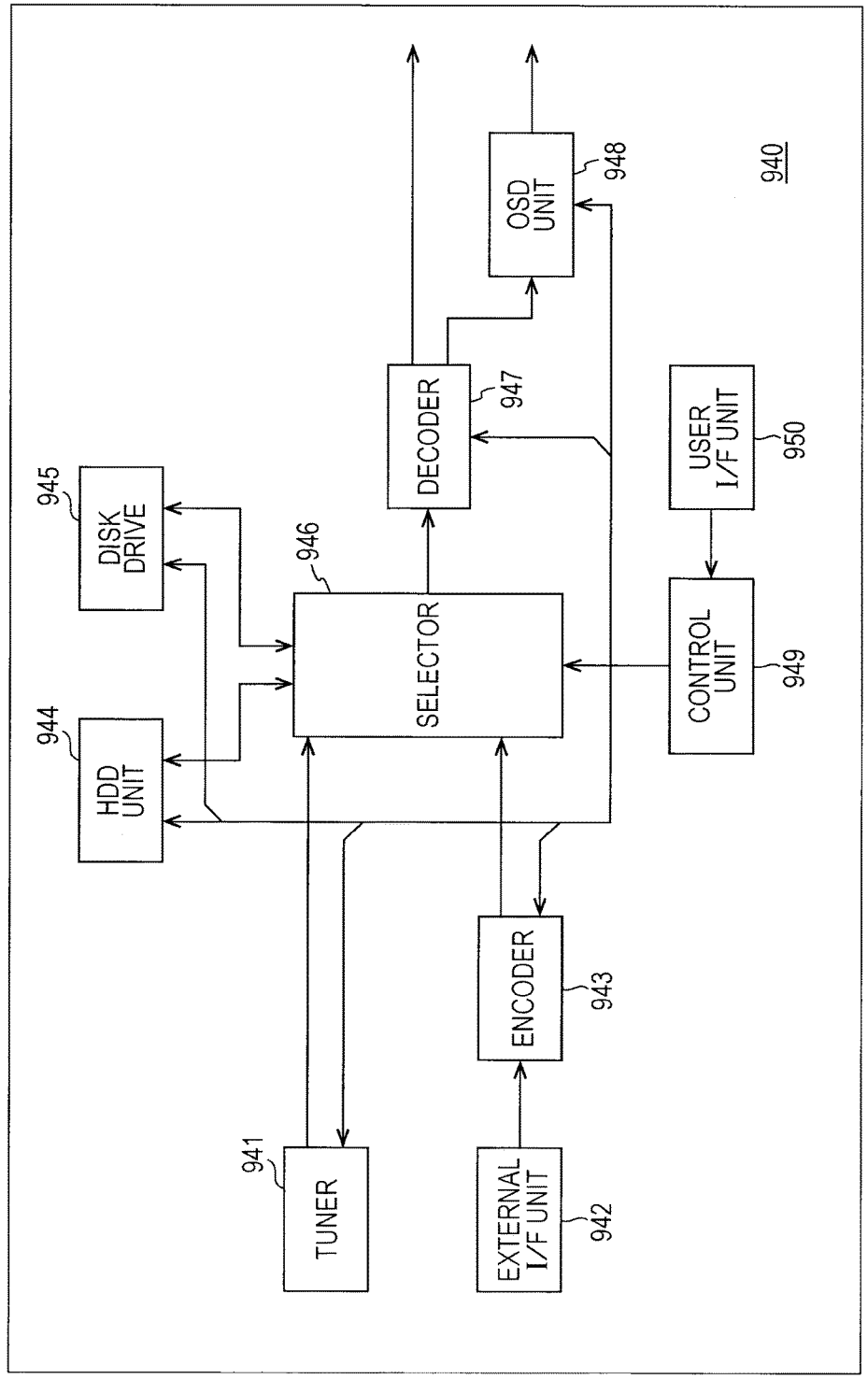
FIG. 116 is a diagram illustrating an exemplary schematic configuration of a recording/reproducing device according to the present technology.

FIG. 116 illustrates a schematic configuration of a recording/reproducing device to which the present technology is applied. A recording/reproducing device 940 records, for example, audio data and video data of a received broadcast program in a recording medium, and provides the recorded data to the user at a timing according to the user's instruction. Further, the recording/reproducing device 940 can acquire, for example, audio data or video data from another device and cause the acquired data to be recorded in a recording medium. Furthermore, the recording/reproducing device 940 decodes and outputs the audio data or the video data recorded in the recording medium so that an image display or a sound output can be performed in a monitor device or the like.

The recording/reproducing device 940 includes a tuner 941, an external I/F unit 942, an encoder 943, a hard disk drive (HDD) unit 944, a disk drive 945, a selector 946, a decoder 947, an on-screen display (OSD) unit 948, a control unit 949, and a user I/F unit 950.

The tuner 941 tunes to a desired channel from a broadcast signal received through an antenna (not illustrated). The tuner 941 demodulates a reception signal of the desired channel, and outputs an obtained encoded bitstream to the selector 946.

The external I/F unit 942 is configured with at least one of an IEEE1394 interface, a network interface, a USB interface, a flash memory interface, and the like. The external I/F unit 942 is an interface for a connection with an external device, a network, a memory card, and the like, and receives data such as video data or audio data to be recorded.

The encoder 943 encodes non-encoded video data or audio data provided from the external I/F unit 942 according to a certain scheme, and outputs an encoded bitstream to the selector 946.

The HDD unit 944 records content data such as a video or a sound, various kinds of programs, and other data in an internal hard disk, and reads recorded data from the hard disk at the time of reproduction or the like.

The disk drive 945 records a signal in a mounted optical disk, and reproduces a signal from the optical disk. Examples of the optical disk include a DVD disk (DVD-Video, DVD-RAM, DVD-R, DVD-RW, DVD+R, DVD+RW, and the like) and a Blu-ray (registered trademark) disk.

When a video or a sound is recorded, the selector 946 selects either of an encoded bitstream provided from the tuner 941 and an encoded bitstream provided from the encoder 943, and provides the selected encoded bitstream to either of the HDD unit 944 and the disk drive 945. Further, when a video or a sound is reproduced, the selector 946 provides the encoded bitstream output from the HDD unit 944 or the disk drive 945 to the decoder 947.

The decoder 947 performs the decoding process of decoding the encoded bitstream. The decoder 947 provides video data generated by performing the decoding process to the OSD unit 948. Further, the decoder 947 outputs audio data generated by performing the decoding process.

The OSD unit 948 generates video data used to display, for example, a menu screen used to, for example, select an item, and outputs the video data to be superimposed on the video data output from the decoder 947.

The user I/F unit 950 is connected to the control unit 949. The user I/F unit 950 includes an operation switch, a remote control signal receiving unit, and the like, and provides an operation signal according to the user's operation to the control unit 949.

The control unit 949 is configured with a CPU, a memory, and the like. The memory stores a program executed by the CPU and various kinds of data necessary when the CPU performs processing. The program stored in the memory is read and executed by the CPU at a certain timing such as a timing at which the recording/reproducing device 940 is activated. The CPU executes the program, and controls the respective units such that the recording/reproducing device 940 is operated according to the user's operation.

In the recording/reproducing device having the above configuration, the decoder 947 is provided with the function of the decoding device (the decoding method) according to the present disclosure. Thus, it is possible to share or predict information related to a reference image of an image having a hierarchical structure.

<Ninth Embodiment>

(Exemplary Configuration of Imaging Device)

Figure 117:
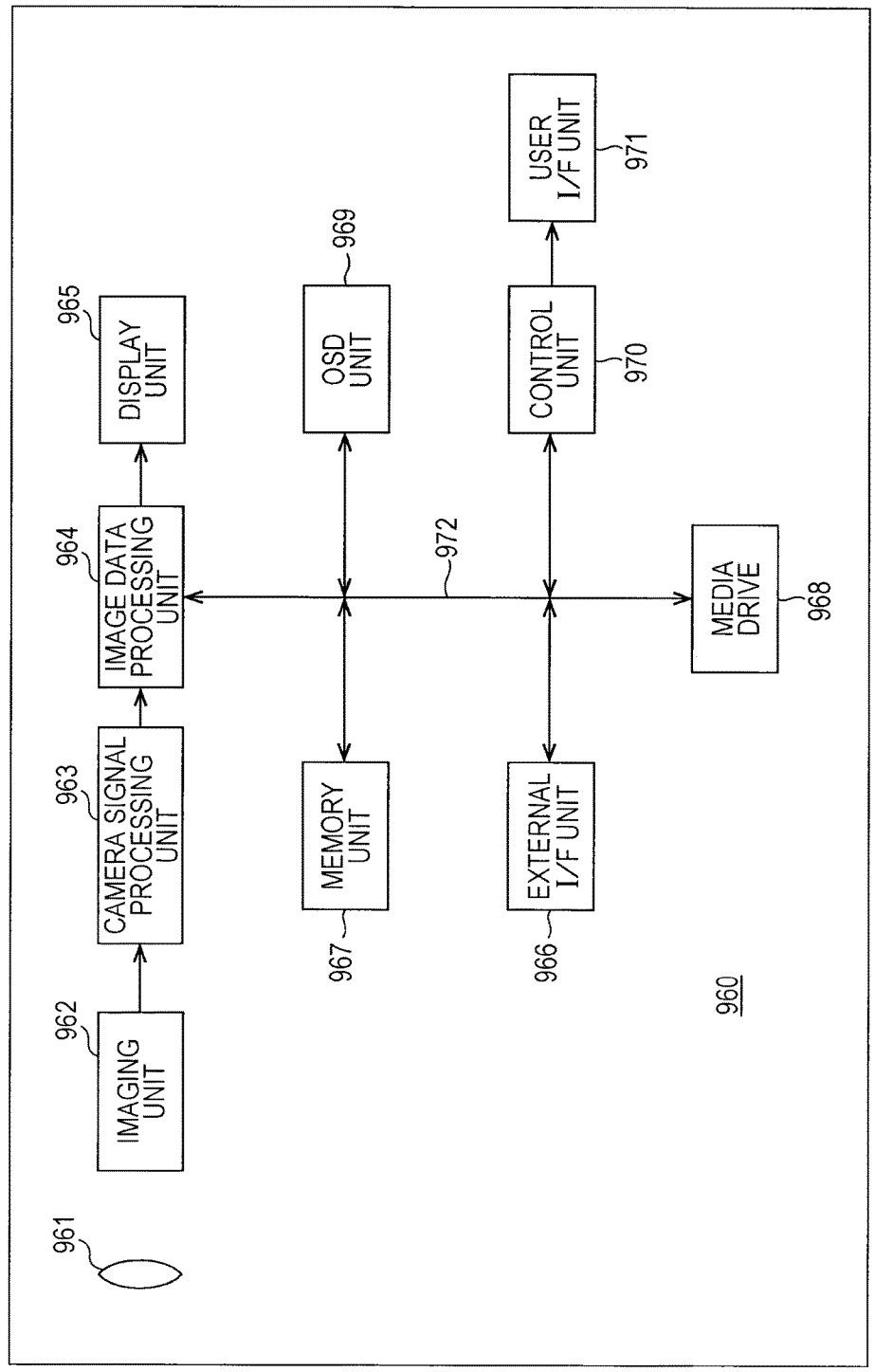
FIG. 117 is a diagram illustrating an exemplary schematic configuration of an imaging device according to the present technology.

FIG. 117 illustrates a schematic configuration of an imaging device to which the present technology is applied. An imaging device 960 photographs a subject, and causes an image of the subject to be displayed on a display unit or records image data in a recording medium.

The imaging device 960 includes an optical block 961, an imaging unit 962, a camera signal processing unit 963, an image data processing unit 964, a display unit 965, an external I/F unit 966, a memory unit 967, a media drive 968, an OSD unit 969, and a control unit 970. Further, a user I/F unit 971 is connected to the control unit 970. Furthermore, the image data processing unit 964, the external I/F unit 966, the memory unit 967, the media drive 968, the OSD unit 969, the control unit 970, and the like are connected with one another via a bus 972.

The optical block 961 is configured with a focus lens, a diaphragm mechanism, and the like. The optical block 961 forms an optical image of a subject on an imaging plane of the imaging unit 962. The imaging unit 962 is configured with a CCD image sensor or a CMOS image sensor, and generates an electrical signal according to an optical image obtained by photoelectric conversion, and provides the electrical signal to the camera signal processing unit 963.

The camera signal processing unit 963 performs various kinds of camera signal processes such as knee correction, gamma correction, and color correction on the electrical signal provided from the imaging unit 962. The camera signal processing unit 963 provides the image data that has been subjected to the camera signal processes to the image data processing unit 964.

The image data processing unit 964 performs the encoding process of encoding the image data provided from the camera signal processing unit 963. The image data processing unit 964 provides encoded data generated by performing the encoding process to the external I/F unit 966 or the media drive 968. Further, the image data processing unit 964 performs the decoding process of decoding encoded data provided from the external I/F unit 966 or the media drive 968. The image data processing unit 964 provides image data generated by performing the decoding process to the display unit 965. Further, the image data processing unit 964 performs a process of providing the image data provided from the camera signal processing unit 963 to the display unit 965, or provides display data acquired from the OSD unit 969 to the display unit 965 to be superimposed on image data.

The OSD unit 969 generates a menu screen including a symbol, a text, or a diagram or display data such as an icon, and outputs the generated menu screen or the display data to the image data processing unit 964.

The external I/F unit 966 is configured with, for example, an USB I/O terminal or the like, and connected with a printer when an image is printed. Further, a drive is connected to the external I/F unit 966 as necessary, a removable medium such as a magnetic disk or an optical disk is appropriately mounted, and a computer program read from the removable medium is installed as necessary. Furthermore, the external I/F unit 966 includes a network interface connected to a certain network such as a LAN or the Internet. The control unit 970 can read encoded data from the media drive 968, for example, according to an instruction given through the user I/F unit 971 and provide the read encoded data to another device connected via a network through the external I/F unit 966. Further, the control unit 970 can acquire encoded data or image data provided from another device via a network through the external I/F unit 966 and provide the acquire encoded data or the image data to the image data processing unit 964.

As a recording media driven by the media drive 968, for example, an arbitrary readable/writable removable medium such as a magnetic disk, a magneto optical disk, an optical disk, or a semiconductor memory is used. Further, the recording medium may be a tape device, a disk, or a memory card regardless of a type of a removable medium. Of course, the recording medium may be a non-contact integrated circuit (IC) card or the like.

Further, the media drive 968 may be integrated with the recording medium to configure a non-portable storage medium such as an internal HDD or a solid state drive (SSD).

The control unit 970 is configured with a CPU. The memory unit 967 stores a program executed by the control unit 970, various kinds of data necessary when the control unit 970 performs processing, and the like. The program stored in the memory unit 967 is read and executed by the control unit 970 at a certain timing such as a timing at which the imaging device 960 is activated. The control unit 970 executes the program, and controls the respective units such that the imaging device 960 is operated according to the user's operation.

In the imaging device having the above configuration, the image data processing unit 964 is provided with the function of the encoding device and the decoding device (the encoding method and the decoding method) according to the present disclosure. Thus, it is possible to share or predict information related to a reference image of an image having a hierarchical structure.

<Applications of Scalable Coding>

(First System)

Next, specific application examples of scalable encoded data generated by scalable coding that is coding by the scalable function will be described. The scalable coding is used for selection of data to be transmitted, for example, as illustrated in FIG. 118.

Figure 118:
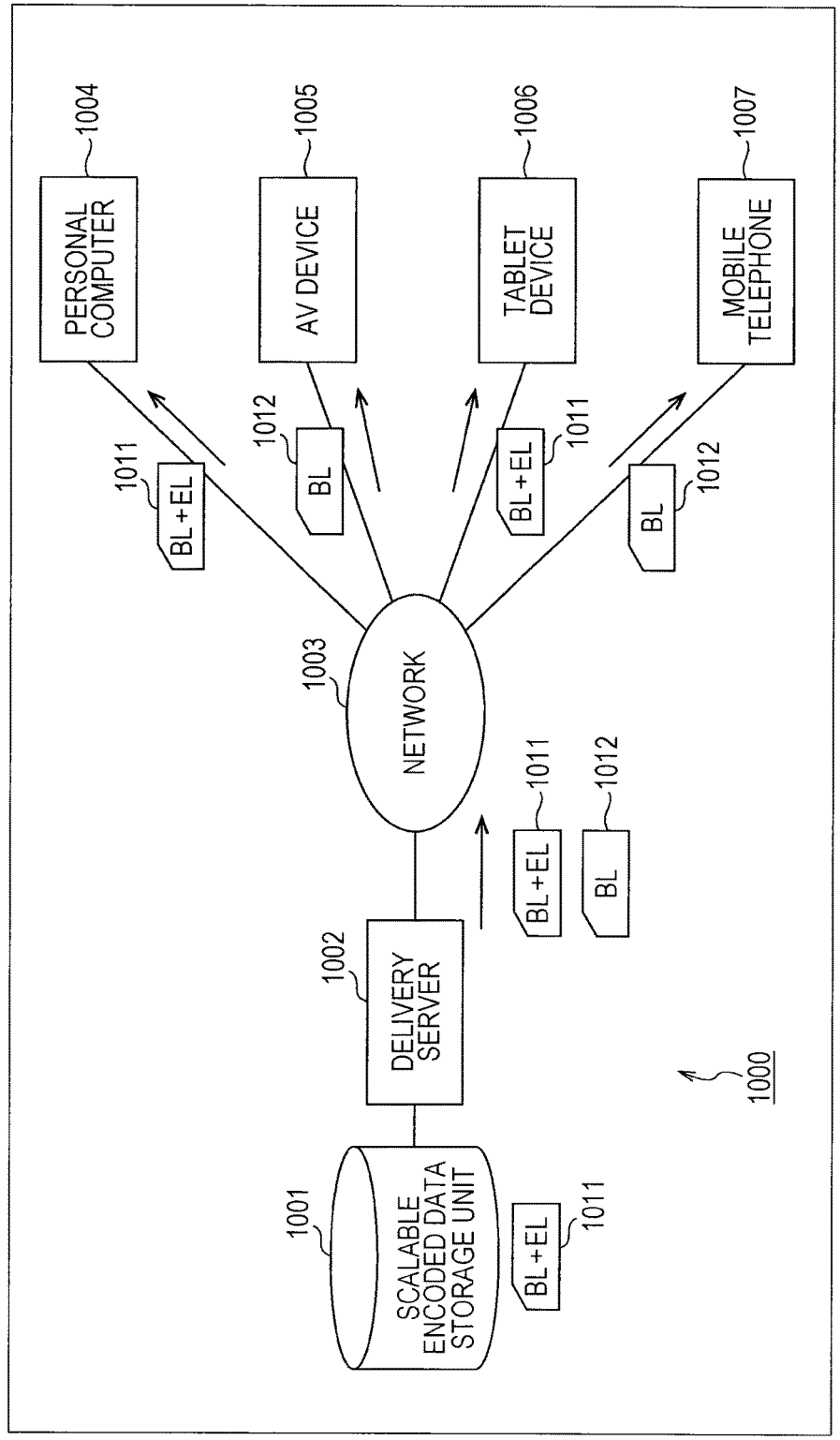
FIG. 118 is a block diagram illustrating a utilization example of scalable coding.

In a data transmission system 1000 illustrated in FIG. 118, a delivery server 1002 reads scalable encoded data stored in a scalable encoded data storage unit 1001, and delivers the scalable encoded data to terminal devices such as a personal computer 1004, an AV device 1005, a tablet device 1006, and a mobile telephone 1007 via a network 1003.

At this time, the delivery server 1002 selects an appropriate high-quality encoded data according to the capabilities of the terminal devices or a communication environment, and transmits the selected high-quality encoded data. Although the delivery server 1002 transmits unnecessarily high-quality data, the terminal devices do not necessarily obtains a high-quality image, and a delay or an overflow may occur. Further, a communication band may be unnecessarily occupied, and a load of a terminal device may be unnecessarily increased. On the other hand, although the delivery server 1002 transmits unnecessarily low-quality data, the terminal devices are unlikely to obtain an image of a sufficient quality. Thus, the delivery server 1002 reads scalable encoded data stored in the scalable encoded data storage unit 1001 as encoded data of a quality appropriate for the capability of the terminal device or a communication environment, and then transmits the read data.

For example, the scalable encoded data storage unit 1001 is assumed to store scalable encoded data (BL+EL) 1011 that is encoded by the scalable coding. The scalable encoded data (BL+EL) 1011 is encoded data including both of a base layer and an enhancement layer, and both an image of the base layer and an image of the enhancement layer can be obtained by decoding the scalable encoded data (BL+EL) 1011.

The delivery server 1002 selects an appropriate layer according to the capability of a terminal device to which data is transmitted or a communication environment, and reads data of the selected layer. For example, for the personal computer 1004 or the tablet device 1006 having a high processing capability, the delivery server 1002 reads the high-quality scalable encoded data (BL+EL) 1011 from the scalable encoded data storage unit 1001, and transmits the scalable encoded data (BL+EL) 1011 without change. On the other hand, for example, for the AV device 1005 or the mobile telephone 1007 having a low processing capability, the delivery server 1002 extracts data of the base layer from the scalable encoded data (BL+EL) 1011, and transmits a scalable encoded data (BL) 1012 that is the same content as the scalable encoded data (BL+EL) 1011 but lower in quality than the scalable encoded data (BL+EL) 1011.

As described above, an amount of data can be easily adjusted using scalable encoded data, and thus it is possible to prevent the occurrence of a delay or an overflow and prevent a load of a terminal device or a communication medium from being unnecessarily increased. Further, the scalable encoded data (BL+EL) 1011 is reduced in redundancy between layers, and thus it is possible to reduce an amount of data to be smaller than when individual data is used as encoded data of each layer. Thus, it is possible to more efficiently use a memory area of the scalable encoded data storage unit 1001.

Further, various devices such as the personal computer 1004 to the mobile telephone 1007 can be applied as the terminal device, and thus the hardware performance of the terminal devices differ according to each device. Further, since various applications can be executed by the terminal devices, software has various capabilities. Furthermore, all communication line networks including either or both of a wired network and a wireless network such as the Internet or a LAN (Local Area Network), can be applied as the network 1003 serving as a communication medium, and thus various data transmission capabilities are provided. Ina addition, a change may be made by another communication or the like.

In this regard, the delivery server 1002 may be configured to perform communication with a terminal device serving as a transmission destination of data before starting data transmission and obtain information related to a capability of a terminal device such as hardware performance of a terminal device or a performance of an application (software) executed by a terminal device and information related to a communication environment such as an available bandwidth of the network 1003. Then, the delivery server 1002 may select an appropriate layer based on the obtained information.

Further, the extracting of the layer may be performed in a terminal device. For example, the personal computer 1004 may decode the transmitted scalable encoded data (BL+EL) 1011 and display the image of the base layer or the image of the enhancement layer. Further, for example, the personal computer 1004 may extract the scalable encoded data (BL) 1012 of the base layer from the transmitted scalable encoded data (BL+EL) 1011, store the scalable encoded data (BL) 1012 of the base layer, transfer the scalable encoded data (BL) 1012 of the base layer to another device, decode the scalable encoded data (BL) 1012 of the base layer, and display the image of the base layer.

Of course, the number of the scalable encoded data storage units 1001, the number of the delivery servers 1002, the number of the networks 1003, and the number of terminal devices are arbitrary. The above description has been made in connection with the example in which the delivery server 1002 transmits data to the terminal devices, but the application example is not limited to this example. The data transmission system 1000 can be applied to any system in which when encoded data generated by the scalable coding is transmitted to a terminal device, an appropriate layer is selected according to a capability of a terminal devices or a communication environment, and the encoded data is transmitted.

(Second System)

Figure 119:
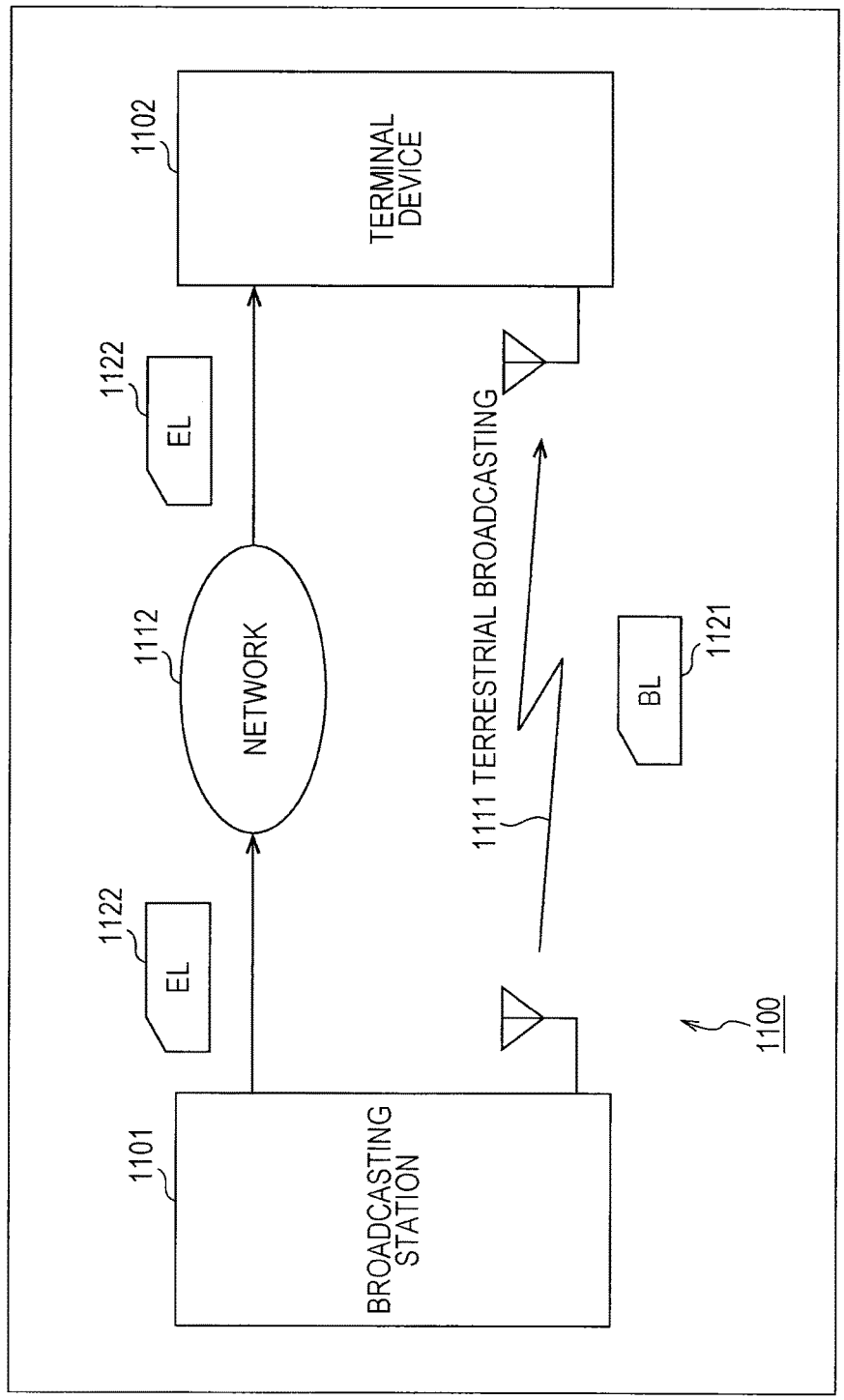
FIG. 119 is a block diagram illustrating another utilization example of scalable coding.

The scalable coding is used for transmission using a plurality of communication media, for example, as illustrated in FIG. 119.

In a data transmission system 1100 illustrated in FIG. 119, a broadcasting station 1101 transmits scalable encoded data (BL) 1121 of a base layer through terrestrial broadcasting 1111. Further, the broadcasting station 1101 transmits scalable encoded data (EL) 1122 of an enhancement layer (for example, packetizes the scalable encoded data (EL) 1122 and then transmits resultant packets) via an arbitrary network 1112 configured with a communication network including either or both of a wired network and a wireless network.

A terminal device 1102 has a reception function of receiving the terrestrial broadcasting 1111 broadcast by the broadcasting station 1101, and receives the scalable encoded data (BL) 1121 of the base layer transmitted through the terrestrial broadcasting 1111. The terminal device 1102 further has a communication function of performing communication via the network 1112, and receives the scalable encoded data (EL) 1122 of the enhancement layer transmitted via the network 1112.

The terminal device 1102 decodes the scalable encoded data (BL) 1121 of the base layer acquired through the terrestrial broadcasting 1111, for example, according to the user's instruction or the like, obtains the image of the base layer, stores the obtained image, and transmits the obtained image to another device.

Further, the terminal device 1102 combines the scalable encoded data (BL) 1121 of the base layer acquired through the terrestrial broadcasting 1111 with the scalable encoded data (EL) 1122 of the enhancement layer acquired through the network 1112, for example, according to the user's instruction or the like, obtains the scalable encoded data (BL+EL), decodes the scalable encoded data (BL+EL) to obtain the image of the enhancement layer, stores the obtained image, and transmits the obtained image to another device.

As described above, it is possible to transmit scalable encoded data of respective layers, for example, through different communication media. Thus, it is possible to distribute a load, and it is possible to prevent the occurrence of a delay or an overflow.

Further, it is possible to select a communication medium used for transmission for each layer according to the situation. For example, the scalable encoded data (BL) 1121 of the base layer having a relative large amount of data may be transmitted through a communication medium having a large bandwidth, and the scalable encoded data (EL) 1122 of the enhancement layer having a relative small amount of data may be transmitted through a communication medium having a small bandwidth. Further, for example, a communication medium for transmitting the scalable encoded data (EL) 1122 of the enhancement layer may be switched between the network 1112 and the terrestrial broadcasting 1111 according to an available bandwidth of the network 1112. Of course, the same applies to data of an arbitrary layer.

As control is performed as described above, it is possible to further suppress an increase in a load in data transmission.

Of course, the number of layers is an arbitrary, and the number of communication media used for transmission is also arbitrary. Further, the number of the terminal devices 1102 serving as a data delivery destination is also arbitrary. The above description has been described in connection with the example of broadcasting from the broadcasting station 1101, and the application example is not limited to this example. The data transmission system 1100 can be applied to any system in which encoded data generated by the scalable coding is divided into two or more in units of layers and transmitted through a plurality of lines.

(Third System)

Figure 120:
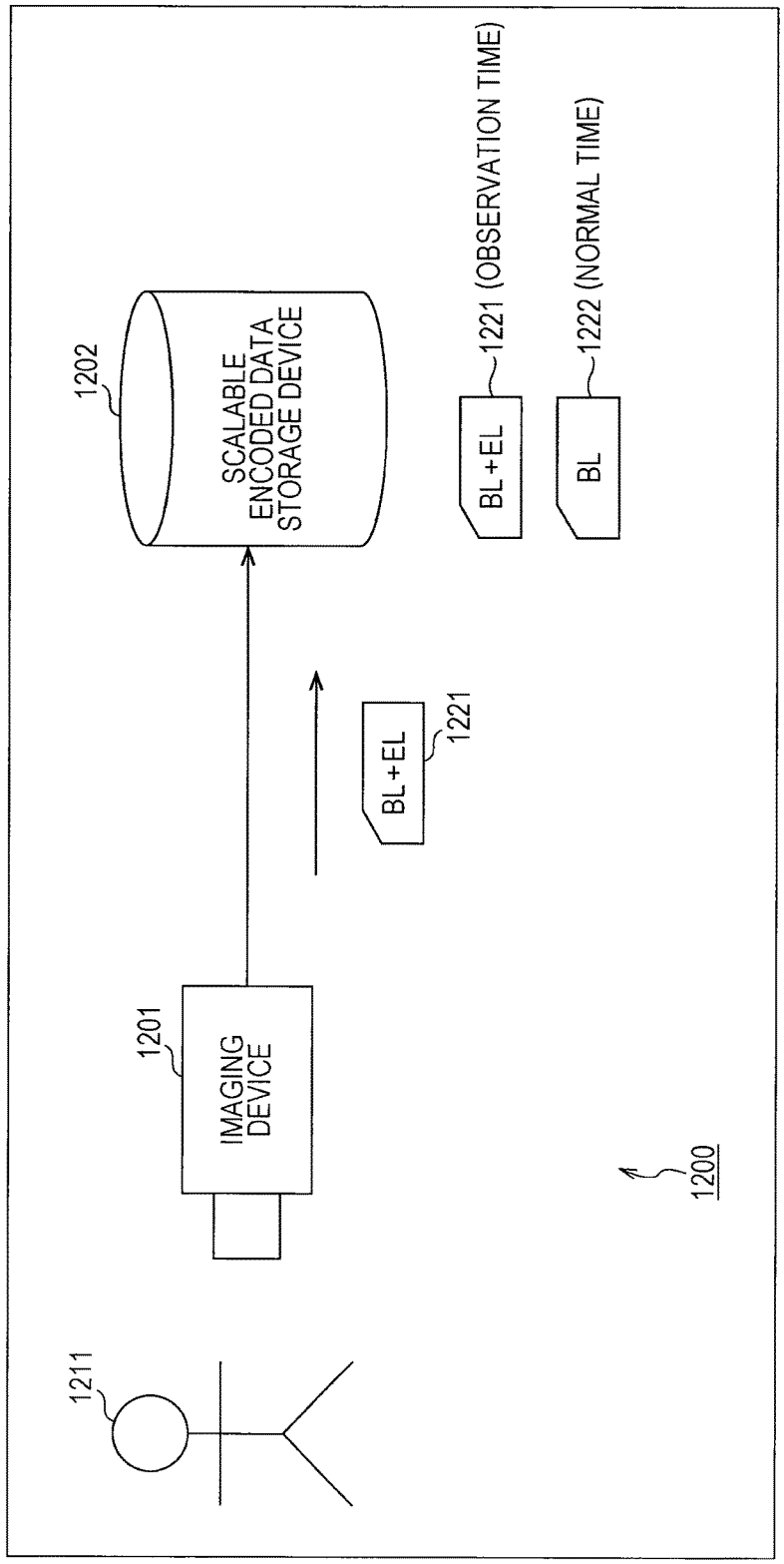

The scalable coding is used for storage of encoded data, for example, as illustrated in FIG. 120.

In an imaging system 1200 illustrated in FIG. 120, an imaging device 1201 photographs a subject 1211, performs the scalable coding on obtained image data, and provides scalable encoded data (BL+EL) 1221 to a scalable encoded data storage device 1202.

The scalable encoded data storage device 1202 stores the scalable encoded data (BL+EL) 1221 provided from the imaging device 1201 in a quality according to the situation. For example, during a normal time, the scalable encoded data storage device 1202 extracts data of the base layer from the scalable encoded data (BL+EL) 1221, and stores the extracted data as scalable encoded data (BL) 1222 of the base layer having a small amount of data in a low quality. On the other hand, for example, during an observation time, the scalable encoded data storage device 1202 stores the scalable encoded data (BL+EL) 1221 having a large amount of data in a high quality without change.

Accordingly, the scalable encoded data storage device 1202 can store an image in a high quality only when necessary, and thus it is possible to suppress an increase in an amount of data and improve use efficiency of a memory area while suppressing a reduction in a value of an image caused by quality deterioration.

For example, the imaging device 1201 is a monitoring camera. When monitoring target (for example, intruder) is not shown on a photographed image (during a normal time), content of the photographed image is likely to be inconsequential, and thus a reduction in an amount of data is prioritized, and image data (scalable encoded data) is stored in a low quality. On the other hand, when a monitoring target is shown on a photographed image as the subject 1211 (during an observation time), content of the photographed image is likely to be consequential, and thus an image quality is prioritized, and image data (scalable encoded data) is stored in a high quality.

It may be determined whether it is the normal time or the observation time, for example, by analyzing an image through the scalable encoded data storage device 1202. Further, the imaging device 1201 may perform the determination and transmit the determination result to the scalable encoded data storage device 1202.

Further, a determination criterion as to whether it is the normal time or the observation time is arbitrary, and content of an image serving as the determination criterion is arbitrary. Of course, a condition other than content of an image may be a determination criterion. For example, switching may be performed according to the magnitude or a waveform of a recorded sound, switching may be performed at certain time intervals, or switching may be performed according an external instruction such as the user's instruction.

The above description has been described in connection with the example in which switching is performed between two states of the normal time and the observation time, but the number of states is arbitrary. For example, switching may be performed among three or more states such as a normal time, a low-level observation time, an observation time, a high-level observation time, and the like. Here, an upper limit number of states to be switched depends on the number of layers of scalable encoded data.

Further, the imaging device 1201 may decide the number of layers for the scalable coding according to a state. For example, during the normal time, the imaging device 1201 may generate the scalable encoded data (BL) 1222 of the base layer having a small amount of data in a low quality and provide the scalable encoded data (BL) 1222 of the base layer to the scalable encoded data storage device 1202. Further, for example, during the observation time, the imaging device 1201 may generate the scalable encoded data (BL+EL) 1221 of the base layer having a large amount of data in a high quality and provide the scalable encoded data (BL+EL) 1221 of the base layer to the scalable encoded data storage device 1202.

The above description has been made in connection with the example of a monitoring camera, but the purpose of the imaging system 1200 is arbitrary and not limited to a monitoring camera.

In the present specification, the description has proceeded with the example in which various kinds of information such as the reference image specifying information and the weighting generation information is multiplexed into an encoded stream and transmitted from an encoding side to a decoding side. However, the technique of transmitting the information is not limited to this example. For example, the information may be transmitted or recorded as individual data associated with an encoded bit stream without being multiplexed into an encoded bitstream. Here, a term "associated" means that an image (or a part of an image such as a slice or a block) included in a bitstream can be linked with information corresponding to the image at the time of decoding. In other words, the information may be transmitted through a transmission path different from an image (or a bitstream). Further, the information may be recorded in a recording medium (or a different recording area of the same recording medium) different from an image (or a bitstream). Furthermore, the information and the image (or the bitstream) may be associated with each other, for example, in arbitrary units such as in units of a plurality of frames, in units of frames, or in units of parts of a frame.

The present technology can be applied to an encoding device or a decoding device used when a bitstream compressed by orthogonal transform such as discrete cosine transform (DCT) and motion compensation as in MPEG or H.26x is received via a network medium such as satellite broadcasting, a cable television, the Internet, or a mobile phone or processed on a storage medium such as an optical disk, a magnetic disk, or a flash memory.

Further, in this specification, the description has proceeded with the example in which encoding and decoding are performed according to the scheme complying with the HEVC scheme, but the application of the present technology is not limited to this example. The present technology can be applied to an encoding device and a decoding device of any other scheme as long as the encoding device hierarchizes an image to be currently encoded and encodes the image using inter prediction such as a base image and an enhancement image correspond to each other in a one-to-one manner as in the spatial scalability or the SNR scalability, and the decoding device performs a corresponding operation.

Further, an embodiment of the present technology is not limited to the above embodiments, and various changes can be made within a scope not departing from the gist of the present disclosure.

For example, the present technology may have a cloud computing configuration in which one function is shared and jointly processed by a plurality of devices via a network.

The steps described above with reference to the flowcharts may be performed by a single device or may be shared and performed by a plurality of devices.

Furthermore, when a plurality of processes are included in a single step, the plurality of processes included in the single step may be performed by a single device or may be shared and performed by a plurality of devices.

Further, the first embodiment may be combined with the second embodiment. In this case, the reference image specifying information and the weighting information are shared or predicted between layers.

The present technology can have the following configurations as well.

(1)

An encoding device, including:

a setting unit that sets reference image generation information used for generation of first reference image information using the first reference image information serving as information related to a first reference image used when a first scalable image of an image having a hierarchical structure is encoded and second reference image information serving as information related to a second reference image of a second scalable image;

an encoding unit that encodes the first scalable image using the first reference image, and generates encoded data; and a transmission unit that transmits the encoded data generated by the encoding unit and the reference image generation information set by the setting unit.

(2)

The encoding device according to (1), wherein the setting unit sets information indicating that the second reference image information is used as the first reference image information as the reference image generation information when the first reference image information is identical to the second reference image information.

(3)

The encoding device according to (1) or (2), wherein the setting unit sets a difference between the first reference image information and the second reference image information and information indicating that the first reference image information is predicted from the second reference image information and the difference as the reference image generation information when the first reference image information is not identical to the second reference image information.

(4)

The encoding device according to any of (1) to (3), wherein the transmission unit transmits information specifying the first layer.

(5)

The encoding device according to (2), wherein the first reference image information is information specifying the first reference image, and the second reference image information is information specifying the second reference image.

(6)

The encoding device according to (5), wherein the setting unit sets the reference image generation information in units of sequence parameter sets (SPSs).

(7)

The encoding device according to (5) or (6), wherein when first reference image specifying information serving as information specifying the first reference image of a short term is identical to second reference image specifying information serving as information specifying the second reference image of the short term, the setting unit sets information indicating that the second reference image specifying information of the short term is used as the first reference image specifying information of the short term as the reference image generation information of the short term, and when the first reference image specifying information of a long term is identical to the second reference image specifying information of the long term, the setting unit sets information indicating that the second reference image specifying information of the long term is used as the first reference image specifying information of the long term as the reference image generation information of the long term.

(8)

The encoding device according to (5) or (6), wherein the setting unit sets information indicating that the second reference image specifying information is used as the first reference image specifying information as the reference image generation information based on a setting mode of the first reference image when first reference image specifying information serving as information specifying the first reference image of a short term is identical to second reference image specifying information serving as information specifying the second reference image of the short term.

(9)

The encoding device according to any one of (5) to (8), wherein the setting unit sets the reference image generation information based on a coding scheme of the second scalable image.

(10)

The encoding device according to (5) or (6), wherein the setting unit sets information indicating that some second reference image specifying information of the short term is used as the first reference image specifying information of the short term as the reference image generation information when all first reference image specifying information serving as information specifying the first reference image of a short term is included in second reference image specifying information serving as information specifying the second reference image of the short term.

(11)

The encoding device according to (10), wherein the setting unit sets utilization information indicating that the second reference image specifying information of the short term is used as the first reference image specifying information of the short term for each second reference image when all the first reference image specifying information of the short term is included in the second reference image specifying information of the short term, and the transmission unit transmits the utilization information set by the setting unit.

(12)

The encoding device according to any one of (1) to (4), further including, a weighting processing unit that weights the first reference image using weighting information including a weight coefficient, wherein the first reference image information is the weighting information of the first reference image, the second reference image information is the weighting information of the second reference image, and the encoding unit encodes the first scalable image using the first reference image weighted by the weighting processing unit.

(13)

The encoding device according to (12), wherein the weighting processing unit weights the first reference image when the second reference image is weighted.

(14)

An encoding method performed by an encoding device, including:

a setting step of setting reference image generation information used for generation of first reference image information using the first reference image information serving as information related to a first reference image used when a first scalable image of an image having a hierarchical structure is encoded and second reference image information serving as information related to a second reference image of a second scalable image;

an encoding step of encoding the first scalable image using the first reference image, and generates encoded data; and a transmission step of transmitting the encoded data generated in the encoding step and the reference image generation information set in the setting step.

(15)

A decoding device, including:

a reception unit that receives reference image generation information used for generation of first reference image information generated using the first reference image information serving as information related to a first reference image used when a first scalable image of an image having a hierarchical structure is encoded and second reference image information serving as information related to a second reference image of a second scalable image and encoded data of the first scalable image;

a generation unit that generates the first reference image information using the reference image generation information; and a decoding unit that decodes the encoded data of the first scalable image using the first reference image based on the first reference image information generated by the generation unit.

(16)

The decoding device according to (15), wherein the reception unit receives information indicating that the second reference image information is used as the first reference image information as the reference image generation information, and the generation unit generates the second reference image information as the first reference image information based on the reference image generation information received by the reception unit.

(17)

The decoding device according to (15) or (16), wherein the reception unit receives a difference between the first reference image information and the second reference image information and information indicating that the first reference image information is predicted from the second reference image information and the difference as the reference image generation information, and the generation unit adds the second reference image information to the difference received by the reception unit based on the information received by the reception unit, and generates an addition value obtained as a result as the first reference image information.

(18)

The decoding device according to any of (15) to (17), wherein the reception unit receives information specifying the first layer, and the generation unit generates the first reference image information based on information specifying the first layer received by the reception unit.

(19)

The decoding device according to (16), wherein the first reference image information is information specifying the first reference image, and the second reference image information is information specifying the second reference image.

(20)

The decoding device according to (19), wherein the reception unit receives the reference image generation information set in units of sequence parameter sets (SPSs).

(21)

The decoding device according to (19) or (20), wherein the reception unit receives the reference image generation information of a short term indicating that second reference image specifying information serving as information specifying the second reference image of the short term is used as first reference image specifying information serving as information specifying the first reference image of the short term and the reference image generation information of a long term indicating that the second reference image specifying information of the long term is used as the first reference image specifying information of the long term, the generation unit generates the second reference image specifying information of the short term as the first reference image specifying information of the short term based on the reference image generation information of the short term received by the reception unit, and generates the second reference image specifying information of the long term as the first reference image specifying information of the long term based on the reference image generation information of the long term received by the reception unit.

(22)

The decoding device according to (19) or (20), wherein the reception unit receives information indicating that second reference image specifying information serving as information specifying the second reference image of a short term is used as first reference image specifying information serving as information specifying the first reference image of a short term set based on a setting mode of the first reference image as the reference image generation information, and the generation unit generates the second reference image specifying information of the short term as the first reference image specifying information of the short term based on the reference image generation information received by the reception unit, and generates the second reference image specifying information of the long term as the first reference image specifying information of the long term based on the reference image generation information and the setting mode.

(23)

The decoding device according to any one of (19) to (22), wherein the reception unit receives the reference image generation information set based on a coding scheme of the second scalable image.

(24)

The decoding device according to (19) or (20), wherein the reception unit receives information indicating that some second reference image specifying information serving as information specifying the second reference image of a short term is used as first reference image specifying information serving as information specifying the first reference image of the short term as the reference image generation information, the generation unit generates the some second reference image specifying information of the short term as the first reference image specifying information of the short term based on the reference image generation information received by the reception unit.

(25)

The decoding device according to (24), wherein the reception unit receives utilization information indicating that the second reference image specifying information of the short term is used as the first reference image specifying information of the short term for each second reference image, and the generation unit generates the some second reference image specifying information of the short term as the first reference image specifying information of the short term based on the reference image generation information and the utilization information received by the reception unit.

(26)

The decoding device according to any of (15) to (18), further including, a weighting processing unit that weights the first reference image using weighting information including a weight coefficient, wherein the first reference image information is the weighting information of the first reference image, the second reference image information is the weighting information of the second reference image, the weighting processing unit weights the first reference image using the first reference image information generated by the generation unit, and the decoding unit decodes encoded data of the first scalable image using the first reference image weighted by the weighting processing unit.

(27)

The decoding device according to (26), wherein the weighting processing unit weights the first reference image when the second reference image is weighted.

(28)

A decoding method performed by a decoding device, including:

a reception step of receiving reference image generation information used for generation of first reference image information generated using the first reference image information serving as information related to a first reference image used when a first scalable image of an image having a hierarchical structure is encoded and second reference image information serving as information related to a second reference image of a second scalable image and encoded data of the first scalable image;

a generation step of generating the first reference image information using the reference image generation information; and a decoding step of decoding the encoded data of the first scalable image using the first reference image based on the first reference image information generated in the generation step.

REFERENCE SIGNS LIST

10 Encoding device
14 Transmission unit
33 Operation unit
50 Reference image setting unit
90 Decoding device
91 Reception unit
135 Addition unit
163 Generation unit
180 Encoding device
221 Motion prediction/compensation unit
223 Weight setting unit
280 Decoding device 323 Motion compensation unit
354 Generation unit

The invention claimed is:

1. An encoding device, comprising:
   circuitry configured to
   set reference image generation information used for generation of first reference image information using the first reference image information specifying a first reference image of a slice used when a first scalable image of an image having a hierarchical structure is encoded and second reference image information specifying a second reference image of the slice in a second scalable image collocated with the first scalable image;
   encode the first scalable image using the first reference image;
   generate encoded data adding a flag indicating that the second reference image information is used as the first reference image information as the reference image generation information, wherein the flag is set to a sequence parameter set (SPS) of a stream including the encoded data; and
   transmit the encoded data and the reference image generation information.

2. The encoding device according to claim 1, wherein the circuitry is configured to transmit information specifying a first layer, the first reference image information being generated based on the information specifying the first layer.

3. An encoding method performed by an encoding device, comprising:
   setting, using circuitry, reference image generation information used for generation of first reference image information using the first reference image information specifying a first reference image of a slice used when a first scalable image of an image having a hierarchical structure is encoded and second reference image information specifying a second reference image of the slice in a second scalable image collocated with the first scalable image;
   encoding, using the circuitry, the first scalable image using the first reference image;
   generating, using the circuitry, encoded data adding a flag indicating that the second reference image information is used as the first reference image information as the reference image generation information, wherein the flag is set to a sequence parameter set (SPS) of a stream including the encoded data; and
   transmitting, using the circuitry, the encoded data and the reference image generation information.

* * * * *